US009802387B2

(12) United States Patent
Cheney et al.

(10) Patent No.: US 9,802,387 B2
(45) Date of Patent: Oct. 31, 2017

(54) CORROSION RESISTANT HARDFACING ALLOY

(71) Applicant: Scoperta, Inc., San Diego, CA (US)

(72) Inventors: Justin Lee Cheney, Encinitas, CA (US); Shengjun Zhang, San Diego, CA (US); John Hamilton Madok, San Diego, CA (US); Jonathon Bracci, Carlsbad, CA (US)

(73) Assignee: Scoperta, Inc., San Diego, CA (US)

( * ) Notice: Subject to any disclaimer, the term of this patent is extended or adjusted under 35 U.S.C. 154(b) by 338 days.

(21) Appl. No.: 14/555,245

(22) Filed: Nov. 26, 2014

(65) Prior Publication Data
US 2015/0147591 A1 May 28, 2015

Related U.S. Application Data

(60) Provisional application No. 61/908,912, filed on Nov. 26, 2013.

(51) Int. Cl.
*B32B 15/01* (2006.01)
*C22C 37/06* (2006.01)
*C22C 37/10* (2006.01)
*C22C 38/32* (2006.01)
*C22C 38/30* (2006.01)
*C22C 38/28* (2006.01)
*C22C 38/26* (2006.01)
*C22C 38/24* (2006.01)
*C22C 38/22* (2006.01)
*C22C 38/04* (2006.01)
*C22C 38/02* (2006.01)
*C22C 33/02* (2006.01)
*C23C 4/067* (2016.01)
*F16L 58/08* (2006.01)
*F16L 57/06* (2006.01)
*B22F 3/115* (2006.01)

(52) U.S. Cl.
CPC ........ *B32B 15/011* (2013.01); *C22C 33/0285* (2013.01); *C22C 37/06* (2013.01); *C22C 37/10* (2013.01); *C22C 38/02* (2013.01); *C22C 38/04* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C23C 4/067* (2016.01); *B22F 3/115* (2013.01); *F16L 57/06* (2013.01); *F16L 58/08* (2013.01); *Y10T 428/12958* (2015.01)

(58) Field of Classification Search
None
See application file for complete search history.

(56) References Cited

U.S. PATENT DOCUMENTS

| | | |
|---|---|---|
| 2,043,952 A | 6/1936 | Ffield |
| 2,156,306 A | 5/1939 | Rapatz |
| 2,608,495 A | 8/1952 | Barry |
| 2,873,187 A | 2/1959 | Dyrkaez et al. |
| 2,936,229 A | 5/1960 | Shepard |
| 3,024,137 A | 3/1962 | Witherell |
| 3,113,021 A | 12/1963 | Witherell |
| 3,181,970 A | 5/1965 | Witherell et al. |
| 3,303,063 A | 2/1967 | Pietryka et al. |
| 3,448,241 A | 6/1969 | Penson et al. |
| 3,554,792 A | 1/1971 | Johnson |
| 3,650,734 A | 3/1972 | Kantor et al. |
| 3,843,359 A | 10/1974 | Fiene et al. |
| 3,859,060 A | 1/1975 | Eiselstein et al. |
| 3,942,954 A | 3/1976 | Frehn |
| 3,975,612 A | 8/1976 | Nakazaki et al. |
| 4,010,309 A | 3/1977 | Petersen |
| 4,017,339 A | 4/1977 | Okuda et al. |
| 4,042,383 A | 8/1977 | Petersen et al. |
| 4,066,451 A | 1/1978 | Rudy |
| 4,214,145 A | 7/1980 | Zvanut et al. |
| 4,235,630 A | 11/1980 | Babu |
| 4,255,709 A | 3/1981 | Zatsepin et al. |
| 4,277,108 A | 7/1981 | Wallace |
| 4,297,135 A | 10/1981 | Giessen et al. |
| 4,365,994 A | 12/1982 | Ray |
| 4,415,530 A | 11/1983 | Hunt |
| 4,419,130 A | 12/1983 | Slaughter |
| 4,576,653 A | 3/1986 | Ray |
| 4,596,282 A | 6/1986 | Maddy et al. |

(Continued)

FOREIGN PATENT DOCUMENTS

| | | |
|---|---|---|
| CA | 2774546 | 1/2015 |
| CN | 102233490 A | 11/2011 |

(Continued)

OTHER PUBLICATIONS

Branagan, et al.: Developing extreme hardness (>15GPa) in iron based nanocomosites, Composites Part A: Applied Science and Manufacturing, Elsevier Science Publishers B.V., Amsterdam, NL, vol. 33, No. 6, Jun. 1, 2002, pp. 855-859.

Cheney, et al.: "Development of quaternary Fe-based bulk metallic glasses," Materials Science and Engineering, vol. 492, No. 1-2, Sep. 25, 2008, pp. 230-235.

Khalifa, et al.: "Effect of Mo—Fe substitution on glass forming ability, thermal stability, and hardness of Fe—C—B—Mo—Cr—W bulk amorphous allows," Materials Science and Engineering, vol. 490, No. 1-2, Aug. 25, 2008, pp. 221-228.

(Continued)

*Primary Examiner* — Adam Krupicka
(74) *Attorney, Agent, or Firm* — Knobbe, Martens, Olson & Bear LLP

(57) ABSTRACT

Disclosed herein are embodiments of iron-based corrosion resistant hardfacing alloys. The alloys can be designed through the use of different compositional, thermodynamic, microstructural, and performance criteria. In some embodiments, chromium content in the alloy can be increased while avoiding the formation of different hard chromium carbides, thereby increasing the corrosion resistance of the alloy.

23 Claims, 9 Drawing Sheets

(56) References Cited

U.S. PATENT DOCUMENTS

| | | |
|---|---|---|
| 4,606,977 A | 8/1986 | Dickson et al. |
| 4,635,701 A | 1/1987 | Sare et al. |
| 4,639,576 A | 1/1987 | Shoemaker et al. |
| 4,666,797 A | 5/1987 | Newman et al. |
| 4,673,550 A | 6/1987 | Dallaire et al. |
| 4,762,681 A | 8/1988 | Tassen et al. |
| 4,803,045 A | 2/1989 | Ohriner et al. |
| 4,822,415 A | 4/1989 | Dorfman et al. |
| 4,919,728 A | 4/1990 | Kohl et al. |
| 4,981,644 A | 1/1991 | Chang |
| 5,094,812 A | 3/1992 | Dulmaine et al. |
| 5,252,149 A | 10/1993 | Dolman |
| 5,306,358 A | 4/1994 | Lai et al. |
| 5,375,759 A | 12/1994 | Hiraishi et al. |
| 5,567,251 A | 10/1996 | Peker et al. |
| 5,570,636 A | 11/1996 | Lewis |
| 5,618,451 A | 4/1997 | Ni |
| 5,820,939 A | 10/1998 | Popoola et al. |
| 5,858,558 A | 1/1999 | Zhao et al. |
| 5,861,605 A | 1/1999 | Ogawa et al. |
| 5,907,017 A | 5/1999 | Ober et al. |
| 5,935,350 A | 8/1999 | Raghu et al. |
| 5,942,289 A | 8/1999 | Jackson |
| 5,988,302 A | 11/1999 | Sreshta et al. |
| 6,117,493 A | 9/2000 | North |
| 6,171,222 B1 | 1/2001 | Lakeland et al. |
| 6,210,635 B1 | 4/2001 | Jackson et al. |
| 6,232,000 B1 | 5/2001 | Singh et al. |
| 6,326,582 B1 | 12/2001 | North |
| 6,331,688 B1 | 12/2001 | Hallén et al. |
| 6,332,936 B1 | 12/2001 | Hajaligol et al. |
| 6,375,895 B1 | 4/2002 | Daemen |
| 6,398,103 B2 | 6/2002 | Hasz et al. |
| 6,441,334 B1 | 8/2002 | Aida et al. |
| 6,582,126 B2 | 6/2003 | North |
| 6,608,286 B2 | 8/2003 | Jiang |
| 6,669,790 B1 | 12/2003 | Gundlach et al. |
| 6,689,234 B2 | 2/2004 | Branagan |
| 6,702,905 B1 | 3/2004 | Qiao et al. |
| 6,702,906 B2 | 3/2004 | Ogawa et al. |
| 6,750,430 B2 | 6/2004 | Kelly |
| 7,052,561 B2 | 5/2006 | Lu et al. |
| 7,219,727 B2 | 5/2007 | Slack et al. |
| 7,285,151 B2 | 10/2007 | Sjodin et al. |
| 7,361,411 B2 | 4/2008 | Daemen et al. |
| 7,491,910 B2 | 2/2009 | Kapoor et al. |
| 7,553,382 B2 | 6/2009 | Branagan et al. |
| 7,569,286 B2 | 8/2009 | Daemen et al. |
| 7,776,451 B2 | 8/2010 | Jiang et al. |
| 7,935,198 B2 | 5/2011 | Branagan et al. |
| 8,070,894 B2 | 12/2011 | Branagan |
| 8,097,095 B2 | 1/2012 | Branagan |
| 8,153,935 B2 | 4/2012 | Jang et al. |
| 8,187,529 B2 | 5/2012 | Powell |
| 8,187,725 B2 | 5/2012 | Kiser et al. |
| 8,268,453 B2 | 9/2012 | Dallaire |
| 8,474,541 B2 | 7/2013 | Branagan et al. |
| 8,562,759 B2 | 10/2013 | Cheney et al. |
| 8,562,760 B2 | 10/2013 | Cheney et al. |
| 8,640,941 B2 | 2/2014 | Cheney |
| 8,647,449 B2 | 2/2014 | Cheney et al. |
| 8,658,934 B2 | 2/2014 | Branagan et al. |
| 8,662,143 B1 | 3/2014 | Foster |
| 8,702,835 B2 | 4/2014 | Yu et al. |
| 8,703,046 B2 | 4/2014 | Hanejko |
| 8,704,134 B2 | 4/2014 | Branagan et al. |
| 8,777,090 B2 | 7/2014 | Miller et al. |
| 8,801,872 B2 | 8/2014 | Wright et al. |
| 8,808,471 B2 | 8/2014 | Wright et al. |
| 8,858,675 B2 | 10/2014 | Larsson |
| 8,870,997 B2 | 10/2014 | Klekovkin et al. |
| 8,911,662 B2 | 12/2014 | Larsson |
| 8,920,938 B2 | 12/2014 | Hesse et al. |
| 8,992,659 B2 | 3/2015 | Larsson et al. |
| 9,051,635 B2 | 6/2015 | Jou |
| 9,095,932 B2 | 8/2015 | Miller et al. |
| 9,145,598 B2 | 9/2015 | Oshchepkov |
| 9,174,293 B2 | 11/2015 | Meyer et al. |
| 9,193,011 B2 | 11/2015 | Mars et al. |
| 9,233,419 B2 | 1/2016 | Gries |
| 9,255,309 B2 | 2/2016 | Aimone |
| 9,309,585 B2 | 4/2016 | Cheney et al. |
| 9,314,848 B2 | 4/2016 | Larsson |
| 9,340,855 B2 | 5/2016 | Schade et al. |
| 9,394,591 B2 | 7/2016 | Deodeshmukh et al. |
| 9,399,907 B2 | 7/2016 | Mo et al. |
| 9,469,890 B2 | 10/2016 | Bengtsson |
| 9,540,711 B2 | 1/2017 | Fifield |
| 2001/0019781 A1 | 9/2001 | Hasz |
| 2002/0054972 A1 | 5/2002 | Charpentier et al. |
| 2002/0098298 A1 | 7/2002 | Bolton et al. |
| 2002/0148533 A1 | 10/2002 | Kim et al. |
| 2004/0062677 A1 | 4/2004 | Chabenat et al. |
| 2004/0079742 A1 | 4/2004 | Kelly |
| 2004/0115086 A1 | 6/2004 | Chabenat et al. |
| 2004/0206726 A1 | 10/2004 | Daemen et al. |
| 2005/0047952 A1 | 3/2005 | Coleman |
| 2005/0109431 A1 | 5/2005 | Kernan et al. |
| 2006/0063020 A1 | 3/2006 | Barbezat |
| 2006/0093752 A1 | 5/2006 | Darolia et al. |
| 2006/0191606 A1 | 8/2006 | Ogawa et al. |
| 2006/0260583 A1 | 11/2006 | Abi-Akar et al. |
| 2007/0029295 A1 | 2/2007 | Branagan |
| 2007/0090167 A1 | 4/2007 | Arjakine et al. |
| 2007/0187369 A1 | 8/2007 | Menon et al. |
| 2007/0253856 A1 | 11/2007 | Vecchio et al. |
| 2007/0284018 A1 | 12/2007 | Hamano et al. |
| 2008/0001115 A1 | 1/2008 | Qiao et al. |
| 2008/0031769 A1 | 2/2008 | Yeh |
| 2008/0149397 A1 | 6/2008 | Overstreet |
| 2008/0241580 A1 | 10/2008 | Kiser et al. |
| 2008/0241584 A1 | 10/2008 | Daemen et al. |
| 2009/0017328 A1 | 1/2009 | Katoh et al. |
| 2009/0123765 A1 | 5/2009 | Branagan |
| 2009/0258250 A1 | 10/2009 | Daemen et al. |
| 2009/0285715 A1 | 11/2009 | Arjakine et al. |
| 2010/0009089 A1 | 1/2010 | Junod et al. |
| 2010/0028706 A1 | 2/2010 | Hornschu et al. |
| 2010/0044348 A1 | 2/2010 | Buchmann |
| 2010/0101780 A1 | 4/2010 | Ballew et al. |
| 2010/0155236 A1 | 6/2010 | Lee et al. |
| 2010/0166594 A1 | 7/2010 | Hirata et al. |
| 2010/0189588 A1 | 7/2010 | Kawatsu et al. |
| 2010/0258217 A1 | 10/2010 | Kuehmann |
| 2011/0004069 A1 | 1/2011 | Ochs et al. |
| 2011/0064963 A1 | 3/2011 | Cheney et al. |
| 2011/0100720 A1 | 5/2011 | Branagan et al. |
| 2011/0139761 A1 | 6/2011 | Sugahara et al. |
| 2011/0142713 A1 | 6/2011 | Kawasaki et al. |
| 2011/0162612 A1 | 7/2011 | Qiao et al. |
| 2011/0171485 A1 | 7/2011 | Kawamoto et al. |
| 2011/0220415 A1 | 9/2011 | Jin et al. |
| 2012/0055903 A1 | 3/2012 | Izutani et al. |
| 2012/0103456 A1 | 5/2012 | Smith et al. |
| 2012/0156020 A1 | 6/2012 | Kottilingam et al. |
| 2012/0160363 A1 | 6/2012 | Jin et al. |
| 2012/0288400 A1 | 11/2012 | Hirata et al. |
| 2013/0094900 A1 | 4/2013 | Folkmann et al. |
| 2013/0167965 A1 | 7/2013 | Cheney et al. |
| 2013/0171367 A1 | 7/2013 | Kusinski et al. |
| 2013/0224516 A1 | 8/2013 | Kusinski et al. |
| 2013/0260177 A1 | 10/2013 | Wallin et al. |
| 2013/0266798 A1 | 10/2013 | Cheney |
| 2013/0294962 A1 | 11/2013 | Wallin et al. |
| 2014/0044587 A1 | 2/2014 | Crook et al. |
| 2014/0044617 A1 | 2/2014 | Dreisinger |
| 2014/0060707 A1 | 3/2014 | Wright et al. |
| 2014/0065316 A1 | 3/2014 | Cheney |
| 2014/0105780 A1 | 4/2014 | Cheney |
| 2014/0131338 A1 | 5/2014 | Postle |
| 2014/0161984 A1 | 6/2014 | Cheney |
| 2014/0219859 A1 | 8/2014 | Cheney |
| 2014/0234154 A1 | 8/2014 | Cheney et al. |
| 2014/0248509 A1 | 9/2014 | Cheney |

(56) References Cited

U.S. PATENT DOCUMENTS

| | | |
|---|---|---|
| 2014/0263248 A1 | 9/2014 | Postle |
| 2014/0295194 A1 | 10/2014 | Nishiyama et al. |
| 2014/0322064 A1 | 10/2014 | Gerk et al. |
| 2014/0356223 A1 | 12/2014 | Nilsson et al. |
| 2015/0004337 A1 | 1/2015 | Zimmermann et al. |
| 2015/0075681 A1 | 3/2015 | Wright et al. |
| 2015/0086413 A1 | 3/2015 | Wolverton et al. |
| 2015/0106035 A1 | 4/2015 | Vecchio et al. |
| 2015/0152994 A1 | 6/2015 | Bondil et al. |
| 2015/0252631 A1 | 9/2015 | Miller |
| 2015/0275341 A1 | 10/2015 | Cheney et al. |
| 2015/0284817 A1 | 10/2015 | Snyder et al. |
| 2015/0284829 A1 | 10/2015 | Cheney |
| 2015/0298986 A1 | 10/2015 | Billieres et al. |
| 2015/0307968 A1 | 10/2015 | Mars et al. |
| 2015/0367454 A1 | 12/2015 | Cheney et al. |
| 2016/0001368 A1 | 1/2016 | Gries et al. |
| 2016/0002752 A1 | 1/2016 | Srivastava et al. |
| 2016/0002764 A1 | 1/2016 | Gries et al. |
| 2016/0017463 A1 | 1/2016 | Cheney |
| 2016/0024621 A1 | 1/2016 | Cheney |
| 2016/0024624 A1 | 1/2016 | Cheney |
| 2016/0024628 A1 | 1/2016 | Cheney |
| 2016/0040262 A1 | 2/2016 | Snyder et al. |
| 2016/0083830 A1 | 3/2016 | Cheney |
| 2016/0114392 A1 | 4/2016 | Berg et al. |
| 2016/0138144 A1 | 5/2016 | Olsérius et al. |
| 2016/0168670 A1 | 6/2016 | Cheney |
| 2016/0195216 A1 | 7/2016 | Bondil et al. |
| 2016/0201169 A1 | 7/2016 | Vecchio |
| 2016/0201170 A1 | 7/2016 | Vecchio |
| 2016/0215374 A1 | 7/2016 | Schade et al. |
| 2016/0222490 A1 | 8/2016 | Wright et al. |
| 2016/0243616 A1 | 8/2016 | Gries |
| 2016/0258044 A1 | 9/2016 | Litström et al. |
| 2016/0289001 A1 | 10/2016 | Shibata et al. |
| 2016/0289798 A1 | 10/2016 | Deodeshmukh et al. |
| 2016/0289799 A1 | 10/2016 | Crook et al. |
| 2016/0289803 A1 | 10/2016 | Cheney |
| 2016/0329139 A1 | 11/2016 | Jayaraman |
| 2016/0376686 A1 | 12/2016 | Jou |
| 2017/0014865 A1 | 1/2017 | Kusinski et al. |

FOREIGN PATENT DOCUMENTS

| | | |
|---|---|---|
| CN | 102357750 A | 2/2012 |
| CN | 102686762 | 3/2014 |
| CN | 103635284 | 3/2014 |
| CN | 104039483 | 9/2014 |
| DE | 2754437 | 7/1979 |
| DE | 33 20 513 | 12/1983 |
| DE | 42 02 828 | 8/1993 |
| EP | 0 365 884 | 5/1990 |
| EP | 1 270 755 | 1/2003 |
| EP | 1 338 663 | 8/2003 |
| EP | 2 305 415 | 8/2003 |
| EP | 1 857 204 | 11/2007 |
| EP | 2 064 359 | 6/2009 |
| EP | 2 388 345 | 11/2011 |
| EP | 2 660 342 | 11/2013 |
| EP | 2 072 627 | 4/2014 |
| EP | 2 730 355 | 5/2014 |
| EP | 2 743 361 | 6/2014 |
| EP | 2 104 753 | 7/2014 |
| EP | 2 778 247 | 9/2014 |
| EP | 2 563 942 | 10/2015 |
| EP | 3 034 637 | 6/2016 |
| EP | 2 235 225 | 10/2016 |
| GB | 2 153 846 A | 8/1985 |
| IN | MUMNP-2003-00842 | 4/2005 |
| JP | 58-132393 | 8/1983 |
| JP | 60-133996 A | 7/1985 |
| JP | 63-026205 A | 2/1988 |
| JP | 03-133593 A | 6/1991 |
| JP | 2012-000616 | 1/2012 |
| KR | 10-0935816 B1 | 1/2010 |
| TW | 200806801 A | 2/2008 |
| WO | WO 84/00385 | 2/1984 |
| WO | WO 84/04760 | 12/1984 |
| WO | WO 2006/086350 | 8/2006 |
| WO | WO 2008/011448 | 5/2008 |
| WO | WO 2008/082353 | 7/2008 |
| WO | WO 2010/044740 | 4/2010 |
| WO | WO 2010/046224 | 4/2010 |
| WO | WO 2010/074634 | 7/2010 |
| WO | WO 2011/035193 | 9/2010 |
| WO | WO 2011/021751 | 2/2011 |
| WO | WO 2011/071054 | 6/2011 |
| WO | WO 2011/158706 | 12/2011 |
| WO | WO 2012/021186 | 2/2012 |
| WO | WO 2012/022874 | 2/2012 |
| WO | WO/2012/037339 | 3/2012 |
| WO | WO 2012/112844 | 8/2012 |
| WO | WO/2012/129505 | 9/2012 |
| WO | WO 2013/060839 | 5/2013 |
| WO | WO 2013/101561 | 7/2013 |
| WO | WO 2013/102650 | 7/2013 |
| WO | WO 2013/126134 | 8/2013 |
| WO | WO/2013/133944 | 9/2013 |
| WO | WO 2014/001544 | 1/2014 |
| WO | WO 2014/023646 | 2/2014 |
| WO | WO 2014/059177 | 4/2014 |
| WO | WO 2014/081491 | 5/2014 |
| WO | WO 2014/083544 | 6/2014 |
| WO | WO 2014/085319 | 6/2014 |
| WO | WO 2014/090922 | 6/2014 |
| WO | WO 2014/114714 | 7/2014 |
| WO | WO 2014/114715 | 7/2014 |
| WO | WO 2014/187867 | 11/2014 |
| WO | WO 2014/197088 | 12/2014 |
| WO | WO 2014/201239 | 12/2014 |
| WO | WO 2014/202488 | 12/2014 |
| WO | WO 2015/028358 | 3/2015 |
| WO | WO 2015/049309 | 4/2015 |
| WO | WO 2015/075122 | 5/2015 |
| ZA | 2013/02311 | 12/2013 |

OTHER PUBLICATIONS

Tillack, et al.: "Selection of Nickel, Nickel-Copper, Nickel-Cromium, and Nickel-Chromium-Iron Allows", AMS Handbook, Welding, Brazing and Soldering, vol. 6,Dec. 1, 1993 (Dec. 1, 1993) pp. 586-592, XP008097120, p. 589.

Chen et al.: "Characterization of Microstructure and Mechanical Properties of High Chromium Cast Irons Using SEM and Nanoindentation," JMEPEG 2015 (published online Oct. 30, 2014), vol. 24(1), pp. 98-105.

Cheney: Modeling the Glass Forming Ability of Metals. A Dissertation submitted in partial satisfaction of the Requirements for the degree of Doctor of Philosophy. University of California, San Diego. Dec. 2007.

Miracle, D.B.: The efficient cluster packing model—An atomic structural model for metallic glasses, Acta Materialia vol. 54, Issue 16, Sep. 2006, pp. 4317-4336.

Yoo et al.: "The effect of boron on the wear behavior of iron-based hardfacing alloys for nuclear power plants valves," Journal of Nuclear Materials 352 (2006) 90-96.

Audouard JP, et al. Corrosion Performance and Field Experience With Super Duplex and Super Austenitic Stainless Steels in FGD Systems. Corrosion 2000; p. 4, table 2.

Davis, JR, ed. Stainless steels. ASM international, 1994; p. 447.

International Search Report and Written Opinion re PCT Application No. PCT/US14/67637, mailed Feb. 18, 2015.

Iron-Carbon (Fe—C) Phase Diagram [online], [retrieved on Jan. 27, 2015]. Retrieved from the Internet: <URL: http://www.calphad.com/iron-carbon.html>.

Titanium-Boron (TiB) Phase Diagram [online], [retrieved on Jan. 27, 2015]. Retrieved from the Internet:<URL:http://www.calphad.com/titaniumboron.html>.

Nb—C Phase Diagram [online], [retrieved on Jan. 27, 2015]. Retrieved from the Internet: <URL: http://www.crct.polymtl.ca/fact/documentation/BINARY/C-Nb.jpg>.

(56) References Cited

OTHER PUBLICATIONS

Mo—C Phase Diagram [online], [retrieved on Jan. 27, 2015]. Retrieved from the Internet: <URL: http://www.factsage.cn/fact/documentation/SGTE/C-Mo.jpg>.

Cr—C Phase Diagram [online], [retrieved on Jan. 27, 2015]. Retrieved from the Internet: http://www.azom.com/work/3ud2quvLOU9g4VBMjVEh_files/image002.gif.

US 9,802,387 B2

CORROSION RESISTANT HARDFACING ALLOY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The disclosure relates in some embodiments to hard coatings and weld overlays used to protect surfaces from wear and corrosion Description of the Related Art The hardfacing process is a technique by which a hard metal alloy is deposited onto a surface which requires protection from wear. In some cases hardfacing materials are also subject to corrosive media, most commonly salt water. An example of such an application is a pipeline which carries an abrasive slurry composed of a mixture of sands, rocks and saltwater. This application is common to the mining industry.

The most common hardfacing materials belong to the family of chromium carbides. For the purposes of this disclosure, chromium carbide overlays are defined as any material which forms hypereutectic or hypoeutectic chromium carbides. In these alloys, the large volume fraction of chromium carbides generates the wear resistance required of the hardfacing material. However, chromium carbides exhibit two negative effects: 1) they deplete the matrix of chromium and 2) they embrittle the microstructure.

SUMMARY

Disclosed herein are embodiments of a work piece having at least a portion of its surface covered by a layer possessing a hardness of at least 50 Rockwell C and an elevated corrosion resistance as defined by a corrosion rate loss of less than about 6 mils per year in an aerated salt water environment (3.5% NaCl). In some embodiments, the layer can exhibit a corrosion rate loss of less than about 3 mils per year in an aerated salt water environment (3.5% NaCl).

In some embodiments, the layer can comprise Fe and in wt. %: B: 0-2, C: 0-2, Co: 0-1, Cr, 12-20, Mn, 0-2, Mo: 0-10, Nb: 0-6, Si: 0-2, Ti: 0-4, V: 0-2. In some embodiments, the layer can comprise Fe and in wt. %: B: 0-1, C: 1, Co: 0.5, Cr, 12, Mn, 0.5, Mo: 0.5, Nb: 0.35-1, Si: 1.5, Ti: 0.25-1.8, V: 0.5.

In some embodiments, the alloy composition can be selected from the group consisting of, in wt. %, Fe:, C: 1, Co: 0.5, Cr: 12, Mn: 0.5, Mo: 0.5, Nb: 0.35, Si: 1.5, Ti: 0.25, V: 0.5; Fe:, B: 1, C: 1, Co: 0.5, Cr: 12, Mn: 0.5, Mo: 0.5, Nb: 0.35, Si: 1.5, Ti: 0.25, V: 0.5; Fe:, B: 1, C: 1, Co: 0.5, Cr: 12, Mn: 0.5, Mo: 0.5, Nb: 1, Si: 1.5, Ti: 1, V: 0.5; Fe:, and B: 1, C: 1, Co: 0.5, Cr: 12, Mn: 0.5, Mo: 0.5, Nb: 0.35, Si: 1.5, Ti: 1.8, V: 0.5.

Also disclosed herein are embodiments of a work piece having at least a portion of its surface covered by a layer comprising an alloy having an hard particle mole fraction equal to or above about 10% and a matrix chromium content equal to or above about 8 weight %, wherein the matrix can be defined as ferritic, austenitic, or martensitic iron.

In some embodiments, the layer can comprise Fe and in wt. %: B: 0-2, C: 0-2, Co: 0-1, Cr, 12-20, Mn, 0-2, Mo: 0-10, Nb: 0-6, Si: 0-2, Ti: 0-4, V: 0-2. In some embodiments, the layer can comprise Fe and in wt. %: B: 0-1, C: 1, Co: 0.5, Cr, 12, Mn, 0.5, Mo: 0.5, Nb: 0.35-1, Si: 1.5, Ti: 0.25-1.8, V: 0.5.

In some embodiments, the alloy composition can be selected from group consisting, in wt. %, Fe, C: 1, Co: 0.5, Cr: 12, Mn: 0.5, Mo: 0.5, Nb: 0.35, Si: 1.5, Ti: 0.25, V: 0.5; Fe, B: 1, C: 1, Co: 0.5, Cr: 12, Mn: 0.5, Mo: 0.5, Nb: 0.35, Si: 1.5, Ti: 0.25, V: 0.5; Fe, B: 1, C: 1, Co: 0.5, Cr: 12, Mn: 0.5, Mo: 0.5, Nb: 1, Si: 1.5, Ti: 1, V: 0.5; and Fe, B: 1, C: 1, Co: 0.5, Cr: 12, Mn: 0.5, Mo: 0.5, Nb: 0.35, Si: 1.5, Ti: 1.8, V: 0.5.

Also disclosed herein are embodiments of a work piece having at least a portion of its surface covered by a layer comprising an alloy containing hard particles of about 10% volume fraction or greater comprising one or more of boride, carbide, borocarbide, nitride, carbonitride, aluminide, oxide, intermetallic, and laves phases embedded in a ferritic, austenitic, or martensitic iron matrix possessing at least about 8% Cr in solid solution.

In some embodiments, the layer can comprise Fe and in wt. %: B: 0-2, C: 0-2, Co: 0-1, Cr, 12-20, Mn, 0-2, Mo: 0-10, Nb: 0-6, Si: 0-2, Ti: 0-4, V: 0-2. In some embodiments, the layer can comprise Fe and in wt. %: B: 0-1, C: 1, Co: 0.5, Cr, 12, Mn, 0.5, Mo: 0.5, Nb: 0.35-1, Si: 1.5, Ti: 0.25-1.8, V: 0.5.

In some embodiments, the alloy composition can be selected from group consisting of, in wt. %, Fe, C: 1, Co: 0.5, Cr: 12, Mn: 0.5, Mo: 0.5, Nb: 0.35, Si: 1.5, Ti: 0.25, V: 0.5; Fe, B: 1, C: 1, Co: 0.5, Cr: 12, Mn: 0.5, Mo: 0.5, Nb: 0.35, Si: 1.5, Ti: 0.25, V: 0.5; Fe, B: 1, C: 1, Co: 0.5, Cr: 12, Mn: 0.5, Mo: 0.5, Nb: 1, Si: 1.5, Ti: 1, V: 0.5; and Fe, B: 1, C: 1, Co: 0.5, Cr: 12, Mn: 0.5, Mo: 0.5, Nb: 0.35, Si: 1.5, Ti: 1.8, V: 0.5.

In some embodiments of the compositions disclosed herein, the alloys may consist essentially of the percentage of the elements listed with the balance being iron. In some embodiments, these compositions may comprise additional elements, such as nickel or other impurities, with the iron being the balance. Accordingly, while the compositions disclosed herein lists iron, this should not be construed as limiting or a specific value based on the other elements listed, and the amount of iron can vary based on the addition of extra elements/impurities into the composition.

Disclosed herein are embodiments of a work piece having at least a portion of its surface covered by a layer comprising a microstructure comprising an Fe-based matrix comprising ferrite, austenite, martensite or a combination thereof, whereby the matrix contains a minimum of 8 wt. % chromium, primary hard phases defined as carbides or borides which form 1-20 micron spherical particles at a volume fraction of at least 5%, and a matrix microhardness of at least 300 Vickers, wherein the matrix contains less than 10% mole fraction of iron or chromium containing carbide or borocarbide particles in excess of 5 microns in size.

In some embodiments, the matrix does not contain any iron or chromium containing carbide or borocarbide particles in excess of 5 microns in size. In some embodiments, the layer can comprise a grain boundary eutectic boride and/or carbide volume fraction of 10% or more. In some embodiments, the layer can comprise a grain boundary eutectic boride and/or carbide volume fraction of 10% or less.

In some embodiments, the work piece can be a steel pipe and the layer coats at least a portion of an interior diameter of the pipe. In some embodiments, the work piece can be a steel plate and the layer coats at least a portion of at least one surface of the steel plate. In some embodiments, the layer can be deposited using one or more of the following techniques: MIG welding, TIG welding, sub-arc welding, open-arc welding, PTA welding, laser cladding, or thermal spraying.

In some embodiments, the layer can comprise, in wt. %: Fe, B: 0-1, C: 0.75-1.9, Co: 0-0.5, Cr: 12-21, Mn: 0.5-1.4, Mo: 0.5-1.6, Nb: 0-3.5, Si: 0.5-1.5, Ti: 0.2-5, and V: 0-0.6.

In some embodiments, the layer or the feedstock material used to produce the layer can comprise in wt. % one or more of the following compositions having Fe and:

C: 1, Co: 0.5, Mn: 0.5, Nb: 0.35, Si: 1.5, Ti: 0.25, V: 0.5;
B: 1, C: 1, Co: 0.5, Cr: 12, Mn: 0.5, Nb: 0.35, Si: 1.5, Ti: 0.25, V: 0.5;
B: 1, C: 1, Co: 0.5, Cr: 12, Mn: 0.5, Mo: 0.5, Nb: 1, Si: 1.5, Ti: 1, V: 0.5;
B: 1, C: 1, Co: 0.5, Cr: 12, Mn: 0.5, Mo: 0.5, Nb: 0.35, Si: 1.5, Ti: 1.8, V: 0.5;
C: 1.9, Cr: 14, Mn: 1.25, Mo: 1, Si: 1, Ti: 5;
B: 0.6, C: 1.2, Cr: 20, Mn: 1, Mo: 1, Nb: 3.5, Si: .0.5, Ti: 0.5, V: 0.5;
B: 0.6, C: 0.8, Cr: 16, Mn: 1, Mo: 1, Nb: 3.5, Si: .0.5, Ti: 0.5, V: 0.5;
B: 0.6, C: 1.6, Cr: 20, Mn: 1, Mo: 1, Nb: 3.5, Si: .0.5, Ti: 0.5, V: 0.5; or
B: 0.6, C: 0.8, Cr: 14.5, Mn: 1, Mo: 1, Nb: 3, Si: 0.5, Ti: 0.5, V: 0.4.

Also disclosed herein are embodiments of a method of forming a coated work piece comprising depositing a layer on at least a portion of a surface of a work piece, wherein the deposited layer comprises a wear resistant and corrosion resistant alloy, wherein the alloy possesses the following thermodynamic traits a minimum weight fraction of chromium in an iron-based austenitic matrix phase calculated at 1300K of at least 8 wt. %, a minimum mole fraction of isolated hard particles of 5%, wherein isolated hard particles are carbides or borides that form at a temperature above the formation temperature of the austenite or ferrite iron-based matrix phase, a maximum delta ferrite concentration of 40 mole %, wherein delta ferrite is any the body centered cubic iron-based matrix phase that exists between 1500K and 1900K, and a maximum of 10 mole % of iron or chromium based (Fe+Cr>50 wt. %) carbides forming at a temperature above the solidus temperature of the alloy.

In some embodiments, the layer can comprise a summed total of grain boundary eutectic carbides and borides, defined as those which form in between the liquidus and solidus of the alloy, of 10 mole % or more. In some embodiments, the layer can comprise a summed total of grain boundary eutectic carbides and borides, defined as those which form in between the liquidus and solidus of the alloy, of 10 mole % or less.

In some embodiments, the work piece can be a steel pipe and the layer coats at least a portion of an interior diameter of the pipe. In some embodiments, the work piece can be a steel plate and the layer coats at least a portion of at least one surface of the steel plate. In some embodiments, the layer is deposited using one or more of the following techniques: MIG welding, TIG welding, sub-arc welding, open-arc welding, PTA welding, laser cladding, or thermal spraying.

In some embodiments, the layer can comprise in wt. % Fe, B: 0-1, C: 0.75-1.9, Co: 0-0.5, Cr: 12-21, Mn: 0.5-1.4, Mo: 0.5-1.6, Nb: 0-3.5, Si: 0.5-1.5, Ti: 0.2-5, and V: 0-0.6.

In some embodiments, the layer or the feedstock material used to produce the layer can comprise, in wt. %, one or more of the following compositions having Fe and:

C: 1, Co: 0.5, Mn: 0.5, Nb: 0.35, Si: 1.5, Ti: 0.25, V: 0.5;
B: 1, C: 1, Co: 0.5, Cr: 12, Mn: 0.5, Nb: 0.35, Si: 1.5, Ti: 0.25, V: 0.5;
B: 1, C: 1, Co: 0.5, Cr: 12, Mn: 0.5, Mo: 0.5, Nb: 1, Si: 1.5, Ti: 1, V: 0.5;
B: 1, C: 1, Co: 0.5, Cr: 12, Mn: 0.5, Mo: 0.5, Nb: 0.35, Si: 1.5, Ti: 1.8, V: 0.5;
C: 1.9, Cr: 14, Mn: 1.25, Mo: 1, Si: 1, Ti: 5;
B: 0.6, C: 1.2, Cr: 20, Mn: 1, Mo: 1, Nb: 3.5, Si: .0.5, Ti: 0.5, V: 0.5;
B: 0.6, C: 0.8, Cr: 16, Mn: 1, Mo: 1, Nb: 3.5, Si: .0.5, Ti: 0.5, V: 0.5;
B: 0.6, C: 1.6, Cr: 20, Mn: 1, Mo: 1, Nb: 3.5, Si: .0.5, Ti: 0.5, V: 0.5; or
B: 0.6, C: 0.8, Cr: 14.5, Mn: 1, Mo: 1, Nb: 3, Si: 0.5, Ti: 0.5, V: 0.4.

Also disclosed herein are embodiments of a work piece having at least a portion of its surface covered by a layer, the layer comprising a high wear resistance as defined by an ASTM G65 mass loss of 0.6 grams or less a high corrosion resistance as defined by an ASTM G31 corrosion rate in 30,000 ppm saltwater of 10 mils per year or less, and a high resistance to cracking as defined by the ability to be MIG welded crack free over the entire surface of a 12"×12" steel plate which is 1" thick using an interpass temperature of 400° F.

In some embodiments, the work piece can be a steel pipe and the layer coats at least a portion of an interior diameter of the pipe. In some embodiments, the work piece can be a steel plate and the layer coats at least a portion of at least one surface of the steel plate. In some embodiments, the layer can be deposited using one or more of the following techniques: MIG welding, TIG welding, sub-arc welding, open-arc welding, PTA welding, laser cladding, or thermal spraying In some embodiments, the layer can comprise in wt. % Fe, B: 0-1, C: 0.75-1.9, Co: 0-0.5, Cr: 12-21, Mn: 0.5-1.4, Mo: 0.5-1.6, Nb: 0-3.5, Si: 0.5-1.5, Ti: 0.2-5, and V: 0-0.6.

In some embodiments, the layer or the feedstock material used to produce the layer can comprise, in wt. %, one or more of the following compositions having Fe and:

C: 1, Co: 0.5, Mn: 0.5, Nb: 0.35, Si: 1.5, Ti: 0.25, V: 0.5;
B: 1, C: 1, Co: 0.5, Cr: 12, Mn: 0.5, Nb: 0.35, Si: 1.5, Ti: 0.25, V: 0.5;
B: 1, C: 1, Co: 0.5, Cr: 12, Mn: 0.5, Mo: 0.5, Nb: 1, Si: 1.5, Ti: 1, V: 0.5;
B: 1, C: 1, Co: 0.5, Cr: 12, Mn: 0.5, Mo: 0.5, Nb: 0.35, Si: 1.5, Ti: 1.8, V: 0.5;
C: 1.9, Cr: 14, Mn: 1.25, Mo: 1, Si: 1, Ti: 5;
B: 0.6, C: 1.2, Cr: 20, Mn: 1, Mo: 1, Nb: 3.5, Si: .0.5, Ti: 0.5, V: 0.5;
B: 0.6, C: 0.8, Cr: 16, Mn: 1, Mo: 1, Nb: 3.5, Si: .0.5, Ti: 0.5, V: 0.5;
B: 0.6, C: 1.6, Cr: 20, Mn: 1, Mo: 1, Nb: 3.5, Si: .0.5, Ti: 0.5, V: 0.5; or
B: 0.6, C: 0.8, Cr: 14.5, Mn: 1, Mo: 1, Nb: 3, Si: 0.5, Ti: 0.5, V: 0.4.

DETAILED DESCRIPTION

Figure 1:
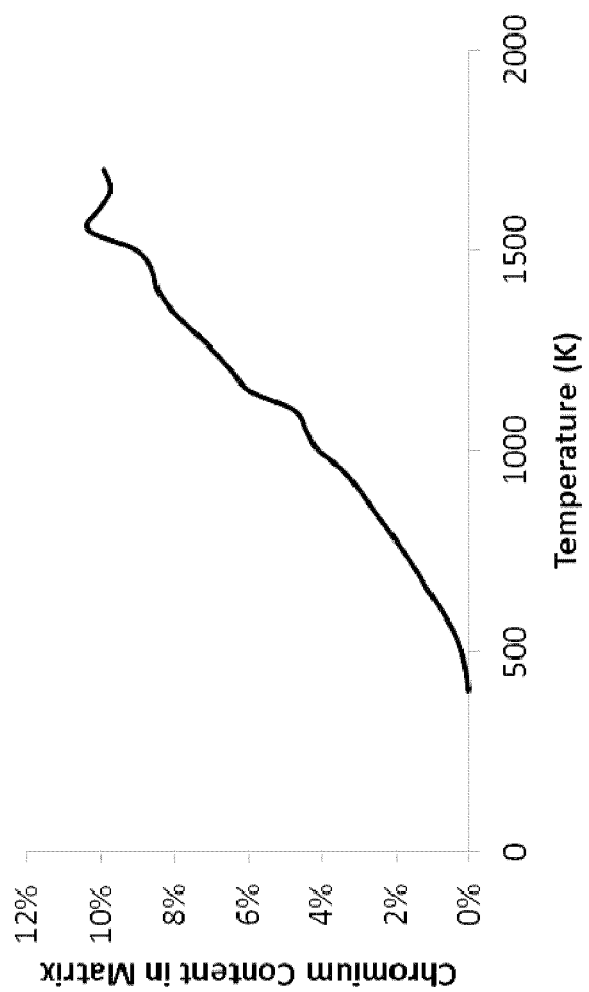
FIG. 1 shows chromium content in an alloy matrix as a function of temperature according to an embodiment.

A hardfacing process is a technique which can be used to protect a surface from wear. Typical methods of hardfacing include the various methods of welding such as, for example, gas metal arc welding (GMAW), gas tungsten welding (GTAW), plasma transferred arc welding (PTA), laser cladding, submerged arc welding, open arc welding, thermal spray, and explosive welding. In some embodiments, it can be desirable for the hardfacing coating to be corrosion resistant as well. In some examples, increasing hardness through alloying control can be done at the expense of corrosion performance. Chromium, as an example, is an alloying element well known to increase the corrosion performance of steels when it is in solid solution with the iron-based matrix, whether ferritic, austenitic, or martensitic. However, chromium preferentially reacts with carbon and boron, two alloying elements commonly used separately or together to increase the hardness and durability of hardfacing materials. The formation of chromium carbides and chromium borides, effectively leeches the chromium from the iron matrix and reduces the corrosion performance of the material. Thus, there is a still a need for hardfacing alloys which also have high corrosion resistance.

The alloys described in this application can be used at least in the following industries: oil and gas (upstream, midstream, and downstream), power generation, mining, steelmaking, chemical processing, pulp and paper, agriculture and food processing, aerospace, automotive, offshore, marine, construction, and other industrial applications. In the oil and gas industry several non-limiting examples of applications of the disclosure include hardbanding and hardfacing on tool joints, drill pipes, stabilizers, centralizers, casing, Christmas trees, sub-sea tieback, and other downhole drilling and production equipment, mud motors, pumps, sand screens, and other sand management equipment, pipelines and other transport equipment, refinery piping, vessels, drums, cyclones, cokers, and other refinery equipment. In the mining industry several non-limiting examples of applications of the disclosure include hardfacing on buckets, shovels, teeth and other ground engaging tools, wear plates, as well as shaker screens, drum screens, blow bars, slurry pipelines, grizzly bars, and other separation, transport, processing equipment. In the steelmaking industry a non-limiting example of applications of the disclosure includes rollers. In the pulp and paper as well as the chemical processing industry, a non-limiting example of applications of the disclosure includes hardfacing on vessels. In the agriculture industry several non-limiting examples of applications of the disclosure include hardfacing on cutter and chopper blades, and other harvester parts. In the power generation industry one non-limiting example of an application of the disclosure includes hardfacing on boiler tubes. In the marine industry several non-limiting examples of applications of the disclosure includes non-skid coatings, hardfacing on motor shafts, and propellers. In general, a non-limiting application can be for alloys of the disclosure to replace chromium plating due to environmental and performance advantages. In general, a non-limiting application can be for alloys of the disclosure to replace chromium carbide weld overlay hardfacing due to corrosion and durability performance advantages.

Chromium can exhibit a complex behavior when used in hardfacing. This complex behavior can make the simultaneous existence of wear resistance and corrosion resistance in a single alloy difficult to achieve. For example, a commonly used family of hardfacing alloys known as chromium carbide overlay (or CCO) possess a high concentration of chromium, typically 20-35 wt. %. However, chromium can form hard chromium carbides in these alloys which reduces the content of chromium in the matrix. Chromium in the matrix can be advantageous in order to enable a high corrosion resistance in the alloy. By this phenomenon, chromium carbide overlay hardfacing materials do not possess good corrosion resistance, and there is still a need for hardfacing alloys with improved corrosion resistance.

In some embodiments, a unique method described in this disclosure is the design of a hardfacing alloy which does not produce chromium carbides to a significant (e.g., >10 volume % or greater than about 10 volume %) degree. Thus, the chromium content of the matrix can be controlled and maintained to a sufficiently high degree.

The relationship between chromium and carbon in the alloy can prevent any obvious mechanisms of designing such an alloy. For example, as chromium is increased in the alloy, the delta ferrite region can be continuously expanded until ferrite is highly stabilized and likely to be the dominant phase in the final weld metal. However, Ferrite is a relatively soft form of iron, in comparison to martensite, and can lead to low hardness and low wear resistance, which would not be advantageous. In hardfacing alloys typically produced, the formation of ferrite in high chromium alloys can be prevented by increasing carbon content which stabilizes the formation of austenite, which then allows for the formation of hard martensite in a rapidly cooling weld bead. However, an alloy which has a high carbon and high chromium content can form a high volume fraction of chromium carbides, which can greatly reduce corrosion resistance. Accordingly, it can be appreciated that the design of an alloy which forms no chromium carbides (or substantially no chromium carbides), maintains a minimum level of hardness, and maintains a minimum level of corrosion resistance is not inherently obvious in the field of hardfacing.

Metal Alloy Composition

In some embodiments, an alloy can be described by a compositional range which can encompass a set of alloys which meet the thermodynamic criteria presented in this disclosure. In some embodiments, for the below described composition the Fe can be a balance of Fe. In some embodiments, the composition can comprise in weight percent the following elemental ranges:

Fe, B: 0-1.6 (or about 0-1.6), C: 0.8-4 (or about 0.8-4), Cr: 8-20 (or about 8-20), Mn: 0-10 (or about 0-10), Mo: 0-10 (or about 0-10), Nb: 0-5 (or about 0-5), Ni: 0-10 (or about 0-10), Si: 0-1 (or about 0-1), Ti: 0-10 (or about 0-10), V: 0-5 (or about 0-5), Zr: 0-5 (or about 0-5). In one embodiment, the composition consists essentially of the percentages of the aforementioned elements and a balance of iron.

In some embodiments, the alloy can be described by a compositional range which can encompass a set of alloys which meet the thermodynamic criteria which predicts a highly crack resistant corrosion resistant hardfacing material as presented in this disclosure. In some embodiments, the composition can comprise in weight percent the following elemental ranges:

Fe, C: 1-4 (or about 1-4), Cr: 8-18.6 (or about 8-18.6), Mn: 0-10 (or about 0-10), Mo: 0-6 (or about 0-6), Nb: 0-5 (or about 0-5), Ni: 0-10 (or about 0-10), Si: 0-1 (or about 0-1), Ti: 0-10 (or about 0-10), V: 0-5 (or about 0-5), Zr: 0-5 (or about 0-5). In one embodiment, the composition consists essentially of the percentages of the aforementioned elements and a balance of iron.

In some embodiments, the alloy can be described by a compositional range which can encompass a set of alloys which meet the thermodynamic criteria which predicts a highly wear resistant corrosion resistant hardfacing material as presented in this disclosure. In some embodiments, the composition can comprise in weight percent the following elemental ranges:

Fe, B: 0-1.6 (or about 0-1.6), C: 0.8-3.5 (or about 0.8-3.5), Cr: 12-20 (or about 12-20), Mn: 0-10 (or about 0-10), Mo: 0-10 (or about 0-10), Nb: 0-5 (or about 0-5), Ni: 0-10 (or about 0-10), Si: 0-1 (or about 0-1), Ti: 0-9 (or about 0-9), V: 0-0.5 (or about 0-0.5), Zr: 0-5 (or about 0-5). In one embodiment, the composition consists essentially of the percentages of the aforementioned elements and a balance of iron.

In some embodiments, the alloy can be described by a compositional range which can encompass a set of alloys which meet the performance criteria or is predicted to meet the performance criteria presented in this disclosure. In some embodiments, the composition can comprise in weight percent the following elemental ranges:

Fe, B: 0-1 (or about 0-1), C: 0.75-1.9 (or about 0.75-1.9), Co: 0-0.5 (or about 0-0.5), Cr: 12-21 (o about 12-21), Mn: 0.5-1.4 (or about 0.5-1.4), Mo: 0.5-1.6 (or about 0.5-1.6), Nb: 0.3-5 (or about 0.3-5), Si: 0.5-1.5 (or about 0.5-1.5), Ti: 0.2-5 (or about 0.2-5), V: 0-0.6 (or about 0-0.6). In one embodiment, the composition consists essentially of the percentages of the aforementioned elements and a balance of iron.

In some embodiments, a corrosion resistant hardfacing can be an alloy comprising the following elements ranges in weight percent:

Fe, B: 0-2 (or about 0-2), C: 0-2 (or about 0-2), Co: 0-1 (or about 0-1), Cr, 12-20 (or about 12-20), Mn, 0-2 (or about 0-2), Mo: 0-10 (or about 0-10), Nb: 0-6 (or about 0-6), Si: 0-2 (or about 0-2), Ti: 0-4 (or about 0-4), V: 0-2 (or about 0-2). In one embodiment, the composition consists essentially of the percentages of the aforementioned elements and a balance of iron.

An embodiment of corrosion resistant hardfacing, at least partially based on Table 7 below, is an alloy comprising the following elements ranges in weight percent:

Fe: bal, B: 0-1 (or about 0-1), C: 1 (or about 1), Co: 0.5 (or about 0.5), Cr: 12 (or about 12), Mn: 0.5 (or about 0.5), Mo: 0.5 (or about 0.5), Nb: 0.35-1 (or about 0.35-1), Si: 1.5 (or about 1.5), Ti: 0.25-1.8 (or about 0.25-1.8), V: 0.5 (or about 0.5). In one embodiment, the composition consists essentially of the percentages of the aforementioned elements and a balance of iron.

Some specific embodiments of corrosion resistant hardfacing are alloys comprising the following elements in weight percent:

Alloy X10: Fe: bal, C: 1 (or about 1), Co: 0.5 (or about 0.5), Cr: 12 (or about 12), Mn: 0.5 (or about 0.5), Mo: 0.5 (or about 0.5), Nb: 0.35 (or about 0.35), Si: 1.5 (or about 1.5), Ti: 0.25 (or about 0.25), V: 0.5 (or about 0.5)

Alloy X17: Fe: bal, B: 1 (or about 1), C: 1 (or about 1), Co: 0.5 (or about 0.5), Cr: 12 (or about 12), Mn: 0.5 (or about 0.5), Mo: 0.5 (or about 0.5), Nb: 0.35 (or about 0.35), Si: 1.5 (or about 1.5), Ti: 0.25 (or about 0.25), V: 0.5 (or about 0.5)

Alloy X20: Fe: bal, B: 1 (or about 1), C: 1 (or about 1), Co: 0.5 (or about 0.5), Cr: 12 (or about 12), Mn: 0.5 (or about 0.5), Mo: 0.5 (or about 0.5), Nb: 1 (or about 1), Si: 1.5 (or about 1.5), Ti: 1 (or about 1), V: 0.5 (or about 0.5)

Alloy X21: Fe: bal, B: 1 (or about 1), C: 1 (or about 1), Co: 0.5 (or about 0.5), Cr: 12 (or about 12), Mn: 0.5 (or about 0.5), Mo: 0.5 (or about 0.5), Nb: 0.35 (or about 0.35), Si: 1.5 (or about 1.5), Ti: 1.8 (or about 1.8), V: 0.5 (or about 0.5)

In some embodiments, the alloys may have more elements, such as nickel, with the iron being the balance. Accordingly, while the above composition lists iron, this should not be construed as limiting or a specific value based on the other elements listed, and the amount of iron can vary based on the addition of extra elements into the composition.

Further, some of the listed compositions include the use of 0 of certain elements. In some embodiments, this may mean that none of the element could be found in the alloy. In some embodiments, there still may be some of the element found in the alloy, but that there would be minimal amounts.

Additional embodiments of alloys are listed below:

Fe, B: 0-2 (or about 0-2), C: 0-2 (or about 0-2), Co: 0-1 (or about 0-1), Cr, 12-20 (or about 12-20), Mn, 0-2 (or about 0-2), Mo: 0-10 (or about 0-10), Nb: 0-6 (or about 0-6), Si: 0-2 (or about 0-2), Ti: 0-4 (or about 0-4), V: 0-2 (or about 0-2). In one embodiment, the composition consists essentially of the percentages of the aforementioned elements and a balance of iron.

Fe, B: 0-1 (or about 0-1), C: 1 (or about 1), Co: 0.5 (or about 0.5), Cr: 12 (or about 12), Mn, 0.5 (or about 0.5), Mo: 0.5 (or about 0.5), Nb: 0.35-1 (or about 0.35-1), Si: 1.5 (or about 1.5), Ti: 0.25-1.8 (or about 0.25-1.8), V: 0.5 (or about 0.5). In one embodiment, the composition consists essentially of the percentages of the aforementioned elements and a balance of iron.

Alloy X10: Fe, C: 1 (or about 1), Co: 0.5 (or about 0.5), Cr: 12 (or about 12), Mn: 0.5 (or about 0.5), Mo: 0.5 (or about 0.5), Nb: 0.35 (or about 0.35), Si: 1.5 (or about 1.5), Ti: 0.25 (or about 0.25), V: 0.5 (or about 0.5). In one embodiment, the composition consists essentially of the percentages of the aforementioned elements and a balance of iron.

Alloy X17: Fe, B: 1 (or about 1), C: 1 (or about 1), Co: 0.5 (or about 0.5), Cr: 12 (or about 12), Mn: 0.5 (or about 0.5), Mo: 0.5 (or about 0.5), Nb: 0.35 (or about 0.35), Si: 1.5 (or about 1.5), Ti: 0.25 (or about 0.25), V: 0.5 (or about 0.5). In one embodiment, the composition consists essentially of the percentages of the aforementioned elements and a balance of iron.

Alloy X20: Fe, B: 1 (or about 1), C: 1 (or about 1), Co: 0.5 (or about 0.5), Cr: 12 (or about 12), Mn: 0.5 (or about 0.5), Mo: 0.5 (or about 0.5), Nb: 1 (or about 1), Si: 1.5 (or about 1.5), Ti: 1 (or about 1), V: 0.5 (or about 0.5). In one embodiment, the composition consists essentially of the percentages of the aforementioned elements and a balance of iron.

Alloy X21: Fe, B: 1 (or about 1), C: 1 (or about 1), Co: 0.5 (or about 0.5), Cr: 12 (or about 0.5), Mn: 0.5 (or about 0.5), Mo: 0.5 (or about 0.5), Nb: 0.35 (or about 0.35), Si: 1.5 (or about 1.5), Ti: 1.8 (or about 1.8), V: 0.5 (or about 0.5). In one embodiment, the composition consists essentially of the percentages of the aforementioned elements and a balance of iron.

Table 1 presents some further examples of experimental alloys, listed in weight percent with the balance Fe, produced in the form of small scale ingots to conduct this study. It can be appreciated that while this list encompasses all of the alloys evaluated experimentally in this study that only a subset possess one or more of the thermodynamic, microstructural, and or performance criteria detailed in this disclosure.

17 of the 27 (63%) of the tested alloys did not meet either the microstructural or performance criteria described in this disclosure, thus showing the lack of obviousness in designing this family of alloys. In general, microstructural evaluation is used as an initial indication to the performance of the alloy, and thus only alloys which possess the desired microstructure where manufactured into welding wire and used in additional testing. Of those tested, 100% of the alloys which met the microstructural criteria also met the performance criteria. This shows that the microstructural criteria outlined in this disclosure is a good indicator of the disclosed desired performance. Specifically Alloys X17, X18, X19, X20, X21, X24, X30, X31, X32, and X86 met the performance criteria or likely meet the performance criteria based on meeting the microstructural criteria.

TABLE 1

Nominal Experimental Alloy Compositions

| Alloy | B | C | Co | Cr | Mn | Mo | N | Nb | Si | Ti | V | HRC |
|---|---|---|---|---|---|---|---|---|---|---|---|---|
| X7 | 0 | 0.01 | 0.15 | 10.5 | 0.25 | 0 | 0.02 | 0.35 | 1.3 | 0.25 | 0.25 | — |
| X8 | 0 | 0.01 | 0.3 | 12 | 0.25 | 0.5 | 0.03 | 0.35 | 2 | 0.5 | 0.5 | — |
| X9 | 0 | 0.01 | 0.5 | 12 | 0.5 | 0.5 | 0.1 | 0.35 | 5 | 0.5 | 0.5 | 26.4 |
| X10 | 0 | 1 | 0.5 | 12 | 0.5 | 0.5 | 0 | 0.35 | 1.5 | 0.25 | 0.5 | 53.1 |
| X11 | 0 | 0.01 | 0.5 | 12 | 0.5 | 0.5 | 1 | 0.35 | 5 | 3.42 | 0.5 | 42.9 |
| X12 | 0 | 1 | 0.5 | 18 | 0.5 | 0.5 | 0 | 0.35 | 1.5 | 0.25 | 0.5 | 42.2 |
| X13 | 0 | 0.70 | 0 | 17 | 1 | 0.75 | 0 | 0 | 1 | 0 | 0 | 36.8 |
| X14 | 0 | 0.05 | 0.5 | 17 | 1 | 0.75 | 5 | 0 | 1 | 0 | 0 | — |
| X15 | 0 | 1.5 | 1.5 | 18 | 2 | 1.5 | 0 | 0.5 | 2 | 0.5 | 1 | 32.8 |
| X16 | 0 | 3 | 1.5 | 18 | 2 | 1.5 | 0 | 0.5 | 2 | 0.5 | 1 | 45.6 |
| X17 | 1 | 1 | 0.5 | 12 | 0.5 | 0.5 | 0 | 0.35 | 1.5 | 0.25 | 0.5 | 61.3 |
| X18 | 1 | 1 | 0.5 | 12 | 0.5 | 0.5 | 0 | 1 | 1.5 | 0.25 | 0.5 | 60.6 |
| X19 | 1 | 1 | 0.5 | 12 | 0.5 | 0.5 | 0 | 0.35 | 1.5 | 1 | 0.5 | 59.4 |
| X20 | 1 | 1 | 0.5 | 12 | 0.5 | 0.5 | 0 | 1 | 1.5 | 1 | 0.5 | 59.8 |
| X21 | 1 | 1 | 0.5 | 12 | 0.5 | 0.5 | 0 | 0.35 | 1.5 | 1.8 | 0.5 | 61 |
| X22 | 0 | 1.3 | 0 | 12 | 1.25 | 1 | 0 | 0 | 1 | 5 | 0 | 13.6 |
| X23 | 0 | 1.2 | 0 | 16 | 1.25 | 1 | 0 | 0 | 1 | 5 | 0 | 17.9 |
| X24 | 0 | 1.9 | 0 | 14 | 1.25 | 1 | 0 | 0 | 1 | 5 | 0 | 42.7 |
| X25 | 0 | 2.3 | 0 | 17 | 1.25 | 1 | 0 | 0 | 1 | 4.5 | 0 | 44.2 |
| X26 | 2.25 | 0 | 0 | 11 | 1.25 | 1 | 0 | 0 | 1 | 5 | 0 | 30.8 |
| X27 | 2.75 | 0 | 0 | 17 | 1.25 | 1 | 0 | 0 | 1 | 5 | 0 | 40 |
| X28 | 0 | 3 | 0 | 12 | 1.25 | 1 | 0 | 2 | 1 | 10 | 0 | 33.4 |
| X29 | 0 | 3.5 | 0 | 14 | 1.25 | 1 | 0 | 2 | 1 | 10 | 0 | 49.4 |
| X30 | 0.6 | 1.2 | 0 | 20 | 1 | 1 | 0 | 3.5 | 0.5 | 0.5 | 0.5 | 42.6 |
| X31 | 0.6 | 0.8 | 0 | 16 | 1 | 1 | 0 | 3.5 | 0.5 | 0.5 | 0.5 | 47.6 |
| X32 | 0.6 | 1.6 | 0 | 20 | 1 | 1 | 0 | 3.5 | 0.5 | 0.5 | 0.5 | 58.3 |
| X86 | 0 | 1.8 | 0 | 11.8 | 1.25 | 1 | 0 | 0 | 0 | 5 | 0 | 60.0 |

The composition of certain alloys were measured via glow discharge spectroscopy after manufacture into test melts, and that data is shown in Table 2. This provides an indication of the manufacturing tolerance associated with producing the nominal alloy chemistries described in this disclosure.

TABLE 2

Experimental Alloy Compositions as Measured via Glow Discharge Spectroscopy

| Alloy | B | C | Cr | Mn | Mo | Nb | Ni | Si | Ti | V |
|---|---|---|---|---|---|---|---|---|---|---|
| X22 | 0.00 | 1.01 | 13.30 | 1.27 | 0.98 | 0.11 | 0.83 | 0.89 | 4.34 | 0.02 |
| X23 | 0.00 | 1.04 | 17.70 | 1.20 | 1.00 | 0.12 | 0.83 | 0.91 | 4.28 | 0.02 |
| X24 | 0.00 | 1.57 | 15.50 | 1.44 | 1.56 | 0.12 | 0.87 | 0.92 | 3.75 | 0.02 |
| X25 | 0.00 | 2.32 | 18.00 | 1.33 | 0.72 | 0.14 | 0.99 | 0.92 | 3.61 | 0.03 |
| X26 | 1.86 | 0.10 | 12.00 | 1.34 | 2.30 | 0.11 | 0.97 | 0.86 | 4.58 | 0.02 |
| X27 | 2.27 | 0.11 | 18.40 | 1.17 | 0.79 | 0.14 | 1.10 | 0.85 | 4.22 | 0.03 |
| X28 | 0.00 | 2.51 | 14.60 | 1.03 | 0.98 | 1.55 | 1.55 | 0.87 | 7.35 | 0.03 |
| X29 | 0.00 | 3.26 | 16.60 | 0.91 | 0.91 | 1.90 | 1.47 | 0.86 | 7.18 | 0.03 |

TABLE 2-continued

Experimental Alloy Compositions as Measured via Glow Discharge Spectroscopy

| Alloy | B | C | Cr | Mn | Mo | Nb | Ni | Si | Ti | V |
|---|---|---|---|---|---|---|---|---|---|---|
| X30 | 0.62 | 1.21 | 21.00 | 0.87 | 0.80 | 2.74 | 0.39 | 0.64 | 0.45 | 0.54 |
| X31 | 0.96 | 0.77 | 17.70 | 1.20 | 1.20 | 2.42 | 0.35 | 0.62 | 0.24 | 0.58 |
| X32 | 0.55 | 1.46 | 20.40 | 0.88 | 0.93 | 3.17 | 0.40 | 0.70 | 0.52 | 0.48 |

Thermodynamic Criteria: Corrosion Resistance

In some embodiments, an alloy can be described by thermodynamic criteria. The first thermodynamic criteria pertains to the alloy's corrosion resistance and can be defined by the percentage of Cr in the iron matrix. In some embodiments, the corrosion resistance of an alloy can be increased as the Cr content in the matrix is increased.

Figure 2:
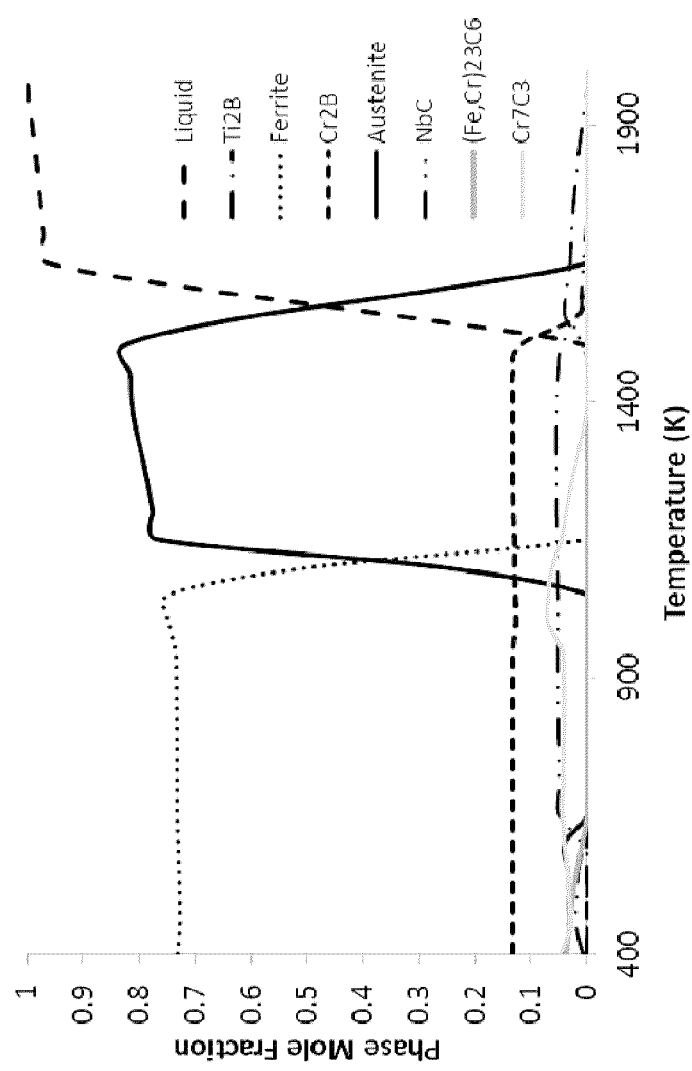
FIG. 2 shows a phase evolution diagram for an embodiment of the disclosure (Alloy X21).
Figure 3:
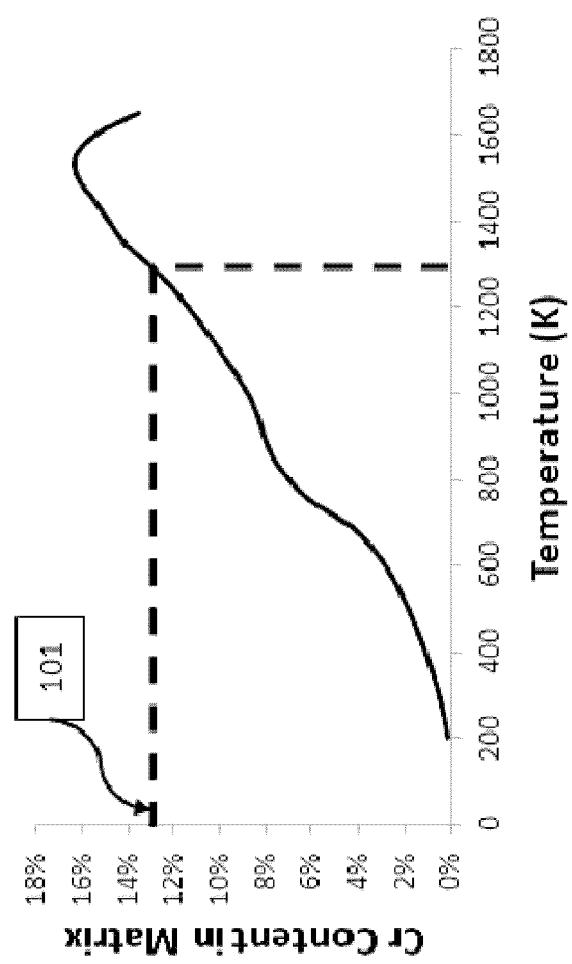
FIG. 3 shows chromium content in matrix as a function of temperature for an embodiment of the disclosure different from FIG. 1.

The chromium content in a matrix such as, for example, a BCC-ferrite phase of iron, as a function of temperature is shown in FIG. 1 for alloy X21 (FIG. 2 shows a phase evolution diagram for said alloy). In some embodiments, the matrix can also be the FCC-austenite or HCP-martensite forms of iron, or any combinations thereof. As shown in FIG. 1, the equilibrium concentration of chromium in the matrix can vary significantly with the temperature. It has been determined through extensive experimentation that the Cr content in the matrix calculated at room temperature does not predict the actual Cr content produced in the weld bead. Through further experimentation it was determined that the Cr content calculated at 1300K accurately predicts the Cr content of an embodiment of a welded alloy [101] as shown in FIG. 3.

In some embodiments, the alloy can be described as having a certain corrosion resistance in terms of the previously mentioned thermodynamic criteria. The Cr content in the matrix is a measure of the alloy's corrosion resistance. For example, the alloy can be described as meeting the thermodynamic criteria by having a minimum Cr content in the matrix. In some embodiments, the Cr content in the matrix can be at or above 8 wt % (or ≥about 8 wt %). In some embodiments, the Cr content in the matrix can be at or above 10 wt % (or ≥ about 10 wt %). In some embodiments, the Cr content in the matrix can be at or above 12 wt % (or ≥about 12 wt %).

Figure 4:
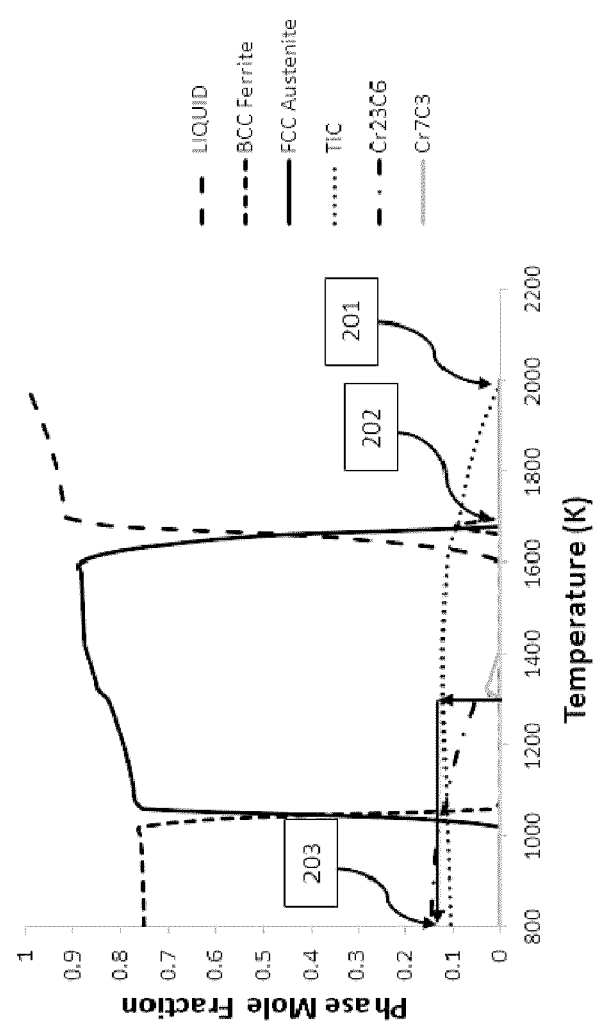
FIG. 4 shows a phase evolution diagram for an embodiment of the disclosure (Alloy X33) illustrating the calculated formation and mole fraction of an isolated primary hard phase.

A second thermodynamic criteria pertains to the alloy's wear resistance and is defined by the total mole fraction of isolated primary hard phase or phases present in the alloy. In some embodiments, the hard phase fraction is calculated by summing the mole fraction of all hard particles at 1300K (or about 1300K). Generally hard phase particles comprise the following: boride, carbide, borocarbide, nitride, carbonitride, aluminide, oxide, intermetallic, and laves phases. FIG. 4 illustrates a phase evolution diagram of an example alloy, X33, which shows a primary hard phase of TiC. An isolated primary hard phase can be defined as a carbide or boride that is the first phase to solidify [201] from the liquid as the alloy cools from a liquid to a solid. This can be further defined as a carbide or boride that has a solidification temperature greater than the solidification temperature of the iron matrix [202], which can be defined as ferritic, austenitic, or martensitic iron. An isolated primary hard phase is a compound formed with carbon or boron or a combination of both carbon and boron with metallic elements. The metallic elements in the isolated primary hard phase can be Cr, Nb, Si, Ta, Ti, V, W, or Zr or a combination of any of these elements. In some embodiments, an alloy's wear resistance is increased with increased hard phase fraction. Again, through extensive experimentation it has been determine the mole fraction of isolated primary hard phase calculated at 1300K (or at about 1300K) accurately predicts the isolated primary hard phase content in the welded alloy at room temperature [203].

In some embodiments, the alloy can be described as meeting a certain thermodynamic criteria that describes the alloy's wear resistance. The mole fraction of isolated primary hard phase or phases can be used to describe the alloy's wear resistance. For example, an alloy can be said to meet the thermodynamic criteria if it contains a minimum calculated mole fraction of isolated primary hard phases. In some embodiments, the minimum mole fraction of isolated primary hard phase can be at or above 5% (or at or above about 5%). In some embodiments, the minimum mole fraction of isolated primary hard phase can be at or above 10% (or at or above about 10%). In some embodiments, the minimum mole fraction of isolated primary hard phase is at or above 15% (or at or above about 15%).

Figure 5:
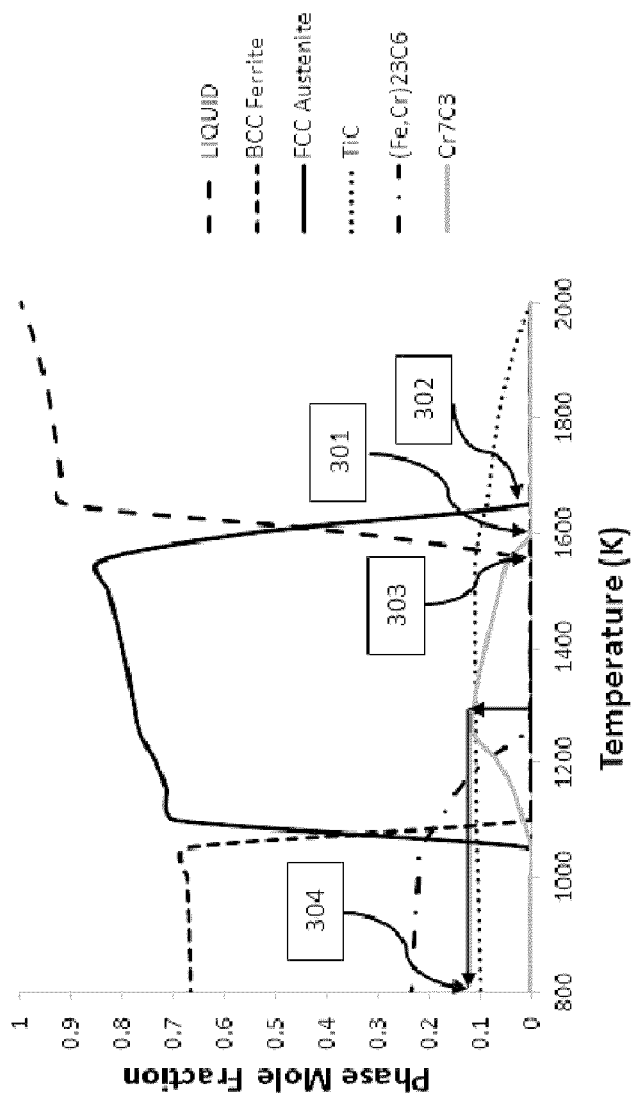
FIG. 5 shows a phase evolution diagram for an embodiment of the disclosure (Alloy X25) illustrating the calculated formation and mole fraction of a grain boundary hard phase.

A third thermodynamic criteria will pertain to the alloy's crack resistance. Part of the alloy's function is to provide a certain level of corrosion resistance to the component or substrate it is applied to. Cracks in a corrosion resistant coating can allow for corrosive media to penetrate the coating and attack the substrate. This attack on the substrate can cause undesired premature failure of the component. Examples of corrosive media can be, but is not limited to, fresh water, salt water, produced water, or alkaline water. Examples of the substrate can be, but is not limited to, low carbon steel or low alloy steel. It has been determined through extensive experimentation that certain hard phases that form along the iron matrix grain boundaries as a eutectic phase can reduce the alloy's crack resistance. As the mole fraction of grain boundary eutectic hard phase or phases increases, the crack resistance of the alloy decreases. By reducing or eliminating the amount of grain boundary (GB) hard phases, the crack resistance of the alloy can be increased. FIG. 5 shows a phase evolution diagram of an example alloy X25 where the grain boundary hard phase is $Cr_7C_3$. The definition of a grain boundary eutectic hard phase is a carbide or boride with a formation temperature [301] between the liquidus [302] and solidus [303] temperature of the ferritic, austenitic or martensitic iron matrix. The grain boundary eutectic hard phase can be a boride of carbide containing Cr, Nb, Si, Ta, Ti, V, W, or Zr or any combination of these elements. Through further experimentation it has been determined the mole fraction of grain boundary eutectic hard phase calculated at 1300K (or at about 1300K) accurately predicts the grain boundary hard phase content in the welded alloy at room temperature [304]. In contrast, if crack resistance of the alloy is not a concern and instead improved wear resistance is advantageous, the alloy can be made to be more wear resistant by increasing the mole fraction of grain boundary hard phase or phases. Increasing the total mole fraction of hard phases in the alloy increases the alloy's wear resistance. By increasing the mole fraction of grain boundary hard phase, crack resistance is sacrificed for an improvement in wear resistance.

In some embodiments, the alloy can be described as meeting a certain thermodynamic criteria that describes the alloy's crack resistance. The mole fraction of grain boundary eutectic hard phase can be used to describe the alloy's crack resistance. For example an alloy can be said to meet the thermodynamic criteria if the alloy contains a maximum calculated mole fraction of grain boundary hard phase. In some embodiments, the maximum mole fraction of grain boundary hard phase is at or below 5% (or at or below about 5%). In some embodiments, the maximum mole fraction of grain boundary hard phase is at or below 3% (or at or below about 3%). In some embodiments, the maximum mole fraction of grain boundary hard phase is 0% (or about 0%).

A second set of embodiments can be used to describe the alloy meeting a certain thermodynamic criteria if crack resistance is exchanged for improved wear resistance. Increasing the mole fraction of grain boundary hard phases can increase the alloy's wear resistance but can reduce the alloy's crack resistance. For example an alloy can be said to meet the thermodynamic criteria if the calculated mole fraction of grain boundary hard phase is at a minimum. In some embodiments, the minimum mole fraction of grain boundary hard phase is at or above 3% (or at or above 3%). In some embodiments, the mole fraction of grain boundary hard phase is at or above 5% (or at or above 5%). In some embodiments, the mole fraction of grain boundary hard phase is at or above 10% (or at or above about 10%). In some embodiments, the total hard phase mole fraction is 0.010 or greater (or about 0.010 or greater). In some embodiments, the total hard phase mole fraction is 0.015 or greater (or about 0.015 or greater). In some embodiments, the total hard phase mole fraction is 0.020 or greater (or about 0.020 or greater).

In the example of Alloy X21, the phase diagram shown in FIG. 2, the total hard phase fraction is 0.205 (or about 0.205). The hard phases present in X21 include NbC, $Ti_2B$, $(Fe,Cr)_{23}C_6$, and $Cr_7C_3$. Some additional non-limiting examples of hard phases which can be present include cementite, iron boride, $(W,Fe)B$, NbC, $(Nb,Ti)C$, $Ti_2B$, $(Cr,Mn)_{23}(C,B)_6$, $Cr_3C_2$, $Cr_5Si$, $Cr_2B$, SiC, $Mn_7C_3$, $W_6C$, WC, FeNbNi laves, WFe laves and combinations thereof.

Figure 6:
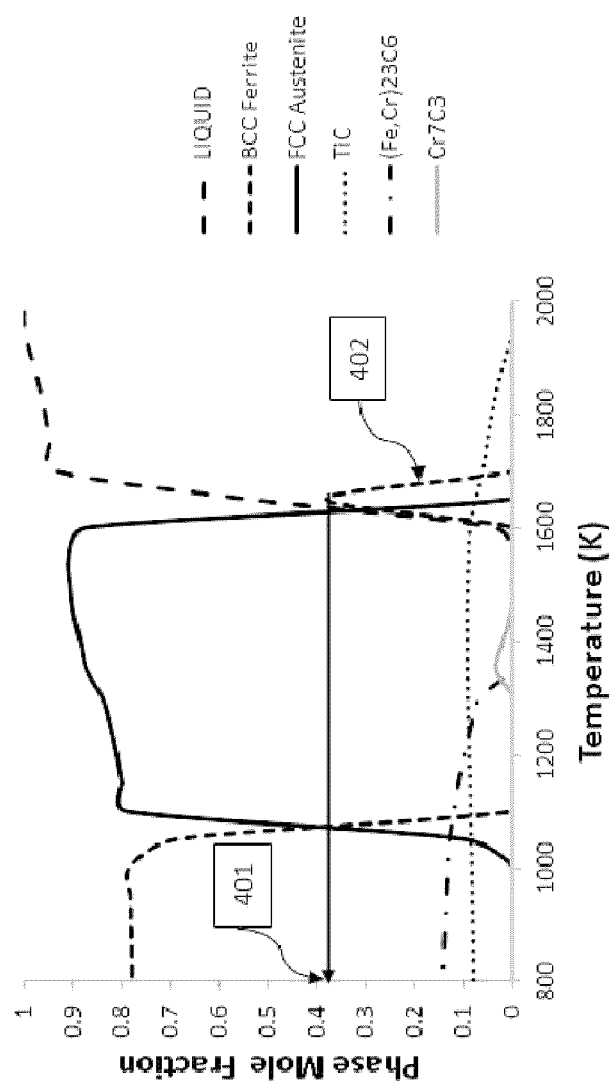
FIG. 6 shows a phase evolution diagram for an embodiment of the disclosure (Alloy X24) illustrating the calculated peak mole fraction of delta ferrite.

A fourth thermodynamic criteria will pertain to the alloy's bulk hardness. Similar to the effect that hard phase content has on the alloy's wear resistance, the bulk hardness of the alloy also contributes to its wear resistance. In some embodiments, as bulk hardness of an alloy increases so too does its wear resistance. Though experimentation, as shown in FIG. 6, it has been determined that an accurate prediction of bulk hardness can be correlated the peak mole fraction of delta ferrite calculated between 1400 and 1900K (or between about 1400 and 1900K) [401]. Delta ferrite by definition is the high temperature BCC phase of iron that can exist between approximately 1400 to 1900K [402]. Experimentation has shown that a higher mole fraction peak of delta ferrite can result in alloys with a lower bulk hardness. In FIG. 6, for example, the maximum calculated peak of delta ferrite is 39% (or about 39%). In contrast, alloys with no delta ferrite peak are found to have a higher bulk hardness.

In some embodiments, the alloy can be described as meeting a certain thermodynamic criteria that describes the alloy's bulk hardness. The peak mole fraction of delta ferrite between 1400 and 1900K can be used to describe the alloy's bulk hardness. For example, the alloy can be said to meet the thermodynamic criteria if the alloy contains a maximum calculated peak mole fraction of delta ferrite between 1400 and 1900K. In some embodiments, the maximum mole fraction peak of delta ferrite between 1400 and 1900K can be at or below 40% (or at or below about 40%). In some embodiments, the maximum mole fraction peak of delta ferrite between 1400 and 1900K can be at or below 20% (or at or below about 20%). In some embodiments, the maximum mole fraction peak of delta ferrite between 1400 and 1900K can be 0% (or about 0%).

The calculated thermodynamic parameters of the alloys evaluated in this study are shown in Table 3. The relationship between the calculated thermodynamic parameters and the measured microstructure and performance of each alloys is indicative of the predicative strength of the described thermodynamic parameters. In the case of alloys X22 through X32 where GDS information is available, the actual GDS chemistry is used to make the thermodynamic calculations as that chemistry is more accurate and useful in drawing correlations to the performance of the alloys.

TABLE 3

Calculated Thermodynamic Parameters of Experimentally Produced Alloys

| Alloy | Cr in Matrix | GB Hard | ISO Hard | Max Delta Ferrite |
|---|---|---|---|---|
| X7 | 11% | 0% | 0% | 0% |
| X8 | 12% | 0% | 0% | 0% |
| X9 | 12% | 0% | 1% | 0% |
| X10 | 9% | 8% | 0% | 0% |
| X11 | 13% | 7% | 7% | 0% |
| X12 | 14% | 10% | 0% | 24% |
| X13 | 14% | 9% | 0% | 50% |
| X14 | 10% | 0% | 0% | 83% |
| X15 | 12% | 16% | 2% | 0% |
| X16 | 6% | 34% | 2% | 0% |
| X17 | 6% | 19% | 1% | 0% |
| X18 | 6% | 20% | 2% | 0% |
| X19 | 7% | 17% | 4% | 0% |
| X20 | 7% | 17% | 4% | 0% |
| X21 | 8% | 14% | 6% | 0% |
| X22 | 15% | 0.0% | 9.3% | 91.0% |
| X23 | 19% | 0.0% | 9.5% | 100.0% |
| X24 | 13% | 6.7% | 0.0% | 35.0% |
| X25 | 12% | 14.8% | 0.0% | 0.0% |
| X26 | 8% | 16.0% | 0.9% | 100.0% |
| X27 | 11% | 14.0% | 1.0% | 100.0% |
| X28 | 14% | 3.8% | 0.0% | 21.6% |
| X29 | 12% | 11.8% | 0.0% | 0.0% |
| X30 | 17% | 21.0% | 0.0% | 43.7% |
| X31 | 13% | 17.1% | 3.4% | 27.5% |
| X32 | 13% | 22.5% | 4.7% | 16.9% |

The $1^{st}$ criteria, Cr in matrix, can be used to predict the Cr content in the matrix of a welded alloy and furthermore predict the corrosion performance of the alloy in saltwater. Alloys X22-X32 and X86 show a 100% correlation between having at least 8% Cr in the matrix, both calculated and measured. X17, X20, and X86 were also corrosion tested and met the corrosion performance criteria (<10 mpy corrosion rate). Thus, it is evident that the thermodynamic, microstructural, and performance criteria related to corrosion exhibit a good correlation.

The $2^{nd}$ and $3^{rd}$ criterion are related to the wear performance of the alloy. In some embodiments, as the total amount of carbides and borides increase (both isolated and grain boundary) so does the wear resistance of the alloy increase. Firstly, it can be demonstrated that the calculated isolated hard phases and grain boundary hard phases exhibit a good correlation with the actual measured fractions in a test melt coupon. In X22-X32 and X86, 100% of the alloys which show an isolated hard phase fraction in excess of 5 mole %, and also showed a measured isolated hard phase fraction in excess of 5 volume %.

The 3$^{rd}$ thermodynamic criteria, GB hard phase, can be most closely related to the wear resistance of the alloy. As mentioned, alloys which possess over 10% grain boundary hard phase can be increasingly wear resistant. Alloys X17, X20, and X21 have been test in ASTM G65 testing as a weld overlay and so a direct comparison can be made to the calculated grain boundary hard phase mole fraction. All 3 alloys show a calculated grain boundary mole fraction in excess of 10%. All 3 alloys also show an ASTM G65 mass loss of below 0.6 grams lost. Thus, it is evident that the calculated grain boundary hard phase mole fraction is an accurate predictor of wear resistance in this particular alloy class.

The 4$^{th}$ criteria is also related to the wear resistance of the material and can be more directly calculated by measuring the bulk hardness of the alloy via Rockwell testing. The max delta ferrite thermodynamic criteria can predict the bulk alloy hardness by predicting the tendency to form martensite in the alloy. While bulk hardness cannot be truly computed generally for all alloys using this technique, an accurate correlation can be made for a specific alloy family and a specific process through careful and detailed experimentation. In this example, a maximum delta ferrite value above about 40% indicates a softer ferritic matrix in this alloy class, and thereby may be unacceptable for hardfacing design. Comparing the hardness values and max delta ferrite calculations of X22 through X32 shows an 80% correlation according to this criteria. X22, X23, X26, and X27 all have a max delta ferrite above 40% and all have a bulk hardness of 40 HRC or below. Only X30 fall outside of the prediction, and this alloy is on the borderline under both criteria: 43.7% calculated max delta ferrite and 42.6 bulk hardness. Thus, it is evident that the max delta ferrite thermodynamic criteria is an accurate predictor of bulk hardness in this particular alloy class.

Table 4 lists all of the alloys calculated that meet the four thermodynamic criteria and are designed to be crack resistant. Table 5 lists all of the alloy calculated that meet the four thermodynamic criteria and are designed to have improved wear resistance. In both Table 4 and Table 5, T1, T2, T3, T4, and T5 are the five thermodynamic criteria Cr in Matrix, GB Hard, ISO Hard, Max Delta Ferrite, and Eutectic Chromium Carbide Mole Fraction respectively.

TABLE 4

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1 | 0 | 1 | 8 | 0 | 0 | 4.5 | 0 | 0 | 0 | 0 | 0 | 0 | 0 | 8% | 0% | 5% | 0% | 0% |
| M2 | 0 | 1 | 8 | 0 | 0 | 5 | 0 | 0 | 0 | 0 | 0 | 0 | 0 | 8% | 0% | 6% | 0% | 0% |
| M3 | 0 | 1 | 9 | 0 | 0 | 5 | 0 | 0 | 0 | 0 | 0 | 0 | 0 | 9% | 0% | 6% | 0% | 0% |
| M4 | 0 | 1 | 10 | 0 | 0 | 5 | 0 | 0 | 0 | 0 | 0 | 0 | 0 | 10% | 0% | 6% | 14% | 0% |
| M5 | 0 | 1.5 | 10 | 1.25 | 1 | 0 | 0 | 0 | 0 | 5 | 0 | 0 | 0 | 10% | 0% | 12% | 36% | 0% |
| M6 | 0 | 1.5 | 10.2 | 1.25 | 1 | 0 | 0 | 0 | 0 | 5 | 0 | 0 | 0 | 10% | 0% | 12% | 36% | 0% |
| M7 | 0 | 1.5 | 10.4 | 1.25 | 1 | 0 | 0 | 0 | 0 | 5 | 0 | 0 | 0 | 11% | 0% | 12% | 35% | 0% |
| M8 | 0 | 1.5 | 10.6 | 1.25 | 1 | 0 | 0 | 0 | 0 | 5 | 0 | 0 | 0 | 11% | 0% | 12% | 35% | 0% |
| M9 | 0 | 1.5 | 10.8 | 1.25 | 1 | 0 | 0 | 0 | 0 | 5 | 0 | 0 | 0 | 11% | 0% | 12% | 34% | 0% |
| M10 | 0 | 1.5 | 11 | 1.25 | 1 | 0 | 0 | 0 | 0 | 5 | 0 | 0 | 0 | 11% | 0% | 12% | 34% | 0% |
| M11 | 0 | 1.5 | 11.2 | 1.25 | 1 | 0 | 0 | 0 | 0 | 5 | 0 | 0 | 0 | 11% | 0% | 12% | 36% | 0% |
| M12 | 0 | 1.6 | 10 | 1.25 | 1 | 0 | 0 | 0 | 0 | 5 | 0 | 0 | 0 | 10% | 0% | 12% | 21% | 0% |
| M13 | 0 | 1.6 | 10.2 | 1.25 | 1 | 0 | 0 | 0 | 0 | 5 | 0 | 0 | 0 | 10% | 0% | 12% | 21% | 0% |
| M14 | 0 | 1.6 | 10.4 | 1.25 | 1 | 0 | 0 | 0 | 0 | 5 | 0 | 0 | 0 | 10% | 0% | 12% | 20% | 0% |
| M15 | 0 | 1.6 | 10.6 | 1.25 | 1 | 0 | 0 | 0 | 0 | 5 | 0 | 0 | 0 | 11% | 0% | 12% | 19% | 0% |
| M16 | 0 | 1.6 | 10.8 | 1.25 | 1 | 0 | 0 | 0 | 0 | 5 | 0 | 0 | 0 | 11% | 0% | 12% | 19% | 0% |
| M17 | 0 | 1.6 | 11 | 1.25 | 1 | 0 | 0 | 0 | 0 | 5 | 0 | 0 | 0 | 11% | 0% | 12% | 18% | 0% |
| M18 | 0 | 1.6 | 11.2 | 1.25 | 1 | 0 | 0 | 0 | 0 | 5 | 0 | 0 | 0 | 11% | 0% | 12% | 18% | 0% |
| M19 | 0 | 1.6 | 11.4 | 1.25 | 1 | 0 | 0 | 0 | 0 | 5 | 0 | 0 | 0 | 12% | 0% | 12% | 19% | 0% |
| M20 | 0 | 1.6 | 11.6 | 1.25 | 1 | 0 | 0 | 0 | 0 | 5 | 0 | 0 | 0 | 12% | 0% | 12% | 25% | 0% |
| M21 | 0 | 1.6 | 11.8 | 1.25 | 1 | 0 | 0 | 0 | 0 | 5 | 0 | 0 | 0 | 12% | 0% | 12% | 32% | 0% |
| M22 | 0 | 1.6 | 12 | 1.25 | 1 | 0 | 0 | 0 | 0 | 5 | 0 | 0 | 0 | 12% | 0% | 12% | 38% | 0% |
| M23 | 0 | 1.7 | 10 | 1.25 | 1 | 0 | 0 | 0 | 0 | 5 | 0 | 0 | 0 | 10% | 0% | 12% | 2% | 0% |
| M24 | 0 | 1.7 | 10.2 | 1.25 | 1 | 0 | 0 | 0 | 0 | 5 | 0 | 0 | 0 | 10% | 0% | 12% | 6% | 0% |
| M25 | 0 | 1.7 | 10.4 | 1.25 | 1 | 0 | 0 | 0 | 0 | 5 | 0 | 0 | 0 | 10% | 0% | 12% | 5% | 0% |
| M26 | 0 | 1.7 | 10.6 | 1.25 | 1 | 0 | 0 | 0 | 0 | 5 | 0 | 0 | 0 | 11% | 0% | 12% | 4% | 0% |
| M27 | 0 | 1.7 | 10.8 | 1.25 | 1 | 0 | 0 | 0 | 0 | 5 | 0 | 0 | 0 | 11% | 0% | 12% | 4% | 0% |
| M28 | 0 | 1.7 | 11 | 1.25 | 1 | 0 | 0 | 0 | 0 | 5 | 0 | 0 | 0 | 11% | 0% | 12% | 3% | 0% |
| M29 | 0 | 1.7 | 11.2 | 1.25 | 1 | 0 | 0 | 0 | 0 | 5 | 0 | 0 | 0 | 11% | 0% | 12% | 2% | 0% |
| M30 | 0 | 1.7 | 11.4 | 1.25 | 1 | 0 | 0 | 0 | 0 | 5 | 0 | 0 | 0 | 11% | 0% | 12% | 2% | 0% |
| M31 | 0 | 1 | 8 | 1.25 | 1 | 0 | 0 | 1 | 0 | 3 | 0 | 0 | 0 | 8% | 0% | 7% | 28% | 0% |
| M32 | 0 | 1 | 9 | 1.25 | 1 | 0 | 0 | 1 | 0 | 3 | 0 | 0 | 0 | 9% | 0% | 7% | 26% | 0% |
| M33 | 0 | 1 | 10 | 1.25 | 1 | 0 | 0 | 1 | 0 | 3 | 0 | 0 | 0 | 10% | 0% | 7% | 25% | 0% |
| M34 | 0 | 1 | 11 | 1.25 | 1 | 0 | 0 | 1 | 0 | 3 | 0 | 0 | 0 | 11% | 0% | 7% | 23% | 0% |
| M35 | 0 | 1 | 12 | 1.25 | 1 | 0 | 0 | 1 | 0 | 3 | 0 | 0 | 0 | 12% | 0% | 7% | 29% | 0% |
| M36 | 0 | 1.1 | 8 | 1.25 | 1 | 0 | 0 | 1 | 0 | 3.5 | 0 | 0 | 0 | 8% | 0% | 8% | 29% | 0% |
| M37 | 0 | 1.1 | 9 | 1.25 | 1 | 0 | 0 | 1 | 0 | 3 | 0 | 0 | 0 | 9% | 0% | 7% | 8% | 0% |
| M38 | 0 | 1.1 | 9 | 1.25 | 1 | 0 | 0 | 1 | 0 | 3.5 | 0 | 0 | 0 | 9% | 0% | 8% | 28% | 0% |
| M39 | 0 | 1.1 | 10 | 1.25 | 1 | 0 | 0 | 1 | 0 | 3 | 0 | 0 | 0 | 10% | 0% | 7% | 6% | 0% |
| M40 | 0 | 1.1 | 10 | 1.25 | 1 | 0 | 0 | 1 | 0 | 3.5 | 0 | 0 | 0 | 10% | 0% | 8% | 26% | 0% |
| M41 | 0 | 1.1 | 11 | 1.25 | 1 | 0 | 0 | 1 | 0 | 3 | 0 | 0 | 0 | 11% | 0% | 8% | 3% | 0% |
| M42 | 0 | 1.1 | 11 | 1.25 | 1 | 0 | 0 | 1 | 0 | 3.5 | 0 | 0 | 0 | 11% | 0% | 8% | 24% | 0% |
| M43 | 0 | 1.1 | 12 | 1.25 | 1 | 0 | 0 | 1 | 0 | 3 | 0 | 0 | 0 | 12% | 0% | 8% | 3% | 0% |
| M44 | 0 | 1.1 | 12 | 1.25 | 1 | 0 | 0 | 1 | 0 | 3.5 | 0 | 0 | 0 | 12% | 0% | 8% | 34% | 0% |
| M45 | 0 | 1.2 | 8 | 1.25 | 1 | 0 | 0 | 1 | 0 | 4 | 0 | 0 | 0 | 8% | 0% | 9% | 31% | 0% |
| M46 | 0 | 1.2 | 9 | 1.25 | 1 | 0 | 0 | 1 | 0 | 3 | 0 | 0 | 0 | 9% | 0% | 8% | 0% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M47 | 0 | 1.2 | 9 | 1.25 | 1 | 0 | 0 | 1 | 0 | 3.5 | 0 | 0 | 0 | 9% | 0% | 9% | 9% | 0% |
| M48 | 0 | 1.2 | 9 | 1.25 | 1 | 0 | 0 | 1 | 0 | 4 | 0 | 0 | 0 | 9% | 0% | 9% | 29% | 0% |
| M49 | 0 | 1.2 | 10 | 1.25 | 1 | 0 | 0 | 1 | 0 | 3 | 0 | 0 | 0 | 10% | 0% | 8% | 0% | 0% |
| M50 | 0 | 1.2 | 10 | 1.25 | 1 | 0 | 0 | 1 | 0 | 3.5 | 0 | 0 | 0 | 10% | 0% | 9% | 7% | 0% |
| M51 | 0 | 1.2 | 10 | 1.25 | 1 | 0 | 0 | 1 | 0 | 4 | 0 | 0 | 0 | 10% | 0% | 9% | 28% | 0% |
| M52 | 0 | 1.2 | 11 | 1.25 | 1 | 0 | 0 | 1 | 0 | 3.5 | 0 | 0 | 0 | 11% | 0% | 9% | 5% | 0% |
| M53 | 0 | 1.2 | 11 | 1.25 | 1 | 0 | 0 | 1 | 0 | 4 | 0 | 0 | 0 | 11% | 0% | 9% | 26% | 0% |
| M54 | 0 | 1.2 | 12 | 1.25 | 1 | 0 | 0 | 1 | 0 | 3.5 | 0 | 0 | 0 | 12% | 0% | 9% | 8% | 0% |
| M55 | 0 | 1.2 | 12 | 1.25 | 1 | 0 | 0 | 1 | 0 | 4 | 0 | 0 | 0 | 12% | 0% | 9% | 39% | 0% |
| M56 | 0 | 1.2 | 13 | 1.25 | 1 | 0 | 0 | 1 | 0 | 3.5 | 0 | 0 | 0 | 13% | 0% | 9% | 30% | 0% |
| M57 | 0 | 1.3 | 8 | 1.25 | 1 | 0 | 0 | 1 | 0 | 4.5 | 0 | 0 | 0 | 8% | 0% | 10% | 32% | 0% |
| M58 | 0 | 1.3 | 9 | 1.25 | 1 | 0 | 0 | 1 | 0 | 3.5 | 0 | 0 | 0 | 9% | 0% | 9% | 0% | 0% |
| M59 | 0 | 1.3 | 9 | 1.25 | 1 | 0 | 0 | 1 | 0 | 4 | 0 | 0 | 0 | 9% | 0% | 10% | 11% | 0% |
| M60 | 0 | 1.3 | 9 | 1.25 | 1 | 0 | 0 | 1 | 0 | 4.5 | 0 | 0 | 0 | 9% | 0% | 10% | 31% | 0% |
| M61 | 0 | 1.3 | 10 | 1.25 | 1 | 0 | 0 | 1 | 0 | 3.5 | 0 | 0 | 0 | 10% | 0% | 9% | 0% | 0% |
| M62 | 0 | 1.3 | 10 | 1.25 | 1 | 0 | 0 | 1 | 0 | 4 | 0 | 0 | 0 | 10% | 0% | 10% | 8% | 0% |
| M63 | 0 | 1.3 | 10 | 1.25 | 1 | 0 | 0 | 1 | 0 | 4.5 | 0 | 0 | 0 | 10% | 0% | 10% | 29% | 0% |
| M64 | 0 | 1.3 | 11 | 1.25 | 1 | 0 | 0 | 1 | 0 | 3.5 | 0 | 0 | 0 | 11% | 0% | 9% | 0% | 0% |
| M65 | 0 | 1.3 | 11 | 1.25 | 1 | 0 | 0 | 1 | 0 | 4 | 0 | 0 | 0 | 11% | 0% | 10% | 6% | 0% |
| M66 | 0 | 1.3 | 11 | 1.25 | 1 | 0 | 0 | 1 | 0 | 4.5 | 0 | 0 | 0 | 11% | 0% | 10% | 31% | 0% |
| M67 | 0 | 1.3 | 12 | 1.25 | 1 | 0 | 0 | 1 | 0 | 4 | 0 | 0 | 0 | 12% | 0% | 10% | 13% | 0% |
| M68 | 0 | 1.3 | 13 | 1.25 | 1 | 0 | 0 | 1 | 0 | 4 | 0 | 0 | 0 | 13% | 0% | 10% | 34% | 0% |
| M69 | 0 | 1.4 | 8 | 1.25 | 1 | 0 | 0 | 1 | 0 | 4.5 | 0 | 0 | 0 | 8% | 0% | 11% | 14% | 0% |
| M70 | 0 | 1.4 | 8 | 1.25 | 1 | 0 | 0 | 1 | 0 | 5 | 0 | 0 | 0 | 8% | 0% | 11% | 33% | 0% |
| M71 | 0 | 1.4 | 9 | 1.25 | 1 | 0 | 0 | 1 | 0 | 3.5 | 0 | 0 | 0 | 9% | 0% | 9% | 0% | 0% |
| M72 | 0 | 1.4 | 9 | 1.25 | 1 | 0 | 0 | 1 | 0 | 4 | 0 | 0 | 0 | 9% | 0% | 10% | 0% | 0% |
| M73 | 0 | 1.4 | 9 | 1.25 | 1 | 0 | 0 | 1 | 0 | 4.5 | 0 | 0 | 0 | 9% | 0% | 11% | 12% | 0% |
| M74 | 0 | 1.4 | 9 | 1.25 | 1 | 0 | 0 | 1 | 0 | 5 | 0 | 0 | 0 | 9% | 0% | 11% | 32% | 0% |
| M75 | 0 | 1.4 | 10 | 1.25 | 1 | 0 | 0 | 1 | 0 | 4 | 0 | 0 | 0 | 10% | 0% | 10% | 0% | 0% |
| M76 | 0 | 1.4 | 10 | 1.25 | 1 | 0 | 0 | 1 | 0 | 4.5 | 0 | 0 | 0 | 10% | 0% | 11% | 10% | 0% |
| M77 | 0 | 1.4 | 10 | 1.25 | 1 | 0 | 0 | 1 | 0 | 5 | 0 | 0 | 0 | 10% | 0% | 11% | 30% | 0% |
| M78 | 0 | 1.4 | 11 | 1.25 | 1 | 0 | 0 | 1 | 0 | 4 | 0 | 0 | 0 | 11% | 0% | 10% | 0% | 0% |
| M79 | 0 | 1.4 | 11 | 1.25 | 1 | 0 | 0 | 1 | 0 | 4.5 | 0 | 0 | 0 | 11% | 0% | 11% | 8% | 0% |
| M80 | 0 | 1.4 | 11 | 1.25 | 1 | 0 | 0 | 1 | 0 | 5 | 0 | 0 | 0 | 11% | 0% | 11% | 36% | 0% |
| M81 | 0 | 1.4 | 12 | 1.25 | 1 | 0 | 0 | 1 | 0 | 4.5 | 0 | 0 | 0 | 12% | 0% | 11% | 18% | 0% |
| M82 | 0 | 1.4 | 13 | 1.25 | 1 | 0 | 0 | 1 | 0 | 4.5 | 0 | 0 | 0 | 13% | 0% | 11% | 38% | 0% |
| M83 | 0 | 1.5 | 8 | 1.25 | 1 | 0 | 0 | 1 | 0 | 5 | 0 | 0 | 0 | 8% | 0% | 12% | 15% | 0% |
| M84 | 0 | 1.5 | 9 | 1.25 | 1 | 0 | 0 | 1 | 0 | 4 | 0 | 0 | 0 | 9% | 0% | 10% | 0% | 0% |
| M85 | 0 | 1.5 | 9 | 1.25 | 1 | 0 | 0 | 1 | 0 | 4.5 | 0 | 0 | 0 | 9% | 0% | 11% | 0% | 0% |
| M86 | 0 | 1.5 | 9 | 1.25 | 1 | 0 | 0 | 1 | 0 | 5 | 0 | 0 | 0 | 9% | 0% | 12% | 13% | 0% |
| M87 | 0 | 1.5 | 10 | 1.25 | 1 | 0 | 0 | 1 | 0 | 4.5 | 0 | 0 | 0 | 10% | 0% | 11% | 0% | 0% |
| M88 | 0 | 1.5 | 10 | 1.25 | 1 | 0 | 0 | 1 | 0 | 5 | 0 | 0 | 0 | 10% | 0% | 12% | 11% | 0% |
| M89 | 0 | 1.5 | 11 | 1.25 | 1 | 0 | 0 | 1 | 0 | 4.5 | 0 | 0 | 0 | 11% | 0% | 11% | 0% | 0% |
| M90 | 0 | 1.5 | 11 | 1.25 | 1 | 0 | 0 | 1 | 0 | 5 | 0 | 0 | 0 | 11% | 0% | 12% | 9% | 0% |
| M91 | 0 | 1.5 | 12 | 1.25 | 1 | 0 | 0 | 1 | 0 | 4.5 | 0 | 0 | 0 | 12% | 0% | 11% | 0% | 0% |
| M92 | 0 | 1.5 | 12 | 1.25 | 1 | 0 | 0 | 1 | 0 | 5 | 0 | 0 | 0 | 12% | 0% | 12% | 23% | 0% |
| M93 | 0 | 1.6 | 9 | 1.25 | 1 | 0 | 0 | 1 | 0 | 4.5 | 0 | 0 | 0 | 9% | 0% | 11% | 0% | 0% |
| M94 | 0 | 1.6 | 9 | 1.25 | 1 | 0 | 0 | 1 | 0 | 5 | 0 | 0 | 0 | 9% | 0% | 12% | 0% | 0% |
| M95 | 0 | 1.6 | 10 | 1.25 | 1 | 0 | 0 | 1 | 0 | 4.5 | 0 | 0 | 0 | 10% | 0% | 11% | 0% | 0% |
| M96 | 0 | 1.6 | 10 | 1.25 | 1 | 0 | 0 | 1 | 0 | 5 | 0 | 0 | 0 | 10% | 0% | 12% | 0% | 0% |
| M97 | 0 | 1.6 | 11 | 1.25 | 1 | 0 | 0 | 1 | 0 | 5 | 0 | 0 | 0 | 11% | 0% | 12% | 0% | 0% |
| M98 | 0 | 1.6 | 12 | 1.25 | 1 | 0 | 0 | 1 | 0 | 5 | 0 | 0 | 0 | 12% | 0% | 12% | 0% | 0% |
| M99 | 0 | 1.6 | 13 | 1.25 | 1 | 0 | 0 | 1 | 0 | 5 | 0 | 0 | 0 | 13% | 0% | 12% | 25% | 0% |
| M100 | 0 | 1.7 | 9 | 1.25 | 1 | 0 | 0 | 1 | 0 | 4.5 | 0 | 0 | 0 | 9% | 0% | 12% | 0% | 0% |
| M101 | 0 | 1.7 | 9 | 1.25 | 1 | 0 | 0 | 1 | 0 | 5 | 0 | 0 | 0 | 9% | 0% | 12% | 0% | 0% |
| M102 | 0 | 1.7 | 10 | 1.25 | 1 | 0 | 0 | 1 | 0 | 5 | 0 | 0 | 0 | 10% | 0% | 12% | 0% | 0% |
| M103 | 0 | 1.7 | 11 | 1.25 | 1 | 0 | 0 | 1 | 0 | 5 | 0 | 0 | 0 | 11% | 0% | 12% | 0% | 0% |
| M104 | 0 | 1.8 | 9 | 1.25 | 1 | 0 | 0 | 1 | 0 | 5 | 0 | 0 | 0 | 9% | 0% | 13% | 0% | 0% |
| M105 | 0 | 1 | 8 | 0 | 0 | 0 | 0 | 0 | 0 | 3.5 | 0 | 0 | 0 | 8% | 0% | 8% | 0% | 0% |
| M106 | 0 | 1 | 9 | 0 | 0 | 0 | 0 | 0 | 0 | 3 | 0 | 0 | 0 | 9% | 0% | 7% | 0% | 0% |
| M107 | 0 | 1 | 9 | 0 | 0 | 0 | 0 | 0 | 0 | 3.5 | 0 | 0 | 0 | 9% | 0% | 8% | 21% | 0% |
| M108 | 0 | 1 | 10 | 0 | 0 | 0 | 0 | 0 | 0 | 3.5 | 0 | 0 | 0 | 10% | 0% | 8% | 38% | 0% |
| M109 | 0 | 1 | 10 | 0 | 0 | 0 | 0 | 0 | 0 | 3 | 0 | 0 | 0 | 10% | 0% | 7% | 0% | 0% |
| M100 | 0 | 1 | 11 | 0 | 0 | 0 | 0 | 0 | 0 | 3 | 0 | 0 | 0 | 11% | 0% | 7% | 40% | 0% |
| M111 | 0 | 1.25 | 8 | 0 | 0 | 0 | 0 | 0 | 0 | 4.5 | 0 | 0 | 0 | 8% | 0% | 10% | 0% | 0% |
| M112 | 0 | 1.25 | 9 | 0 | 0 | 0 | 0 | 0 | 0 | 3 | 0 | 0 | 0 | 9% | 0% | 8% | 0% | 0% |
| M113 | 0 | 1.25 | 9 | 0 | 0 | 0 | 0 | 0 | 0 | 3.5 | 0 | 0 | 0 | 9% | 0% | 9% | 0% | 0% |
| M114 | 0 | 1.25 | 9 | 0 | 0 | 0 | 0 | 0 | 0 | 4 | 0 | 0 | 0 | 9% | 0% | 9% | 0% | 0% |
| M115 | 0 | 1.25 | 9 | 0 | 0 | 0 | 0 | 0 | 0 | 4.5 | 0 | 0 | 0 | 9% | 0% | 10% | 11% | 0% |
| M116 | 0 | 1.25 | 10 | 0 | 0 | 0 | 0 | 0 | 0 | 3.5 | 0 | 0 | 0 | 10% | 0% | 9% | 0% | 0% |
| M117 | 0 | 1.25 | 10 | 0 | 0 | 0 | 0 | 0 | 0 | 4 | 0 | 0 | 0 | 10% | 0% | 9% | 0% | 0% |
| M118 | 0 | 1.25 | 10 | 0 | 0 | 0 | 0 | 0 | 0 | 4.5 | 0 | 0 | 0 | 10% | 0% | 10% | 30% | 0% |
| M119 | 0 | 1.25 | 11 | 0 | 0 | 0 | 0 | 0 | 0 | 3.5 | 0 | 0 | 0 | 11% | 0% | 9% | 4% | 0% |
| M120 | 0 | 1.25 | 11 | 0 | 0 | 0 | 0 | 0 | 0 | 4 | 0 | 0 | 0 | 11% | 0% | 9% | 36% | 0% |
| M121 | 0 | 1.25 | 12 | 0 | 0 | 0 | 0 | 0 | 0 | 3.5 | 0 | 0 | 0 | 12% | 0% | 9% | 35% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M122 | 0 | 1.5 | 9 | 0 | 0 | 0 | 0 | 0 | 0 | 4 | 0 | 0 | 0 | 9% | 0% | 10% | 0% | 0% |
| M123 | 0 | 1.5 | 9 | 0 | 0 | 0 | 0 | 0 | 0 | 4.5 | 0 | 0 | 0 | 9% | 0% | 11% | 0% | 0% |
| M124 | 0 | 1.5 | 9 | 0 | 0 | 0 | 0 | 0 | 0 | 5 | 0 | 0 | 0 | 9% | 0% | 12% | 0% | 0% |
| M125 | 0 | 1.5 | 10 | 0 | 0 | 0 | 0 | 0 | 0 | 4.5 | 0 | 0 | 0 | 10% | 0% | 11% | 0% | 0% |
| M126 | 0 | 1.5 | 10 | 0 | 0 | 0 | 0 | 0 | 0 | 5 | 0 | 0 | 0 | 10% | 0% | 12% | 0% | 0% |
| M127 | 0 | 1.5 | 11 | 0 | 0 | 0 | 0 | 0 | 0 | 4.5 | 0 | 0 | 0 | 11% | 0% | 11% | 1% | 0% |
| M128 | 0 | 1.5 | 11 | 0 | 0 | 0 | 0 | 0 | 0 | 5 | 0 | 0 | 0 | 11% | 0% | 12% | 33% | 0% |
| M129 | 0 | 1.5 | 12 | 0 | 0 | 0 | 0 | 0 | 0 | 4.5 | 0 | 0 | 0 | 12% | 0% | 11% | 30% | 0% |
| M130 | 0 | 1.75 | 9 | 0 | 0 | 0 | 0 | 0 | 0 | 5 | 0 | 0 | 0 | 9% | 0% | 12% | 0% | 0% |
| M131 | 0 | 1.75 | 10 | 0 | 0 | 0 | 0 | 0 | 0 | 5 | 0 | 0 | 0 | 10% | 0% | 12% | 0% | 0% |
| M132 | 0 | 1.5 | 10 | 1 | 1 | 0 | 0 | 0 | 0 | 5 | 0 | 0 | 0 | 10% | 0% | 12% | 39% | 0% |
| M133 | 0 | 1.5 | 10 | 2.5 | 1 | 0 | 0 | 0 | 0 | 5 | 0 | 0 | 0 | 10% | 0% | 12% | 23% | 0% |
| M134 | 0 | 1.5 | 10 | 4 | 1 | 0 | 0 | 0 | 0 | 5 | 0 | 0 | 0 | 10% | 0% | 12% | 20% | 0% |
| M135 | 0 | 1.5 | 10 | 5.5 | 1 | 0 | 0 | 0 | 0 | 5 | 0 | 0 | 0 | 10% | 0% | 12% | 34% | 0% |
| M136 | 0 | 1.5 | 10 | 7 | 1 | 0 | 0 | 0 | 0 | 5 | 0 | 0 | 0 | 10% | 0% | 12% | 20% | 0% |
| M137 | 0 | 1.5 | 10 | 8.5 | 1 | 0 | 0 | 0 | 0 | 5 | 0 | 0 | 0 | 10% | 0% | 12% | 7% | 0% |
| M138 | 0 | 1.5 | 10 | 10 | 1 | 0 | 0 | 0 | 0 | 5 | 0 | 0 | 0 | 10% | 0% | 12% | 17% | 0% |
| M139 | 0 | 1.6 | 10 | 1 | 1 | 0 | 0 | 0 | 0 | 5 | 0 | 0 | 0 | 10% | 0% | 12% | 24% | 0% |
| M140 | 0 | 1.6 | 10 | 2.5 | 1 | 0 | 0 | 0 | 0 | 5 | 0 | 0 | 0 | 10% | 0% | 12% | 7% | 0% |
| M141 | 0 | 1.6 | 10 | 4 | 1 | 0 | 0 | 0 | 0 | 5 | 0 | 0 | 0 | 10% | 0% | 12% | 0% | 0% |
| M142 | 0 | 1.6 | 10 | 5.5 | 1 | 0 | 0 | 0 | 0 | 5 | 0 | 0 | 0 | 10% | 0% | 12% | 5% | 0% |
| M143 | 0 | 1.6 | 10 | 7 | 1 | 0 | 0 | 0 | 0 | 5 | 0 | 0 | 0 | 10% | 0% | 12% | 6% | 0% |
| M144 | 0 | 1.6 | 10 | 8.5 | 1 | 0 | 0 | 0 | 0 | 5 | 0 | 0 | 0 | 10% | 0% | 12% | 0% | 0% |
| M145 | 0 | 1.6 | 10 | 10 | 1 | 0 | 0 | 0 | 0 | 5 | 0 | 0 | 0 | 10% | 0% | 12% | 0% | 0% |
| M146 | 0 | 1.6 | 12 | 1 | 1 | 0 | 0 | 0 | 0 | 5 | 0 | 0 | 0 | 12% | 0% | 12% | 36% | 0% |
| M147 | 0 | 1.6 | 12 | 2.5 | 1 | 0 | 0 | 0 | 0 | 5 | 0 | 0 | 0 | 12% | 0% | 12% | 39% | 0% |
| M148 | 0 | 1.6 | 12 | 4 | 1 | 0 | 0 | 0 | 0 | 5 | 0 | 0 | 0 | 12% | 0% | 12% | 28% | 0% |
| M149 | 0 | 1.6 | 12 | 5.5 | 1 | 0 | 0 | 0 | 0 | 5 | 0 | 0 | 0 | 12% | 0% | 12% | 28% | 0% |
| M150 | 0 | 1.6 | 12 | 7 | 1 | 0 | 0 | 0 | 0 | 5 | 0 | 0 | 0 | 12% | 0% | 12% | 36% | 0% |
| M151 | 0 | 1.6 | 12 | 8.5 | 1 | 0 | 0 | 0 | 0 | 5 | 0 | 0 | 0 | 12% | 0% | 12% | 27% | 0% |
| M152 | 0 | 1.6 | 12 | 10 | 1 | 0 | 0 | 0 | 0 | 5 | 0 | 0 | 0 | 12% | 0% | 12% | 24% | 0% |
| M153 | 0 | 1.7 | 10 | 1 | 1 | 0 | 0 | 0 | 0 | 5 | 0 | 0 | 0 | 10% | 0% | 12% | 0% | 0% |
| M154 | 0 | 1.7 | 10 | 2.5 | 1 | 0 | 0 | 0 | 0 | 5 | 0 | 0 | 0 | 10% | 0% | 12% | 0% | 0% |
| M155 | 0 | 1.7 | 10 | 4 | 1 | 0 | 0 | 0 | 0 | 5 | 0 | 0 | 0 | 10% | 0% | 12% | 0% | 0% |
| M156 | 0 | 1.7 | 10 | 5.5 | 1 | 0 | 0 | 0 | 0 | 5 | 0 | 0 | 0 | 10% | 0% | 12% | 0% | 0% |
| M157 | 0 | 1.7 | 10 | 7 | 1 | 0 | 0 | 0 | 0 | 5 | 0 | 0 | 0 | 10% | 0% | 12% | 0% | 0% |
| M158 | 0 | 1.7 | 10 | 8.5 | 1 | 0 | 0 | 0 | 0 | 5 | 0 | 0 | 0 | 10% | 0% | 12% | 0% | 0% |
| M159 | 0 | 1.7 | 10 | 10 | 1 | 0 | 0 | 0 | 0 | 5 | 0 | 0 | 0 | 10% | 0% | 12% | 0% | 0% |
| M160 | 0 | 1.8 | 10 | 7 | 1 | 0 | 0 | 0 | 0 | 5 | 0 | 0 | 0 | 10% | 0% | 12% | 0% | 0% |
| M161 | 0 | 1.8 | 10 | 8.5 | 1 | 0 | 0 | 0 | 0 | 5 | 0 | 0 | 0 | 10% | 0% | 12% | 0% | 0% |
| M162 | 0 | 1.8 | 10 | 10 | 1 | 0 | 0 | 0 | 0 | 5 | 0 | 0 | 0 | 10% | 0% | 12% | 0% | 0% |
| M163 | 0 | 2 | 10 | 1.25 | 1 | 2 | 0 | 1 | 0 | 6 | 0 | 0 | 0 | 11% | 0% | 16% | 6% | 0% |
| M164 | 0 | 2 | 11 | 1.25 | 1 | 2 | 0 | 1 | 0 | 6 | 0 | 0 | 0 | 12% | 0% | 16% | 4% | 0% |
| M165 | 0 | 2 | 12 | 1.25 | 1 | 2 | 0 | 1 | 0 | 6 | 0 | 0 | 0 | 13% | 0% | 16% | 20% | 0% |
| M166 | 0 | 2.5 | 10 | 1.25 | 1 | 2 | 0 | 1 | 0 | 8 | 0 | 0 | 0 | 11% | 0% | 20% | 0% | 0% |
| M167 | 0 | 2.5 | 11 | 1.25 | 1 | 2 | 0 | 1 | 0 | 8 | 0 | 0 | 0 | 12% | 0% | 20% | 0% | 0% |
| M168 | 0 | 2.5 | 12 | 1.25 | 1 | 2 | 0 | 1 | 0 | 8 | 0 | 0 | 0 | 13% | 0% | 20% | 19% | 0% |
| M169 | 0 | 3 | 10 | 1.25 | 1 | 2 | 0 | 1 | 0 | 9 | 0 | 0 | 0 | 10% | 0% | 23% | 0% | 0% |
| M170 | 0 | 3 | 10 | 1.25 | 1 | 2 | 0 | 1 | 0 | 10 | 0 | 0 | 0 | 11% | 0% | 24% | 0% | 0% |
| M171 | 0 | 3 | 11 | 1.25 | 1 | 2 | 0 | 1 | 0 | 10 | 0 | 0 | 0 | 12% | 0% | 24% | 0% | 0% |
| M172 | 0 | 3 | 12 | 1.25 | 1 | 2 | 0 | 1 | 0 | 10 | 0 | 0 | 0 | 13% | 0% | 24% | 19% | 0% |
| M173 | 0 | 1 | 8 | 0 | 0 | 0 | 0 | 0 | 0 | 0 | 0 | 0 | 4.5 | 8% | 0% | 6% | 0% | 0% |
| M174 | 0 | 1 | 8 | 0 | 0 | 0 | 0 | 0 | 0 | 0 | 0 | 0 | 5 | 8% | 0% | 6% | 0% | 0% |
| M175 | 0 | 1 | 9 | 0 | 0 | 0 | 0 | 0 | 0 | 0 | 0 | 0 | 4.5 | 9% | 0% | 6% | 0% | 0% |
| M176 | 0 | 1 | 9 | 0 | 0 | 0 | 0 | 0 | 0 | 0 | 0 | 0 | 5 | 9% | 0% | 6% | 0% | 0% |
| M177 | 0 | 1 | 10 | 0 | 0 | 0 | 0 | 0 | 0 | 0 | 0 | 0 | 5 | 10% | 0% | 6% | 0% | 0% |
| M178 | 0 | 1 | 11 | 0 | 0 | 0 | 0 | 0 | 0 | 0 | 0 | 0 | 5 | 12% | 0% | 6% | 18% | 0% |
| M179 | 0 | 1.5 | 10 | 0 | 0 | 0 | 0 | 0 | 0 | 4 | 0 | 0 | 0 | 10% | 0% | 10% | 0% | 0% |
| M180 | 0 | 1.5 | 10 | 1.25 | 1 | 0 | 0 | 1 | 0 | 4 | 0 | 0 | 0 | 10% | 0% | 10% | 0% | 0% |
| M181 | 0 | 1.8 | 10 | 5.5 | 1 | 0 | 0 | 0 | 0 | 5 | 0 | 0 | 0 | 10% | 0% | 12% | 0% | 0% |
| M182 | 0 | 1.5 | 13 | 0 | 0 | 0 | 0 | 0 | 0 | 4.5 | 0 | 0 | 0 | 13% | 0% | 11% | 28% | 0% |
| M183 | 0 | 1.4 | 12 | 1.25 | 1 | 0 | 0 | 1 | 0 | 4 | 0 | 0 | 0 | 12% | 0% | 10% | 0% | 0% |
| M184 | 0 | 1.7 | 11.6 | 1.25 | 1 | 0 | 0 | 0 | 0 | 5 | 0 | 0 | 0 | 12% | 0% | 12% | 3% | 0% |
| M185 | 0 | 1.8 | 10 | 4 | 1 | 0 | 0 | 0 | 0 | 5 | 0 | 0 | 0 | 10% | 0% | 12% | 0% | 0% |
| M186 | 0 | 2.5 | 10 | 1.25 | 1 | 2 | 0 | 1 | 0 | 7 | 0 | 0 | 0 | 10% | 0% | 19% | 0% | 0% |
| M187 | 0 | 1.8 | 10 | 2.5 | 1 | 0 | 0 | 0 | 0 | 5 | 0 | 0 | 0 | 10% | 0% | 13% | 0% | 0% |
| M188 | 0 | 1.8 | 10 | 1.25 | 1 | 0 | 0 | 1 | 0 | 5 | 0 | 0 | 0 | 10% | 0% | 13% | 0% | 0% |
| M189 | 0 | 1 | 9 | 0 | 0 | 4.5 | 0 | 0 | 0 | 0 | 0 | 0 | 0 | 9% | 0% | 5% | 0% | 0% |
| M190 | 0 | 1.5 | 13 | 1.25 | 1 | 0 | 0 | 1 | 0 | 4.5 | 0 | 0 | 0 | 13% | 0% | 11% | 21% | 0% |
| M191 | 0 | 1.25 | 13 | 0 | 0 | 0 | 0 | 0 | 0 | 3.5 | 0 | 0 | 0 | 13% | 0% | 9% | 33% | 0% |
| M192 | 0 | 1.8 | 10 | 1.25 | 1 | 0 | 0 | 0 | 0 | 5 | 0 | 0 | 0 | 10% | 0% | 13% | 0% | 0% |
| M193 | 0 | 1.8 | 10 | 1 | 1 | 0 | 0 | 0 | 0 | 5 | 0 | 0 | 0 | 10% | 0% | 13% | 0% | 0% |
| M194 | 0 | 1.7 | 11.8 | 1.25 | 1 | 0 | 0 | 0 | 0 | 5 | 0 | 0 | 0 | 12% | 0% | 12% | 9% | 0% |
| M195 | 0 | 1.6 | 11 | 1.25 | 1 | 0 | 0 | 1 | 0 | 4.5 | 0 | 0 | 0 | 11% | 0% | 11% | 0% | 0% |
| M196 | 0 | 1.1 | 13 | 1.25 | 1 | 0 | 0 | 1 | 0 | 3 | 0 | 0 | 0 | 13% | 0% | 7% | 26% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M197 | 0 | 1.3 | 9 | 1.25 | 1 | 0 | 0 | 1 | 0 | 3 | 0 | 0 | 0 | 9% | 0% | 8% | 0% | 0% |
| M198 | 0 | 1.25 | 10 | 0 | 0 | 0 | 0 | 0 | 0 | 3 | 0 | 0 | 0 | 10% | 0% | 8% | 0% | 0% |
| M199 | 0 | 1.6 | 9 | 1.25 | 1 | 0 | 0 | 1 | 0 | 4 | 0 | 0 | 0 | 9% | 0% | 10% | 0% | 0% |
| M200 | 0 | 1 | 10 | 0 | 0 | 0 | 0 | 0 | 0 | 0 | 0 | 0 | 4.5 | 10% | 0% | 6% | 0% | 0% |
| M201 | 0 | 1.75 | 9 | 0 | 0 | 0 | 0 | 0 | 0 | 4.5 | 0 | 0 | 0 | 8% | 0% | 11% | 0% | 0% |
| M202 | 0 | 1.8 | 10.2 | 1.25 | 1 | 0 | 0 | 0 | 0 | 5 | 0 | 0 | 0 | 10% | 0% | 13% | 0% | 0% |
| M203 | 0 | 3 | 11 | 1.25 | 1 | 2 | 0 | 1 | 0 | 9 | 0 | 0 | 0 | 11% | 0% | 23% | 0% | 0% |
| M204 | 0 | 1.9 | 9 | 1.25 | 1 | 0 | 0 | 1 | 0 | 5 | 0 | 0 | 0 | 8% | 0% | 13% | 0% | 0% |
| M205 | 0 | 1.75 | 11 | 0 | 0 | 0 | 0 | 0 | 0 | 5 | 0 | 0 | 0 | 11% | 0% | 12% | 0% | 0% |
| M206 | 0 | 1.7 | 12 | 1.25 | 1 | 0 | 0 | 1 | 0 | 5 | 0 | 0 | 0 | 12% | 0% | 12% | 0% | 0% |
| M207 | 0 | 1 | 11 | 0 | 0 | 5 | 0 | 0 | 0 | 0 | 0 | 0 | 0 | 11% | 0% | 6% | 14% | 0% |
| M208 | 0 | 1.2 | 11 | 1.25 | 1 | 0 | 0 | 1 | 0 | 3 | 0 | 0 | 0 | 11% | 0% | 8% | 0% | 0% |
| M209 | 0 | 1.5 | 14 | 0 | 0 | 0 | 0 | 0 | 0 | 4.5 | 0 | 0 | 0 | 14% | 0% | 11% | 25% | 0% |
| M210 | 0 | 1.7 | 12 | 1 | 1 | 0 | 0 | 0 | 0 | 5 | 0 | 0 | 0 | 12% | 0% | 12% | 13% | 0% |
| M211 | 0 | 1.8 | 10.4 | 1.25 | 1 | 0 | 0 | 0 | 0 | 5 | 0 | 0 | 0 | 10% | 1% | 13% | 0% | 0% |
| M212 | 0 | 1.7 | 12 | 1.25 | 1 | 0 | 0 | 0 | 0 | 5 | 0 | 0 | 0 | 12% | 1% | 12% | 15% | 0% |
| M213 | 0 | 1.4 | 10 | 1.25 | 1 | 0 | 0 | 1 | 0 | 3.5 | 0 | 0 | 0 | 10% | 1% | 9% | 0% | 0% |
| M214 | 0 | 1.3 | 12 | 1.25 | 1 | 0 | 0 | 1 | 0 | 3.5 | 0 | 0 | 0 | 12% | 1% | 9% | 0% | 0% |
| M215 | 0 | 1.7 | 12 | 2.5 | 1 | 0 | 0 | 0 | 0 | 5 | 0 | 0 | 0 | 12% | 1% | 12% | 26% | 0% |
| M216 | 0 | 1.4 | 13 | 1.25 | 1 | 0 | 0 | 1 | 0 | 4 | 0 | 0 | 0 | 13% | 1% | 10% | 17% | 0% |
| M217 | 0 | 1.25 | 14 | 0 | 0 | 0 | 0 | 0 | 0 | 3.5 | 0 | 0 | 0 | 14% | 1% | 8% | 30% | 0% |
| M218 | 0 | 1.7 | 12 | 4 | 1 | 0 | 0 | 0 | 0 | 5 | 0 | 0 | 0 | 12% | 1% | 12% | 16% | 0% |
| M219 | 0 | 1.7 | 12 | 5.5 | 1 | 0 | 0 | 0 | 0 | 5 | 0 | 0 | 0 | 12% | 1% | 12% | 7% | 0% |
| M220 | 0 | 1.8 | 10.6 | 1.25 | 1 | 0 | 0 | 0 | 0 | 5 | 0 | 0 | 0 | 10% | 1% | 13% | 0% | 0% |
| M221 | 0 | 1.5 | 11 | 0 | 0 | 0 | 0 | 0 | 0 | 4 | 0 | 0 | 0 | 11% | 1% | 10% | 0% | 0% |
| M222 | 0 | 1.7 | 10 | 1.25 | 1 | 0 | 0 | 1 | 0 | 4.5 | 0 | 0 | 0 | 9% | 1% | 12% | 0% | 0% |
| M223 | 0 | 1.7 | 12 | 7 | 1 | 0 | 0 | 0 | 0 | 5 | 0 | 0 | 0 | 12% | 1% | 12% | 17% | 0% |
| M224 | 0 | 1.5 | 11 | 1.25 | 1 | 0 | 0 | 1 | 0 | 4 | 0 | 0 | 0 | 11% | 1% | 10% | 0% | 0% |
| M225 | 0 | 1.7 | 12 | 8.5 | 1 | 0 | 0 | 0 | 0 | 5 | 0 | 0 | 0 | 12% | 1% | 12% | 15% | 0% |
| M226 | 0 | 1.7 | 12.2 | 1.25 | 1 | 0 | 0 | 0 | 0 | 5 | 0 | 0 | 0 | 12% | 1% | 12% | 22% | 0% |
| M227 | 0 | 1.7 | 12 | 10 | 1 | 0 | 0 | 0 | 0 | 5 | 0 | 0 | 0 | 12% | 1% | 12% | 4% | 0% |
| M228 | 0 | 1.5 | 9 | 0 | 0 | 0 | 0 | 0 | 0 | 3.5 | 0 | 0 | 0 | 8% | 1% | 9% | 0% | 0% |
| M229 | 0 | 1 | 10 | 0 | 0 | 4.5 | 0 | 0 | 0 | 0 | 0 | 0 | 0 | 10% | 1% | 5% | 0% | 0% |
| M230 | 0 | 2 | 10 | 1.25 | 1 | 2 | 0 | 1 | 0 | 5 | 0 | 0 | 0 | 10% | 1% | 14% | 0% | 0% |
| M231 | 0 | 1 | 11 | 0 | 0 | 0 | 0 | 0 | 0 | 0 | 0 | 0 | 4.5 | 11% | 1% | 6% | 0% | 0% |
| M232 | 0 | 1.8 | 10.8 | 1.25 | 1 | 0 | 0 | 0 | 0 | 5 | 0 | 0 | 0 | 10% | 1% | 12% | 0% | 0% |
| M233 | 0 | 1 | 12 | 0 | 0 | 5 | 0 | 0 | 0 | 0 | 0 | 0 | 0 | 12% | 1% | 6% | 3% | 0% |
| M234 | 0 | 1.6 | 12 | 1.25 | 1 | 0 | 0 | 1 | 0 | 4.5 | 0 | 0 | 0 | 12% | 1% | 11% | 0% | 0% |
| M235 | 0 | 1.5 | 9 | 1.25 | 1 | 0 | 0 | 1 | 0 | 3.5 | 0 | 0 | 0 | 8% | 1% | 9% | 0% | 0% |
| M236 | 0 | 1.8 | 9 | 1.25 | 1 | 0 | 0 | 1 | 0 | 4.5 | 0 | 0 | 0 | 8% | 1% | 12% | 0% | 0% |
| M237 | 0 | 2.5 | 11 | 1.25 | 1 | 2 | 0 | 1 | 0 | 7 | 0 | 0 | 0 | 11% | 1% | 19% | 0% | 0% |
| M238 | 0 | 1.8 | 11 | 1.25 | 1 | 0 | 0 | 0 | 0 | 5 | 0 | 0 | 0 | 11% | 1% | 12% | 0% | 0% |
| M239 | 0 | 1.8 | 11 | 1.25 | 1 | 0 | 0 | 1 | 0 | 5 | 0 | 0 | 0 | 10% | 1% | 13% | 0% | 0% |
| M240 | 0 | 1.25 | 11 | 0 | 0 | 0 | 0 | 0 | 0 | 3 | 0 | 0 | 0 | 10% | 1% | 8% | 0% | 0% |
| M241 | 0 | 1.7 | 13 | 1.25 | 1 | 0 | 0 | 1 | 0 | 5 | 0 | 0 | 0 | 13% | 1% | 12% | 9% | 0% |
| M242 | 0 | 1.7 | 12.4 | 1.25 | 1 | 0 | 0 | 0 | 0 | 5 | 0 | 0 | 0 | 12% | 1% | 12% | 28% | 0% |
| M243 | 0 | 1.9 | 10 | 10 | 1 | 0 | 0 | 0 | 0 | 5 | 0 | 0 | 0 | 9% | 1% | 12% | 0% | 0% |
| M244 | 0 | 1.2 | 12 | 1.25 | 1 | 0 | 0 | 1 | 0 | 3 | 0 | 0 | 0 | 12% | 1% | 8% | 0% | 0% |
| M245 | 0 | 1.3 | 13 | 1.25 | 1 | 0 | 0 | 1 | 0 | 3.5 | 0 | 0 | 0 | 13% | 1% | 9% | 13% | 0% |
| M246 | 0 | 1.75 | 12 | 0 | 0 | 0 | 0 | 0 | 0 | 5 | 0 | 0 | 0 | 11% | 1% | 12% | 5% | 0% |
| M247 | 0 | 1.3 | 10 | 1.25 | 1 | 0 | 0 | 1 | 0 | 3 | 0 | 0 | 0 | 9% | 1% | 8% | 0% | 0% |
| M248 | 0 | 1.9 | 10 | 8.5 | 1 | 0 | 0 | 0 | 0 | 5 | 0 | 0 | 0 | 9% | 1% | 12% | 0% | 0% |
| M249 | 0 | 1.8 | 11.2 | 1.25 | 1 | 0 | 0 | 0 | 0 | 5 | 0 | 0 | 0 | 11% | 1% | 12% | 0% | 0% |
| M250 | 0 | 3 | 12 | 1.25 | 1 | 2 | 0 | 1 | 0 | 9 | 0 | 0 | 0 | 12% | 1% | 23% | 0% | 0% |
| M251 | 0 | 1.9 | 10 | 7 | 1 | 0 | 0 | 0 | 0 | 5 | 0 | 0 | 0 | 9% | 1% | 12% | 0% | 0% |
| M252 | 0 | 1 | 12 | 0 | 0 | 0 | 0 | 0 | 0 | 0 | 0 | 0 | 4.5 | 12% | 1% | 6% | 38% | 0% |
| M253 | 0 | 1.6 | 10 | 1.25 | 1 | 0 | 0 | 1 | 0 | 4 | 0 | 0 | 0 | 9% | 1% | 10% | 0% | 0% |
| M254 | 0 | 1.7 | 12.6 | 1.25 | 1 | 0 | 0 | 0 | 0 | 5 | 0 | 0 | 0 | 12% | 1% | 12% | 34% | 0% |
| M255 | 0 | 1.8 | 11.4 | 1.25 | 1 | 0 | 0 | 0 | 0 | 5 | 0 | 0 | 0 | 11% | 1% | 12% | 0% | 0% |
| M256 | 0 | 1 | 13 | 0 | 0 | 5 | 0 | 0 | 0 | 0 | 0 | 0 | 0 | 13% | 1% | 6% | 10% | 0% |
| M257 | 0 | 1.9 | 10 | 5.5 | 1 | 0 | 0 | 0 | 0 | 5 | 0 | 0 | 0 | 9% | 1% | 12% | 0% | 0% |
| M258 | 0 | 1.4 | 11 | 1.25 | 1 | 0 | 0 | 1 | 0 | 3.5 | 0 | 0 | 0 | 10% | 1% | 9% | 0% | 0% |
| M259 | 0 | 1.75 | 10 | 0 | 0 | 0 | 0 | 0 | 0 | 4.5 | 0 | 0 | 0 | 9% | 1% | 11% | 0% | 0% |
| M260 | 0 | 1.5 | 12 | 0 | 0 | 0 | 0 | 0 | 0 | 4 | 0 | 0 | 0 | 11% | 1% | 10% | 9% | 0% |
| M261 | 0 | 1.9 | 10 | 4 | 1 | 0 | 0 | 0 | 0 | 5 | 0 | 0 | 0 | 9% | 1% | 13% | 0% | 0% |
| M262 | 0 | 1.5 | 15 | 0 | 0 | 0 | 0 | 0 | 0 | 4.5 | 0 | 0 | 0 | 15% | 1% | 11% | 22% | 0% |
| M263 | 0 | 1 | 11 | 0 | 0 | 4.5 | 0 | 0 | 0 | 0 | 0 | 0 | 0 | 11% | 1% | 5% | 5% | 0% |
| M264 | 0 | 1.9 | 10 | 1.25 | 1 | 0 | 0 | 1 | 0 | 5 | 0 | 0 | 0 | 9% | 1% | 13% | 0% | 0% |
| M265 | 0 | 1.9 | 10 | 2.5 | 1 | 0 | 0 | 0 | 0 | 5 | 0 | 0 | 0 | 9% | 1% | 13% | 0% | 0% |
| M266 | 0 | 1.8 | 11.6 | 1.25 | 1 | 0 | 0 | 0 | 0 | 5 | 0 | 0 | 0 | 11% | 1% | 12% | 0% | 0% |
| M267 | 0 | 1.5 | 12 | 1.25 | 1 | 0 | 0 | 1 | 0 | 4 | 0 | 0 | 0 | 11% | 1% | 10% | 0% | 0% |
| M268 | 0 | 1.9 | 10 | 1.25 | 1 | 0 | 0 | 0 | 0 | 5 | 0 | 0 | 0 | 9% | 1% | 13% | 0% | 0% |
| M269 | 0 | 1.9 | 10 | 1 | 1 | 0 | 0 | 0 | 0 | 5 | 0 | 0 | 0 | 9% | 1% | 13% | 0% | 0% |
| M270 | 0 | 1.25 | 15 | 0 | 0 | 0 | 0 | 0 | 0 | 3.5 | 0 | 0 | 0 | 15% | 1% | 8% | 28% | 0% |
| M271 | 0 | 1.7 | 12.8 | 1.25 | 1 | 0 | 0 | 0 | 0 | 5 | 0 | 0 | 0 | 12% | 1% | 12% | 34% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M272 | 0 | 1.6 | 13 | 1.25 | 1 | 0 | 0 | 1 | 0 | 4.5 | 0 | 0 | 0 | 13% | 1% | 11% | 5% | 0% |
| M273 | 0 | 1.4 | 9 | 1.25 | 1 | 0 | 0 | 1 | 0 | 3 | 0 | 0 | 0 | 8% | 1% | 8% | 0% | 0% |
| M274 | 0 | 1.7 | 9 | 1.25 | 1 | 0 | 0 | 1 | 0 | 4 | 0 | 0 | 0 | 8% | 1% | 11% | 0% | 0% |
| M275 | 0 | 1.7 | 11 | 1.25 | 1 | 0 | 0 | 1 | 0 | 4.5 | 0 | 0 | 0 | 10% | 1% | 11% | 0% | 0% |
| M276 | 0 | 1.8 | 11.8 | 1.25 | 1 | 0 | 0 | 0 | 0 | 5 | 0 | 0 | 0 | 11% | 1% | 12% | 0% | 0% |
| M277 | 0 | 2 | 11 | 1.25 | 1 | 2 | 0 | 1 | 0 | 5 | 0 | 0 | 0 | 11% | 1% | 14% | 0% | 0% |
| M278 | 0 | 1.2 | 13 | 1.25 | 1 | 0 | 0 | 1 | 0 | 3 | 0 | 0 | 0 | 12% | 1% | 7% | 9% | 0% |
| M279 | 0 | 1 | 14 | 0 | 0 | 5 | 0 | 0 | 0 | 0 | 0 | 0 | 0 | 14% | 1% | 6% | 28% | 0% |
| M280 | 0 | 1.8 | 12 | 2.5 | 1 | 0 | 0 | 0 | 0 | 5 | 0 | 0 | 0 | 11% | 1% | 12% | 3% | 0% |
| M281 | 0 | 1.25 | 12 | 0 | 0 | 0 | 0 | 0 | 0 | 3 | 0 | 0 | 0 | 11% | 1% | 7% | 12% | 0% |
| M282 | 0 | 1.9 | 10.2 | 1.25 | 1 | 0 | 0 | 0 | 0 | 5 | 0 | 0 | 0 | 9% | 1% | 13% | 0% | 0% |
| M283 | 0 | 1.8 | 12 | 1.25 | 1 | 0 | 0 | 0 | 0 | 5 | 0 | 0 | 0 | 11% | 1% | 12% | 0% | 0% |
| M284 | 0 | 1.75 | 13 | 0 | 0 | 0 | 0 | 0 | 0 | 5 | 0 | 0 | 0 | 12% | 1% | 12% | 7% | 0% |
| M285 | 0 | 1.8 | 12 | 1 | 1 | 0 | 0 | 0 | 0 | 5 | 0 | 0 | 0 | 11% | 1% | 12% | 0% | 0% |
| M286 | 0 | 2.5 | 12 | 1.25 | 1 | 2 | 0 | 1 | 0 | 7 | 0 | 0 | 0 | 12% | 1% | 18% | 0% | 0% |
| M287 | 0 | 1.7 | 13 | 1.25 | 1 | 0 | 0 | 0 | 0 | 5 | 0 | 0 | 0 | 13% | 2% | 12% | 33% | 0% |
| M288 | 0 | 1.5 | 10 | 0 | 0 | 0 | 0 | 0 | 0 | 3.5 | 0 | 0 | 0 | 9% | 2% | 9% | 0% | 0% |
| M289 | 0 | 1.8 | 12 | 1.25 | 1 | 0 | 0 | 1 | 0 | 5 | 0 | 0 | 0 | 11% | 2% | 12% | 0% | 0% |
| M290 | 0 | 1.9 | 10.4 | 1.25 | 1 | 0 | 0 | 0 | 0 | 5 | 0 | 0 | 0 | 9% | 2% | 13% | 0% | 0% |
| M291 | 0 | 1.8 | 12.2 | 1.25 | 1 | 0 | 0 | 0 | 0 | 5 | 0 | 0 | 0 | 12% | 2% | 12% | 0% | 0% |
| M292 | 0 | 1.5 | 10 | 1.25 | 1 | 0 | 0 | 1 | 0 | 3.5 | 0 | 0 | 0 | 9% | 2% | 9% | 0% | 0% |
| M293 | 0 | 1.3 | 11 | 1.25 | 1 | 0 | 0 | 1 | 0 | 3 | 0 | 0 | 0 | 10% | 2% | 8% | 0% | 0% |
| M294 | 0 | 1 | 9 | 0 | 0 | 0 | 0 | 0 | 0 | 0 | 4 | 0 | 0 | 9% | 2% | 6% | 6% | 0% |
| M295 | 0 | 1 | 12 | 0 | 0 | 4.5 | 0 | 0 | 0 | 0 | 0 | 0 | 0 | 12% | 2% | 5% | 0% | 0% |
| M296 | 0 | 1.5 | 13 | 0 | 0 | 0 | 0 | 0 | 0 | 4 | 0 | 0 | 0 | 12% | 2% | 10% | 12% | 0% |
| M297 | 0 | 3 | 13 | 1.25 | 1 | 2 | 0 | 1 | 0 | 9 | 0 | 0 | 0 | 13% | 2% | 23% | 7% | 0% |
| M298 | 0 | 1.8 | 12.4 | 1.25 | 1 | 0 | 0 | 0 | 0 | 5 | 0 | 0 | 0 | 12% | 2% | 12% | 5% | 0% |
| M299 | 0 | 1.8 | 10 | 1.25 | 1 | 0 | 0 | 1 | 0 | 4.5 | 0 | 0 | 0 | 9% | 2% | 12% | 0% | 0% |
| M300 | 0 | 1.4 | 12 | 1.25 | 1 | 0 | 0 | 1 | 0 | 3.5 | 0 | 0 | 0 | 11% | 2% | 9% | 0% | 0% |
| M301 | 0 | 1.7 | 13.2 | 1.25 | 1 | 0 | 0 | 0 | 0 | 5 | 0 | 0 | 0 | 13% | 2% | 12% | 33% | 0% |
| M302 | 0 | 1.9 | 10.6 | 1.25 | 1 | 0 | 0 | 0 | 0 | 5 | 0 | 0 | 0 | 10% | 2% | 13% | 0% | 0% |
| M303 | 0 | 1.5 | 13 | 1.25 | 1 | 0 | 0 | 1 | 0 | 4 | 0 | 0 | 0 | 12% | 2% | 10% | 1% | 0% |
| M304 | 0 | 1.6 | 11 | 1.25 | 1 | 0 | 0 | 1 | 0 | 4 | 0 | 0 | 0 | 10% | 2% | 10% | 0% | 0% |
| M305 | 0 | 1.9 | 10.8 | 1.25 | 1 | 0 | 0 | 0 | 0 | 5 | 0 | 0 | 0 | 10% | 2% | 13% | 0% | 0% |
| M306 | 0 | 1.25 | 13 | 0 | 0 | 0 | 0 | 0 | 0 | 3 | 0 | 0 | 0 | 12% | 2% | 7% | 17% | 0% |
| M307 | 0 | 1.75 | 11 | 0 | 0 | 0 | 0 | 0 | 0 | 4.5 | 0 | 0 | 0 | 10% | 2% | 11% | 0% | 0% |
| M308 | 0 | 1.7 | 13.4 | 1.25 | 1 | 0 | 0 | 0 | 0 | 5 | 0 | 0 | 0 | 13% | 2% | 12% | 33% | 0% |
| M309 | 0 | 1.8 | 12 | 4 | 1 | 0 | 0 | 0 | 0 | 5 | 0 | 0 | 0 | 11% | 2% | 12% | 3% | 0% |
| M310 | 0 | 1.75 | 14 | 0 | 0 | 0 | 0 | 0 | 0 | 5 | 0 | 0 | 0 | 13% | 2% | 12% | 4% | 0% |
| M311 | 0 | 2 | 12 | 1.25 | 1 | 2 | 0 | 1 | 0 | 5 | 0 | 0 | 0 | 12% | 2% | 14% | 0% | 0% |
| M312 | 0 | 1 | 13 | 0 | 0 | 4.5 | 0 | 0 | 0 | 0 | 0 | 0 | 0 | 13% | 2% | 5% | 0% | 0% |
| M313 | 0 | 1.7 | 12 | 1.25 | 1 | 0 | 0 | 1 | 0 | 4.5 | 0 | 0 | 0 | 11% | 2% | 11% | 0% | 0% |
| M314 | 0 | 1.8 | 12 | 5.5 | 1 | 0 | 0 | 0 | 0 | 5 | 0 | 0 | 0 | 11% | 2% | 12% | 0% | 0% |
| M315 | 0 | 1.9 | 11 | 1.25 | 1 | 0 | 0 | 1 | 0 | 5 | 0 | 0 | 0 | 10% | 2% | 13% | 0% | 0% |
| M316 | 0 | 1.9 | 11 | 1.25 | 1 | 0 | 0 | 0 | 0 | 5 | 0 | 0 | 0 | 10% | 2% | 12% | 0% | 0% |
| M317 | 0 | 2 | 10 | 10 | 1 | 0 | 0 | 0 | 0 | 5 | 0 | 0 | 0 | 9% | 2% | 12% | 0% | 0% |
| M318 | 0 | 1.8 | 12 | 7 | 1 | 0 | 0 | 0 | 0 | 5 | 0 | 0 | 0 | 11% | 2% | 12% | 0% | 0% |
| M319 | 0 | 2.5 | 13 | 1.25 | 1 | 2 | 0 | 1 | 0 | 7 | 0 | 0 | 0 | 13% | 2% | 18% | 6% | 0% |
| M320 | 0 | 1.7 | 14 | 1.25 | 1 | 0 | 0 | 1 | 0 | 5 | 0 | 0 | 0 | 13% | 2% | 12% | 35% | 0% |
| M321 | 0 | 1.7 | 13.6 | 1.25 | 1 | 0 | 0 | 0 | 0 | 5 | 0 | 0 | 0 | 13% | 2% | 12% | 32% | 0% |
| M322 | 0 | 1.3 | 14 | 1.25 | 1 | 0 | 0 | 1 | 0 | 3.5 | 0 | 0 | 0 | 13% | 2% | 9% | 40% | 0% |
| M323 | 0 | 1.8 | 12 | 8.5 | 1 | 0 | 0 | 0 | 0 | 5 | 0 | 0 | 0 | 11% | 2% | 12% | 4% | 0% |
| M324 | 0 | 1.8 | 13 | 1.25 | 1 | 0 | 0 | 1 | 0 | 5 | 0 | 0 | 0 | 12% | 2% | 12% | 0% | 0% |
| M325 | 0 | 1.5 | 14 | 0 | 0 | 0 | 0 | 0 | 0 | 4 | 0 | 0 | 0 | 13% | 2% | 10% | 9% | 0% |
| M326 | 0 | 2 | 10 | 8.5 | 1 | 0 | 0 | 0 | 0 | 5 | 0 | 0 | 0 | 9% | 2% | 12% | 0% | 0% |
| M327 | 0 | 1.4 | 10 | 1.25 | 1 | 0 | 0 | 1 | 0 | 3 | 0 | 0 | 0 | 9% | 2% | 8% | 0% | 0% |
| M328 | 0 | 1.25 | 9 | 0 | 0 | 0 | 0 | 0 | 0 | 0 | 0 | 0 | 5 | 9% | 2% | 6% | 0% | 0% |
| M329 | 0 | 1.25 | 9 | 0 | 0 | 0 | 0 | 0 | 0 | 0 | 5 | 0 | 0 | 8% | 2% | 8% | 0% | 0% |
| M330 | 0 | 1.8 | 12.6 | 1.25 | 1 | 0 | 0 | 0 | 0 | 5 | 0 | 0 | 0 | 12% | 2% | 12% | 12% | 0% |
| M331 | 0 | 1.9 | 11.2 | 1.25 | 1 | 0 | 0 | 0 | 0 | 5 | 0 | 0 | 0 | 10% | 2% | 12% | 0% | 0% |
| M332 | 0 | 1.8 | 12 | 10 | 1 | 0 | 0 | 0 | 0 | 5 | 0 | 0 | 0 | 11% | 2% | 12% | 0% | 0% |
| M333 | 0 | 2 | 10 | 7 | 1 | 0 | 0 | 0 | 0 | 5 | 0 | 0 | 0 | 9% | 2% | 12% | 0% | 0% |
| M334 | 0 | 1.3 | 12 | 1.25 | 1 | 0 | 0 | 1 | 0 | 3 | 0 | 0 | 0 | 11% | 2% | 8% | 0% | 0% |
| M335 | 0 | 1.7 | 10 | 1.25 | 1 | 0 | 0 | 1 | 0 | 4 | 0 | 0 | 0 | 9% | 2% | 10% | 0% | 0% |
| M336 | 0 | 1.4 | 13 | 1.25 | 1 | 0 | 0 | 1 | 0 | 3.5 | 0 | 0 | 0 | 12% | 2% | 9% | 0% | 0% |
| M337 | 0 | 2 | 10 | 5.5 | 1 | 0 | 0 | 0 | 0 | 5 | 0 | 0 | 0 | 9% | 2% | 13% | 0% | 0% |
| M338 | 0 | 1.5 | 11 | 0 | 0 | 0 | 0 | 0 | 0 | 3.5 | 0 | 0 | 0 | 10% | 2% | 9% | 0% | 0% |
| M339 | 0 | 3 | 10 | 1.25 | 1 | 2 | 0 | 1 | 0 | 8 | 0 | 0 | 0 | 9% | 2% | 21% | 0% | 0% |
| M340 | 0 | 2 | 10 | 1.25 | 1 | 0 | 0 | 1 | 0 | 5 | 0 | 0 | 0 | 9% | 2% | 13% | 0% | 0% |
| M341 | 0 | 2 | 10 | 4 | 1 | 0 | 0 | 0 | 0 | 5 | 0 | 0 | 0 | 9% | 2% | 13% | 0% | 0% |
| M342 | 0 | 1.7 | 13.8 | 1.25 | 1 | 0 | 0 | 0 | 0 | 5 | 0 | 0 | 0 | 13% | 2% | 12% | 32% | 0% |
| M343 | 0 | 2 | 10 | 0 | 0 | 0 | 0 | 0 | 0 | 5 | 0 | 0 | 0 | 9% | 2% | 13% | 0% | 0% |
| M344 | 0 | 1 | 14 | 0 | 0 | 4.5 | 0 | 0 | 0 | 0 | 0 | 0 | 0 | 14% | 2% | 5% | 15% | 0% |
| M345 | 0 | 1.9 | 11.4 | 1.25 | 1 | 0 | 0 | 0 | 0 | 5 | 0 | 0 | 0 | 10% | 2% | 12% | 0% | 0% |
| M346 | 0 | 1.25 | 14 | 0 | 0 | 0 | 0 | 0 | 0 | 3 | 0 | 0 | 0 | 13% | 2% | 7% | 14% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M347 | 0 | 2 | 10 | 2.5 | 1 | 0 | 0 | 0 | 0 | 5 | 0 | 0 | 0 | 9% | 2% | 13% | 0% | 0% |
| M348 | 0 | 1.5 | 11 | 1.25 | 1 | 0 | 0 | 1 | 0 | 3.5 | 0 | 0 | 0 | 10% | 2% | 9% | 0% | 0% |
| M349 | 0 | 2 | 10 | 1.25 | 1 | 0 | 0 | 0 | 0 | 5 | 0 | 0 | 0 | 9% | 2% | 13% | 0% | 0% |
| M350 | 0 | 2 | 10 | 1 | 1 | 0 | 0 | 0 | 0 | 5 | 0 | 0 | 0 | 9% | 2% | 13% | 0% | 0% |
| M351 | 0 | 1.75 | 15 | 0 | 0 | 0 | 0 | 0 | 0 | 5 | 0 | 0 | 0 | 14% | 2% | 12% | 2% | 0% |
| M352 | 0 | 1.9 | 11.6 | 1.25 | 1 | 0 | 0 | 0 | 0 | 5 | 0 | 0 | 0 | 10% | 2% | 12% | 0% | 0% |
| M353 | 0 | 1.7 | 14 | 1 | 1 | 0 | 0 | 0 | 0 | 5 | 0 | 0 | 0 | 13% | 2% | 12% | 33% | 0% |
| M354 | 0 | 3.5 | 11 | 1.25 | 1 | 2 | 0 | 1 | 0 | 10 | 0 | 0 | 0 | 10% | 2% | 25% | 0% | 0% |
| M355 | 0 | 1.6 | 12 | 1.25 | 1 | 0 | 0 | 1 | 0 | 4 | 0 | 0 | 0 | 11% | 2% | 10% | 0% | 0% |
| M356 | 0 | 1.7 | 14 | 1.25 | 1 | 0 | 0 | 0 | 0 | 5 | 0 | 0 | 0 | 13% | 2% | 12% | 33% | 0% |
| M357 | 0 | 1.8 | 11 | 1.25 | 1 | 0 | 0 | 1 | 0 | 4.5 | 0 | 0 | 0 | 10% | 2% | 11% | 0% | 0% |
| M358 | 0 | 2 | 13 | 1.25 | 1 | 2 | 0 | 1 | 0 | 5 | 0 | 0 | 0 | 13% | 2% | 14% | 6% | 0% |
| M359 | 0 | 1.25 | 9 | 0 | 0 | 5 | 0 | 0 | 0 | 0 | 0 | 0 | 0 | 8% | 2% | 6% | 0% | 0% |
| M360 | 0 | 1.9 | 12 | 5.5 | 1 | 0 | 0 | 0 | 0 | 5 | 0 | 0 | 0 | 11% | 2% | 12% | 0% | 0% |
| M361 | 0 | 1.5 | 15 | 0 | 0 | 0 | 0 | 0 | 0 | 4 | 0 | 0 | 0 | 14% | 2% | 10% | 6% | 0% |
| M362 | 0 | 2 | 10.2 | 1.25 | 1 | 0 | 0 | 0 | 0 | 5 | 0 | 0 | 0 | 9% | 2% | 13% | 0% | 0% |
| M363 | 0 | 1.7 | 14 | 4 | 1 | 0 | 0 | 0 | 0 | 5 | 0 | 0 | 0 | 13% | 2% | 12% | 38% | 0% |
| M364 | 0 | 1.9 | 11.8 | 1.25 | 1 | 0 | 0 | 0 | 0 | 5 | 0 | 0 | 0 | 11% | 2% | 12% | 0% | 0% |
| M365 | 0 | 1 | 15 | 0 | 0 | 4.5 | 0 | 0 | 0 | 0 | 0 | 0 | 0 | 15% | 2% | 5% | 37% | 0% |
| M366 | 0 | 1.75 | 12 | 0 | 0 | 0 | 0 | 0 | 0 | 4.5 | 0 | 0 | 0 | 11% | 2% | 11% | 0% | 0% |
| M367 | 0 | 1.7 | 13 | 1.25 | 1 | 0 | 0 | 1 | 0 | 4.5 | 0 | 0 | 0 | 12% | 2% | 11% | 0% | 0% |
| M368 | 0 | 1.9 | 12 | 4 | 1 | 0 | 0 | 0 | 0 | 5 | 0 | 0 | 0 | 11% | 2% | 12% | 0% | 0% |
| M369 | 0 | 1.6 | 14 | 1.25 | 1 | 0 | 0 | 1 | 0 | 4.5 | 0 | 0 | 0 | 13% | 3% | 11% | 31% | 0% |
| M370 | 0 | 1.7 | 14 | 5.5 | 1 | 0 | 0 | 0 | 0 | 5 | 0 | 0 | 0 | 13% | 3% | 12% | 31% | 0% |
| M371 | 0 | 1.9 | 12 | 2.5 | 1 | 0 | 0 | 0 | 0 | 5 | 0 | 0 | 0 | 11% | 3% | 12% | 0% | 0% |
| M372 | 0 | 1.8 | 14 | 1.25 | 1 | 0 | 0 | 1 | 0 | 5 | 0 | 0 | 0 | 13% | 3% | 12% | 19% | 0% |
| M373 | 0 | 1.5 | 14 | 1.25 | 1 | 0 | 0 | 1 | 0 | 4 | 0 | 0 | 0 | 13% | 3% | 10% | 27% | 0% |
| M374 | 0 | 1.7 | 14.2 | 1.25 | 1 | 0 | 0 | 0 | 0 | 5 | 0 | 0 | 0 | 14% | 3% | 12% | 38% | 0% |
| M375 | 0 | 1.25 | 15 | 0 | 0 | 0 | 0 | 0 | 0 | 3 | 0 | 0 | 0 | 14% | 3% | 7% | 11% | 0% |
| M376 | 0 | 1.2 | 14 | 1.25 | 1 | 0 | 0 | 1 | 0 | 3 | 0 | 0 | 0 | 13% | 3% | 7% | 36% | 0% |
| M377 | 0 | 1.7 | 14 | 8.5 | 1 | 0 | 0 | 0 | 0 | 5 | 0 | 0 | 0 | 13% | 3% | 12% | 36% | 0% |
| M378 | 0 | 1.9 | 12 | 1.25 | 1 | 0 | 0 | 0 | 0 | 5 | 0 | 0 | 0 | 11% | 3% | 12% | 0% | 0% |
| M379 | 0 | 2 | 10.4 | 1.25 | 1 | 0 | 0 | 0 | 0 | 5 | 0 | 0 | 0 | 9% | 3% | 13% | 0% | 0% |
| M380 | 0 | 1.4 | 14 | 1.25 | 1 | 0 | 0 | 1 | 0 | 3.5 | 0 | 0 | 0 | 13% | 3% | 9% | 23% | 0% |
| M381 | 0 | 1.9 | 12 | 1 | 1 | 0 | 0 | 0 | 0 | 5 | 0 | 0 | 0 | 11% | 3% | 12% | 0% | 0% |
| M382 | 0 | 1.9 | 12 | 1.25 | 1 | 0 | 0 | 1 | 0 | 5 | 0 | 0 | 0 | 11% | 3% | 12% | 0% | 0% |
| M383 | 0 | 1.75 | 10 | 0 | 0 | 0 | 0 | 0 | 0 | 4 | 0 | 0 | 0 | 8% | 3% | 10% | 0% | 0% |
| M384 | 0 | 1.7 | 14 | 10 | 1 | 0 | 0 | 0 | 0 | 5 | 0 | 0 | 0 | 13% | 3% | 12% | 31% | 0% |
| M385 | 0 | 1.3 | 13 | 1.25 | 1 | 0 | 0 | 1 | 0 | 3 | 0 | 0 | 0 | 12% | 3% | 8% | 0% | 0% |
| M386 | 0 | 1.6 | 10 | 1.25 | 1 | 0 | 0 | 1 | 0 | 3.5 | 0 | 0 | 0 | 9% | 3% | 9% | 0% | 0% |
| M387 | 0 | 1.8 | 12.8 | 1.25 | 1 | 0 | 0 | 0 | 0 | 5 | 0 | 0 | 0 | 12% | 3% | 12% | 18% | 0% |
| M388 | 0 | 1.25 | 10 | 0 | 0 | 0 | 0 | 0 | 0 | 0 | 0 | 0 | 5 | 9% | 3% | 6% | 0% | 0% |
| M389 | 0 | 1.9 | 10 | 1.25 | 1 | 0 | 0 | 1 | 0 | 4.5 | 0 | 0 | 0 | 9% | 3% | 12% | 0% | 0% |
| M390 | 0 | 1.9 | 12.2 | 1.25 | 1 | 0 | 0 | 0 | 0 | 5 | 0 | 0 | 0 | 11% | 3% | 12% | 0% | 0% |
| M391 | 0 | 1.4 | 11 | 1.25 | 1 | 0 | 0 | 1 | 0 | 3 | 0 | 0 | 0 | 10% | 3% | 8% | 0% | 0% |
| M392 | 0 | 2 | 10.6 | 1.25 | 1 | 0 | 0 | 0 | 0 | 5 | 0 | 0 | 0 | 9% | 3% | 13% | 0% | 0% |
| M393 | 0 | 1.5 | 12 | 0 | 0 | 0 | 0 | 0 | 0 | 3.5 | 0 | 0 | 0 | 11% | 3% | 9% | 0% | 0% |
| M394 | 0 | 1 | 10 | 0 | 0 | 0 | 0 | 0 | 0 | 0 | 4 | 0 | 0 | 9% | 3% | 5% | 4% | 0% |
| M395 | 0 | 1.9 | 12.4 | 1.25 | 1 | 0 | 0 | 0 | 0 | 5 | 0 | 0 | 0 | 11% | 3% | 12% | 0% | 0% |
| M396 | 0 | 1.25 | 9 | 0 | 0 | 0 | 0 | 0 | 0 | 0 | 0 | 0 | 4.5 | 8% | 3% | 6% | 0% | 0% |
| M397 | 0 | 1.5 | 12 | 1.25 | 1 | 0 | 0 | 1 | 0 | 3.5 | 0 | 0 | 0 | 11% | 3% | 9% | 0% | 0% |
| M398 | 0 | 1.8 | 13 | 1.25 | 1 | 0 | 0 | 0 | 0 | 5 | 0 | 0 | 0 | 12% | 3% | 12% | 22% | 0% |
| M399 | 0 | 1.7 | 11 | 1.25 | 1 | 0 | 0 | 1 | 0 | 4 | 0 | 0 | 0 | 10% | 3% | 10% | 0% | 0% |
| M400 | 0 | 2 | 10.8 | 1.25 | 1 | 0 | 0 | 0 | 0 | 5 | 0 | 0 | 0 | 9% | 3% | 13% | 0% | 0% |
| M401 | 0 | 1.6 | 13 | 1.25 | 1 | 0 | 0 | 1 | 0 | 4 | 0 | 0 | 0 | 12% | 3% | 10% | 0% | 0% |
| M402 | 0 | 1.9 | 12.6 | 1.25 | 1 | 0 | 0 | 0 | 0 | 5 | 0 | 0 | 0 | 11% | 3% | 12% | 0% | 0% |
| M403 | 0 | 2.5 | 10 | 1.25 | 1 | 2 | 0 | 1 | 0 | 6 | 0 | 0 | 0 | 9% | 3% | 17% | 0% | 0% |
| M404 | 0 | 1.7 | 14 | 1.25 | 1 | 0 | 0 | 1 | 0 | 4.5 | 0 | 0 | 0 | 13% | 3% | 11% | 15% | 0% |
| M405 | 0 | 2 | 11 | 1.25 | 1 | 0 | 0 | 1 | 0 | 5 | 0 | 0 | 0 | 9% | 3% | 13% | 0% | 0% |
| M406 | 0 | 2 | 11 | 0 | 0 | 0 | 0 | 0 | 0 | 5 | 0 | 0 | 0 | 9% | 3% | 12% | 0% | 0% |
| M407 | 0 | 1.75 | 13 | 0 | 0 | 0 | 0 | 0 | 0 | 4.5 | 0 | 0 | 0 | 12% | 3% | 11% | 0% | 0% |
| M408 | 0 | 1.5 | 10 | 0 | 0 | 0 | 0 | 0 | 0 | 3 | 0 | 0 | 0 | 8% | 3% | 8% | 0% | 0% |
| M409 | 0 | 1.9 | 12.8 | 1.25 | 1 | 0 | 0 | 0 | 0 | 5 | 0 | 0 | 0 | 11% | 3% | 12% | 0% | 0% |
| M410 | 0 | 3 | 11 | 1.25 | 1 | 2 | 0 | 1 | 0 | 8 | 0 | 0 | 0 | 10% | 3% | 21% | 0% | 0% |
| M411 | 0 | 2 | 11 | 1.25 | 1 | 0 | 0 | 0 | 0 | 5 | 0 | 0 | 0 | 9% | 3% | 13% | 0% | 0% |
| M412 | 0 | 1.3 | 14 | 1.25 | 1 | 0 | 0 | 1 | 0 | 3 | 0 | 0 | 0 | 13% | 3% | 7% | 19% | 0% |
| M413 | 0 | 1.25 | 10 | 0 | 0 | 5 | 0 | 0 | 0 | 0 | 0 | 0 | 0 | 9% | 3% | 6% | 0% | 0% |
| M414 | 0 | 1.8 | 12 | 1.25 | 1 | 0 | 0 | 1 | 0 | 4.5 | 0 | 0 | 0 | 11% | 3% | 11% | 0% | 0% |
| M415 | 0 | 1.8 | 13.2 | 1.25 | 1 | 0 | 0 | 0 | 0 | 5 | 0 | 0 | 0 | 12% | 3% | 12% | 22% | 0% |
| M416 | 0 | 2.1 | 10 | 10 | 1 | 0 | 0 | 0 | 0 | 5 | 0 | 0 | 0 | 9% | 3% | 12% | 0% | 0% |
| M417 | 0 | 1.25 | 9 | 0 | 0 | 4.5 | 0 | 0 | 0 | 0 | 0 | 0 | 0 | 8% | 3% | 5% | 0% | 0% |
| M418 | 0 | 2.1 | 10 | 8.5 | 1 | 0 | 0 | 0 | 0 | 5 | 0 | 0 | 0 | 9% | 3% | 12% | 0% | 0% |
| M419 | 0 | 1.9 | 13 | 1.25 | 1 | 0 | 0 | 0 | 0 | 5 | 0 | 0 | 0 | 12% | 3% | 12% | 2% | 0% |
| M420 | 0 | 1.25 | 11 | 0 | 0 | 0 | 0 | 0 | 0 | 0 | 0 | 0 | 5 | 10% | 3% | 6% | 0% | 0% |
| M421 | 0 | 1.5 | 10 | 1.25 | 1 | 0 | 0 | 1 | 0 | 3 | 0 | 0 | 0 | 8% | 3% | 8% | 0% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M422 | 0 | 3 | 14 | 1.25 | 1 | 2 | 0 | 1 | 0 | 9 | 0 | 0 | 0 | 14% | 3% | 22% | 33% | 0% |
| M423 | 0 | 2.1 | 10 | 7 | 1 | 0 | 0 | 0 | 0 | 5 | 0 | 0 | 0 | 8% | 3% | 12% | 0% | 0% |
| M424 | 0 | 2 | 11.2 | 1.25 | 1 | 0 | 0 | 0 | 0 | 5 | 0 | 0 | 0 | 10% | 3% | 13% | 0% | 0% |
| M425 | 0 | 1.8 | 10 | 1.25 | 1 | 0 | 0 | 1 | 0 | 4 | 0 | 0 | 0 | 8% | 3% | 10% | 0% | 0% |
| M426 | 0 | 2.1 | 10 | 1.25 | 1 | 0 | 0 | 1 | 0 | 5 | 0 | 0 | 0 | 8% | 3% | 13% | 0% | 0% |
| M427 | 0 | 1.9 | 13 | 1.25 | 1 | 0 | 0 | 1 | 0 | 5 | 0 | 0 | 0 | 12% | 3% | 12% | 0% | 0% |
| M428 | 0 | 2.1 | 10 | 5.5 | 1 | 0 | 0 | 0 | 0 | 5 | 0 | 0 | 0 | 8% | 3% | 13% | 0% | 0% |
| M429 | 0 | 3.5 | 12 | 1.25 | 1 | 2 | 0 | 1 | 0 | 10 | 0 | 0 | 0 | 11% | 3% | 25% | 0% | 0% |
| M430 | 0 | 2.1 | 10 | 4 | 1 | 0 | 0 | 0 | 0 | 5 | 0 | 0 | 0 | 8% | 3% | 13% | 0% | 0% |
| M431 | 0 | 1.8 | 13.4 | 1.25 | 1 | 0 | 0 | 0 | 0 | 5 | 0 | 0 | 0 | 12% | 3% | 12% | 21% | 0% |
| M432 | 0 | 1.5 | 13 | 0 | 0 | 0 | 0 | 0 | 0 | 3.5 | 0 | 0 | 0 | 12% | 3% | 9% | 0% | 0% |
| M433 | 0 | 2.1 | 10 | 2.5 | 1 | 0 | 0 | 0 | 0 | 5 | 0 | 0 | 0 | 8% | 3% | 13% | 0% | 0% |
| M434 | 0 | 2.1 | 10 | 1.25 | 1 | 0 | 0 | 0 | 0 | 5 | 0 | 0 | 0 | 8% | 3% | 13% | 0% | 0% |
| M435 | 0 | 2.1 | 10 | 1 | 1 | 0 | 0 | 0 | 0 | 5 | 0 | 0 | 0 | 8% | 3% | 13% | 0% | 0% |
| M436 | 0 | 2 | 11.4 | 1.25 | 1 | 0 | 0 | 0 | 0 | 5 | 0 | 0 | 0 | 10% | 3% | 12% | 0% | 0% |
| M437 | 0 | 1.4 | 12 | 1.25 | 1 | 0 | 0 | 1 | 0 | 3 | 0 | 0 | 0 | 11% | 3% | 8% | 0% | 0% |
| M438 | 0 | 1.25 | 10 | 0 | 0 | 0 | 0 | 0 | 0 | 0 | 5 | 0 | 0 | 9% | 3% | 8% | 0% | 1% |
| M439 | 0 | 1.9 | 12 | 7 | 1 | 0 | 0 | 0 | 0 | 5 | 0 | 0 | 0 | 11% | 3% | 12% | 0% | 0% |
| M440 | 0 | 1.6 | 11 | 1.25 | 1 | 0 | 0 | 1 | 0 | 3.5 | 0 | 0 | 0 | 9% | 3% | 9% | 0% | 0% |
| M441 | 0 | 1.75 | 11 | 0 | 0 | 0 | 0 | 0 | 0 | 4 | 0 | 0 | 0 | 9% | 3% | 10% | 0% | 0% |
| M442 | 0 | 1.5 | 13 | 1.25 | 1 | 0 | 0 | 1 | 0 | 3.5 | 0 | 0 | 0 | 12% | 3% | 9% | 0% | 0% |
| M443 | 0 | 1.9 | 13.2 | 1.25 | 1 | 0 | 0 | 0 | 0 | 5 | 0 | 0 | 0 | 12% | 3% | 12% | 8% | 0% |
| M444 | 0 | 1.6 | 14 | 1.25 | 1 | 0 | 0 | 1 | 0 | 4 | 0 | 0 | 0 | 13% | 3% | 10% | 11% | 0% |
| M445 | 0 | 1.9 | 12 | 8.5 | 1 | 0 | 0 | 0 | 0 | 5 | 0 | 0 | 0 | 11% | 3% | 12% | 0% | 0% |
| M446 | 0 | 1.9 | 12 | 10 | 1 | 0 | 0 | 0 | 0 | 5 | 0 | 0 | 0 | 11% | 3% | 12% | 0% | 0% |
| M447 | 0 | 2.1 | 10.2 | 1.25 | 1 | 0 | 0 | 0 | 0 | 5 | 0 | 0 | 0 | 8% | 3% | 13% | 0% | 0% |
| M448 | 0 | 1.25 | 10 | 0 | 0 | 0 | 0 | 0 | 0 | 0 | 0 | 0 | 4.5 | 9% | 3% | 6% | 0% | 0% |
| M449 | 0 | 2 | 11.6 | 1.25 | 1 | 0 | 0 | 0 | 0 | 5 | 0 | 0 | 0 | 10% | 3% | 12% | 0% | 0% |
| M450 | 0 | 1.8 | 13.6 | 1.25 | 1 | 0 | 0 | 0 | 0 | 5 | 0 | 0 | 0 | 12% | 3% | 12% | 21% | 0% |
| M451 | 0 | 1.9 | 11 | 1.25 | 1 | 0 | 0 | 1 | 0 | 4.5 | 0 | 0 | 0 | 9% | 3% | 11% | 0% | 0% |
| M452 | 0 | 2 | 12 | 7 | 1 | 0 | 0 | 0 | 0 | 5 | 0 | 0 | 0 | 11% | 3% | 12% | 0% | 0% |
| M453 | 0 | 1.75 | 14 | 0 | 0 | 0 | 0 | 0 | 0 | 4.5 | 0 | 0 | 0 | 12% | 3% | 11% | 0% | 0% |
| M454 | 0 | 1.7 | 12 | 1.25 | 1 | 0 | 0 | 1 | 0 | 4 | 0 | 0 | 0 | 10% | 4% | 10% | 0% | 0% |
| M455 | 0 | 2 | 12 | 5.5 | 1 | 0 | 0 | 0 | 0 | 5 | 0 | 0 | 0 | 10% | 4% | 12% | 0% | 0% |
| M456 | 0 | 2.5 | 14 | 1.25 | 1 | 2 | 0 | 1 | 0 | 7 | 0 | 0 | 0 | 13% | 4% | 18% | 32% | 0% |
| M457 | 0 | 1.25 | 12 | 0 | 0 | 0 | 0 | 0 | 0 | 0 | 0 | 0 | 5 | 11% | 4% | 6% | 0% | 0% |
| M458 | 0 | 2 | 11.8 | 1.25 | 1 | 0 | 0 | 0 | 0 | 5 | 0 | 0 | 0 | 10% | 4% | 12% | 0% | 0% |
| M459 | 0 | 1.25 | 11 | 0 | 0 | 5 | 0 | 0 | 0 | 0 | 0 | 0 | 0 | 10% | 4% | 6% | 0% | 0% |
| M460 | 0 | 2 | 12 | 4 | 1 | 0 | 0 | 0 | 0 | 5 | 0 | 0 | 0 | 10% | 4% | 12% | 0% | 0% |
| M461 | 0 | 2.1 | 10.4 | 1.25 | 1 | 0 | 0 | 0 | 0 | 5 | 0 | 0 | 0 | 9% | 4% | 13% | 0% | 0% |
| M462 | 0 | 1.8 | 13 | 1.25 | 1 | 0 | 0 | 1 | 0 | 4.5 | 0 | 0 | 0 | 11% | 4% | 11% | 0% | 0% |
| M463 | 0 | 1.8 | 13.8 | 1.25 | 1 | 0 | 0 | 0 | 0 | 5 | 0 | 0 | 0 | 13% | 4% | 12% | 21% | 0% |
| M464 | 0 | 2 | 12 | 2.5 | 1 | 0 | 0 | 0 | 0 | 5 | 0 | 0 | 0 | 10% | 4% | 12% | 0% | 0% |
| M465 | 0 | 2 | 10 | 1.25 | 1 | 0 | 0 | 1 | 0 | 4.5 | 0 | 0 | 0 | 8% | 4% | 12% | 0% | 0% |
| M466 | 0 | 1.7 | 10 | 1.25 | 1 | 0 | 0 | 1 | 0 | 3.5 | 0 | 0 | 0 | 8% | 4% | 9% | 0% | 0% |
| M467 | 0 | 2 | 12 | 1.25 | 1 | 0 | 0 | 1 | 0 | 5 | 0 | 0 | 0 | 10% | 4% | 12% | 0% | 0% |
| M468 | 0 | 2 | 12 | 1.25 | 1 | 0 | 0 | 0 | 0 | 5 | 0 | 0 | 0 | 10% | 4% | 12% | 0% | 0% |
| M469 | 0 | 2 | 12 | 0 | 0 | 0 | 0 | 0 | 0 | 5 | 0 | 0 | 0 | 10% | 4% | 12% | 0% | 0% |
| M470 | 0 | 1.5 | 14 | 0 | 0 | 0 | 0 | 0 | 0 | 3.5 | 0 | 0 | 0 | 12% | 4% | 9% | 0% | 0% |
| M471 | 0 | 2 | 12 | 1 | 1 | 0 | 0 | 0 | 0 | 5 | 0 | 0 | 0 | 10% | 4% | 12% | 0% | 0% |
| M472 | 0 | 1.9 | 14 | 1.25 | 1 | 0 | 0 | 1 | 0 | 5 | 0 | 0 | 0 | 12% | 4% | 12% | 4% | 0% |
| M473 | 0 | 2 | 12 | 8.5 | 1 | 0 | 0 | 0 | 0 | 5 | 0 | 0 | 0 | 11% | 4% | 12% | 0% | 0% |
| M474 | 0 | 1.5 | 11 | 0 | 0 | 0 | 0 | 0 | 0 | 3 | 0 | 0 | 0 | 9% | 4% | 8% | 0% | 0% |
| M475 | 0 | 2.5 | 11 | 1.25 | 1 | 2 | 0 | 1 | 0 | 6 | 0 | 0 | 0 | 10% | 4% | 17% | 0% | 0% |
| M476 | 0 | 2 | 10 | 1.25 | 1 | 2 | 0 | 1 | 0 | 4 | 0 | 0 | 0 | 9% | 4% | 12% | 0% | 0% |
| M477 | 0 | 2.1 | 10.6 | 1.25 | 1 | 0 | 0 | 0 | 0 | 5 | 0 | 0 | 0 | 9% | 4% | 13% | 0% | 0% |
| M478 | 0 | 1.25 | 10 | 0 | 0 | 4.5 | 0 | 0 | 0 | 0 | 0 | 0 | 0 | 9% | 4% | 5% | 0% | 0% |
| M479 | 0 | 3 | 12 | 1.25 | 1 | 2 | 0 | 1 | 0 | 8 | 0 | 0 | 0 | 11% | 4% | 21% | 0% | 0% |
| M480 | 0 | 2 | 14 | 1.25 | 1 | 2 | 0 | 1 | 0 | 5 | 0 | 0 | 0 | 13% | 4% | 14% | 32% | 0% |
| M481 | 0 | 1.8 | 14 | 1 | 1 | 0 | 0 | 0 | 0 | 5 | 0 | 0 | 0 | 13% | 4% | 12% | 22% | 0% |
| M482 | 0 | 1.75 | 16 | 0 | 0 | 0 | 0 | 0 | 0 | 5 | 0 | 0 | 0 | 15% | 4% | 12% | 24% | 0% |
| M483 | 0 | 1.8 | 14 | 1.25 | 1 | 0 | 0 | 0 | 0 | 5 | 0 | 0 | 0 | 13% | 4% | 12% | 20% | 0% |
| M484 | 0 | 2 | 12.2 | 1.25 | 1 | 0 | 0 | 0 | 0 | 5 | 0 | 0 | 0 | 10% | 4% | 12% | 0% | 0% |
| M485 | 0 | 1.5 | 14 | 1.25 | 1 | 0 | 0 | 1 | 0 | 3.5 | 0 | 0 | 0 | 12% | 4% | 9% | 7% | 0% |
| M486 | 0 | 1.4 | 13 | 1.25 | 1 | 0 | 0 | 1 | 0 | 3 | 0 | 0 | 0 | 11% | 4% | 8% | 0% | 0% |
| M487 | 0 | 1.5 | 11 | 1.25 | 1 | 0 | 0 | 1 | 0 | 3 | 0 | 0 | 0 | 9% | 4% | 8% | 0% | 0% |
| M488 | 0 | 1.8 | 14 | 2.5 | 1 | 0 | 0 | 0 | 0 | 5 | 0 | 0 | 0 | 13% | 4% | 12% | 23% | 0% |
| M489 | 0 | 1.75 | 15 | 0 | 0 | 0 | 0 | 0 | 0 | 4.5 | 0 | 0 | 0 | 13% | 4% | 11% | 0% | 0% |
| M490 | 0 | 1.25 | 13 | 0 | 0 | 0 | 0 | 0 | 0 | 0 | 0 | 0 | 5 | 12% | 4% | 6% | 34% | 0% |
| M491 | 0 | 1.25 | 16 | 0 | 0 | 0 | 0 | 0 | 0 | 3 | 0 | 0 | 0 | 15% | 4% | 7% | 24% | 0% |
| M492 | 0 | 1.8 | 14 | 4 | 1 | 0 | 0 | 0 | 0 | 5 | 0 | 0 | 0 | 13% | 4% | 12% | 28% | 0% |
| M493 | 0 | 2.1 | 10.8 | 1.25 | 1 | 0 | 0 | 0 | 0 | 5 | 0 | 0 | 0 | 9% | 4% | 13% | 0% | 0% |
| M494 | 0 | 2 | 12.4 | 1.25 | 1 | 0 | 0 | 0 | 0 | 5 | 0 | 0 | 0 | 11% | 4% | 12% | 0% | 0% |
| M495 | 0 | 1.5 | 16 | 0 | 0 | 0 | 0 | 0 | 0 | 4 | 0 | 0 | 0 | 15% | 4% | 9% | 24% | 0% |
| M496 | 0 | 3.5 | 13 | 1.25 | 1 | 2 | 0 | 1 | 0 | 10 | 0 | 0 | 0 | 12% | 4% | 25% | 0% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M497 | 0 | 1.8 | 11 | 1.25 | 1 | 0 | 0 | 1 | 0 | 4 | 0 | 0 | 0 | 9% | 4% | 10% | 0% | 0% |
| M498 | 0 | 1.9 | 13.4 | 1.25 | 1 | 0 | 0 | 0 | 0 | 5 | 0 | 0 | 0 | 12% | 4% | 12% | 10% | 0% |
| M499 | 0 | 1.25 | 11 | 0 | 0 | 0 | 0 | 0 | 0 | 0 | 0 | 0 | 4.5 | 10% | 4% | 6% | 0% | 0% |
| M500 | 0 | 1.8 | 14 | 5.5 | 1 | 0 | 0 | 0 | 0 | 5 | 0 | 0 | 0 | 13% | 4% | 12% | 20% | 0% |
| M501 | 0 | 1.6 | 12 | 1.25 | 1 | 0 | 0 | 1 | 0 | 3.5 | 0 | 0 | 0 | 10% | 4% | 9% | 0% | 0% |
| M502 | 0 | 1.8 | 14.2 | 1.25 | 1 | 0 | 0 | 0 | 0 | 5 | 0 | 0 | 0 | 13% | 4% | 12% | 20% | 0% |
| M503 | 0 | 2.1 | 11 | 1.25 | 1 | 0 | 0 | 1 | 0 | 5 | 0 | 0 | 0 | 9% | 4% | 13% | 0% | 0% |
| M504 | 0 | 1.75 | 12 | 0 | 0 | 0 | 0 | 0 | 0 | 4 | 0 | 0 | 0 | 10% | 4% | 10% | 0% | 0% |
| M505 | 0 | 1.8 | 14 | 7 | 1 | 0 | 0 | 0 | 0 | 5 | 0 | 0 | 0 | 13% | 4% | 12% | 22% | 0% |
| M506 | 0 | 2 | 12.6 | 1.25 | 1 | 0 | 0 | 0 | 0 | 5 | 0 | 0 | 0 | 11% | 4% | 12% | 0% | 0% |
| M507 | 0 | 1.8 | 14 | 8.5 | 1 | 0 | 0 | 0 | 0 | 5 | 0 | 0 | 0 | 13% | 4% | 12% | 27% | 0% |
| M508 | 0 | 1.25 | 12 | 0 | 0 | 5 | 0 | 0 | 0 | 0 | 0 | 0 | 0 | 11% | 4% | 6% | 0% | 0% |
| M509 | 0 | 2.1 | 11 | 1.25 | 1 | 0 | 0 | 0 | 0 | 5 | 0 | 0 | 0 | 9% | 4% | 13% | 0% | 0% |
| M510 | 0 | 1.7 | 13 | 1.25 | 1 | 0 | 0 | 1 | 0 | 4 | 0 | 0 | 0 | 11% | 4% | 10% | 0% | 0% |
| M511 | 0 | 1.5 | 15 | 0 | 0 | 0 | 0 | 0 | 0 | 3.5 | 0 | 0 | 0 | 13% | 4% | 8% | 0% | 0% |
| M512 | 0 | 1.8 | 14 | 10 | 1 | 0 | 0 | 0 | 0 | 5 | 0 | 0 | 0 | 13% | 4% | 12% | 20% | 0% |
| M513 | 0 | 2.2 | 10 | 10 | 1 | 0 | 0 | 0 | 0 | 5 | 0 | 0 | 0 | 8% | 4% | 12% | 0% | 0% |
| M514 | 0 | 1.8 | 14 | 1.25 | 1 | 0 | 0 | 1 | 0 | 4.5 | 0 | 0 | 0 | 12% | 4% | 11% | 0% | 0% |
| M515 | 0 | 1.9 | 12 | 1.25 | 1 | 0 | 0 | 1 | 0 | 4.5 | 0 | 0 | 0 | 10% | 4% | 11% | 0% | 0% |
| M516 | 0 | 2.2 | 10 | 8.5 | 1 | 0 | 0 | 0 | 0 | 5 | 0 | 0 | 0 | 8% | 4% | 12% | 0% | 0% |
| M517 | 0 | 3 | 15 | 1.25 | 1 | 2 | 0 | 1 | 0 | 9 | 0 | 0 | 0 | 14% | 4% | 22% | 34% | 0% |
| M518 | 0 | 2 | 12.8 | 1.25 | 1 | 0 | 0 | 0 | 0 | 5 | 0 | 0 | 0 | 11% | 4% | 12% | 0% | 0% |
| M519 | 0 | 1.8 | 14.4 | 1.25 | 1 | 0 | 0 | 0 | 0 | 5 | 0 | 0 | 0 | 13% | 4% | 12% | 25% | 0% |
| M520 | 0 | 2.2 | 10 | 7 | 1 | 0 | 0 | 0 | 0 | 5 | 0 | 0 | 0 | 8% | 4% | 13% | 0% | 0% |
| M521 | 0 | 1.25 | 14 | 0 | 0 | 0 | 0 | 0 | 0 | 0 | 0 | 0 | 5 | 13% | 4% | 6% | 33% | 0% |
| M522 | 0 | 1.6 | 10 | 1.25 | 1 | 0 | 0 | 1 | 0 | 3 | 0 | 0 | 0 | 8% | 4% | 8% | 0% | 0% |
| M523 | 0 | 2.1 | 11.2 | 1.25 | 1 | 0 | 0 | 0 | 0 | 5 | 0 | 0 | 0 | 9% | 4% | 13% | 0% | 0% |
| M524 | 0 | 1.75 | 16 | 0 | 0 | 0 | 0 | 0 | 0 | 4.5 | 0 | 0 | 0 | 14% | 4% | 11% | 4% | 0% |
| M525 | 0 | 1.4 | 14 | 1.25 | 1 | 0 | 0 | 1 | 0 | 3 | 0 | 0 | 0 | 12% | 4% | 7% | 3% | 0% |
| M526 | 0 | 2 | 13 | 1.25 | 1 | 0 | 0 | 0 | 0 | 5 | 0 | 0 | 0 | 11% | 4% | 12% | 0% | 0% |
| M527 | 0 | 2 | 13 | 0 | 0 | 0 | 0 | 0 | 0 | 5 | 0 | 0 | 0 | 11% | 4% | 12% | 0% | 0% |
| M528 | 0 | 2 | 13 | 1.25 | 1 | 0 | 0 | 1 | 0 | 5 | 0 | 0 | 0 | 11% | 4% | 12% | 0% | 0% |
| M529 | 0 | 1.5 | 12 | 0 | 0 | 0 | 0 | 0 | 0 | 3 | 0 | 0 | 0 | 10% | 4% | 8% | 0% | 0% |
| M530 | 0 | 1.8 | 14.6 | 1.25 | 1 | 0 | 0 | 0 | 0 | 5 | 0 | 0 | 0 | 13% | 4% | 12% | 30% | 0% |
| M531 | 0 | 1.25 | 11 | 0 | 0 | 4.5 | 0 | 0 | 0 | 0 | 0 | 0 | 0 | 10% | 4% | 5% | 0% | 0% |
| M532 | 0 | 2.1 | 11.4 | 1.25 | 1 | 0 | 0 | 0 | 0 | 5 | 0 | 0 | 0 | 9% | 4% | 13% | 0% | 0% |
| M533 | 0 | 2 | 13.2 | 1.25 | 1 | 0 | 0 | 0 | 0 | 5 | 0 | 0 | 0 | 11% | 4% | 12% | 0% | 0% |
| M534 | 0 | 1.25 | 12 | 0 | 0 | 0 | 0 | 0 | 0 | 0 | 0 | 0 | 4.5 | 11% | 4% | 6% | 0% | 0% |
| M535 | 0 | 2.5 | 12 | 1.25 | 1 | 2 | 0 | 1 | 0 | 6 | 0 | 0 | 0 | 10% | 4% | 16% | 0% | 0% |
| M536 | 0 | 1.5 | 16 | 0 | 0 | 0 | 0 | 0 | 0 | 3.5 | 0 | 0 | 0 | 14% | 4% | 8% | 4% | 0% |
| M537 | 0 | 1.7 | 11 | 1.25 | 1 | 0 | 0 | 1 | 0 | 3.5 | 0 | 0 | 0 | 9% | 4% | 9% | 0% | 0% |
| M538 | 0 | 2 | 11 | 1.25 | 1 | 2 | 0 | 1 | 0 | 4 | 0 | 0 | 0 | 9% | 4% | 12% | 0% | 0% |
| M539 | 0 | 1.25 | 15 | 0 | 0 | 0 | 0 | 0 | 0 | 0 | 0 | 0 | 5 | 14% | 4% | 6% | 32% | 0% |
| M540 | 0 | 2 | 11 | 0 | 0 | 0 | 0 | 0 | 0 | 4.5 | 0 | 0 | 0 | 9% | 4% | 11% | 0% | 0% |
| M541 | 0 | 3 | 13 | 1.25 | 1 | 2 | 0 | 1 | 0 | 8 | 0 | 0 | 0 | 11% | 4% | 21% | 0% | 0% |
| M542 | 0 | 1.25 | 13 | 0 | 0 | 5 | 0 | 0 | 0 | 0 | 0 | 0 | 0 | 12% | 4% | 6% | 0% | 0% |
| M543 | 0 | 2.1 | 12 | 10 | 1 | 0 | 0 | 0 | 0 | 5 | 0 | 0 | 0 | 10% | 4% | 12% | 0% | 0% |
| M544 | 0 | 1.5 | 12 | 1.25 | 1 | 0 | 0 | 1 | 0 | 3 | 0 | 0 | 0 | 10% | 4% | 8% | 0% | 0% |
| M545 | 0 | 2.5 | 15 | 1.25 | 1 | 2 | 0 | 1 | 0 | 7 | 0 | 0 | 0 | 14% | 4% | 18% | 39% | 0% |
| M546 | 0 | 2 | 13.4 | 1.25 | 1 | 0 | 0 | 0 | 0 | 5 | 0 | 0 | 0 | 11% | 4% | 12% | 0% | 0% |
| M547 | 0 | 2 | 11 | 1.25 | 1 | 0 | 0 | 1 | 0 | 4.5 | 0 | 0 | 0 | 9% | 4% | 12% | 0% | 0% |
| M548 | 0 | 2.1 | 11.6 | 1.25 | 1 | 0 | 0 | 0 | 0 | 5 | 0 | 0 | 0 | 9% | 5% | 12% | 0% | 0% |
| M549 | 0 | 1.25 | 11 | 0 | 0 | 0 | 0 | 0 | 0 | 0 | 5 | 0 | 0 | 10% | 5% | 7% | 0% | 3% |
| M550 | 0 | 1.8 | 14.8 | 1.25 | 1 | 0 | 0 | 0 | 0 | 5 | 0 | 0 | 0 | 13% | 5% | 12% | 35% | 0% |
| M551 | 0 | 1.9 | 15 | 1.25 | 1 | 0 | 0 | 1 | 0 | 5 | 0 | 0 | 0 | 13% | 5% | 12% | 30% | 0% |
| M552 | 0 | 2.1 | 12 | 8.5 | 1 | 0 | 0 | 0 | 0 | 5 | 0 | 0 | 0 | 10% | 5% | 12% | 0% | 0% |
| M553 | 0 | 1.6 | 13 | 1.25 | 1 | 0 | 0 | 1 | 0 | 3.5 | 0 | 0 | 0 | 11% | 5% | 9% | 0% | 0% |
| M554 | 0 | 1.9 | 13.6 | 1.25 | 1 | 0 | 0 | 0 | 0 | 5 | 0 | 0 | 0 | 12% | 5% | 12% | 10% | 0% |
| M555 | 0 | 1.7 | 14 | 1.25 | 1 | 0 | 0 | 1 | 0 | 4 | 0 | 0 | 0 | 12% | 5% | 10% | 0% | 0% |
| M556 | 0 | 1.75 | 13 | 0 | 0 | 0 | 0 | 0 | 0 | 4 | 0 | 0 | 0 | 11% | 5% | 10% | 0% | 0% |
| M557 | 0 | 1.8 | 15 | 1.25 | 1 | 0 | 0 | 1 | 0 | 4.5 | 0 | 0 | 0 | 13% | 5% | 11% | 26% | 0% |
| M558 | 0 | 2.2 | 10.4 | 1.25 | 1 | 0 | 0 | 0 | 0 | 5 | 0 | 0 | 0 | 8% | 5% | 13% | 0% | 0% |
| M559 | 0 | 2 | 13.6 | 1.25 | 1 | 0 | 0 | 0 | 0 | 5 | 0 | 0 | 0 | 12% | 5% | 12% | 0% | 0% |
| M560 | 0 | 2.1 | 12 | 7 | 1 | 0 | 0 | 0 | 0 | 5 | 0 | 0 | 0 | 10% | 5% | 12% | 0% | 0% |
| M561 | 0 | 3.5 | 14 | 1.25 | 1 | 2 | 0 | 1 | 0 | 10 | 0 | 0 | 0 | 13% | 5% | 25% | 0% | 0% |
| M562 | 0 | 1.8 | 12 | 1.25 | 1 | 0 | 0 | 1 | 0 | 4 | 0 | 0 | 0 | 10% | 5% | 10% | 0% | 0% |
| M563 | 0 | 2.1 | 11.8 | 1.25 | 1 | 0 | 0 | 0 | 0 | 5 | 0 | 0 | 0 | 10% | 5% | 12% | 0% | 0% |
| M564 | 0 | 2.1 | 12 | 5.5 | 1 | 0 | 0 | 0 | 0 | 5 | 0 | 0 | 0 | 10% | 5% | 12% | 0% | 0% |
| M565 | 0 | 1.8 | 15 | 1.25 | 1 | 0 | 0 | 0 | 0 | 5 | 0 | 0 | 0 | 13% | 5% | 12% | 40% | 0% |
| M566 | 0 | 2 | 13.8 | 1.25 | 1 | 0 | 0 | 0 | 0 | 5 | 0 | 0 | 0 | 12% | 5% | 12% | 0% | 0% |
| M567 | 0 | 2.1 | 12 | 4 | 1 | 0 | 0 | 0 | 0 | 5 | 0 | 0 | 0 | 10% | 5% | 12% | 0% | 0% |
| M568 | 0 | 1.25 | 10 | 0 | 0 | 0 | 0 | 0 | 0 | 0 | 4.5 | 0 | 0 | 9% | 5% | 6% | 0% | 2% |
| M569 | 0 | 2.1 | 12 | 1.25 | 1 | 0 | 0 | 1 | 0 | 5 | 0 | 0 | 0 | 10% | 5% | 13% | 0% | 0% |
| M570 | 0 | 2.1 | 12 | 2.5 | 1 | 0 | 0 | 0 | 0 | 5 | 0 | 0 | 0 | 10% | 5% | 12% | 0% | 0% |
| M571 | 0 | 2 | 12 | 10 | 1 | 0 | 0 | 0 | 0 | 5 | 0 | 0 | 0 | 10% | 5% | 12% | 0% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M572 | 0 | 1.9 | 13 | 1.25 | 1 | 0 | 0 | 1 | 0 | 4.5 | 0 | 0 | 0 | 11% | 5% | 11% | 0% | 0% |
| M573 | 0 | 2.2 | 10.6 | 1.25 | 1 | 0 | 0 | 0 | 0 | 5 | 0 | 0 | 0 | 8% | 5% | 13% | 0% | 0% |
| M574 | 0 | 1.25 | 13 | 0 | 0 | 0 | 0 | 0 | 0 | 0 | 0 | 0 | 4.5 | 11% | 5% | 6% | 16% | 0% |
| M575 | 0 | 1.6 | 15 | 1.25 | 1 | 0 | 0 | 1 | 0 | 4 | 0 | 0 | 0 | 13% | 5% | 10% | 38% | 0% |
| M576 | 0 | 2.1 | 12 | 1.25 | 1 | 0 | 0 | 0 | 0 | 5 | 0 | 0 | 0 | 10% | 5% | 12% | 0% | 0% |
| M577 | 0 | 2.1 | 12 | 1 | 1 | 0 | 0 | 0 | 0 | 5 | 0 | 0 | 0 | 10% | 5% | 12% | 0% | 0% |
| M578 | 0 | 1.25 | 14 | 0 | 0 | 5 | 0 | 0 | 0 | 0 | 0 | 0 | 0 | 13% | 5% | 6% | 0% | 0% |
| M579 | 0 | 1.5 | 15 | 1.25 | 1 | 0 | 0 | 1 | 0 | 3.5 | 0 | 0 | 0 | 13% | 5% | 9% | 34% | 0% |
| M580 | 0 | 2 | 14 | 0 | 0 | 0 | 0 | 0 | 0 | 5 | 0 | 0 | 0 | 12% | 5% | 12% | 0% | 0% |
| M581 | 0 | 1.25 | 12 | 0 | 0 | 4.5 | 0 | 0 | 0 | 0 | 0 | 0 | 0 | 10% | 5% | 5% | 0% | 0% |
| M582 | 0 | 1.8 | 15.2 | 1.25 | 1 | 0 | 0 | 0 | 0 | 5 | 0 | 0 | 0 | 14% | 5% | 12% | 40% | 0% |
| M583 | 0 | 1.4 | 15 | 1.25 | 1 | 0 | 0 | 1 | 0 | 3 | 0 | 0 | 0 | 13% | 5% | 7% | 30% | 0% |
| M584 | 0 | 2 | 14 | 1.25 | 1 | 0 | 0 | 1 | 0 | 5 | 0 | 0 | 0 | 12% | 5% | 12% | 0% | 0% |
| M585 | 0 | 1.75 | 11 | 0 | 0 | 0 | 0 | 0 | 0 | 3.5 | 0 | 0 | 0 | 9% | 5% | 9% | 0% | 0% |
| M586 | 0 | 1.5 | 13 | 0 | 0 | 0 | 0 | 0 | 0 | 3 | 0 | 0 | 0 | 11% | 5% | 7% | 0% | 0% |
| M587 | 0 | 3.5 | 11 | 1.25 | 1 | 2 | 0 | 1 | 0 | 9 | 0 | 0 | 0 | 9% | 5% | 23% | 0% | 0% |
| M588 | 0 | 2.1 | 12.2 | 1.25 | 1 | 0 | 0 | 0 | 0 | 5 | 0 | 0 | 0 | 10% | 5% | 12% | 0% | 0% |
| M589 | 0 | 2.2 | 10.8 | 1.25 | 1 | 0 | 0 | 0 | 0 | 5 | 0 | 0 | 0 | 8% | 5% | 13% | 0% | 0% |
| M590 | 0 | 1.6 | 11 | 1.25 | 1 | 0 | 0 | 1 | 0 | 3 | 0 | 0 | 0 | 9% | 5% | 8% | 0% | 0% |
| M591 | 0 | 1.9 | 11 | 1.25 | 1 | 0 | 0 | 1 | 0 | 4 | 0 | 0 | 0 | 9% | 5% | 10% | 0% | 0% |
| M592 | 0 | 1.8 | 15.4 | 1.25 | 1 | 0 | 0 | 0 | 0 | 5 | 0 | 0 | 0 | 14% | 5% | 12% | 40% | 0% |
| M593 | 0 | 2.2 | 11 | 1.25 | 1 | 0 | 0 | 1 | 0 | 5 | 0 | 0 | 0 | 9% | 5% | 13% | 0% | 0% |
| M594 | 0 | 1.5 | 13 | 1.25 | 1 | 0 | 0 | 1 | 0 | 3 | 0 | 0 | 0 | 11% | 5% | 8% | 0% | 0% |
| M595 | 0 | 2.5 | 13 | 1.25 | 1 | 2 | 0 | 1 | 0 | 6 | 0 | 0 | 0 | 11% | 5% | 16% | 0% | 0% |
| M596 | 0 | 1.7 | 15 | 1.25 | 1 | 0 | 0 | 1 | 0 | 4 | 0 | 0 | 0 | 13% | 5% | 10% | 22% | 0% |
| M597 | 0 | 1.9 | 13.8 | 1.25 | 1 | 0 | 0 | 0 | 0 | 5 | 0 | 0 | 0 | 12% | 5% | 12% | 10% | 0% |
| M598 | 0 | 1.6 | 14 | 1.25 | 1 | 0 | 0 | 1 | 0 | 3.5 | 0 | 0 | 0 | 12% | 5% | 9% | 0% | 0% |
| M599 | 0 | 1.25 | 16 | 0 | 0 | 0 | 0 | 0 | 0 | 0 | 0 | 0 | 5 | 15% | 5% | 6% | 31% | 0% |
| M600 | 0 | 2.1 | 12.4 | 1.25 | 1 | 0 | 0 | 0 | 0 | 5 | 0 | 0 | 0 | 10% | 5% | 12% | 0% | 0% |
| M601 | 0 | 2 | 12 | 1.25 | 1 | 2 | 0 | 1 | 0 | 4 | 0 | 0 | 0 | 10% | 5% | 12% | 0% | 0% |
| M602 | 0 | 3 | 14 | 1.25 | 1 | 2 | 0 | 1 | 0 | 8 | 0 | 0 | 0 | 12% | 5% | 20% | 0% | 0% |
| M603 | 0 | 2 | 14 | 1 | 1 | 0 | 0 | 0 | 0 | 5 | 0 | 0 | 0 | 12% | 5% | 12% | 0% | 0% |
| M604 | 0 | 1.75 | 14 | 0 | 0 | 0 | 0 | 0 | 0 | 4 | 0 | 0 | 0 | 12% | 5% | 10% | 0% | 0% |
| M605 | 0 | 1.25 | 14 | 0 | 0 | 0 | 0 | 0 | 0 | 0 | 0 | 0 | 4.5 | 12% | 5% | 5% | 26% | 0% |
| M606 | 0 | 2.2 | 11 | 1.25 | 1 | 0 | 0 | 0 | 0 | 5 | 0 | 0 | 0 | 9% | 5% | 13% | 0% | 0% |
| M607 | 0 | 1.25 | 15 | 0 | 0 | 5 | 0 | 0 | 0 | 0 | 0 | 0 | 0 | 14% | 5% | 6% | 3% | 0% |
| M608 | 0 | 3 | 16 | 1.25 | 1 | 2 | 0 | 1 | 0 | 9 | 0 | 0 | 0 | 15% | 5% | 22% | 34% | 0% |
| M609 | 0 | 1.7 | 12 | 1.25 | 1 | 0 | 0 | 1 | 0 | 3.5 | 0 | 0 | 0 | 10% | 5% | 9% | 0% | 0% |
| M610 | 0 | 1.8 | 15.6 | 1.25 | 1 | 0 | 0 | 0 | 0 | 5 | 0 | 0 | 0 | 14% | 5% | 12% | 40% | 0% |
| M611 | 0 | 2.1 | 12.6 | 1.25 | 1 | 0 | 0 | 0 | 0 | 5 | 0 | 0 | 0 | 10% | 5% | 12% | 0% | 0% |
| M612 | 0 | 2 | 12 | 0 | 0 | 0 | 0 | 0 | 0 | 4.5 | 0 | 0 | 0 | 9% | 5% | 11% | 0% | 0% |
| M613 | 0 | 3.5 | 15 | 1.25 | 1 | 2 | 0 | 1 | 0 | 10 | 0 | 0 | 0 | 14% | 5% | 24% | 10% | 0% |
| M614 | 0 | 1.9 | 14 | 1 | 1 | 0 | 0 | 0 | 0 | 5 | 0 | 0 | 0 | 12% | 5% | 12% | 11% | 0% |
| M615 | 0 | 1.9 | 14 | 1.25 | 1 | 0 | 0 | 0 | 0 | 5 | 0 | 0 | 0 | 12% | 5% | 12% | 9% | 0% |
| M616 | 0 | 1.8 | 13 | 1.25 | 1 | 0 | 0 | 1 | 0 | 4 | 0 | 0 | 0 | 11% | 5% | 10% | 0% | 0% |
| M617 | 0 | 2 | 12 | 1.25 | 1 | 0 | 0 | 1 | 0 | 4.5 | 0 | 0 | 0 | 10% | 5% | 11% | 0% | 0% |
| M618 | 0 | 2 | 14 | 1.25 | 1 | 0 | 0 | 0 | 0 | 5 | 0 | 0 | 0 | 12% | 5% | 12% | 0% | 0% |
| M619 | 0 | 2.2 | 11.2 | 1.25 | 1 | 0 | 0 | 0 | 0 | 5 | 0 | 0 | 0 | 9% | 5% | 13% | 0% | 0% |
| M620 | 0 | 1.25 | 13 | 0 | 0 | 4.5 | 0 | 0 | 0 | 0 | 0 | 0 | 0 | 11% | 5% | 5% | 0% | 0% |
| M621 | 0 | 1.9 | 14 | 2.5 | 1 | 0 | 0 | 0 | 0 | 5 | 0 | 0 | 0 | 12% | 5% | 12% | 4% | 0% |
| M622 | 0 | 2.1 | 12.8 | 1.25 | 1 | 0 | 0 | 0 | 0 | 5 | 0 | 0 | 0 | 10% | 5% | 12% | 0% | 0% |
| M623 | 0 | 1.9 | 14 | 1.25 | 1 | 0 | 0 | 1 | 0 | 4.5 | 0 | 0 | 0 | 12% | 5% | 11% | 0% | 0% |
| M624 | 0 | 1.8 | 15.8 | 1.25 | 1 | 0 | 0 | 0 | 0 | 5 | 0 | 0 | 0 | 14% | 5% | 12% | 40% | 0% |
| M625 | 0 | 2 | 15 | 0 | 0 | 0 | 0 | 0 | 0 | 5 | 0 | 0 | 0 | 13% | 5% | 12% | 0% | 0% |
| M626 | 0 | 2.5 | 16 | 1.25 | 1 | 2 | 0 | 1 | 0 | 7 | 0 | 0 | 0 | 15% | 5% | 18% | 39% | 0% |
| M627 | 0 | 1.9 | 14 | 4 | 1 | 0 | 0 | 0 | 0 | 5 | 0 | 0 | 0 | 12% | 5% | 12% | 14% | 0% |
| M628 | 0 | 1.25 | 16 | 0 | 0 | 5 | 0 | 0 | 0 | 0 | 0 | 0 | 0 | 14% | 5% | 6% | 25% | 0% |
| M629 | 0 | 1.5 | 14 | 0 | 0 | 0 | 0 | 0 | 0 | 3 | 0 | 0 | 0 | 12% | 5% | 7% | 0% | 0% |
| M630 | 0 | 2 | 15 | 1.25 | 1 | 0 | 0 | 1 | 0 | 5 | 0 | 0 | 0 | 13% | 5% | 12% | 15% | 0% |
| M631 | 0 | 1.25 | 15 | 0 | 0 | 0 | 0 | 0 | 0 | 0 | 0 | 0 | 4.5 | 13% | 5% | 5% | 25% | 0% |
| M632 | 0 | 2.1 | 13 | 1.25 | 1 | 0 | 0 | 1 | 0 | 5 | 0 | 0 | 0 | 11% | 5% | 12% | 0% | 0% |
| M633 | 0 | 2.2 | 11.4 | 1.25 | 1 | 0 | 0 | 0 | 0 | 5 | 0 | 0 | 0 | 9% | 5% | 13% | 0% | 0% |
| M634 | 0 | 2.1 | 13 | 1.25 | 1 | 0 | 0 | 0 | 0 | 5 | 0 | 0 | 0 | 11% | 5% | 12% | 0% | 0% |
| M635 | 0 | 1.9 | 14 | 5.5 | 1 | 0 | 0 | 0 | 0 | 5 | 0 | 0 | 0 | 12% | 5% | 12% | 10% | 0% |
| M636 | 0 | 1.9 | 14.2 | 1.25 | 1 | 0 | 0 | 0 | 0 | 5 | 0 | 0 | 0 | 12% | 5% | 12% | 9% | 0% |
| M637 | 0 | 1.8 | 16 | 1.25 | 1 | 0 | 0 | 0 | 0 | 5 | 0 | 0 | 0 | 14% | 5% | 12% | 39% | 0% |
| M638 | 0 | 1.6 | 15 | 1.25 | 1 | 0 | 0 | 1 | 0 | 3.5 | 0 | 0 | 0 | 13% | 5% | 9% | 18% | 0% |
| M639 | 0 | 1.9 | 14 | 7 | 1 | 0 | 0 | 0 | 0 | 5 | 0 | 0 | 0 | 12% | 5% | 12% | 5% | 0% |
| M640 | 0 | 2.25 | 11 | 0 | 0 | 0 | 0 | 0 | 0 | 5 | 0 | 0 | 0 | 8% | 5% | 13% | 0% | 0% |
| M641 | 0 | 1.5 | 14 | 1.25 | 1 | 0 | 0 | 1 | 0 | 3 | 0 | 0 | 0 | 12% | 5% | 7% | 0% | 0% |
| M642 | 0 | 2.1 | 11 | 1.25 | 1 | 0 | 0 | 1 | 0 | 4.5 | 0 | 0 | 0 | 8% | 6% | 12% | 0% | 0% |
| M643 | 0 | 1.8 | 11 | 1.25 | 1 | 0 | 0 | 1 | 0 | 3.5 | 0 | 0 | 0 | 9% | 6% | 9% | 0% | 0% |
| M644 | 0 | 1.9 | 14 | 8.5 | 1 | 0 | 0 | 0 | 0 | 5 | 0 | 0 | 0 | 12% | 6% | 12% | 14% | 0% |
| M645 | 0 | 2.1 | 13.2 | 1.25 | 1 | 0 | 0 | 0 | 0 | 5 | 0 | 0 | 0 | 11% | 6% | 12% | 0% | 0% |
| M646 | 0 | 1.75 | 15 | 0 | 0 | 0 | 0 | 0 | 0 | 4 | 0 | 0 | 0 | 13% | 6% | 10% | 0% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M647 | 0 | 2.2 | 11.6 | 1.25 | 1 | 0 | 0 | 0 | 0 | 5 | 0 | 0 | 0 | 9% | 6% | 13% | 0% | 0% |
| M648 | 0 | 2.5 | 14 | 1.25 | 1 | 2 | 0 | 1 | 0 | 6 | 0 | 0 | 0 | 12% | 6% | 16% | 0% | 0% |
| M649 | 0 | 1.75 | 12 | 0 | 0 | 0 | 0 | 0 | 0 | 3.5 | 0 | 0 | 0 | 9% | 6% | 9% | 0% | 0% |
| M650 | 0 | 1.9 | 14 | 10 | 1 | 0 | 0 | 0 | 0 | 5 | 0 | 0 | 0 | 12% | 6% | 12% | 11% | 0% |
| M651 | 0 | 1.25 | 16 | 0 | 0 | 0 | 0 | 0 | 0 | 0 | 0 | 0 | 4.5 | 14% | 6% | 5% | 23% | 0% |
| M652 | 0 | 2.2 | 12 | 10 | 1 | 0 | 0 | 0 | 0 | 5 | 0 | 0 | 0 | 10% | 6% | 12% | 0% | 0% |
| M653 | 0 | 1.8 | 16.2 | 1.25 | 1 | 0 | 0 | 0 | 0 | 5 | 0 | 0 | 0 | 14% | 6% | 12% | 39% | 0% |
| M654 | 0 | 1.8 | 16 | 5.5 | 1 | 0 | 0 | 0 | 0 | 5 | 0 | 0 | 0 | 14% | 6% | 12% | 38% | 0% |
| M655 | 0 | 2 | 13 | 1.25 | 1 | 2 | 0 | 1 | 0 | 4 | 0 | 0 | 0 | 11% | 6% | 12% | 0% | 0% |
| M656 | 0 | 1.9 | 14.4 | 1.25 | 1 | 0 | 0 | 0 | 0 | 5 | 0 | 0 | 0 | 12% | 6% | 12% | 9% | 0% |
| M657 | 0 | 3 | 15 | 1.25 | 1 | 2 | 0 | 1 | 0 | 8 | 0 | 0 | 0 | 13% | 6% | 20% | 15% | 0% |
| M658 | 0 | 1.25 | 14 | 0 | 0 | 4.5 | 0 | 0 | 0 | 0 | 0 | 0 | 0 | 12% | 6% | 5% | 0% | 0% |
| M659 | 0 | 1.6 | 12 | 1.25 | 0 | 0 | 0 | 1 | 0 | 3 | 0 | 0 | 0 | 10% | 6% | 8% | 0% | 0% |
| M660 | 0 | 2.1 | 13.4 | 1.25 | 1 | 0 | 0 | 0 | 0 | 5 | 0 | 0 | 0 | 11% | 6% | 12% | 0% | 0% |
| M661 | 0 | 2.2 | 12 | 8.5 | 1 | 0 | 0 | 0 | 0 | 5 | 0 | 0 | 0 | 10% | 6% | 12% | 0% | 0% |
| M662 | 0 | 1.5 | 10 | 0 | 0 | 0 | 0 | 0 | 0 | 0 | 0 | 0 | 5 | 8% | 6% | 6% | 0% | 0% |
| M663 | 0 | 1.25 | 12 | 0 | 0 | 0 | 0 | 0 | 0 | 0 | 5 | 0 | 0 | 10% | 6% | 6% | 21% | 4% |
| M664 | 0 | 2 | 16 | 1 | 0 | 0 | 0 | 0 | 0 | 5 | 0 | 0 | 0 | 14% | 6% | 12% | 0% | 0% |
| M665 | 0 | 2.2 | 11.8 | 1.25 | 1 | 0 | 0 | 0 | 0 | 5 | 0 | 0 | 0 | 9% | 6% | 13% | 0% | 0% |
| M666 | 0 | 1.7 | 13 | 1.25 | 1 | 0 | 0 | 1 | 0 | 3.5 | 0 | 0 | 0 | 11% | 6% | 9% | 0% | 0% |
| M667 | 0 | 2.2 | 12 | 7 | 1 | 0 | 0 | 0 | 0 | 5 | 0 | 0 | 0 | 10% | 6% | 12% | 0% | 0% |
| M668 | 0 | 1.9 | 12 | 1.25 | 1 | 0 | 0 | 1 | 0 | 4 | 0 | 0 | 0 | 9% | 6% | 10% | 0% | 0% |
| M669 | 0 | 2 | 16 | 0 | 0 | 0 | 0 | 0 | 0 | 5 | 0 | 0 | 0 | 14% | 6% | 12% | 0% | 0% |
| M670 | 0 | 1.8 | 16 | 10 | 1 | 0 | 0 | 0 | 0 | 5 | 0 | 0 | 0 | 14% | 6% | 11% | 38% | 0% |
| M671 | 0 | 2.1 | 13.6 | 1.25 | 1 | 0 | 0 | 0 | 0 | 5 | 0 | 0 | 0 | 11% | 6% | 12% | 0% | 0% |
| M672 | 0 | 2.2 | 12 | 5.5 | 1 | 0 | 0 | 0 | 0 | 5 | 0 | 0 | 0 | 9% | 6% | 12% | 0% | 0% |
| M673 | 0 | 1.5 | 15 | 0 | 0 | 0 | 0 | 0 | 0 | 3 | 0 | 0 | 0 | 12% | 6% | 7% | 0% | 0% |
| M674 | 0 | 1.8 | 14 | 1.25 | 1 | 0 | 0 | 1 | 0 | 4 | 0 | 0 | 0 | 12% | 6% | 10% | 0% | 0% |
| M675 | 0 | 3 | 11 | 1.25 | 1 | 2 | 0 | 1 | 0 | 7 | 0 | 0 | 0 | 8% | 6% | 19% | 0% | 0% |
| M676 | 0 | 1.9 | 15 | 1.25 | 1 | 0 | 0 | 1 | 0 | 4.5 | 0 | 0 | 0 | 13% | 6% | 11% | 11% | 0% |
| M677 | 0 | 1.9 | 14.6 | 1.25 | 1 | 0 | 0 | 0 | 0 | 5 | 0 | 0 | 0 | 13% | 6% | 12% | 11% | 0% |
| M678 | 0 | 2.2 | 12 | 1.25 | 1 | 0 | 0 | 1 | 0 | 5 | 0 | 0 | 0 | 9% | 6% | 13% | 0% | 0% |
| M679 | 0 | 2.2 | 12 | 4 | 1 | 0 | 0 | 0 | 0 | 5 | 0 | 0 | 0 | 9% | 6% | 12% | 0% | 0% |
| M680 | 0 | 3.5 | 12 | 1.25 | 1 | 2 | 0 | 1 | 0 | 9 | 0 | 0 | 0 | 9% | 6% | 23% | 0% | 0% |
| M681 | 0 | 2 | 16 | 2 | 0 | 0 | 1 | 0 | 0 | 5 | 0 | 0 | 0 | 14% | 6% | 12% | 0% | 0% |
| M682 | 0 | 2.2 | 12 | 2.5 | 1 | 0 | 0 | 0 | 0 | 5 | 0 | 0 | 0 | 9% | 6% | 12% | 0% | 0% |
| M683 | 0 | 2 | 14.2 | 1.25 | 1 | 0 | 0 | 0 | 0 | 5 | 0 | 0 | 0 | 12% | 6% | 12% | 0% | 0% |
| M684 | 0 | 2 | 16 | 1 | 0 | 0 | 1 | 0 | 0 | 5 | 0 | 0 | 0 | 14% | 6% | 12% | 0% | 0% |
| M685 | 0 | 2 | 13 | 0 | 0 | 0 | 0 | 0 | 0 | 4.5 | 0 | 0 | 0 | 10% | 6% | 11% | 0% | 0% |
| M686 | 0 | 2.2 | 12 | 1.25 | 1 | 0 | 0 | 0 | 0 | 5 | 0 | 0 | 0 | 9% | 6% | 12% | 0% | 0% |
| M687 | 0 | 2.2 | 12 | 1 | 1 | 0 | 0 | 0 | 0 | 5 | 0 | 0 | 0 | 9% | 6% | 12% | 0% | 0% |
| M688 | 0 | 2.1 | 13.8 | 1.25 | 1 | 0 | 0 | 0 | 0 | 5 | 0 | 0 | 0 | 11% | 6% | 12% | 0% | 0% |
| M689 | 0 | 2 | 16 | 0 | 0 | 0 | 1 | 0 | 0 | 5 | 0 | 0 | 0 | 13% | 6% | 12% | 0% | 0% |
| M690 | 0 | 2 | 13 | 1.25 | 1 | 0 | 0 | 1 | 0 | 4.5 | 0 | 0 | 0 | 10% | 6% | 11% | 0% | 0% |
| M691 | 0 | 1.75 | 16 | 0 | 0 | 0 | 0 | 0 | 0 | 4 | 0 | 0 | 0 | 13% | 6% | 10% | 0% | 0% |
| M692 | 0 | 2.1 | 14 | 2.5 | 1 | 0 | 0 | 0 | 0 | 5 | 0 | 0 | 0 | 11% | 6% | 12% | 0% | 0% |
| M693 | 0 | 1.25 | 15 | 0 | 0 | 4.5 | 0 | 0 | 0 | 0 | 0 | 0 | 0 | 13% | 6% | 5% | 0% | 0% |
| M694 | 0 | 1.5 | 15 | 1.25 | 1 | 0 | 0 | 1 | 0 | 3 | 0 | 0 | 0 | 13% | 6% | 7% | 14% | 0% |
| M695 | 0 | 2 | 11 | 0 | 0 | 0 | 0 | 0 | 0 | 4 | 0 | 0 | 0 | 8% | 6% | 10% | 0% | 0% |
| M696 | 0 | 2 | 16 | 2 | 0 | 0 | 2 | 0 | 0 | 5 | 0 | 0 | 0 | 13% | 6% | 12% | 0% | 0% |
| M697 | 0 | 2.1 | 14 | 1.25 | 1 | 0 | 0 | 0 | 0 | 5 | 0 | 0 | 0 | 11% | 6% | 12% | 0% | 0% |
| M698 | 0 | 1.25 | 11 | 0 | 0 | 0 | 0 | 0 | 0 | 0 | 4.5 | 0 | 0 | 9% | 6% | 6% | 0% | 4% |
| M699 | 0 | 1.9 | 14.8 | 1.25 | 1 | 0 | 0 | 0 | 0 | 5 | 0 | 0 | 0 | 13% | 6% | 12% | 16% | 0% |
| M700 | 0 | 2.1 | 14 | 1 | 1 | 0 | 0 | 0 | 0 | 5 | 0 | 0 | 0 | 11% | 6% | 12% | 0% | 0% |
| M701 | 0 | 2 | 16 | 1 | 0 | 0 | 2 | 0 | 0 | 5 | 0 | 0 | 0 | 13% | 6% | 12% | 0% | 0% |
| M702 | 0 | 2.2 | 12.2 | 1.25 | 1 | 0 | 0 | 0 | 0 | 5 | 0 | 0 | 0 | 9% | 6% | 12% | 0% | 0% |
| M703 | 0 | 2.1 | 14 | 1.25 | 1 | 0 | 0 | 1 | 0 | 5 | 0 | 0 | 0 | 11% | 6% | 12% | 0% | 0% |
| M704 | 0 | 2.3 | 11 | 1.25 | 1 | 0 | 0 | 1 | 0 | 5 | 0 | 0 | 0 | 8% | 6% | 13% | 0% | 0% |
| M705 | 0 | 2 | 16 | 0 | 0 | 0 | 2 | 0 | 0 | 5 | 0 | 0 | 0 | 13% | 6% | 12% | 0% | 0% |
| M706 | 0 | 3 | 17 | 1.25 | 1 | 2 | 0 | 1 | 0 | 9 | 0 | 0 | 0 | 15% | 6% | 22% | 38% | 0% |
| M707 | 0 | 2 | 11 | 1.25 | 1 | 0 | 0 | 1 | 0 | 4 | 0 | 0 | 0 | 8% | 6% | 10% | 0% | 0% |
| M708 | 0 | 2.5 | 15 | 1.25 | 1 | 2 | 0 | 1 | 0 | 6 | 0 | 0 | 0 | 13% | 6% | 16% | 20% | 0% |
| M709 | 0 | 1.7 | 11 | 1.25 | 1 | 0 | 0 | 1 | 0 | 3 | 0 | 0 | 0 | 8% | 6% | 8% | 0% | 0% |
| M710 | 0 | 2.1 | 14.2 | 1.25 | 1 | 0 | 0 | 0 | 0 | 5 | 0 | 0 | 0 | 12% | 6% | 12% | 0% | 0% |
| M711 | 0 | 2 | 14 | 1.25 | 1 | 2 | 0 | 1 | 0 | 4 | 0 | 0 | 0 | 12% | 6% | 12% | 0% | 0% |
| M712 | 0 | 2 | 17 | 0 | 0 | 0 | 0 | 0 | 0 | 5 | 0 | 0 | 0 | 15% | 6% | 12% | 6% | 0% |
| M713 | 0 | 2.3 | 11 | 1.25 | 1 | 0 | 0 | 0 | 0 | 5 | 0 | 0 | 0 | 8% | 6% | 13% | 0% | 0% |
| M714 | 0 | 2 | 16 | 2 | 0 | 0 | 3 | 0 | 0 | 5 | 0 | 0 | 0 | 13% | 6% | 12% | 0% | 0% |
| M715 | 0 | 1.5 | 16 | 0 | 0 | 0 | 0 | 0 | 0 | 3 | 0 | 0 | 0 | 13% | 6% | 7% | 0% | 0% |
| M716 | 0 | 2 | 16 | 3 | 0 | 0 | 3 | 0 | 0 | 5 | 0 | 0 | 0 | 13% | 6% | 12% | 0% | 0% |
| M717 | 0 | 2 | 16 | 1 | 0 | 0 | 3 | 0 | 0 | 5 | 0 | 0 | 0 | 13% | 6% | 12% | 0% | 0% |
| M718 | 0 | 2.2 | 12.4 | 1.25 | 1 | 0 | 0 | 0 | 0 | 5 | 0 | 0 | 0 | 10% | 6% | 12% | 0% | 0% |
| M719 | 0 | 2 | 14 | 2.5 | 1 | 0 | 0 | 0 | 0 | 5 | 0 | 0 | 0 | 12% | 6% | 12% | 0% | 0% |
| M720 | 0 | 2 | 16 | 0 | 0 | 0 | 3 | 0 | 0 | 5 | 0 | 0 | 0 | 13% | 6% | 12% | 0% | 0% |
| M721 | 0 | 1.9 | 15 | 1.25 | 1 | 0 | 0 | 0 | 0 | 5 | 0 | 0 | 0 | 13% | 6% | 12% | 21% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M722 | 0 | 1.25 | 10 | 0 | 0 | 0 | 0 | 0 | 0 | 0 | 4 | 0 | 0 | 8% | 6% | 5% | 0% | 4% |
| M723 | 0 | 2.1 | 14.4 | 1.25 | 1 | 0 | 0 | 0 | 0 | 5 | 0 | 0 | 0 | 12% | 6% | 12% | 0% | 0% |
| M724 | 0 | 1.75 | 13 | 0 | 0 | 0 | 0 | 0 | 0 | 3.5 | 0 | 0 | 0 | 10% | 6% | 9% | 0% | 0% |
| M725 | 0 | 1.25 | 16 | 0 | 0 | 4.5 | 0 | 0 | 0 | 0 | 0 | 0 | 0 | 14% | 6% | 5% | 12% | 0% |
| M726 | 0 | 2 | 16 | 2 | 0 | 0 | 0 | 0 | 0 | 5 | 0 | 0 | 0 | 14% | 6% | 12% | 0% | 0% |
| M727 | 0 | 1.6 | 13 | 1.25 | 1 | 0 | 0 | 1 | 0 | 3 | 0 | 0 | 0 | 10% | 6% | 8% | 0% | 0% |
| M728 | 0 | 1.8 | 12 | 1.25 | 1 | 0 | 0 | 1 | 0 | 3.5 | 0 | 0 | 0 | 9% | 6% | 9% | 0% | 0% |
| M729 | 0 | 1.7 | 14 | 1.25 | 1 | 0 | 0 | 1 | 0 | 3.5 | 0 | 0 | 0 | 11% | 6% | 9% | 0% | 0% |
| M730 | 0 | 1.8 | 15 | 1.25 | 1 | 0 | 0 | 1 | 0 | 4 | 0 | 0 | 0 | 12% | 6% | 10% | 6% | 0% |
| M731 | 0 | 2.5 | 17 | 1.25 | 1 | 2 | 0 | 1 | 0 | 7 | 0 | 0 | 0 | 15% | 6% | 18% | 40% | 0% |
| M732 | 0 | 2 | 16 | 3 | 0 | 0 | 4 | 0 | 0 | 5 | 0 | 0 | 0 | 13% | 6% | 12% | 0% | 0% |
| M733 | 0 | 2 | 16 | 2 | 0 | 0 | 4 | 0 | 0 | 5 | 0 | 0 | 0 | 13% | 6% | 12% | 0% | 0% |
| M734 | 0 | 1.75 | 17 | 0 | 0 | 0 | 0 | 0 | 0 | 4 | 0 | 0 | 0 | 14% | 6% | 9% | 6% | 0% |
| M735 | 0 | 2 | 16 | 1 | 0 | 0 | 4 | 0 | 0 | 5 | 0 | 0 | 0 | 13% | 6% | 12% | 0% | 0% |
| M736 | 0 | 2.2 | 12.6 | 1.25 | 1 | 0 | 0 | 0 | 0 | 5 | 0 | 0 | 0 | 10% | 6% | 12% | 0% | 0% |
| M737 | 0 | 2 | 16 | 0 | 0 | 0 | 4 | 0 | 0 | 5 | 0 | 0 | 0 | 13% | 6% | 12% | 0% | 0% |
| M738 | 0 | 1.5 | 11 | 0 | 0 | 0 | 0 | 0 | 0 | 0 | 0 | 0 | 5 | 9% | 6% | 6% | 0% | 0% |
| M739 | 0 | 2.3 | 11.2 | 1.25 | 1 | 0 | 0 | 0 | 0 | 5 | 0 | 0 | 0 | 8% | 6% | 13% | 0% | 0% |
| M740 | 0 | 2.1 | 12 | 1.25 | 1 | 0 | 0 | 1 | 0 | 4.5 | 0 | 0 | 0 | 9% | 6% | 11% | 0% | 0% |
| M741 | 0 | 2.25 | 12 | 0 | 0 | 0 | 0 | 0 | 0 | 5 | 0 | 0 | 0 | 9% | 6% | 12% | 0% | 0% |
| M742 | 0 | 1.9 | 15.2 | 1.25 | 1 | 0 | 0 | 0 | 0 | 5 | 0 | 0 | 0 | 13% | 6% | 12% | 26% | 0% |
| M743 | 0 | 1.9 | 13 | 1.25 | 1 | 0 | 0 | 1 | 0 | 4 | 0 | 0 | 0 | 10% | 6% | 10% | 0% | 0% |
| M744 | 0 | 2 | 16 | 0 | 0 | 0 | 5 | 0 | 0 | 5 | 0 | 0 | 0 | 13% | 6% | 12% | 0% | 0% |
| M745 | 0 | 2 | 16 | 1 | 0 | 0 | 5 | 0 | 0 | 5 | 0 | 0 | 0 | 13% | 6% | 12% | 0% | 0% |
| M746 | 0 | 2 | 16 | 2 | 0 | 0 | 5 | 0 | 0 | 5 | 0 | 0 | 0 | 13% | 6% | 12% | 0% | 0% |
| M747 | 0 | 2.2 | 12.8 | 1.25 | 1 | 0 | 0 | 0 | 0 | 5 | 0 | 0 | 0 | 10% | 6% | 12% | 0% | 0% |
| M748 | 0 | 2 | 16 | 3 | 0 | 0 | 5 | 0 | 0 | 5 | 0 | 0 | 0 | 13% | 6% | 12% | 0% | 0% |
| M749 | 0 | 2 | 14 | 0 | 0 | 0 | 0 | 0 | 0 | 4.5 | 0 | 0 | 0 | 11% | 6% | 11% | 0% | 0% |
| M750 | 0 | 1.75 | 11 | 0 | 0 | 0 | 0 | 0 | 0 | 3 | 0 | 0 | 0 | 8% | 6% | 8% | 0% | 0% |
| M751 | 0 | 1.25 | 17 | 0 | 0 | 0 | 4 | 0 | 0 | 0 | 0 | 0 | 4.5 | 15% | 6% | 5% | 0% | 0% |
| M752 | 0 | 2.3 | 11.4 | 1.25 | 1 | 0 | 0 | 0 | 0 | 5 | 0 | 0 | 0 | 8% | 6% | 13% | 0% | 0% |
| M753 | 0 | 1.5 | 17 | 0 | 0 | 0 | 0 | 0 | 0 | 3 | 0 | 0 | 0 | 14% | 6% | 7% | 6% | 0% |
| M754 | 0 | 2 | 14.4 | 1.25 | 1 | 0 | 0 | 0 | 0 | 5 | 0 | 0 | 0 | 12% | 6% | 12% | 0% | 0% |
| M755 | 0 | 2 | 14 | 1.25 | 1 | 0 | 0 | 1 | 0 | 4.5 | 0 | 0 | 0 | 11% | 6% | 11% | 0% | 0% |
| M756 | 0 | 2.2 | 13 | 1.25 | 1 | 0 | 0 | 1 | 0 | 5 | 0 | 0 | 0 | 10% | 6% | 12% | 0% | 0% |
| M757 | 0 | 2 | 16 | 4 | 0 | 0 | 5 | 0 | 0 | 5 | 0 | 0 | 0 | 13% | 6% | 12% | 0% | 1% |
| M758 | 0 | 1.9 | 15.4 | 1.25 | 1 | 0 | 0 | 0 | 0 | 5 | 0 | 0 | 0 | 13% | 6% | 12% | 31% | 0% |
| M759 | 0 | 2 | 15 | 1.25 | 1 | 2 | 0 | 1 | 0 | 4 | 0 | 0 | 0 | 13% | 6% | 11% | 19% | 0% |
| M760 | 0 | 2 | 16 | 0 | 0 | 0 | 6 | 0 | 0 | 5 | 0 | 0 | 0 | 13% | 6% | 12% | 0% | 0% |
| M761 | 0 | 2.1 | 14.6 | 1.25 | 1 | 0 | 0 | 0 | 0 | 5 | 0 | 0 | 0 | 12% | 6% | 12% | 0% | 0% |
| M762 | 0 | 2 | 16 | 1 | 0 | 0 | 6 | 0 | 0 | 5 | 0 | 0 | 0 | 13% | 6% | 12% | 0% | 0% |
| M763 | 0 | 2.2 | 13 | 1.25 | 1 | 0 | 0 | 0 | 0 | 5 | 0 | 0 | 0 | 10% | 6% | 12% | 0% | 0% |
| M764 | 0 | 2.1 | 15 | 1.25 | 1 | 0 | 0 | 1 | 0 | 5 | 0 | 0 | 0 | 12% | 6% | 12% | 0% | 0% |
| M765 | 0 | 2 | 16 | 2 | 0 | 0 | 6 | 0 | 0 | 5 | 0 | 0 | 0 | 13% | 6% | 12% | 0% | 0% |
| M766 | 0 | 2 | 16 | 3 | 0 | 0 | 6 | 0 | 0 | 5 | 0 | 0 | 0 | 13% | 6% | 12% | 0% | 2% |
| M767 | 0 | 2 | 16 | 4 | 0 | 0 | 6 | 0 | 0 | 5 | 0 | 0 | 0 | 13% | 6% | 12% | 0% | 2% |
| M768 | 0 | 1.25 | 17 | 0 | 0 | 0 | 5 | 0 | 0 | 0 | 0 | 0 | 4.5 | 15% | 7% | 5% | 0% | 0% |
| M769 | 0 | 1.9 | 11 | 1.25 | 1 | 0 | 0 | 1 | 0 | 3.5 | 0 | 0 | 0 | 8% | 7% | 9% | 0% | 0% |
| M770 | 0 | 1.25 | 17 | 0 | 0 | 0 | 3 | 0 | 0 | 0 | 0 | 0 | 4.5 | 15% | 7% | 5% | 0% | 0% |
| M771 | 0 | 1.5 | 17 | 0 | 0 | 0 | 0 | 0 | 0 | 3.5 | 0 | 0 | 0 | 15% | 7% | 8% | 26% | 0% |
| M772 | 0 | 1.75 | 17 | 0 | 0 | 0 | 0 | 0 | 0 | 4.5 | 0 | 0 | 0 | 15% | 7% | 11% | 25% | 0% |
| M773 | 0 | 2.3 | 11.6 | 1.25 | 1 | 0 | 0 | 0 | 0 | 5 | 0 | 0 | 0 | 9% | 7% | 13% | 0% | 0% |
| M774 | 0 | 2.1 | 14 | 4 | 1 | 0 | 0 | 0 | 0 | 5 | 0 | 0 | 0 | 11% | 7% | 12% | 0% | 0% |
| M775 | 0 | 1.9 | 16 | 1.25 | 1 | 0 | 0 | 1 | 0 | 5 | 0 | 0 | 0 | 14% | 7% | 12% | 35% | 0% |
| M776 | 0 | 3 | 12 | 1.25 | 1 | 2 | 0 | 1 | 0 | 7 | 0 | 0 | 0 | 9% | 7% | 19% | 0% | 0% |
| M777 | 0 | 2 | 16 | 0 | 0 | 0 | 7 | 0 | 0 | 5 | 0 | 0 | 0 | 13% | 7% | 12% | 0% | 0% |
| M778 | 0 | 3.5 | 13 | 1.25 | 1 | 2 | 0 | 1 | 0 | 9 | 0 | 0 | 0 | 10% | 7% | 23% | 0% | 0% |
| M779 | 0 | 2 | 16 | 1 | 0 | 0 | 7 | 0 | 0 | 5 | 0 | 0 | 0 | 13% | 7% | 12% | 0% | 0% |
| M780 | 0 | 1.5 | 11 | 0 | 0 | 5 | 0 | 0 | 0 | 5 | 0 | 0 | 0 | 9% | 7% | 6% | 0% | 0% |
| M781 | 0 | 2.2 | 13.2 | 1.25 | 1 | 0 | 0 | 0 | 0 | 5 | 0 | 0 | 0 | 10% | 7% | 12% | 0% | 0% |
| M782 | 0 | 2 | 16 | 2 | 0 | 0 | 7 | 0 | 0 | 5 | 0 | 0 | 0 | 13% | 7% | 12% | 0% | 0% |
| M783 | 0 | 1.9 | 15.6 | 1.25 | 1 | 0 | 0 | 0 | 0 | 5 | 0 | 0 | 0 | 13% | 7% | 12% | 31% | 0% |
| M784 | 0 | 2 | 16 | 3 | 0 | 0 | 7 | 0 | 0 | 5 | 0 | 0 | 0 | 13% | 7% | 12% | 0% | 2% |
| M785 | 0 | 2 | 16 | 4 | 0 | 0 | 7 | 0 | 0 | 5 | 0 | 0 | 0 | 13% | 7% | 12% | 0% | 2% |
| M786 | 0 | 1.7 | 15 | 1.25 | 1 | 0 | 0 | 1 | 0 | 3.5 | 0 | 0 | 0 | 12% | 7% | 9% | 2% | 0% |
| M787 | 0 | 2.5 | 11 | 1.25 | 1 | 2 | 0 | 1 | 0 | 5 | 0 | 0 | 0 | 8% | 7% | 14% | 0% | 0% |
| M788 | 0 | 2.3 | 12 | 10 | 1 | 0 | 0 | 0 | 0 | 5 | 0 | 0 | 0 | 9% | 7% | 12% | 0% | 1% |
| M789 | 0 | 1.25 | 17 | 0 | 0 | 0 | 6 | 0 | 0 | 0 | 0 | 0 | 4.5 | 15% | 7% | 5% | 0% | 0% |
| M790 | 0 | 1.75 | 14 | 0 | 0 | 0 | 0 | 0 | 0 | 3.5 | 0 | 0 | 0 | 11% | 7% | 9% | 0% | 0% |
| M791 | 0 | 2 | 12 | 0 | 0 | 0 | 0 | 0 | 0 | 4 | 0 | 0 | 0 | 9% | 7% | 10% | 0% | 0% |
| M792 | 0 | 1.6 | 14 | 1.25 | 1 | 0 | 0 | 1 | 0 | 3 | 0 | 0 | 0 | 11% | 7% | 8% | 0% | 0% |
| M793 | 0 | 2 | 16 | 0 | 0 | 0 | 8 | 0 | 0 | 5 | 0 | 0 | 0 | 13% | 7% | 12% | 0% | 0% |
| M794 | 0 | 2 | 16 | 1 | 0 | 0 | 8 | 0 | 0 | 5 | 0 | 0 | 0 | 13% | 7% | 12% | 0% | 0% |
| M795 | 0 | 2.3 | 11.8 | 1.25 | 1 | 0 | 0 | 0 | 0 | 5 | 0 | 0 | 0 | 9% | 7% | 13% | 0% | 0% |
| M796 | 0 | 2 | 16 | 5 | 0 | 0 | 7 | 0 | 0 | 5 | 0 | 0 | 0 | 13% | 7% | 12% | 0% | 2% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M797 | 0 | 1.7 | 12 | 1.25 | 1 | 0 | 0 | 1 | 0 | 3 | 0 | 0 | 0 | 9% | 7% | 8% | 0% | 0% |
| M798 | 0 | 2.3 | 12 | 8.5 | 1 | 0 | 0 | 0 | 0 | 5 | 0 | 0 | 0 | 9% | 7% | 12% | 0% | 0% |
| M799 | 0 | 2 | 14 | 4 | 1 | 0 | 0 | 0 | 0 | 5 | 0 | 0 | 0 | 12% | 7% | 12% | 0% | 0% |
| M800 | 0 | 2 | 16 | 1.25 | 1 | 0 | 0 | 1 | 0 | 5 | 0 | 0 | 0 | 13% | 7% | 12% | 26% | 0% |
| M801 | 0 | 2.2 | 13.4 | 1.25 | 1 | 0 | 0 | 0 | 0 | 5 | 0 | 0 | 0 | 10% | 7% | 12% | 0% | 0% |
| M802 | 0 | 2 | 16 | 2 | 0 | 0 | 8 | 0 | 0 | 5 | 0 | 0 | 0 | 13% | 7% | 12% | 0% | 1% |
| M803 | 0 | 1.5 | 12 | 0 | 0 | 0 | 0 | 0 | 0 | 0 | 0 | 0 | 5 | 10% | 7% | 6% | 0% | 0% |
| M804 | 0 | 1.9 | 16 | 1.25 | 1 | 0 | 0 | 1 | 0 | 4.5 | 0 | 0 | 0 | 13% | 7% | 11% | 25% | 0% |
| M805 | 0 | 2 | 16 | 3 | 0 | 0 | 8 | 0 | 0 | 5 | 0 | 0 | 0 | 13% | 7% | 12% | 0% | 2% |
| M806 | 0 | 2 | 16 | 3 | 0 | 0 | 2 | 0 | 0 | 5 | 0 | 0 | 0 | 13% | 7% | 12% | 0% | 0% |
| M807 | 0 | 2 | 12 | 1.25 | 1 | 0 | 0 | 1 | 0 | 4 | 0 | 0 | 0 | 9% | 7% | 10% | 0% | 0% |
| M808 | 0 | 2.3 | 12 | 7 | 1 | 0 | 0 | 0 | 0 | 5 | 0 | 0 | 0 | 9% | 7% | 12% | 0% | 0% |
| M809 | 0 | 2 | 16 | 4 | 0 | 0 | 8 | 0 | 0 | 5 | 0 | 0 | 0 | 13% | 7% | 12% | 0% | 2% |
| M810 | 0 | 1.8 | 16 | 1.25 | 1 | 0 | 0 | 1 | 0 | 4 | 0 | 0 | 0 | 13% | 7% | 10% | 24% | 0% |
| M811 | 0 | 2 | 16 | 0 | 0 | 0 | 9 | 0 | 0 | 5 | 0 | 0 | 0 | 13% | 7% | 12% | 0% | 1% |
| M812 | 0 | 2.3 | 12 | 1.25 | 1 | 0 | 0 | 1 | 0 | 5 | 0 | 0 | 0 | 9% | 7% | 13% | 0% | 0% |
| M813 | 0 | 1.9 | 15.8 | 1.25 | 1 | 0 | 0 | 0 | 0 | 5 | 0 | 0 | 0 | 13% | 7% | 12% | 31% | 0% |
| M814 | 0 | 1.25 | 17 | 1 | 0 | 0 | 7 | 0 | 0 | 0 | 0 | 0 | 4.5 | 15% | 7% | 5% | 0% | 1% |
| M815 | 0 | 2 | 16 | 5 | 0 | 0 | 8 | 0 | 0 | 5 | 0 | 0 | 0 | 13% | 7% | 12% | 0% | 2% |
| M816 | 0 | 2 | 14 | 5.5 | 1 | 0 | 0 | 0 | 0 | 5 | 0 | 0 | 0 | 12% | 7% | 12% | 0% | 0% |
| M817 | 0 | 2.3 | 12 | 5.5 | 1 | 0 | 0 | 0 | 0 | 5 | 0 | 0 | 0 | 9% | 7% | 12% | 0% | 0% |
| M818 | 0 | 1.25 | 17 | 0 | 0 | 0 | 7 | 0 | 0 | 0 | 0 | 0 | 4.5 | 15% | 7% | 5% | 0% | 1% |
| M819 | 0 | 2 | 16 | 1 | 0 | 0 | 9 | 0 | 0 | 5 | 0 | 0 | 0 | 13% | 7% | 12% | 0% | 1% |
| M820 | 0 | 1.8 | 13 | 1.25 | 1 | 0 | 0 | 1 | 0 | 3.5 | 0 | 0 | 0 | 10% | 7% | 9% | 0% | 0% |
| M821 | 0 | 2.3 | 12 | 4 | 1 | 0 | 0 | 0 | 0 | 5 | 0 | 0 | 0 | 9% | 7% | 12% | 0% | 0% |
| M822 | 0 | 2 | 16 | 2 | 0 | 0 | 9 | 0 | 0 | 5 | 0 | 0 | 0 | 13% | 7% | 12% | 0% | 1% |
| M823 | 0 | 2.2 | 13.6 | 1.25 | 1 | 0 | 0 | 0 | 0 | 5 | 0 | 0 | 0 | 11% | 7% | 12% | 0% | 0% |
| M824 | 0 | 2.3 | 12 | 2.5 | 1 | 0 | 0 | 0 | 0 | 5 | 0 | 0 | 0 | 9% | 7% | 12% | 0% | 0% |
| M825 | 0 | 2.3 | 12 | 1.25 | 1 | 0 | 0 | 0 | 0 | 5 | 0 | 0 | 0 | 9% | 7% | 13% | 0% | 0% |
| M826 | 0 | 2.3 | 12 | 1 | 1 | 0 | 0 | 0 | 0 | 5 | 0 | 0 | 0 | 9% | 7% | 13% | 0% | 0% |
| M827 | 0 | 2 | 14 | 7 | 1 | 0 | 0 | 0 | 0 | 5 | 0 | 0 | 0 | 12% | 7% | 12% | 0% | 0% |
| M828 | 0 | 2 | 15 | 0 | 0 | 0 | 0 | 0 | 0 | 4.5 | 0 | 0 | 0 | 12% | 7% | 11% | 0% | 0% |
| M829 | 0 | 2 | 16 | 3 | 0 | 0 | 9 | 0 | 0 | 5 | 0 | 0 | 0 | 13% | 7% | 12% | 0% | 2% |
| M830 | 0 | 2 | 16 | 0 | 0 | 0 | 10 | 0 | 0 | 5 | 0 | 0 | 0 | 13% | 7% | 12% | 0% | 1% |
| M831 | 0 | 1.9 | 14 | 1.25 | 1 | 0 | 0 | 1 | 0 | 4 | 0 | 0 | 0 | 11% | 7% | 10% | 0% | 0% |
| M832 | 0 | 2 | 16 | 4 | 0 | 0 | 9 | 0 | 0 | 5 | 0 | 0 | 0 | 13% | 7% | 12% | 0% | 2% |
| M833 | 0 | 2 | 16 | 1 | 0 | 0 | 10 | 0 | 0 | 5 | 0 | 0 | 0 | 13% | 7% | 12% | 0% | 1% |
| M834 | 0 | 2 | 16 | 5 | 0 | 0 | 9 | 0 | 0 | 5 | 0 | 0 | 0 | 13% | 7% | 12% | 0% | 3% |
| M835 | 0 | 2 | 14 | 8.5 | 1 | 0 | 0 | 0 | 0 | 5 | 0 | 0 | 0 | 12% | 7% | 12% | 0% | 0% |
| M836 | 0 | 1.25 | 17 | 1 | 0 | 0 | 8 | 0 | 0 | 0 | 0 | 0 | 4.5 | 15% | 7% | 5% | 0% | 1% |
| M837 | 0 | 2 | 15 | 1.25 | 1 | 0 | 0 | 1 | 0 | 4.5 | 0 | 0 | 0 | 12% | 7% | 11% | 0% | 0% |
| M838 | 0 | 1.9 | 16 | 1 | 1 | 0 | 0 | 1 | 0 | 5 | 0 | 0 | 0 | 14% | 7% | 12% | 32% | 0% |
| M839 | 0 | 2.1 | 13 | 1.25 | 1 | 0 | 0 | 1 | 0 | 4.5 | 0 | 0 | 0 | 10% | 7% | 11% | 0% | 0% |
| M840 | 0 | 1.25 | 17 | 0 | 0 | 0 | 8 | 0 | 0 | 0 | 0 | 0 | 4.5 | 15% | 7% | 5% | 0% | 1% |
| M841 | 0 | 2 | 16 | 6 | 0 | 0 | 9 | 0 | 0 | 5 | 0 | 0 | 0 | 13% | 7% | 12% | 0% | 3% |
| M842 | 0 | 1.9 | 16 | 1.25 | 1 | 0 | 0 | 0 | 0 | 5 | 0 | 0 | 0 | 14% | 7% | 12% | 30% | 0% |
| M843 | 0 | 2 | 16 | 2 | 0 | 0 | 10 | 0 | 0 | 5 | 0 | 0 | 0 | 13% | 7% | 12% | 0% | 1% |
| M844 | 0 | 2.1 | 16 | 1.25 | 1 | 0 | 0 | 1 | 0 | 5 | 0 | 0 | 0 | 13% | 7% | 12% | 18% | 0% |
| M845 | 0 | 2.2 | 13.8 | 1.25 | 1 | 0 | 0 | 0 | 0 | 5 | 0 | 0 | 0 | 11% | 7% | 12% | 0% | 0% |
| M846 | 0 | 1.8 | 16 | 1.25 | 1 | 0 | 0 | 1 | 0 | 4.5 | 0 | 0 | 0 | 14% | 7% | 11% | 34% | 0% |
| M847 | 0 | 2.2 | 14 | 5.5 | 1 | 0 | 0 | 0 | 0 | 5 | 0 | 0 | 0 | 11% | 7% | 12% | 0% | 0% |
| M848 | 0 | 1.25 | 17 | 1 | 0 | 0 | 6 | 0 | 0 | 0 | 0 | 0 | 4.5 | 15% | 7% | 5% | 0% | 0% |
| M849 | 0 | 2.25 | 13 | 0 | 0 | 0 | 0 | 0 | 0 | 5 | 0 | 0 | 0 | 10% | 7% | 12% | 0% | 0% |
| M850 | 0 | 2 | 14 | 10 | 1 | 0 | 0 | 0 | 0 | 5 | 0 | 0 | 0 | 12% | 7% | 12% | 1% | 0% |
| M851 | 0 | 1.7 | 16 | 1.25 | 1 | 0 | 0 | 1 | 0 | 4 | 0 | 0 | 0 | 13% | 7% | 10% | 33% | 0% |
| M852 | 0 | 2 | 16 | 3 | 0 | 0 | 10 | 0 | 0 | 5 | 0 | 0 | 0 | 13% | 7% | 12% | 0% | 3% |
| M853 | 0 | 2.2 | 14 | 4 | 1 | 0 | 0 | 0 | 0 | 5 | 0 | 0 | 0 | 11% | 7% | 12% | 0% | 0% |
| M854 | 0 | 1.9 | 16 | 2.5 | 1 | 0 | 0 | 0 | 0 | 5 | 0 | 0 | 0 | 14% | 7% | 12% | 26% | 0% |
| M855 | 0 | 2 | 14.6 | 1.25 | 1 | 0 | 0 | 0 | 0 | 5 | 0 | 0 | 0 | 12% | 7% | 12% | 0% | 0% |
| M856 | 0 | 1.25 | 17 | 0 | 0 | 0 | 2 | 0 | 0 | 0 | 0 | 0 | 4.5 | 15% | 7% | 5% | 4% | 0% |
| M857 | 0 | 1.5 | 11 | 0 | 0 | 0 | 0 | 0 | 0 | 0 | 0 | 0 | 4.5 | 9% | 7% | 5% | 0% | 0% |
| M858 | 0 | 2.3 | 12.2 | 1.25 | 1 | 0 | 0 | 0 | 0 | 5 | 0 | 0 | 0 | 9% | 7% | 12% | 0% | 0% |
| M859 | 0 | 1.6 | 16 | 1.25 | 1 | 0 | 0 | 1 | 0 | 3.5 | 0 | 0 | 0 | 13% | 7% | 9% | 32% | 0% |
| M860 | 0 | 2 | 16 | 4 | 0 | 0 | 10 | 0 | 0 | 5 | 0 | 0 | 0 | 13% | 7% | 12% | 0% | 3% |
| M861 | 0 | 2.2 | 14 | 2.5 | 1 | 0 | 0 | 0 | 0 | 5 | 0 | 0 | 0 | 11% | 7% | 12% | 0% | 0% |
| M862 | 0 | 2 | 16 | 5 | 0 | 0 | 10 | 0 | 0 | 5 | 0 | 0 | 0 | 13% | 7% | 12% | 0% | 3% |
| M863 | 0 | 1.5 | 16 | 1.25 | 1 | 0 | 0 | 1 | 0 | 3 | 0 | 0 | 0 | 13% | 7% | 7% | 31% | 0% |
| M864 | 0 | 1.25 | 17 | 1 | 0 | 0 | 9 | 0 | 0 | 0 | 0 | 0 | 4.5 | 15% | 7% | 5% | 0% | 1% |
| M865 | 0 | 1.9 | 16 | 4 | 1 | 0 | 0 | 0 | 0 | 5 | 0 | 0 | 0 | 14% | 7% | 12% | 35% | 0% |
| M866 | 0 | 1.25 | 17 | 0 | 0 | 0 | 9 | 0 | 0 | 0 | 0 | 0 | 4.5 | 15% | 7% | 5% | 0% | 1% |
| M867 | 0 | 1.25 | 17 | 2 | 0 | 0 | 9 | 0 | 0 | 0 | 0 | 0 | 4.5 | 15% | 7% | 5% | 0% | 1% |
| M868 | 0 | 1.7 | 16 | 1.25 | 1 | 0 | 0 | 1 | 0 | 3.5 | 0 | 0 | 0 | 13% | 7% | 9% | 23% | 0% |
| M869 | 0 | 2.1 | 14.8 | 1.25 | 1 | 0 | 0 | 0 | 0 | 5 | 0 | 0 | 0 | 12% | 7% | 12% | 0% | 0% |
| M870 | 0 | 2.2 | 14 | 1.25 | 1 | 0 | 0 | 0 | 0 | 5 | 0 | 0 | 0 | 11% | 7% | 12% | 0% | 0% |
| M871 | 0 | 2 | 16 | 6 | 0 | 0 | 10 | 0 | 0 | 5 | 0 | 0 | 0 | 13% | 7% | 12% | 0% | 3% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M872 | 0 | 2.2 | 14 | 1.25 | 1 | 0 | 0 | 1 | 0 | 5 | 0 | 0 | 0 | 11% | 7% | 12% | 0% | 0% |
| M873 | 0 | 2.2 | 14 | 1 | 1 | 0 | 0 | 0 | 0 | 5 | 0 | 0 | 0 | 11% | 7% | 12% | 0% | 0% |
| M874 | 0 | 1.9 | 16.2 | 1.25 | 1 | 0 | 0 | 0 | 0 | 5 | 0 | 0 | 0 | 14% | 7% | 12% | 30% | 0% |
| M875 | 0 | 2 | 16 | 4 | 0 | 0 | 4 | 0 | 0 | 5 | 0 | 0 | 0 | 13% | 7% | 12% | 0% | 1% |
| M876 | 0 | 1.75 | 12 | 0 | 0 | 0 | 0 | 0 | 0 | 3 | 0 | 0 | 0 | 9% | 7% | 8% | 0% | 0% |
| M877 | 0 | 1.9 | 16 | 5.5 | 1 | 0 | 0 | 0 | 0 | 5 | 0 | 0 | 0 | 14% | 7% | 12% | 29% | 0% |
| M878 | 0 | 1.6 | 15 | 1.25 | 1 | 0 | 0 | 1 | 0 | 3 | 0 | 0 | 0 | 12% | 7% | 7% | 0% | 0% |
| M879 | 0 | 1.75 | 15 | 0 | 0 | 0 | 0 | 0 | 0 | 3.5 | 0 | 0 | 0 | 12% | 7% | 8% | 0% | 0% |
| M880 | 0 | 2.3 | 12.4 | 1.25 | 1 | 0 | 0 | 0 | 0 | 5 | 0 | 0 | 0 | 9% | 7% | 12% | 0% | 0% |
| M881 | 0 | 1.5 | 12 | 0 | 0 | 5 | 0 | 0 | 0 | 0 | 0 | 0 | 0 | 9% | 7% | 6% | 0% | 0% |
| M882 | 0 | 1.5 | 13 | 0 | 0 | 0 | 0 | 0 | 0 | 0 | 0 | 0 | 5 | 10% | 7% | 6% | 0% | 0% |
| M883 | 0 | 1.25 | 17 | 2 | 0 | 0 | 10 | 0 | 0 | 0 | 0 | 0 | 4.5 | 14% | 7% | 5% | 0% | 2% |
| M884 | 0 | 1.9 | 16 | 7 | 1 | 0 | 0 | 0 | 0 | 5 | 0 | 0 | 0 | 14% | 7% | 12% | 29% | 0% |
| M885 | 0 | 2.2 | 14.2 | 1.25 | 1 | 0 | 0 | 0 | 0 | 5 | 0 | 0 | 0 | 11% | 7% | 12% | 0% | 0% |
| M886 | 0 | 1.25 | 17 | 1 | 0 | 0 | 10 | 0 | 0 | 0 | 0 | 0 | 4.5 | 14% | 7% | 5% | 0% | 2% |
| M887 | 0 | 1.25 | 17 | 0 | 0 | 0 | 10 | 0 | 0 | 0 | 0 | 0 | 4.5 | 14% | 7% | 5% | 0% | 2% |
| M888 | 0 | 1.9 | 16 | 8.5 | 1 | 0 | 0 | 0 | 0 | 5 | 0 | 0 | 0 | 14% | 7% | 12% | 33% | 0% |
| M889 | 0 | 1.9 | 16.4 | 1.25 | 1 | 0 | 0 | 0 | 0 | 5 | 0 | 0 | 0 | 14% | 7% | 12% | 30% | 0% |
| M890 | 0 | 1.9 | 16 | 10 | 1 | 0 | 0 | 0 | 0 | 5 | 0 | 0 | 0 | 14% | 7% | 11% | 29% | 0% |
| M891 | 0 | 1.9 | 12 | 1.25 | 1 | 0 | 0 | 1 | 0 | 3.5 | 0 | 0 | 0 | 9% | 7% | 9% | 0% | 0% |
| M892 | 0 | 2.2 | 14.4 | 1.25 | 1 | 0 | 0 | 0 | 0 | 5 | 0 | 0 | 0 | 11% | 7% | 12% | 0% | 0% |
| M893 | 0 | 2.2 | 12 | 1.25 | 1 | 0 | 0 | 1 | 0 | 4.5 | 0 | 0 | 0 | 9% | 7% | 11% | 0% | 0% |
| M894 | 0 | 2.3 | 12.6 | 1.25 | 1 | 0 | 0 | 0 | 0 | 5 | 0 | 0 | 0 | 9% | 7% | 12% | 0% | 0% |
| M895 | 0 | 3 | 13 | 1.25 | 1 | 2 | 0 | 1 | 0 | 7 | 0 | 0 | 0 | 10% | 7% | 19% | 0% | 0% |
| M896 | 0 | 3.5 | 14 | 1.25 | 1 | 2 | 0 | 1 | 0 | 9 | 0 | 0 | 0 | 11% | 7% | 23% | 0% | 1% |
| M897 | 0 | 2 | 16 | 0 | 0 | 0 | 0 | 0 | 0 | 4.5 | 0 | 0 | 0 | 13% | 7% | 11% | 0% | 0% |
| M898 | 0 | 2 | 16 | 5 | 0 | 0 | 6 | 0 | 0 | 5 | 0 | 0 | 0 | 13% | 7% | 12% | 0% | 2% |
| M899 | 0 | 1.5 | 11 | 0 | 0 | 4.5 | 0 | 0 | 0 | 0 | 0 | 0 | 0 | 8% | 7% | 5% | 0% | 0% |
| M900 | 0 | 1.7 | 13 | 1.25 | 1 | 0 | 0 | 1 | 0 | 3 | 0 | 0 | 0 | 10% | 7% | 8% | 0% | 0% |
| M901 | 0 | 2 | 13 | 0 | 0 | 0 | 0 | 0 | 0 | 4 | 0 | 0 | 0 | 10% | 7% | 10% | 0% | 0% |
| M902 | 0 | 2 | 14.8 | 1.25 | 1 | 0 | 0 | 0 | 0 | 5 | 0 | 0 | 0 | 12% | 7% | 12% | 0% | 0% |
| M903 | 0 | 1.9 | 17 | 1.25 | 1 | 0 | 0 | 1 | 0 | 5 | 0 | 0 | 0 | 15% | 7% | 12% | 36% | 0% |
| M904 | 0 | 1.8 | 14 | 1.25 | 1 | 0 | 0 | 1 | 0 | 3.5 | 0 | 0 | 0 | 11% | 7% | 9% | 0% | 0% |
| M905 | 0 | 2 | 16 | 1.25 | 1 | 0 | 0 | 1 | 0 | 4.5 | 0 | 0 | 0 | 13% | 7% | 11% | 16% | 0% |
| M906 | 0 | 1.9 | 15 | 1.25 | 1 | 0 | 0 | 1 | 0 | 4 | 0 | 0 | 0 | 12% | 7% | 10% | 0% | 0% |
| M907 | 0 | 2.2 | 14.6 | 1.25 | 1 | 0 | 0 | 0 | 0 | 5 | 0 | 0 | 0 | 11% | 7% | 12% | 0% | 0% |
| M908 | 0 | 1.9 | 16.6 | 1.25 | 1 | 0 | 0 | 0 | 0 | 5 | 0 | 0 | 0 | 14% | 7% | 12% | 32% | 0% |
| M909 | 0 | 2.5 | 12 | 1.25 | 1 | 2 | 0 | 1 | 0 | 5 | 0 | 0 | 0 | 9% | 7% | 14% | 0% | 0% |
| M910 | 0 | 2.3 | 12.8 | 1.25 | 1 | 0 | 0 | 0 | 0 | 5 | 0 | 0 | 0 | 9% | 7% | 12% | 0% | 0% |
| M911 | 0 | 2 | 13 | 1.25 | 1 | 0 | 0 | 1 | 0 | 4 | 0 | 0 | 0 | 10% | 7% | 10% | 0% | 0% |
| M912 | 0 | 4 | 12 | 1.25 | 1 | 2 | 0 | 1 | 0 | 10 | 0 | 0 | 0 | 8% | 7% | 25% | 0% | 0% |
| M913 | 0 | 2 | 16 | 6 | 0 | 0 | 8 | 0 | 0 | 5 | 0 | 0 | 0 | 13% | 7% | 12% | 0% | 2% |
| M914 | 0 | 1.25 | 17 | 1 | 0 | 0 | 5 | 0 | 0 | 0 | 0 | 0 | 4.5 | 15% | 7% | 5% | 0% | 0% |
| M915 | 0 | 1.25 | 17 | 0 | 0 | 0 | 1 | 0 | 0 | 0 | 0 | 0 | 4.5 | 15% | 7% | 5% | 17% | 0% |
| M916 | 0 | 2.2 | 14.8 | 1.25 | 1 | 0 | 0 | 0 | 0 | 5 | 0 | 0 | 0 | 12% | 7% | 12% | 0% | 0% |
| M917 | 0 | 2 | 16 | 3 | 0 | 0 | 1 | 0 | 0 | 5 | 0 | 0 | 0 | 13% | 7% | 12% | 0% | 0% |
| M918 | 0 | 2.3 | 13 | 1.25 | 1 | 0 | 0 | 1 | 0 | 5 | 0 | 0 | 0 | 10% | 7% | 12% | 0% | 0% |
| M919 | 0 | 1.6 | 16 | 1.25 | 1 | 0 | 0 | 1 | 0 | 3 | 0 | 0 | 0 | 13% | 8% | 7% | 22% | 0% |
| M920 | 0 | 1.5 | 14 | 0 | 0 | 0 | 0 | 0 | 0 | 0 | 0 | 0 | 5 | 11% | 8% | 6% | 3% | 0% |
| M921 | 0 | 2.1 | 14 | 1.25 | 1 | 0 | 0 | 1 | 0 | 4.5 | 0 | 0 | 0 | 11% | 8% | 11% | 0% | 0% |
| M922 | 0 | 1.5 | 12 | 0 | 0 | 0 | 0 | 0 | 0 | 0 | 0 | 0 | 4.5 | 9% | 8% | 5% | 0% | 0% |
| M923 | 0 | 1.75 | 16 | 0 | 0 | 0 | 0 | 0 | 0 | 3.5 | 0 | 0 | 0 | 13% | 8% | 8% | 0% | 0% |
| M924 | 0 | 1.9 | 16.8 | 1.25 | 1 | 0 | 0 | 0 | 0 | 5 | 0 | 0 | 0 | 14% | 8% | 12% | 36% | 0% |
| M925 | 0 | 2 | 15 | 1.25 | 1 | 0 | 0 | 0 | 0 | 5 | 0 | 0 | 0 | 12% | 8% | 12% | 3% | 0% |
| M926 | 0 | 1.25 | 17 | 0 | 0 | 4.5 | 0 | 0 | 0 | 0 | 0 | 0 | 0 | 15% | 8% | 5% | 34% | 0% |
| M927 | 0 | 2.4 | 11.6 | 1.25 | 1 | 0 | 0 | 0 | 0 | 5 | 0 | 0 | 0 | 8% | 8% | 13% | 0% | 0% |
| M928 | 0 | 2.3 | 13 | 1.25 | 1 | 0 | 0 | 0 | 0 | 5 | 0 | 0 | 0 | 10% | 8% | 12% | 0% | 0% |
| M929 | 0 | 1.25 | 17 | 2 | 0 | 0 | 8 | 0 | 0 | 0 | 0 | 0 | 4.5 | 14% | 8% | 5% | 0% | 1% |
| M930 | 0 | 3.5 | 16 | 1.25 | 1 | 2 | 0 | 1 | 0 | 10 | 0 | 0 | 0 | 14% | 8% | 24% | 11% | 0% |
| M931 | 0 | 2.2 | 15 | 1.25 | 1 | 0 | 0 | 0 | 0 | 5 | 0 | 0 | 0 | 12% | 8% | 12% | 0% | 0% |
| M932 | 0 | 2 | 16 | 0 | 1 | 0 | 10 | 0 | 0 | 5 | 0 | 0 | 0 | 13% | 8% | 12% | 0% | 1% |
| M933 | 0 | 2 | 16 | 7 | 0 | 0 | 10 | 0 | 0 | 5 | 0 | 0 | 0 | 13% | 8% | 12% | 0% | 3% |
| M934 | 0 | 2.25 | 14 | 0 | 0 | 0 | 0 | 0 | 0 | 5 | 0 | 0 | 0 | 10% | 8% | 12% | 0% | 0% |
| M935 | 0 | 2.2 | 15 | 1.25 | 1 | 0 | 0 | 1 | 0 | 5 | 0 | 0 | 0 | 12% | 8% | 12% | 0% | 0% |
| M936 | 0 | 1.5 | 13 | 0 | 0 | 5 | 0 | 0 | 0 | 0 | 0 | 0 | 0 | 10% | 8% | 6% | 0% | 0% |
| M937 | 0 | 2.1 | 15 | 1.25 | 1 | 0 | 0 | 0 | 0 | 5 | 0 | 0 | 0 | 12% | 8% | 12% | 0% | 0% |
| M938 | 0 | 2 | 17 | 0 | 0 | 0 | 0 | 0 | 0 | 4.5 | 0 | 0 | 0 | 14% | 8% | 11% | 0% | 0% |
| M939 | 0 | 2.3 | 13.2 | 1.25 | 1 | 0 | 0 | 0 | 0 | 5 | 0 | 0 | 0 | 10% | 8% | 12% | 0% | 0% |
| M940 | 0 | 2.4 | 11.8 | 1.25 | 1 | 0 | 0 | 0 | 0 | 5 | 0 | 0 | 0 | 8% | 8% | 13% | 0% | 0% |
| M941 | 0 | 2.25 | 12 | 0 | 0 | 0 | 0 | 0 | 0 | 4.5 | 0 | 0 | 0 | 8% | 8% | 11% | 0% | 0% |
| M942 | 0 | 2 | 15.2 | 1.25 | 1 | 0 | 0 | 0 | 0 | 5 | 0 | 0 | 0 | 12% | 8% | 12% | 8% | 0% |
| M943 | 0 | 2.2 | 15.2 | 1.25 | 1 | 0 | 0 | 0 | 0 | 5 | 0 | 0 | 0 | 12% | 8% | 12% | 0% | 0% |
| M944 | 0 | 1.75 | 13 | 0 | 0 | 0 | 0 | 0 | 0 | 3 | 0 | 0 | 0 | 9% | 8% | 8% | 0% | 0% |
| M945 | 0 | 3 | 16 | 1.25 | 1 | 2 | 0 | 1 | 0 | 8 | 0 | 0 | 0 | 14% | 8% | 20% | 15% | 0% |
| M946 | 0 | 2.4 | 12 | 10 | 1 | 0 | 0 | 0 | 0 | 5 | 0 | 0 | 0 | 9% | 8% | 12% | 0% | 2% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M947 | 0 | 2 | 16 | 0 | 1 | 0 | 9 | 0 | 0 | 5 | 0 | 0 | 0 | 13% | 8% | 12% | 0% | 1% |
| M948 | 0 | 2.4 | 12 | 1.25 | 1 | 0 | 0 | 1 | 0 | 5 | 0 | 0 | 0 | 8% | 8% | 13% | 0% | 0% |
| M949 | 0 | 2.4 | 12 | 8.5 | 1 | 0 | 0 | 0 | 0 | 5 | 0 | 0 | 0 | 9% | 8% | 12% | 0% | 2% |
| M950 | 0 | 2 | 16 | 4 | 0 | 0 | 3 | 0 | 0 | 5 | 0 | 0 | 0 | 13% | 8% | 12% | 0% | 0% |
| M951 | 0 | 2.1 | 12 | 1.25 | 1 | 0 | 0 | 1 | 0 | 4 | 0 | 0 | 0 | 9% | 8% | 10% | 0% | 0% |
| M952 | 0 | 1.8 | 12 | 1.25 | 1 | 0 | 0 | 1 | 0 | 3 | 0 | 0 | 0 | 9% | 8% | 8% | 0% | 0% |
| M953 | 0 | 2.3 | 13.4 | 1.25 | 1 | 0 | 0 | 0 | 0 | 5 | 0 | 0 | 0 | 10% | 8% | 12% | 0% | 0% |
| M954 | 0 | 2.4 | 12 | 7 | 1 | 0 | 0 | 0 | 0 | 5 | 0 | 0 | 0 | 9% | 8% | 12% | 0% | 1% |
| M955 | 0 | 1.9 | 16 | 1.25 | 1 | 0 | 0 | 1 | 0 | 4 | 0 | 0 | 0 | 13% | 8% | 10% | 15% | 1% |
| M956 | 0 | 2.4 | 12 | 5.5 | 1 | 0 | 0 | 0 | 0 | 5 | 0 | 0 | 0 | 9% | 8% | 12% | 0% | 1% |
| M957 | 0 | 1.5 | 15 | 0 | 0 | 0 | 0 | 0 | 0 | 0 | 0 | 0 | 5 | 12% | 8% | 6% | 1% | 0% |
| M958 | 0 | 1.8 | 15 | 1.25 | 1 | 0 | 0 | 1 | 0 | 3.5 | 0 | 0 | 0 | 12% | 8% | 9% | 0% | 0% |
| M959 | 0 | 1.8 | 17 | 1.25 | 1 | 0 | 0 | 1 | 0 | 4.5 | 0 | 0 | 0 | 14% | 8% | 11% | 35% | 0% |
| M960 | 0 | 1.7 | 14 | 1.25 | 1 | 0 | 0 | 1 | 0 | 3 | 0 | 0 | 0 | 11% | 8% | 8% | 0% | 0% |
| M961 | 0 | 2.4 | 12 | 4 | 1 | 0 | 0 | 0 | 0 | 5 | 0 | 0 | 0 | 8% | 8% | 12% | 0% | 0% |
| M962 | 0 | 2.4 | 12 | 1 | 1 | 0 | 0 | 0 | 0 | 5 | 0 | 0 | 0 | 8% | 8% | 13% | 0% | 0% |
| M963 | 0 | 2.4 | 12 | 1.25 | 1 | 0 | 0 | 0 | 0 | 5 | 0 | 0 | 0 | 8% | 8% | 13% | 0% | 0% |
| M964 | 0 | 2.4 | 12 | 2.5 | 1 | 0 | 0 | 0 | 0 | 5 | 0 | 0 | 0 | 8% | 8% | 13% | 0% | 0% |
| M965 | 0 | 1.75 | 17 | 0 | 0 | 0 | 0 | 0 | 0 | 3.5 | 0 | 0 | 0 | 14% | 8% | 8% | 0% | 0% |
| M966 | 0 | 1.5 | 12 | 0 | 0 | 4.5 | 0 | 0 | 0 | 0 | 0 | 0 | 0 | 9% | 8% | 5% | 0% | 0% |
| M967 | 0 | 2 | 15.4 | 1.25 | 1 | 0 | 0 | 0 | 0 | 5 | 0 | 0 | 0 | 13% | 8% | 12% | 13% | 0% |
| M968 | 0 | 1.9 | 13 | 1.25 | 1 | 0 | 0 | 1 | 0 | 3.5 | 0 | 0 | 0 | 10% | 8% | 9% | 0% | 0% |
| M969 | 0 | 2.3 | 13.6 | 1.25 | 1 | 0 | 0 | 0 | 0 | 5 | 0 | 0 | 0 | 10% | 8% | 12% | 0% | 0% |
| M970 | 0 | 2 | 14 | 0 | 0 | 0 | 0 | 0 | 0 | 4 | 0 | 0 | 0 | 10% | 8% | 10% | 0% | 0% |
| M971 | 0 | 3.5 | 15 | 1.25 | 1 | 2 | 0 | 1 | 0 | 9 | 0 | 0 | 0 | 12% | 8% | 22% | 0% | 2% |
| M972 | 0 | 3 | 14 | 1.25 | 1 | 2 | 0 | 1 | 0 | 7 | 0 | 0 | 0 | 11% | 8% | 18% | 0% | 1% |
| M973 | 0 | 2 | 16 | 0 | 1 | 0 | 8 | 0 | 0 | 5 | 0 | 0 | 0 | 13% | 8% | 12% | 0% | 0% |
| M974 | 0 | 2.5 | 16 | 1.25 | 1 | 2 | 0 | 1 | 0 | 6 | 0 | 0 | 0 | 14% | 8% | 16% | 20% | 0% |
| M975 | 0 | 2 | 16 | 5 | 0 | 0 | 5 | 0 | 0 | 5 | 0 | 0 | 0 | 13% | 8% | 12% | 0% | 1% |
| M976 | 0 | 1.25 | 17 | 0 | 0 | 0 | 0 | 0 | 0 | 0 | 0 | 0 | 4.5 | 15% | 8% | 5% | 30% | 0% |
| M977 | 0 | 2 | 16 | 3 | 0 | 0 | 0 | 0 | 0 | 5 | 0 | 0 | 0 | 13% | 8% | 12% | 1% | 0% |
| M978 | 0 | 1.25 | 17 | 3 | 0 | 0 | 10 | 0 | 0 | 0 | 0 | 0 | 4.5 | 14% | 8% | 5% | 0% | 2% |
| M979 | 0 | 2 | 16 | 1 | 1 | 0 | 10 | 0 | 0 | 5 | 0 | 0 | 0 | 13% | 8% | 12% | 0% | 1% |
| M980 | 0 | 1.5 | 13 | 0 | 0 | 0 | 0 | 0 | 0 | 0 | 0 | 0 | 4.5 | 10% | 8% | 5% | 0% | 0% |
| M981 | 0 | 1.25 | 17 | 1 | 0 | 0 | 4 | 0 | 0 | 0 | 0 | 0 | 4.5 | 14% | 8% | 5% | 0% | 0% |
| M982 | 0 | 2.2 | 13 | 1.25 | 1 | 0 | 0 | 1 | 0 | 4.5 | 0 | 0 | 0 | 9% | 8% | 11% | 0% | 0% |
| M983 | 0 | 2.1 | 14 | 5.5 | 1 | 0 | 0 | 0 | 0 | 5 | 0 | 0 | 0 | 11% | 8% | 12% | 0% | 0% |
| M984 | 0 | 2.3 | 14 | 7 | 1 | 0 | 0 | 0 | 0 | 5 | 0 | 0 | 0 | 11% | 8% | 12% | 0% | 2% |
| M985 | 0 | 2 | 14 | 1.25 | 1 | 0 | 0 | 1 | 0 | 4 | 0 | 0 | 0 | 11% | 8% | 10% | 0% | 0% |
| M986 | 0 | 2.4 | 12.2 | 1.25 | 1 | 0 | 0 | 0 | 0 | 5 | 0 | 0 | 0 | 9% | 8% | 13% | 0% | 0% |
| M987 | 0 | 2.5 | 13 | 1.25 | 1 | 2 | 0 | 1 | 0 | 5 | 0 | 0 | 0 | 10% | 8% | 14% | 0% | 1% |
| M988 | 0 | 2.3 | 13.8 | 1.25 | 1 | 0 | 0 | 0 | 0 | 5 | 0 | 0 | 0 | 10% | 8% | 12% | 0% | 0% |
| M989 | 0 | 2.3 | 14 | 5.5 | 1 | 0 | 0 | 0 | 0 | 5 | 0 | 0 | 0 | 11% | 8% | 12% | 0% | 1% |
| M990 | 0 | 2 | 16 | 6 | 0 | 0 | 7 | 0 | 0 | 5 | 0 | 0 | 0 | 13% | 8% | 12% | 0% | 2% |
| M991 | 0 | 1.5 | 14 | 0 | 0 | 5 | 0 | 0 | 0 | 0 | 0 | 0 | 0 | 11% | 8% | 6% | 0% | 0% |
| M992 | 0 | 2.1 | 15 | 1.25 | 1 | 0 | 0 | 1 | 0 | 4.5 | 0 | 0 | 0 | 12% | 8% | 11% | 0% | 1% |
| M993 | 0 | 2 | 15.6 | 1.25 | 1 | 0 | 0 | 0 | 0 | 5 | 0 | 0 | 0 | 13% | 8% | 12% | 18% | 0% |
| M994 | 0 | 1.25 | 17 | 2 | 0 | 0 | 7 | 0 | 0 | 0 | 0 | 0 | 4.5 | 14% | 8% | 5% | 0% | 1% |
| M995 | 0 | 2 | 16 | 4 | 0 | 0 | 0 | 0 | 0 | 5 | 0 | 0 | 0 | 13% | 8% | 12% | 8% | 0% |
| M996 | 0 | 2.2 | 16 | 1.25 | 1 | 0 | 0 | 1 | 0 | 5 | 0 | 0 | 0 | 13% | 8% | 12% | 9% | 1% |
| M997 | 0 | 2.3 | 14 | 4 | 1 | 0 | 0 | 0 | 0 | 5 | 0 | 0 | 0 | 10% | 8% | 12% | 0% | 1% |
| M998 | 0 | 1.5 | 16 | 0 | 0 | 0 | 0 | 0 | 0 | 0 | 0 | 0 | 5 | 13% | 8% | 6% | 0% | 0% |
| M999 | 0 | 2 | 16 | 7 | 0 | 0 | 9 | 0 | 0 | 5 | 0 | 0 | 0 | 13% | 8% | 12% | 0% | 3% |
| M1000 | 0 | 2 | 16 | 0 | 1 | 0 | 7 | 0 | 0 | 5 | 0 | 0 | 0 | 13% | 8% | 12% | 0% | 0% |
| M1001 | 0 | 2.3 | 14 | 2.5 | 1 | 0 | 0 | 0 | 0 | 5 | 0 | 0 | 0 | 10% | 8% | 12% | 0% | 0% |
| M1002 | 0 | 2.25 | 15 | 0 | 0 | 0 | 0 | 0 | 0 | 5 | 0 | 0 | 0 | 11% | 8% | 12% | 0% | 0% |
| M1003 | 0 | 2.3 | 14 | 1.25 | 1 | 0 | 0 | 1 | 0 | 5 | 0 | 0 | 0 | 10% | 8% | 12% | 0% | 1% |
| M1004 | 0 | 2.3 | 14 | 1.25 | 1 | 0 | 0 | 0 | 0 | 5 | 0 | 0 | 0 | 10% | 8% | 12% | 0% | 0% |
| M1005 | 0 | 2.4 | 12.4 | 1.25 | 1 | 0 | 0 | 0 | 0 | 5 | 0 | 0 | 0 | 9% | 8% | 13% | 0% | 0% |
| M1006 | 0 | 2.3 | 14 | 1 | 1 | 0 | 0 | 0 | 0 | 5 | 0 | 0 | 0 | 10% | 8% | 12% | 0% | 0% |
| M1007 | 0 | 2 | 16 | 1 | 1 | 0 | 9 | 0 | 0 | 5 | 0 | 0 | 0 | 13% | 8% | 12% | 0% | 1% |
| M1008 | 0 | 2 | 12 | 0 | 0 | 0 | 0 | 0 | 0 | 3.5 | 0 | 0 | 0 | 8% | 8% | 9% | 0% | 0% |
| M1009 | 0 | 2 | 16 | 1.25 | 1 | 2 | 0 | 1 | 0 | 4 | 0 | 0 | 0 | 13% | 8% | 11% | 26% | 0% |
| M1010 | 0 | 2 | 16 | 5 | 0 | 0 | 0 | 0 | 0 | 5 | 0 | 0 | 0 | 13% | 8% | 12% | 15% | 0% |
| M1011 | 0 | 2 | 16 | 4 | 0 | 0 | 1 | 0 | 0 | 5 | 0 | 0 | 0 | 13% | 8% | 12% | 0% | 0% |
| M1012 | 0 | 2.1 | 14 | 7 | 1 | 0 | 0 | 0 | 0 | 5 | 0 | 0 | 0 | 11% | 8% | 12% | 0% | 0% |
| M1013 | 0 | 2 | 15.8 | 1.25 | 1 | 0 | 0 | 0 | 0 | 5 | 0 | 0 | 0 | 13% | 8% | 12% | 22% | 0% |
| M1014 | 0 | 2.1 | 15.2 | 1.25 | 1 | 0 | 0 | 0 | 0 | 5 | 0 | 0 | 0 | 12% | 8% | 12% | 0% | 0% |
| M1015 | 0 | 1.8 | 16 | 1.25 | 1 | 0 | 0 | 1 | 0 | 3.5 | 0 | 0 | 0 | 13% | 8% | 9% | 14% | 1% |
| M1016 | 0 | 2.3 | 14.2 | 1.25 | 1 | 0 | 0 | 0 | 0 | 5 | 0 | 0 | 0 | 11% | 8% | 12% | 0% | 0% |
| M1017 | 0 | 1.75 | 14 | 0 | 0 | 0 | 0 | 0 | 0 | 3 | 0 | 0 | 0 | 10% | 8% | 7% | 0% | 0% |
| M1018 | 0 | 2.3 | 12 | 1.25 | 1 | 0 | 0 | 1 | 0 | 4.5 | 0 | 0 | 0 | 8% | 8% | 12% | 0% | 2% |
| M1019 | 0 | 2 | 16 | 6 | 0 | 0 | 0 | 0 | 0 | 5 | 0 | 0 | 0 | 13% | 8% | 12% | 11% | 0% |
| M1020 | 0 | 2.1 | 14 | 8.5 | 1 | 0 | 0 | 0 | 0 | 5 | 0 | 0 | 0 | 11% | 8% | 12% | 0% | 0% |
| M1021 | 0 | 2.2 | 15.4 | 1.25 | 1 | 0 | 0 | 0 | 0 | 5 | 0 | 0 | 0 | 12% | 8% | 12% | 0% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1022 | 0 | 2.4 | 12.6 | 1.25 | 1 | 0 | 0 | 0 | 0 | 5 | 0 | 0 | 0 | 9% | 8% | 12% | 0% | 0% |
| M1023 | 0 | 1.7 | 15 | 1.25 | 1 | 0 | 0 | 1 | 0 | 3 | 0 | 0 | 0 | 11% | 8% | 7% | 0% | 1% |
| M1024 | 0 | 2 | 12 | 1.25 | 1 | 0 | 0 | 1 | 0 | 3.5 | 0 | 0 | 0 | 8% | 8% | 9% | 0% | 0% |
| M1025 | 0 | 1.5 | 17 | 0 | 0 | 0 | 0 | 0 | 0 | 0 | 0 | 0 | 5 | 14% | 8% | 6% | 3% | 1% |
| M1026 | 0 | 2 | 16 | 0 | 1 | 0 | 0 | 0 | 0 | 5 | 0 | 0 | 0 | 13% | 8% | 12% | 7% | 0% |
| M1027 | 0 | 2 | 16 | 0 | 1 | 0 | 6 | 0 | 0 | 5 | 0 | 0 | 0 | 13% | 8% | 12% | 0% | 0% |
| M1028 | 0 | 2 | 16 | 5 | 0 | 0 | 1 | 0 | 0 | 5 | 0 | 0 | 0 | 13% | 8% | 12% | 0% | 0% |
| M1029 | 0 | 1.7 | 17 | 1.25 | 1 | 0 | 0 | 1 | 0 | 4 | 0 | 0 | 0 | 14% | 8% | 10% | 34% | 0% |
| M1030 | 0 | 2.1 | 14 | 10 | 1 | 0 | 0 | 0 | 0 | 5 | 0 | 0 | 0 | 11% | 8% | 12% | 0% | 0% |
| M1031 | 0 | 1.25 | 17 | 1 | 0 | 0 | 0 | 0 | 0 | 0 | 0 | 0 | 4.5 | 15% | 8% | 5% | 38% | 0% |
| M1032 | 0 | 1.5 | 14 | 0 | 0 | 0 | 0 | 0 | 0 | 0 | 0 | 0 | 4.5 | 11% | 8% | 5% | 0% | 0% |
| M1033 | 0 | 2 | 16 | 4 | 0 | 0 | 2 | 0 | 0 | 5 | 0 | 0 | 0 | 13% | 8% | 12% | 0% | 0% |
| M1034 | 0 | 4 | 13 | 1.25 | 1 | 2 | 0 | 1 | 0 | 10 | 0 | 0 | 0 | 9% | 8% | 25% | 0% | 2% |
| M1035 | 0 | 2 | 16 | 7 | 0 | 0 | 0 | 0 | 0 | 5 | 0 | 0 | 0 | 13% | 8% | 12% | 6% | 0% |
| M1036 | 0 | 2.3 | 14.4 | 1.25 | 1 | 0 | 0 | 0 | 0 | 5 | 0 | 0 | 0 | 11% | 8% | 12% | 0% | 0% |
| M1037 | 0 | 2 | 16 | 1 | 1 | 0 | 0 | 0 | 0 | 5 | 0 | 0 | 0 | 13% | 8% | 12% | 13% | 0% |
| M1038 | 0 | 1.5 | 13 | 0 | 0 | 4.5 | 0 | 0 | 0 | 0 | 0 | 0 | 0 | 10% | 8% | 5% | 0% | 0% |
| M1039 | 0 | 2 | 16 | 1 | 1 | 0 | 8 | 0 | 0 | 5 | 0 | 0 | 0 | 13% | 8% | 12% | 0% | 0% |
| M1040 | 0 | 2 | 16 | 1.25 | 1 | 0 | 0 | 0 | 0 | 5 | 0 | 0 | 0 | 13% | 8% | 12% | 21% | 0% |
| M1041 | 0 | 1.5 | 15 | 0 | 0 | 5 | 0 | 0 | 0 | 0 | 0 | 0 | 0 | 12% | 8% | 6% | 0% | 0% |
| M1042 | 0 | 3.5 | 12 | 1.25 | 1 | 2 | 0 | 1 | 0 | 8 | 0 | 0 | 0 | 8% | 8% | 21% | 0% | 2% |
| M1043 | 0 | 2 | 16 | 2 | 1 | 0 | 10 | 0 | 0 | 5 | 0 | 0 | 0 | 13% | 8% | 12% | 0% | 2% |
| M1044 | 0 | 1.8 | 13 | 1.25 | 1 | 0 | 0 | 1 | 0 | 3 | 0 | 0 | 0 | 9% | 8% | 8% | 0% | 0% |
| M1045 | 0 | 2 | 15 | 0 | 0 | 0 | 0 | 0 | 0 | 4 | 0 | 0 | 0 | 11% | 8% | 10% | 0% | 0% |
| M1046 | 0 | 2 | 16 | 2 | 1 | 0 | 0 | 0 | 0 | 5 | 0 | 0 | 0 | 13% | 8% | 12% | 19% | 0% |
| M1047 | 0 | 1.25 | 17 | 10 | 0 | 0 | 0 | 0 | 0 | 0 | 0 | 0 | 4.5 | 15% | 8% | 5% | 38% | 0% |
| M1048 | 0 | 2.25 | 13 | 0 | 0 | 0 | 0 | 0 | 0 | 4.5 | 0 | 0 | 0 | 9% | 8% | 11% | 0% | 0% |
| M1049 | 0 | 1.25 | 17 | 9 | 0 | 0 | 0 | 0 | 0 | 0 | 0 | 0 | 4.5 | 15% | 8% | 5% | 32% | 0% |
| M1050 | 0 | 2.4 | 12.8 | 1.25 | 1 | 0 | 0 | 0 | 0 | 5 | 0 | 0 | 0 | 9% | 8% | 12% | 0% | 0% |
| M1051 | 0 | 1.25 | 17 | 6 | 0 | 0 | 0 | 0 | 0 | 0 | 0 | 0 | 4.5 | 15% | 8% | 5% | 40% | 0% |
| M1052 | 0 | 2 | 16 | 6 | 0 | 0 | 1 | 0 | 0 | 5 | 0 | 0 | 0 | 13% | 8% | 12% | 0% | 0% |
| M1053 | 0 | 1.25 | 17 | 8 | 0 | 0 | 0 | 0 | 0 | 0 | 0 | 0 | 4.5 | 15% | 8% | 5% | 33% | 0% |
| M1054 | 0 | 1.25 | 17 | 7 | 0 | 0 | 0 | 0 | 0 | 0 | 0 | 0 | 4.5 | 15% | 8% | 5% | 37% | 0% |
| M1055 | 0 | 2 | 16 | 0 | 1 | 0 | 1 | 0 | 0 | 5 | 0 | 0 | 0 | 13% | 8% | 12% | 0% | 0% |
| M1056 | 0 | 2.2 | 14 | 7 | 1 | 0 | 0 | 0 | 0 | 5 | 0 | 0 | 0 | 11% | 8% | 12% | 0% | 0% |
| M1057 | 0 | 2 | 16 | 8 | 0 | 0 | 0 | 0 | 0 | 5 | 0 | 0 | 0 | 13% | 8% | 12% | 0% | 0% |
| M1058 | 0 | 2 | 16 | 2.5 | 1 | 0 | 0 | 0 | 0 | 5 | 0 | 0 | 0 | 13% | 8% | 12% | 15% | 0% |
| M1059 | 0 | 1.25 | 17 | 3 | 0 | 0 | 9 | 0 | 0 | 0 | 0 | 0 | 4.5 | 14% | 8% | 5% | 0% | 1% |
| M1060 | 0 | 2.1 | 13 | 1.25 | 1 | 0 | 0 | 1 | 0 | 4 | 0 | 0 | 0 | 9% | 8% | 10% | 0% | 0% |
| M1061 | 0 | 2 | 16 | 3 | 1 | 0 | 0 | 0 | 0 | 5 | 0 | 0 | 0 | 13% | 8% | 12% | 23% | 0% |
| M1062 | 0 | 1.9 | 14 | 1.25 | 1 | 0 | 0 | 1 | 0 | 3.5 | 0 | 0 | 0 | 10% | 8% | 9% | 0% | 1% |
| M1063 | 0 | 2 | 16 | 5 | 0 | 0 | 2 | 0 | 0 | 5 | 0 | 0 | 0 | 13% | 8% | 12% | 0% | 0% |
| M1064 | 0 | 2.3 | 14.6 | 1.25 | 1 | 0 | 0 | 0 | 0 | 5 | 0 | 0 | 0 | 11% | 8% | 12% | 0% | 0% |
| M1065 | 0 | 3 | 15 | 1.25 | 1 | 2 | 0 | 1 | 0 | 7 | 0 | 0 | 0 | 12% | 9% | 18% | 0% | 2% |
| M1066 | 0 | 3.5 | 16 | 1.25 | 1 | 2 | 0 | 1 | 0 | 9 | 0 | 0 | 0 | 13% | 9% | 22% | 0% | 3% |
| M1067 | 0 | 2.4 | 13 | 1.25 | 1 | 0 | 0 | 1 | 0 | 5 | 0 | 0 | 0 | 9% | 9% | 13% | 0% | 1% |
| M1068 | 0 | 2 | 16 | 1 | 1 | 0 | 1 | 0 | 0 | 5 | 0 | 0 | 0 | 13% | 9% | 12% | 0% | 0% |
| M1069 | 0 | 2 | 15 | 1.25 | 1 | 0 | 0 | 1 | 0 | 4 | 0 | 0 | 0 | 11% | 9% | 10% | 0% | 1% |
| M1070 | 0 | 2.1 | 16 | 1.25 | 1 | 0 | 0 | 1 | 0 | 4.5 | 0 | 0 | 0 | 12% | 9% | 11% | 7% | 1% |
| M1071 | 0 | 1.25 | 17 | 1 | 0 | 0 | 3 | 0 | 0 | 0 | 0 | 0 | 4.5 | 14% | 9% | 5% | 0% | 0% |
| M1072 | 0 | 2 | 16 | 4 | 1 | 0 | 0 | 0 | 0 | 5 | 0 | 0 | 0 | 13% | 9% | 12% | 18% | 0% |
| M1073 | 0 | 2 | 16 | 9 | 0 | 0 | 0 | 0 | 0 | 5 | 0 | 0 | 0 | 13% | 9% | 11% | 0% | 0% |
| M1074 | 0 | 2 | 16 | 7 | 0 | 0 | 1 | 0 | 0 | 5 | 0 | 0 | 0 | 13% | 9% | 12% | 0% | 0% |
| M1075 | 0 | 2 | 16 | 0 | 1 | 0 | 5 | 0 | 0 | 5 | 0 | 0 | 0 | 13% | 9% | 12% | 0% | 0% |
| M1076 | 0 | 1.25 | 17 | 1 | 0 | 0 | 1 | 0 | 0 | 0 | 0 | 0 | 4.5 | 14% | 9% | 5% | 23% | 0% |
| M1077 | 0 | 2 | 16.2 | 1.25 | 1 | 0 | 0 | 0 | 0 | 5 | 0 | 0 | 0 | 13% | 9% | 12% | 21% | 0% |
| M1078 | 0 | 2 | 16 | 2 | 1 | 0 | 1 | 0 | 0 | 5 | 0 | 0 | 0 | 13% | 9% | 12% | 2% | 0% |
| M1079 | 0 | 2 | 16 | 0 | 1 | 0 | 2 | 0 | 0 | 5 | 0 | 0 | 0 | 13% | 9% | 12% | 0% | 0% |
| M1080 | 0 | 2 | 16 | 5 | 1 | 0 | 0 | 0 | 0 | 5 | 0 | 0 | 0 | 13% | 9% | 12% | 13% | 0% |
| M1081 | 0 | 2.4 | 13 | 1.25 | 1 | 0 | 0 | 0 | 0 | 5 | 0 | 0 | 0 | 9% | 9% | 12% | 0% | 0% |
| M1082 | 0 | 1.25 | 17 | 2 | 0 | 0 | 1 | 0 | 0 | 0 | 0 | 0 | 4.5 | 14% | 9% | 5% | 29% | 0% |
| M1083 | 0 | 2.3 | 14.8 | 1.25 | 1 | 0 | 0 | 0 | 0 | 5 | 0 | 0 | 0 | 11% | 9% | 12% | 0% | 1% |
| M1084 | 0 | 2 | 16 | 6 | 0 | 0 | 2 | 0 | 0 | 5 | 0 | 0 | 0 | 13% | 9% | 12% | 0% | 0% |
| M1085 | 0 | 2 | 16 | 5.5 | 1 | 0 | 0 | 0 | 0 | 5 | 0 | 0 | 0 | 13% | 9% | 12% | 21% | 0% |
| M1086 | 0 | 2 | 16 | 10 | 0 | 0 | 0 | 0 | 0 | 5 | 0 | 0 | 0 | 13% | 9% | 11% | 0% | 0% |
| M1087 | 0 | 2.2 | 14 | 1.25 | 1 | 0 | 0 | 1 | 0 | 4.5 | 0 | 0 | 0 | 10% | 9% | 11% | 0% | 0% |
| M1088 | 0 | 2.5 | 14 | 1.25 | 1 | 2 | 0 | 1 | 0 | 5 | 0 | 0 | 0 | 11% | 9% | 14% | 0% | 2% |
| M1089 | 0 | 1.25 | 17 | 2 | 0 | 0 | 6 | 0 | 0 | 0 | 0 | 0 | 4.5 | 14% | 9% | 5% | 0% | 0% |
| M1090 | 0 | 1.25 | 17 | 3 | 0 | 0 | 1 | 0 | 0 | 0 | 0 | 0 | 4.5 | 14% | 9% | 5% | 35% | 0% |
| M1091 | 0 | 2.25 | 16 | 0 | 0 | 0 | 0 | 0 | 0 | 5 | 0 | 0 | 0 | 12% | 9% | 12% | 0% | 1% |
| M1092 | 0 | 2 | 16 | 1 | 1 | 0 | 7 | 0 | 0 | 5 | 0 | 0 | 0 | 13% | 9% | 12% | 0% | 0% |
| M1093 | 0 | 2 | 16 | 6 | 1 | 0 | 0 | 0 | 0 | 5 | 0 | 0 | 0 | 13% | 9% | 12% | 8% | 0% |
| M1094 | 0 | 2 | 16 | 3 | 1 | 0 | 1 | 0 | 0 | 5 | 0 | 0 | 0 | 13% | 9% | 12% | 6% | 0% |
| M1095 | 0 | 2 | 16 | 5 | 0 | 0 | 3 | 0 | 0 | 5 | 0 | 0 | 0 | 13% | 9% | 12% | 0% | 1% |
| M1096 | 0 | 2 | 16 | 8 | 0 | 0 | 1 | 0 | 0 | 5 | 0 | 0 | 0 | 13% | 9% | 12% | 0% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1097 | 0 | 2 | 16 | 1 | 1 | 0 | 2 | 0 | 0 | 5 | 0 | 0 | 0 | 13% | 9% | 12% | 0% | 0% |
| M1098 | 0 | 1.25 | 17 | 5 | 0 | 0 | 1 | 0 | 0 | 0 | 0 | 0 | 4.5 | 14% | 9% | 5% | 38% | 0% |
| M1099 | 0 | 2 | 16 | 2 | 1 | 0 | 9 | 0 | 0 | 5 | 0 | 0 | 0 | 13% | 9% | 12% | 0% | 2% |
| M1100 | 0 | 2 | 16 | 5 | 0 | 0 | 4 | 0 | 0 | 5 | 0 | 0 | 0 | 13% | 9% | 12% | 0% | 1% |
| M1101 | 0 | 2 | 16 | 7 | 1 | 0 | 0 | 0 | 0 | 5 | 0 | 0 | 0 | 13% | 9% | 12% | 3% | 0% |
| M1102 | 0 | 2.2 | 17 | 1.25 | 1 | 0 | 0 | 1 | 0 | 5 | 0 | 0 | 0 | 13% | 9% | 12% | 9% | 2% |
| M1103 | 0 | 1.25 | 17 | 6 | 0 | 0 | 1 | 0 | 0 | 0 | 0 | 0 | 4.5 | 14% | 9% | 5% | 35% | 0% |
| M1104 | 0 | 1.25 | 17 | 7 | 0 | 0 | 1 | 0 | 0 | 0 | 0 | 0 | 4.5 | 14% | 9% | 5% | 31% | 0% |
| M1105 | 0 | 1.25 | 17 | 8 | 0 | 0 | 1 | 0 | 0 | 0 | 0 | 0 | 4.5 | 14% | 9% | 5% | 27% | 0% |
| M1106 | 0 | 1.25 | 17 | 10 | 0 | 0 | 1 | 0 | 0 | 0 | 0 | 0 | 4.5 | 14% | 9% | 5% | 20% | 0% |
| M1107 | 0 | 1.25 | 17 | 9 | 0 | 0 | 1 | 0 | 0 | 0 | 0 | 0 | 4.5 | 14% | 9% | 5% | 24% | 0% |
| M1108 | 0 | 2 | 16 | 4 | 1 | 0 | 1 | 0 | 0 | 5 | 0 | 0 | 0 | 13% | 9% | 12% | 11% | 0% |
| M1109 | 0 | 1.5 | 15 | 0 | 0 | 0 | 0 | 0 | 0 | 0 | 0 | 0 | 4.5 | 12% | 9% | 5% | 0% | 0% |
| M1110 | 0 | 2 | 16 | 6 | 0 | 0 | 6 | 0 | 0 | 5 | 0 | 0 | 0 | 13% | 9% | 12% | 0% | 2% |
| M1111 | 0 | 2 | 16 | 0 | 1 | 0 | 3 | 0 | 0 | 5 | 0 | 0 | 0 | 13% | 9% | 12% | 0% | 0% |
| M1112 | 0 | 2.3 | 15 | 1.25 | 1 | 0 | 0 | 0 | 0 | 5 | 0 | 0 | 0 | 11% | 9% | 12% | 0% | 1% |
| M1113 | 0 | 2 | 16 | 8 | 1 | 0 | 0 | 0 | 0 | 5 | 0 | 0 | 0 | 13% | 9% | 12% | 2% | 0% |
| M1114 | 0 | 1.5 | 16 | 0 | 0 | 5 | 0 | 0 | 0 | 0 | 0 | 0 | 0 | 13% | 9% | 6% | 0% | 1% |
| M1115 | 0 | 2 | 16 | 7 | 0 | 0 | 2 | 0 | 0 | 5 | 0 | 0 | 0 | 13% | 9% | 12% | 0% | 0% |
| M1116 | 0 | 2.3 | 15 | 1.25 | 1 | 0 | 0 | 1 | 0 | 5 | 0 | 0 | 0 | 11% | 9% | 12% | 0% | 1% |
| M1117 | 0 | 2 | 16 | 2 | 1 | 0 | 2 | 0 | 0 | 5 | 0 | 0 | 0 | 13% | 9% | 12% | 0% | 0% |
| M1118 | 0 | 2 | 16 | 7 | 0 | 0 | 8 | 0 | 0 | 5 | 0 | 0 | 0 | 12% | 9% | 12% | 0% | 2% |
| M1119 | 0 | 2 | 16 | 8.5 | 1 | 0 | 0 | 0 | 0 | 5 | 0 | 0 | 0 | 13% | 9% | 12% | 22% | 0% |
| M1120 | 0 | 2 | 16 | 9 | 0 | 0 | 1 | 0 | 0 | 5 | 0 | 0 | 0 | 13% | 9% | 12% | 0% | 0% |
| M1121 | 0 | 2 | 16.4 | 1.25 | 1 | 0 | 0 | 0 | 0 | 5 | 0 | 0 | 0 | 13% | 9% | 12% | 21% | 0% |
| M1122 | 0 | 2.4 | 13.2 | 1.25 | 1 | 0 | 0 | 0 | 0 | 5 | 0 | 0 | 0 | 9% | 9% | 12% | 0% | 0% |
| M1123 | 0 | 1.7 | 16 | 1.25 | 1 | 0 | 0 | 1 | 0 | 3 | 0 | 0 | 0 | 12% | 9% | 7% | 10% | 1% |
| M1124 | 0 | 2 | 16 | 9 | 1 | 0 | 0 | 0 | 0 | 5 | 0 | 0 | 0 | 13% | 9% | 12% | 6% | 0% |
| M1125 | 0 | 2 | 16 | 5 | 1 | 0 | 1 | 0 | 0 | 5 | 0 | 0 | 0 | 13% | 9% | 12% | 6% | 0% |
| M1126 | 0 | 2 | 16 | 8 | 0 | 0 | 10 | 0 | 0 | 5 | 0 | 0 | 0 | 12% | 9% | 12% | 0% | 3% |
| M1127 | 0 | 2 | 16 | 6 | 0 | 0 | 3 | 0 | 0 | 5 | 0 | 0 | 0 | 13% | 9% | 12% | 0% | 1% |
| M1128 | 0 | 1.75 | 15 | 0 | 0 | 0 | 0 | 0 | 0 | 3 | 0 | 0 | 0 | 11% | 9% | 7% | 0% | 0% |
| M1129 | 0 | 1.25 | 17 | 1 | 0 | 0 | 2 | 0 | 0 | 0 | 0 | 0 | 4.5 | 14% | 9% | 5% | 8% | 0% |
| M1130 | 0 | 1.25 | 17 | 7 | 1 | 0 | 0 | 0 | 0 | 0 | 0 | 0 | 4.5 | 14% | 9% | 5% | 40% | 0% |
| M1131 | 0 | 2 | 16 | 10 | 1 | 0 | 0 | 0 | 0 | 5 | 0 | 0 | 0 | 13% | 9% | 12% | 11% | 0% |
| M1132 | 0 | 2 | 16 | 1 | 1 | 0 | 3 | 0 | 0 | 5 | 0 | 0 | 0 | 13% | 9% | 12% | 0% | 0% |
| M1133 | 0 | 2 | 16 | 3 | 1 | 0 | 2 | 0 | 0 | 5 | 0 | 0 | 0 | 13% | 9% | 12% | 0% | 0% |
| M1134 | 0 | 1.25 | 17 | 2 | 0 | 0 | 2 | 0 | 0 | 0 | 0 | 0 | 4.5 | 14% | 9% | 5% | 12% | 0% |
| M1135 | 0 | 2 | 16 | 6 | 1 | 0 | 1 | 0 | 0 | 5 | 0 | 0 | 0 | 13% | 9% | 12% | 1% | 0% |
| M1136 | 0 | 2 | 16 | 0 | 1 | 0 | 4 | 0 | 0 | 5 | 0 | 0 | 0 | 13% | 9% | 12% | 0% | 0% |
| M1137 | 0 | 2 | 17 | 1.25 | 1 | 0 | 0 | 1 | 0 | 5 | 0 | 0 | 0 | 14% | 9% | 12% | 27% | 0% |
| M1138 | 0 | 1.25 | 17 | 6 | 1 | 0 | 0 | 0 | 0 | 0 | 0 | 0 | 4.5 | 14% | 9% | 5% | 38% | 0% |
| M1139 | 0 | 2 | 16 | 10 | 0 | 0 | 1 | 0 | 0 | 5 | 0 | 0 | 0 | 13% | 9% | 11% | 0% | 0% |
| M1140 | 0 | 2.5 | 12 | 10 | 1 | 0 | 0 | 0 | 0 | 5 | 0 | 0 | 0 | 8% | 9% | 12% | 0% | 3% |
| M1141 | 0 | 2.3 | 15.2 | 1.25 | 1 | 0 | 0 | 0 | 0 | 5 | 0 | 0 | 0 | 11% | 9% | 12% | 0% | 1% |
| M1142 | 0 | 2 | 16 | 8 | 0 | 0 | 2 | 0 | 0 | 5 | 0 | 0 | 0 | 13% | 9% | 12% | 0% | 0% |
| M1143 | 0 | 2.2 | 12 | 1.25 | 1 | 0 | 0 | 1 | 0 | 4 | 0 | 0 | 0 | 8% | 9% | 10% | 0% | 3% |
| M1144 | 0 | 1.5 | 14 | 0 | 0 | 4.5 | 0 | 0 | 0 | 0 | 0 | 0 | 0 | 11% | 9% | 5% | 0% | 0% |
| M1145 | 0 | 1.25 | 17 | 3 | 0 | 0 | 2 | 0 | 0 | 0 | 0 | 0 | 4.5 | 14% | 9% | 5% | 17% | 0% |
| M1146 | 0 | 2.5 | 12 | 8.5 | 1 | 0 | 0 | 0 | 0 | 5 | 0 | 0 | 0 | 8% | 9% | 12% | 0% | 3% |
| M1147 | 0 | 2 | 16 | 4 | 1 | 0 | 2 | 0 | 0 | 5 | 0 | 0 | 0 | 13% | 9% | 12% | 0% | 0% |
| M1148 | 0 | 2.1 | 15.4 | 1.25 | 1 | 0 | 0 | 0 | 0 | 5 | 0 | 0 | 0 | 12% | 9% | 12% | 0% | 0% |
| M1149 | 0 | 2 | 16 | 7 | 1 | 0 | 1 | 0 | 0 | 5 | 0 | 0 | 0 | 13% | 9% | 12% | 0% | 0% |
| M1150 | 0 | 1.25 | 17 | 4 | 0 | 0 | 2 | 0 | 0 | 0 | 0 | 0 | 4.5 | 14% | 9% | 5% | 21% | 0% |
| M1151 | 0 | 2 | 16 | 2 | 1 | 0 | 3 | 0 | 0 | 5 | 0 | 0 | 0 | 13% | 9% | 12% | 0% | 0% |
| M1152 | 0 | 2.5 | 12 | 7 | 1 | 0 | 0 | 0 | 0 | 5 | 0 | 0 | 0 | 8% | 9% | 12% | 0% | 2% |
| M1153 | 0 | 2.4 | 13.4 | 1.25 | 1 | 0 | 0 | 0 | 0 | 5 | 0 | 0 | 0 | 9% | 9% | 12% | 0% | 1% |
| M1154 | 0 | 2.5 | 12 | 5.5 | 1 | 0 | 0 | 0 | 0 | 5 | 0 | 0 | 0 | 8% | 9% | 12% | 0% | 2% |
| M1155 | 0 | 2.5 | 12 | 4 | 1 | 0 | 0 | 0 | 0 | 5 | 0 | 0 | 0 | 8% | 9% | 12% | 0% | 1% |
| M1156 | 0 | 2 | 16 | 7 | 0 | 0 | 3 | 0 | 0 | 5 | 0 | 0 | 0 | 13% | 9% | 12% | 0% | 1% |
| M1157 | 0 | 1.25 | 17 | 5 | 0 | 0 | 2 | 0 | 0 | 0 | 0 | 0 | 4.5 | 14% | 9% | 5% | 26% | 0% |
| M1158 | 0 | 1.9 | 12 | 1.25 | 1 | 0 | 0 | 1 | 0 | 3 | 0 | 0 | 0 | 8% | 9% | 8% | 0% | 2% |
| M1159 | 0 | 2 | 13 | 0 | 0 | 0 | 0 | 0 | 0 | 3.5 | 0 | 0 | 0 | 9% | 9% | 9% | 0% | 0% |
| M1160 | 0 | 2 | 16.6 | 1.25 | 1 | 0 | 0 | 0 | 0 | 5 | 0 | 0 | 0 | 13% | 9% | 12% | 21% | 0% |
| M1161 | 0 | 2 | 16 | 1 | 1 | 0 | 6 | 0 | 0 | 5 | 0 | 0 | 0 | 13% | 9% | 12% | 0% | 0% |
| M1162 | 0 | 1.25 | 17 | 6 | 0 | 0 | 2 | 0 | 0 | 0 | 0 | 0 | 4.5 | 14% | 9% | 5% | 29% | 0% |
| M1163 | 0 | 1.6 | 17 | 1.25 | 1 | 0 | 0 | 1 | 0 | 3.5 | 0 | 0 | 0 | 14% | 9% | 8% | 33% | 0% |
| M1164 | 0 | 2 | 16 | 8 | 1 | 0 | 1 | 0 | 0 | 5 | 0 | 0 | 0 | 13% | 9% | 12% | 0% | 0% |
| M1165 | 0 | 2 | 16 | 0 | 0 | 0 | 0 | 0 | 0 | 4 | 0 | 0 | 0 | 12% | 9% | 10% | 0% | 1% |
| M1166 | 0 | 2 | 16 | 1 | 0 | 0 | 4 | 0 | 0 | 5 | 0 | 0 | 0 | 13% | 9% | 12% | 0% | 0% |
| M1167 | 0 | 2.2 | 15.6 | 1.25 | 1 | 0 | 0 | 0 | 0 | 5 | 0 | 0 | 0 | 12% | 9% | 12% | 0% | 0% |
| M1168 | 0 | 2 | 16 | 6 | 0 | 0 | 4 | 0 | 0 | 5 | 0 | 0 | 0 | 13% | 9% | 12% | 0% | 1% |
| M1169 | 0 | 1.25 | 17 | 7 | 0 | 0 | 2 | 0 | 0 | 0 | 0 | 0 | 4.5 | 14% | 9% | 5% | 25% | 0% |
| M1170 | 0 | 2 | 16 | 5 | 1 | 0 | 2 | 0 | 0 | 5 | 0 | 0 | 0 | 13% | 9% | 12% | 0% | 0% |
| M1171 | 0 | 2 | 16 | 9 | 0 | 0 | 2 | 0 | 0 | 5 | 0 | 0 | 0 | 13% | 9% | 12% | 0% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1172 | 0 | 2.1 | 17 | 1.25 | 1 | 0 | 0 | 1 | 0 | 5 | 0 | 0 | 0 | 14% | 9% | 12% | 18% | 1% |
| M1173 | 0 | 2.3 | 15.4 | 1.25 | 1 | 0 | 0 | 0 | 0 | 5 | 0 | 0 | 0 | 12% | 9% | 12% | 0% | 1% |
| M1174 | 0 | 3.5 | 17 | 1.25 | 1 | 2 | 0 | 1 | 0 | 10 | 0 | 0 | 0 | 15% | 9% | 24% | 12% | 1% |
| M1175 | 0 | 2.3 | 14 | 8.5 | 1 | 0 | 0 | 0 | 0 | 5 | 0 | 0 | 0 | 11% | 9% | 12% | 0% | 2% |
| M1176 | 0 | 1.25 | 17 | 8 | 0 | 0 | 2 | 0 | 0 | 0 | 0 | 0 | 4.5 | 14% | 9% | 5% | 21% | 0% |
| M1177 | 0 | 2 | 16 | 3 | 1 | 0 | 3 | 0 | 0 | 5 | 0 | 0 | 0 | 13% | 9% | 12% | 0% | 1% |
| M1178 | 0 | 2 | 16 | 2 | 1 | 0 | 8 | 0 | 0 | 5 | 0 | 0 | 0 | 13% | 9% | 12% | 0% | 2% |
| M1179 | 0 | 1.25 | 17 | 9 | 0 | 0 | 2 | 0 | 0 | 0 | 0 | 0 | 4.5 | 14% | 9% | 5% | 17% | 0% |
| M1180 | 0 | 2 | 17 | 1.25 | 1 | 0 | 0 | 1 | 0 | 4.5 | 0 | 0 | 0 | 14% | 9% | 11% | 17% | 1% |
| M1181 | 0 | 1.25 | 17 | 10 | 1 | 0 | 1 | 0 | 0 | 0 | 0 | 0 | 4.5 | 14% | 9% | 5% | 36% | 0% |
| M1182 | 0 | 2 | 16 | 10 | 2 | 0 | 0 | 0 | 0 | 5 | 0 | 0 | 0 | 13% | 9% | 12% | 29% | 0% |
| M1183 | 0 | 2 | 16 | 9 | 2 | 0 | 0 | 0 | 0 | 5 | 0 | 0 | 0 | 13% | 9% | 12% | 24% | 0% |
| M1184 | 0 | 2 | 16 | 8 | 2 | 0 | 0 | 0 | 0 | 5 | 0 | 0 | 0 | 13% | 9% | 12% | 19% | 0% |
| M1185 | 0 | 1.25 | 17 | 10 | 0 | 0 | 2 | 0 | 0 | 0 | 0 | 0 | 4.5 | 14% | 9% | 5% | 12% | 0% |
| M1186 | 0 | 2 | 16 | 7 | 2 | 0 | 0 | 0 | 0 | 5 | 0 | 0 | 0 | 13% | 9% | 12% | 15% | 0% |
| M1187 | 0 | 2 | 16 | 6 | 2 | 0 | 0 | 0 | 0 | 5 | 0 | 0 | 0 | 13% | 9% | 12% | 10% | 0% |
| M1188 | 0 | 2 | 16 | 5 | 2 | 0 | 0 | 0 | 0 | 5 | 0 | 0 | 0 | 13% | 9% | 12% | 11% | 0% |
| M1189 | 0 | 2 | 16 | 9 | 1 | 0 | 1 | 0 | 0 | 5 | 0 | 0 | 0 | 13% | 9% | 12% | 0% | 0% |
| M1190 | 0 | 2 | 16 | 4 | 2 | 0 | 0 | 0 | 0 | 5 | 0 | 0 | 0 | 13% | 9% | 12% | 16% | 0% |
| M1191 | 0 | 2 | 16 | 3 | 1 | 0 | 10 | 0 | 0 | 5 | 0 | 0 | 0 | 12% | 9% | 12% | 0% | 3% |
| M1192 | 0 | 2 | 16 | 3 | 2 | 0 | 0 | 0 | 0 | 5 | 0 | 0 | 0 | 13% | 9% | 12% | 21% | 0% |
| M1193 | 0 | 2 | 16 | 2 | 2 | 0 | 0 | 0 | 0 | 5 | 0 | 0 | 0 | 13% | 9% | 12% | 26% | 0% |
| M1194 | 0 | 2 | 16 | 1 | 2 | 0 | 0 | 0 | 0 | 5 | 0 | 0 | 0 | 13% | 9% | 12% | 30% | 0% |
| M1195 | 0 | 2 | 16 | 0 | 2 | 0 | 0 | 0 | 0 | 5 | 0 | 0 | 0 | 13% | 9% | 12% | 30% | 0% |
| M1196 | 0 | 1.25 | 17 | 9 | 1 | 0 | 1 | 0 | 0 | 0 | 0 | 0 | 4.5 | 14% | 9% | 5% | 32% | 0% |
| M1197 | 0 | 1.9 | 17 | 1.25 | 1 | 0 | 0 | 1 | 0 | 4 | 0 | 0 | 0 | 13% | 9% | 10% | 16% | 1% |
| M1198 | 0 | 2 | 16 | 6 | 1 | 0 | 2 | 0 | 0 | 5 | 0 | 0 | 0 | 13% | 9% | 12% | 0% | 0% |
| M1199 | 0 | 2.1 | 17 | 1.25 | 1 | 0 | 0 | 1 | 0 | 4.5 | 0 | 0 | 0 | 13% | 9% | 11% | 8% | 2% |
| M1200 | 0 | 2 | 16 | 2 | 1 | 0 | 4 | 0 | 0 | 5 | 0 | 0 | 0 | 13% | 9% | 12% | 0% | 0% |
| M1201 | 0 | 1.25 | 17 | 8 | 1 | 0 | 1 | 0 | 0 | 0 | 0 | 0 | 4.5 | 14% | 9% | 5% | 28% | 0% |
| M1202 | 0 | 2 | 16 | 8 | 0 | 0 | 3 | 0 | 0 | 5 | 0 | 0 | 0 | 13% | 9% | 12% | 0% | 1% |
| M1203 | 0 | 1.5 | 17 | 0 | 0 | 5 | 0 | 0 | 0 | 0 | 0 | 0 | 0 | 14% | 9% | 6% | 0% | 1% |
| M1204 | 0 | 2 | 16 | 10 | 1 | 0 | 1 | 0 | 0 | 5 | 0 | 0 | 0 | 13% | 9% | 12% | 0% | 0% |
| M1205 | 0 | 1.5 | 16 | 0 | 0 | 0 | 0 | 0 | 0 | 0 | 0 | 0 | 4.5 | 13% | 9% | 5% | 0% | 1% |
| M1206 | 0 | 2 | 16 | 4 | 1 | 0 | 3 | 0 | 0 | 5 | 0 | 0 | 0 | 13% | 9% | 12% | 0% | 1% |
| M1207 | 0 | 2 | 16 | 10 | 0 | 0 | 2 | 0 | 0 | 5 | 0 | 0 | 0 | 13% | 9% | 12% | 0% | 0% |
| M1208 | 0 | 1.25 | 17 | 2 | 0 | 0 | 3 | 0 | 0 | 0 | 0 | 0 | 4.5 | 14% | 9% | 5% | 0% | 0% |
| M1209 | 0 | 2.4 | 13.6 | 1.25 | 1 | 0 | 0 | 0 | 0 | 5 | 0 | 0 | 0 | 10% | 9% | 12% | 0% | 1% |
| M1210 | 0 | 2 | 16 | 1.25 | 1 | 0 | 0 | 1 | 0 | 4 | 0 | 0 | 0 | 12% | 9% | 10% | 3% | 2% |
| M1211 | 0 | 1.25 | 17 | 7 | 1 | 0 | 1 | 0 | 0 | 0 | 0 | 0 | 4.5 | 14% | 9% | 5% | 30% | 0% |
| M1212 | 0 | 1.8 | 17 | 1.25 | 1 | 0 | 0 | 1 | 0 | 3.5 | 0 | 0 | 0 | 13% | 9% | 8% | 15% | 2% |
| M1213 | 0 | 1.8 | 14 | 1.25 | 1 | 0 | 0 | 1 | 0 | 3 | 0 | 0 | 0 | 10% | 9% | 8% | 0% | 1% |
| M1214 | 0 | 2.3 | 15.6 | 1.25 | 1 | 0 | 0 | 0 | 0 | 5 | 0 | 0 | 0 | 12% | 9% | 12% | 0% | 1% |
| M1215 | 0 | 2.5 | 12.2 | 1.25 | 1 | 0 | 0 | 0 | 0 | 5 | 0 | 0 | 0 | 8% | 9% | 13% | 0% | 0% |
| M1216 | 0 | 1.9 | 15 | 1.25 | 1 | 0 | 0 | 1 | 0 | 3.5 | 0 | 0 | 0 | 11% | 9% | 9% | 0% | 1% |
| M1217 | 0 | 2 | 13 | 1.25 | 1 | 0 | 0 | 1 | 0 | 3.5 | 0 | 0 | 0 | 9% | 9% | 9% | 0% | 1% |
| M1218 | 0 | 2 | 16 | 1 | 1 | 0 | 5 | 0 | 0 | 5 | 0 | 0 | 0 | 13% | 9% | 12% | 0% | 0% |
| M1219 | 0 | 2 | 16 | 7 | 1 | 0 | 2 | 0 | 0 | 5 | 0 | 0 | 0 | 13% | 9% | 12% | 0% | 0% |
| M1220 | 0 | 1.25 | 17 | 6 | 1 | 0 | 1 | 0 | 0 | 0 | 0 | 0 | 4.5 | 14% | 9% | 5% | 33% | 0% |
| M1221 | 0 | 2 | 16 | 7 | 0 | 0 | 4 | 0 | 0 | 5 | 0 | 0 | 0 | 13% | 9% | 12% | 0% | 1% |
| M1222 | 0 | 1.25 | 17 | 3 | 0 | 0 | 3 | 0 | 0 | 0 | 0 | 0 | 4.5 | 14% | 9% | 5% | 0% | 0% |
| M1223 | 0 | 2.3 | 13 | 1.25 | 1 | 0 | 0 | 1 | 0 | 4.5 | 0 | 0 | 0 | 9% | 9% | 11% | 0% | 1% |
| M1224 | 0 | 3 | 16 | 1.25 | 1 | 2 | 0 | 1 | 0 | 7 | 0 | 0 | 0 | 13% | 9% | 18% | 0% | 3% |
| M1225 | 0 | 1.25 | 17 | 3 | 0 | 0 | 8 | 0 | 0 | 0 | 0 | 0 | 4.5 | 14% | 9% | 5% | 0% | 0% |
| M1226 | 0 | 2 | 16.8 | 1.25 | 1 | 0 | 0 | 0 | 0 | 5 | 0 | 0 | 0 | 14% | 9% | 12% | 21% | 0% |
| M1227 | 0 | 2 | 16 | 6 | 0 | 0 | 5 | 0 | 0 | 5 | 0 | 0 | 0 | 13% | 9% | 12% | 0% | 1% |
| M1228 | 0 | 1.25 | 17 | 5 | 1 | 0 | 1 | 0 | 0 | 0 | 0 | 0 | 4.5 | 14% | 9% | 5% | 37% | 0% |
| M1229 | 0 | 2 | 16 | 3 | 1 | 0 | 4 | 0 | 0 | 5 | 0 | 0 | 0 | 13% | 9% | 12% | 0% | 0% |
| M1230 | 0 | 1.25 | 17 | 4 | 0 | 0 | 3 | 0 | 0 | 0 | 0 | 0 | 4.5 | 14% | 9% | 5% | 3% | 0% |
| M1231 | 0 | 2 | 16 | 5 | 1 | 0 | 3 | 0 | 0 | 5 | 0 | 0 | 0 | 13% | 9% | 12% | 0% | 1% |
| M1232 | 0 | 2.25 | 17 | 0 | 0 | 0 | 0 | 0 | 0 | 5 | 0 | 0 | 0 | 13% | 9% | 12% | 0% | 1% |
| M1233 | 0 | 1.25 | 17 | 4 | 1 | 0 | 1 | 0 | 0 | 0 | 0 | 0 | 4.5 | 14% | 9% | 5% | 40% | 0% |
| M1234 | 0 | 2.4 | 14 | 8.5 | 1 | 0 | 0 | 0 | 0 | 5 | 0 | 0 | 0 | 10% | 9% | 12% | 0% | 3% |
| M1235 | 0 | 2 | 16 | 0 | 2 | 0 | 1 | 0 | 0 | 5 | 0 | 0 | 0 | 13% | 9% | 12% | 16% | 0% |
| M1236 | 0 | 2 | 16 | 10 | 3 | 0 | 0 | 0 | 0 | 5 | 0 | 0 | 0 | 13% | 9% | 12% | 31% | 1% |
| M1237 | 0 | 2 | 16 | 8 | 1 | 0 | 2 | 0 | 0 | 5 | 0 | 0 | 0 | 13% | 9% | 12% | 0% | 0% |
| M1238 | 0 | 2 | 16 | 1 | 2 | 0 | 1 | 0 | 0 | 5 | 0 | 0 | 0 | 13% | 9% | 12% | 20% | 0% |
| M1239 | 0 | 2 | 16 | 9 | 0 | 0 | 3 | 0 | 0 | 5 | 0 | 0 | 0 | 13% | 9% | 12% | 0% | 1% |
| M1240 | 0 | 1.25 | 17 | 5 | 0 | 0 | 3 | 0 | 0 | 0 | 0 | 0 | 4.5 | 14% | 9% | 5% | 7% | 1% |
| M1241 | 0 | 2 | 16 | 2 | 2 | 0 | 1 | 0 | 0 | 5 | 0 | 0 | 0 | 13% | 9% | 12% | 20% | 0% |
| M1242 | 0 | 2 | 16 | 3 | 2 | 0 | 1 | 0 | 0 | 5 | 0 | 0 | 0 | 13% | 9% | 12% | 15% | 0% |
| M1243 | 0 | 2 | 16 | 4 | 2 | 0 | 1 | 0 | 0 | 5 | 0 | 0 | 0 | 13% | 9% | 12% | 10% | 0% |
| M1244 | 0 | 2 | 16 | 2 | 1 | 0 | 5 | 0 | 0 | 5 | 0 | 0 | 0 | 13% | 9% | 12% | 0% | 0% |
| M1245 | 0 | 2 | 16 | 5 | 2 | 0 | 1 | 0 | 0 | 5 | 0 | 0 | 0 | 13% | 9% | 12% | 4% | 0% |
| M1246 | 0 | 1.25 | 17 | 6 | 0 | 0 | 3 | 0 | 0 | 0 | 0 | 0 | 4.5 | 14% | 9% | 5% | 10% | 1% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1247 | 0 | 2.3 | 15.8 | 1.25 | 1 | 0 | 0 | 0 | 0 | 5 | 0 | 0 | 0 | 12% | 9% | 12% | 0% | 1% |
| M1248 | 0 | 2 | 16 | 9 | 3 | 0 | 0 | 0 | 0 | 5 | 0 | 0 | 0 | 13% | 9% | 12% | 33% | 1% |
| M1249 | 0 | 2.25 | 14 | 0 | 0 | 0 | 0 | 0 | 0 | 4.5 | 0 | 0 | 0 | 10% | 9% | 11% | 0% | 0% |
| M1250 | 0 | 2 | 16 | 6 | 2 | 0 | 1 | 0 | 0 | 5 | 0 | 0 | 0 | 13% | 9% | 12% | 0% | 0% |
| M1251 | 0 | 1.7 | 17 | 1.25 | 1 | 0 | 0 | 1 | 0 | 3 | 0 | 0 | 0 | 13% | 9% | 7% | 14% | 2% |
| M1252 | 0 | 2.1 | 14 | 1.25 | 1 | 0 | 0 | 1 | 0 | 4 | 0 | 0 | 0 | 10% | 9% | 10% | 0% | 1% |
| M1253 | 0 | 2 | 16 | 7 | 2 | 0 | 1 | 0 | 0 | 5 | 0 | 0 | 0 | 13% | 9% | 12% | 0% | 0% |
| M1254 | 0 | 2.4 | 14 | 7 | 1 | 0 | 0 | 0 | 0 | 5 | 0 | 0 | 0 | 10% | 9% | 12% | 0% | 3% |
| M1255 | 0 | 2 | 16 | 6 | 1 | 0 | 3 | 0 | 0 | 5 | 0 | 0 | 0 | 13% | 9% | 12% | 0% | 1% |
| M1256 | 0 | 1.25 | 17 | 7 | 0 | 0 | 3 | 0 | 0 | 0 | 0 | 0 | 4.5 | 14% | 9% | 5% | 13% | 1% |
| M1257 | 0 | 2.4 | 13.8 | 1.25 | 1 | 0 | 0 | 0 | 0 | 5 | 0 | 0 | 0 | 10% | 9% | 12% | 0% | 1% |
| M1258 | 0 | 2 | 16 | 8 | 2 | 0 | 1 | 0 | 0 | 5 | 0 | 0 | 0 | 13% | 9% | 12% | 3% | 0% |
| M1259 | 0 | 2 | 16 | 9 | 1 | 0 | 2 | 0 | 0 | 5 | 0 | 0 | 0 | 13% | 9% | 12% | 0% | 0% |
| M1260 | 0 | 2 | 16 | 4 | 1 | 0 | 4 | 0 | 0 | 5 | 0 | 0 | 0 | 13% | 9% | 12% | 0% | 1% |
| M1261 | 0 | 2 | 16 | 9 | 2 | 0 | 1 | 0 | 0 | 5 | 0 | 0 | 0 | 13% | 9% | 12% | 6% | 0% |
| M1262 | 0 | 2 | 16 | 8 | 3 | 0 | 0 | 0 | 0 | 5 | 0 | 0 | 0 | 13% | 9% | 12% | 36% | 0% |
| M1263 | 0 | 2.5 | 15 | 1.25 | 1 | 2 | 0 | 1 | 0 | 5 | 0 | 0 | 0 | 12% | 9% | 14% | 0% | 2% |
| M1264 | 0 | 2 | 16 | 8 | 0 | 0 | 4 | 0 | 0 | 5 | 0 | 0 | 0 | 13% | 9% | 12% | 0% | 1% |
| M1265 | 0 | 1.25 | 17 | 8 | 0 | 0 | 3 | 0 | 0 | 0 | 0 | 0 | 4.5 | 14% | 9% | 5% | 14% | 1% |
| M1266 | 0 | 2 | 16 | 10 | 2 | 0 | 1 | 0 | 0 | 5 | 0 | 0 | 0 | 13% | 9% | 12% | 9% | 2% |
| M1267 | 0 | 1.25 | 17 | 9 | 0 | 0 | 3 | 0 | 0 | 0 | 0 | 0 | 4.5 | 14% | 9% | 5% | 9% | 1% |
| M1268 | 0 | 2.4 | 14 | 5.5 | 1 | 0 | 0 | 0 | 0 | 5 | 0 | 0 | 0 | 10% | 9% | 12% | 0% | 2% |
| M1269 | 0 | 2 | 16 | 7 | 3 | 0 | 0 | 0 | 0 | 5 | 0 | 0 | 0 | 13% | 9% | 12% | 33% | 0% |
| M1270 | 0 | 1.25 | 17 | 10 | 0 | 0 | 3 | 0 | 0 | 0 | 0 | 0 | 4.5 | 14% | 9% | 5% | 4% | 1% |
| M1271 | 0 | 2.5 | 12.4 | 1.25 | 1 | 0 | 0 | 0 | 0 | 5 | 0 | 0 | 0 | 8% | 9% | 13% | 0% | 1% |
| M1272 | 0 | 2 | 16 | 7 | 0 | 0 | 5 | 0 | 0 | 5 | 0 | 0 | 0 | 13% | 9% | 12% | 0% | 1% |
| M1273 | 0 | 1.25 | 17 | 10 | 1 | 0 | 2 | 0 | 0 | 0 | 0 | 0 | 4.5 | 14% | 9% | 5% | 19% | 0% |
| M1274 | 0 | 2 | 16 | 10 | 0 | 0 | 3 | 0 | 0 | 5 | 0 | 0 | 0 | 13% | 9% | 12% | 0% | 1% |
| M1275 | 0 | 1.9 | 17 | 1.25 | 1 | 0 | 0 | 1 | 0 | 4.5 | 0 | 0 | 0 | 14% | 9% | 11% | 26% | 0% |
| M1276 | 0 | 2 | 16 | 10 | 1 | 0 | 2 | 0 | 0 | 5 | 0 | 0 | 0 | 13% | 9% | 12% | 0% | 0% |
| M1277 | 0 | 2 | 16 | 3 | 1 | 0 | 5 | 0 | 0 | 5 | 0 | 0 | 0 | 13% | 9% | 12% | 0% | 1% |
| M1278 | 0 | 1.25 | 17 | 2 | 0 | 0 | 4 | 0 | 0 | 0 | 0 | 0 | 4.5 | 14% | 9% | 5% | 0% | 0% |
| M1279 | 0 | 1.8 | 17 | 1.25 | 1 | 0 | 0 | 1 | 0 | 4 | 0 | 0 | 0 | 14% | 9% | 10% | 25% | 0% |
| M1280 | 0 | 2 | 16 | 7 | 1 | 0 | 3 | 0 | 0 | 5 | 0 | 0 | 0 | 13% | 9% | 12% | 0% | 1% |
| M1281 | 0 | 2.2 | 15 | 1.25 | 1 | 0 | 0 | 1 | 0 | 4.5 | 0 | 0 | 0 | 11% | 9% | 11% | 0% | 2% |
| M1282 | 0 | 1.75 | 16 | 0 | 0 | 0 | 0 | 0 | 0 | 3 | 0 | 0 | 0 | 12% | 9% | 7% | 0% | 1% |
| M1283 | 0 | 1.25 | 17 | 9 | 1 | 0 | 2 | 0 | 0 | 0 | 0 | 0 | 4.5 | 14% | 9% | 5% | 16% | 0% |
| M1284 | 0 | 2 | 16 | 0 | 2 | 0 | 2 | 0 | 0 | 5 | 0 | 0 | 0 | 13% | 9% | 12% | 1% | 0% |
| M1285 | 0 | 2 | 17 | 1.25 | 1 | 0 | 0 | 0 | 0 | 5 | 0 | 0 | 0 | 14% | 9% | 12% | 25% | 0% |
| M1286 | 0 | 2.4 | 14 | 4 | 1 | 0 | 0 | 0 | 0 | 5 | 0 | 0 | 0 | 10% | 9% | 12% | 0% | 2% |
| M1287 | 0 | 1.5 | 15 | 0 | 0 | 4.5 | 0 | 0 | 0 | 0 | 0 | 0 | 0 | 12% | 9% | 5% | 0% | 1% |
| M1288 | 0 | 2 | 16 | 6 | 3 | 0 | 0 | 0 | 0 | 5 | 0 | 0 | 0 | 13% | 9% | 12% | 28% | 0% |
| M1289 | 0 | 2.4 | 14 | 1.25 | 1 | 0 | 0 | 1 | 0 | 5 | 0 | 0 | 0 | 10% | 9% | 12% | 0% | 2% |
| M1290 | 0 | 2 | 16 | 5 | 1 | 0 | 4 | 0 | 0 | 5 | 0 | 0 | 0 | 13% | 9% | 12% | 0% | 1% |
| M1291 | 0 | 2 | 16 | 1 | 2 | 0 | 2 | 0 | 0 | 5 | 0 | 0 | 0 | 13% | 9% | 12% | 4% | 0% |
| M1292 | 0 | 1.25 | 17 | 8 | 1 | 0 | 2 | 0 | 0 | 0 | 0 | 0 | 4.5 | 14% | 9% | 5% | 19% | 0% |
| M1293 | 0 | 2 | 16 | 2 | 1 | 0 | 7 | 0 | 0 | 5 | 0 | 0 | 0 | 13% | 9% | 12% | 0% | 2% |
| M1294 | 0 | 2 | 16 | 10 | 4 | 0 | 0 | 0 | 0 | 5 | 0 | 0 | 0 | 13% | 9% | 12% | 29% | 1% |
| M1295 | 0 | 1.7 | 17 | 1.25 | 1 | 0 | 0 | 1 | 0 | 3.5 | 0 | 0 | 0 | 14% | 9% | 8% | 24% | 0% |
| M1296 | 0 | 1.25 | 17 | 2 | 0 | 0 | 5 | 0 | 0 | 0 | 0 | 0 | 4.5 | 14% | 9% | 5% | 0% | 0% |
| M1297 | 0 | 2 | 16 | 2 | 1 | 0 | 6 | 0 | 0 | 5 | 0 | 0 | 0 | 13% | 9% | 12% | 0% | 1% |
| M1298 | 0 | 2 | 16 | 3 | 1 | 0 | 9 | 0 | 0 | 5 | 0 | 0 | 0 | 12% | 9% | 12% | 0% | 2% |
| M1299 | 0 | 2 | 16 | 2 | 2 | 0 | 2 | 0 | 0 | 5 | 0 | 0 | 0 | 13% | 9% | 12% | 6% | 0% |
| M1300 | 0 | 1.25 | 17 | 3 | 0 | 0 | 4 | 0 | 0 | 0 | 0 | 0 | 4.5 | 14% | 9% | 5% | 0% | 0% |
| M1301 | 0 | 1.25 | 17 | 7 | 1 | 0 | 2 | 0 | 0 | 0 | 0 | 0 | 4.5 | 14% | 9% | 5% | 23% | 0% |
| M1302 | 0 | 1.5 | 17 | 0 | 0 | 0 | 0 | 0 | 0 | 0 | 0 | 0 | 4.5 | 14% | 9% | 5% | 0% | 1% |
| M1303 | 0 | 2.4 | 14 | 2.5 | 1 | 0 | 0 | 0 | 0 | 5 | 0 | 0 | 0 | 10% | 9% | 12% | 0% | 1% |
| M1304 | 0 | 2 | 16 | 3 | 2 | 0 | 2 | 0 | 0 | 5 | 0 | 0 | 0 | 13% | 9% | 12% | 8% | 0% |
| M1305 | 0 | 4 | 14 | 1.25 | 1 | 2 | 0 | 1 | 0 | 10 | 0 | 0 | 0 | 10% | 9% | 25% | 0% | 3% |
| M1306 | 0 | 2.3 | 16 | 1.25 | 1 | 0 | 0 | 1 | 0 | 5 | 0 | 0 | 0 | 12% | 9% | 12% | 0% | 2% |
| M1307 | 0 | 2 | 16 | 5 | 3 | 0 | 0 | 0 | 0 | 5 | 0 | 0 | 0 | 13% | 9% | 12% | 24% | 0% |
| M1308 | 0 | 1.25 | 17 | 6 | 1 | 0 | 2 | 0 | 0 | 0 | 0 | 0 | 4.5 | 14% | 9% | 5% | 27% | 0% |
| M1309 | 0 | 2 | 16 | 9 | 0 | 0 | 4 | 0 | 0 | 5 | 0 | 0 | 0 | 13% | 9% | 12% | 0% | 1% |
| M1310 | 0 | 2 | 16 | 4 | 2 | 0 | 2 | 0 | 0 | 5 | 0 | 0 | 0 | 13% | 9% | 12% | 2% | 0% |
| M1311 | 0 | 1.6 | 17 | 1.25 | 1 | 0 | 0 | 1 | 0 | 3 | 0 | 0 | 0 | 13% | 9% | 7% | 22% | 1% |
| M1312 | 0 | 2.4 | 14 | 1.25 | 1 | 0 | 0 | 0 | 0 | 5 | 0 | 0 | 0 | 10% | 9% | 12% | 0% | 1% |
| M1313 | 0 | 2 | 16 | 8 | 1 | 0 | 3 | 0 | 0 | 5 | 0 | 0 | 0 | 13% | 9% | 12% | 0% | 1% |
| M1314 | 0 | 1.25 | 17 | 5 | 1 | 0 | 2 | 0 | 0 | 0 | 0 | 0 | 4.5 | 14% | 9% | 5% | 31% | 0% |
| M1315 | 0 | 2.4 | 14 | 1 | 1 | 0 | 0 | 0 | 0 | 5 | 0 | 0 | 0 | 10% | 9% | 12% | 0% | 1% |
| M1316 | 0 | 1.25 | 17 | 4 | 0 | 0 | 4 | 0 | 0 | 0 | 0 | 0 | 4.5 | 14% | 9% | 5% | 0% | 0% |
| M1317 | 0 | 2 | 16 | 9 | 4 | 0 | 0 | 0 | 0 | 5 | 0 | 0 | 0 | 13% | 9% | 12% | 32% | 1% |
| M1318 | 0 | 2 | 16 | 4 | 1 | 0 | 5 | 0 | 0 | 5 | 0 | 0 | 0 | 13% | 9% | 12% | 0% | 1% |
| M1319 | 0 | 2 | 16 | 5 | 2 | 0 | 2 | 0 | 0 | 5 | 0 | 0 | 0 | 13% | 9% | 12% | 0% | 0% |
| M1320 | 0 | 1.25 | 17 | 4 | 1 | 0 | 2 | 0 | 0 | 0 | 0 | 0 | 4.5 | 14% | 9% | 5% | 35% | 0% |
| M1321 | 0 | 3.5 | 13 | 1.25 | 1 | 2 | 0 | 1 | 0 | 8 | 0 | 0 | 0 | 9% | 9% | 21% | 0% | 3% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1322 | 0 | 2 | 16 | 4 | 3 | 0 | 0 | 0 | 0 | 5 | 0 | 0 | 0 | 13% | 9% | 12% | 20% | 0% |
| M1323 | 0 | 2 | 16 | 6 | 1 | 0 | 4 | 0 | 0 | 5 | 0 | 0 | 0 | 13% | 9% | 12% | 0% | 1% |
| M1324 | 0 | 2 | 16 | 6 | 2 | 0 | 2 | 0 | 0 | 5 | 0 | 0 | 0 | 13% | 9% | 12% | 0% | 0% |
| M1325 | 0 | 1.25 | 17 | 3 | 1 | 0 | 2 | 0 | 0 | 0 | 0 | 0 | 4.5 | 14% | 9% | 5% | 38% | 0% |
| M1326 | 0 | 1.25 | 17 | 5 | 0 | 0 | 4 | 0 | 0 | 0 | 0 | 0 | 4.5 | 14% | 9% | 5% | 0% | 1% |
| M1327 | 0 | 2 | 16 | 8 | 0 | 0 | 5 | 0 | 0 | 5 | 0 | 0 | 0 | 13% | 9% | 12% | 0% | 1% |
| M1328 | 0 | 1.25 | 17 | 2 | 1 | 0 | 2 | 0 | 0 | 0 | 0 | 0 | 4.5 | 14% | 9% | 5% | 35% | 0% |
| M1329 | 0 | 2 | 16 | 10 | 3 | 0 | 1 | 0 | 0 | 5 | 0 | 0 | 0 | 13% | 9% | 12% | 25% | 2% |
| M1330 | 0 | 2 | 16 | 7 | 2 | 0 | 2 | 0 | 0 | 5 | 0 | 0 | 0 | 13% | 9% | 12% | 0% | 0% |
| M1331 | 0 | 2 | 16 | 3 | 1 | 0 | 6 | 0 | 0 | 5 | 0 | 0 | 0 | 13% | 9% | 12% | 0% | 1% |
| M1332 | 0 | 2 | 17 | 0 | 0 | 0 | 0 | 0 | 0 | 4 | 0 | 0 | 0 | 13% | 9% | 9% | 0% | 1% |
| M1333 | 0 | 2 | 16 | 0 | 2 | 0 | 3 | 0 | 0 | 5 | 0 | 0 | 0 | 13% | 9% | 12% | 0% | 0% |
| M1334 | 0 | 1.25 | 17 | 1 | 1 | 0 | 2 | 0 | 0 | 0 | 0 | 0 | 4.5 | 14% | 9% | 5% | 31% | 0% |
| M1335 | 0 | 2 | 16 | 7 | 0 | 0 | 6 | 0 | 0 | 5 | 0 | 0 | 0 | 12% | 9% | 12% | 0% | 2% |
| M1336 | 0 | 2 | 16 | 9 | 1 | 0 | 3 | 0 | 0 | 5 | 0 | 0 | 0 | 13% | 9% | 12% | 0% | 1% |
| M1337 | 0 | 1.25 | 17 | 6 | 0 | 0 | 4 | 0 | 0 | 0 | 0 | 0 | 4.5 | 14% | 9% | 5% | 0% | 1% |
| M1338 | 0 | 2 | 16 | 3 | 3 | 0 | 0 | 0 | 0 | 5 | 0 | 0 | 0 | 13% | 9% | 12% | 19% | 0% |
| M1339 | 0 | 2 | 16 | 8 | 2 | 0 | 2 | 0 | 0 | 5 | 0 | 0 | 0 | 13% | 9% | 12% | 0% | 0% |
| M1340 | 0 | 2 | 16 | 9 | 3 | 0 | 1 | 0 | 0 | 5 | 0 | 0 | 0 | 13% | 9% | 12% | 21% | 2% |
| M1341 | 0 | 2 | 16 | 8 | 4 | 0 | 0 | 0 | 0 | 5 | 0 | 0 | 0 | 13% | 9% | 12% | 35% | 1% |
| M1342 | 0 | 1.25 | 17 | 0 | 1 | 0 | 2 | 0 | 0 | 0 | 0 | 0 | 4.5 | 14% | 9% | 5% | 26% | 0% |
| M1343 | 0 | 2 | 16 | 1 | 2 | 0 | 3 | 0 | 0 | 5 | 0 | 0 | 0 | 13% | 9% | 12% | 0% | 0% |
| M1344 | 0 | 2 | 16 | 10 | 5 | 0 | 0 | 0 | 0 | 5 | 0 | 0 | 0 | 13% | 9% | 12% | 35% | 2% |
| M1345 | 0 | 2.5 | 12.6 | 1.25 | 1 | 0 | 0 | 0 | 0 | 5 | 0 | 0 | 0 | 8% | 9% | 13% | 0% | 1% |
| M1346 | 0 | 3 | 17 | 1.25 | 1 | 2 | 0 | 1 | 0 | 8 | 0 | 0 | 0 | 14% | 9% | 20% | 16% | 1% |
| M1347 | 0 | 2 | 16 | 9 | 2 | 0 | 2 | 0 | 0 | 5 | 0 | 0 | 0 | 13% | 9% | 12% | 0% | 0% |
| M1348 | 0 | 2 | 16 | 8 | 3 | 0 | 1 | 0 | 0 | 5 | 0 | 0 | 0 | 13% | 9% | 12% | 18% | 0% |
| M1349 | 0 | 1.25 | 17 | 7 | 0 | 0 | 4 | 0 | 0 | 0 | 0 | 0 | 4.5 | 14% | 9% | 5% | 0% | 1% |
| M1350 | 0 | 1.25 | 17 | 4 | 0 | 0 | 10 | 0 | 0 | 0 | 0 | 0 | 4.5 | 14% | 9% | 5% | 0% | 3% |
| M1351 | 0 | 2 | 16 | 8 | 0 | 0 | 9 | 0 | 0 | 5 | 0 | 0 | 0 | 12% | 9% | 12% | 0% | 3% |
| M1352 | 0 | 2 | 16 | 5 | 1 | 0 | 5 | 0 | 0 | 5 | 0 | 0 | 0 | 13% | 9% | 12% | 0% | 1% |
| M1353 | 0 | 1.25 | 17 | 6 | 2 | 0 | 1 | 0 | 0 | 0 | 0 | 0 | 4.5 | 14% | 9% | 6% | 37% | 0% |
| M1354 | 0 | 2 | 17.2 | 1.25 | 1 | 0 | 0 | 0 | 0 | 5 | 0 | 0 | 0 | 14% | 9% | 12% | 29% | 0% |
| M1355 | 0 | 2 | 16 | 2 | 2 | 0 | 3 | 0 | 0 | 5 | 0 | 0 | 0 | 13% | 9% | 12% | 0% | 0% |
| M1356 | 0 | 2 | 16 | 7 | 1 | 0 | 4 | 0 | 0 | 5 | 0 | 0 | 0 | 13% | 9% | 12% | 0% | 1% |
| M1357 | 0 | 2 | 16 | 10 | 0 | 0 | 4 | 0 | 0 | 5 | 0 | 0 | 0 | 13% | 9% | 12% | 0% | 1% |
| M1358 | 0 | 2 | 16 | 10 | 2 | 0 | 2 | 0 | 0 | 5 | 0 | 0 | 0 | 13% | 9% | 12% | 0% | 2% |
| M1359 | 0 | 2 | 16 | 2 | 3 | 0 | 0 | 0 | 0 | 5 | 0 | 0 | 0 | 13% | 9% | 12% | 24% | 0% |
| M1360 | 0 | 2 | 16 | 7 | 3 | 0 | 1 | 0 | 0 | 5 | 0 | 0 | 0 | 13% | 9% | 12% | 15% | 0% |
| M1361 | 0 | 1.25 | 17 | 8 | 0 | 0 | 4 | 0 | 0 | 0 | 0 | 0 | 4.5 | 14% | 9% | 5% | 0% | 1% |
| M1362 | 0 | 3.5 | 17 | 1.25 | 1 | 2 | 0 | 1 | 0 | 9 | 0 | 0 | 0 | 14% | 9% | 22% | 0% | 3% |
| M1363 | 0 | 2 | 16 | 10 | 1 | 0 | 3 | 0 | 0 | 5 | 0 | 0 | 0 | 13% | 9% | 12% | 0% | 1% |
| M1364 | 0 | 2 | 16 | 3 | 2 | 0 | 3 | 0 | 0 | 5 | 0 | 0 | 0 | 13% | 9% | 12% | 0% | 0% |
| M1365 | 0 | 2.4 | 14 | 10 | 1 | 0 | 0 | 0 | 0 | 5 | 0 | 0 | 0 | 10% | 9% | 12% | 0% | 3% |
| M1366 | 0 | 2.4 | 14.2 | 1.25 | 1 | 0 | 0 | 0 | 0 | 5 | 0 | 0 | 0 | 10% | 9% | 12% | 0% | 1% |
| M1367 | 0 | 2 | 16 | 7 | 4 | 0 | 0 | 0 | 0 | 5 | 0 | 0 | 0 | 13% | 9% | 12% | 38% | 0% |
| M1368 | 0 | 1.25 | 17 | 9 | 0 | 0 | 4 | 0 | 0 | 0 | 0 | 0 | 4.5 | 14% | 9% | 5% | 0% | 1% |
| M1369 | 0 | 2 | 16 | 7 | 0 | 0 | 7 | 0 | 0 | 5 | 0 | 0 | 0 | 12% | 9% | 12% | 0% | 2% |
| M1370 | 0 | 2 | 16 | 6 | 3 | 0 | 1 | 0 | 0 | 5 | 0 | 0 | 0 | 13% | 9% | 12% | 12% | 0% |
| M1371 | 0 | 2 | 16 | 4 | 1 | 0 | 6 | 0 | 0 | 5 | 0 | 0 | 0 | 12% | 9% | 12% | 0% | 2% |
| M1372 | 0 | 1.25 | 17 | 5 | 2 | 0 | 1 | 0 | 0 | 0 | 0 | 0 | 4.5 | 14% | 9% | 6% | 35% | 0% |
| M1373 | 0 | 2 | 16 | 1 | 3 | 0 | 0 | 0 | 0 | 5 | 0 | 0 | 0 | 13% | 9% | 12% | 28% | 0% |
| M1374 | 0 | 2 | 16 | 4 | 2 | 0 | 3 | 0 | 0 | 5 | 0 | 0 | 0 | 13% | 9% | 12% | 0% | 0% |
| M1375 | 0 | 2.3 | 16 | 1 | 1 | 0 | 0 | 0 | 0 | 5 | 0 | 0 | 0 | 12% | 9% | 12% | 0% | 2% |
| M1376 | 0 | 1.25 | 17 | 10 | 0 | 0 | 4 | 0 | 0 | 0 | 0 | 0 | 4.5 | 14% | 9% | 5% | 0% | 1% |
| M1377 | 0 | 2 | 16 | 9 | 5 | 0 | 0 | 0 | 0 | 5 | 0 | 0 | 0 | 13% | 9% | 12% | 32% | 1% |
| M1378 | 0 | 1.25 | 17 | 10 | 2 | 0 | 2 | 0 | 0 | 0 | 0 | 0 | 4.5 | 14% | 9% | 6% | 34% | 3% |
| M1379 | 0 | 2 | 16 | 9 | 0 | 0 | 5 | 0 | 0 | 5 | 0 | 0 | 0 | 12% | 9% | 12% | 0% | 1% |
| M1380 | 0 | 2 | 16 | 5 | 3 | 0 | 1 | 0 | 0 | 5 | 0 | 0 | 0 | 13% | 9% | 12% | 9% | 0% |
| M1381 | 0 | 1.25 | 17 | 10 | 1 | 0 | 3 | 0 | 0 | 0 | 0 | 0 | 4.5 | 14% | 9% | 5% | 5% | 1% |
| M1382 | 0 | 1.25 | 17 | 3 | 0 | 0 | 5 | 0 | 0 | 0 | 0 | 0 | 4.5 | 14% | 9% | 5% | 0% | 0% |
| M1383 | 0 | 2 | 16 | 0 | 2 | 0 | 4 | 0 | 0 | 5 | 0 | 0 | 0 | 13% | 9% | 12% | 0% | 0% |
| M1384 | 0 | 2 | 16 | 3 | 1 | 0 | 7 | 0 | 0 | 5 | 0 | 0 | 0 | 12% | 9% | 12% | 0% | 2% |
| M1385 | 0 | 2 | 16 | 8 | 1 | 0 | 4 | 0 | 0 | 5 | 0 | 0 | 0 | 13% | 9% | 12% | 0% | 1% |
| M1386 | 0 | 2 | 17 | 1.25 | 1 | 0 | 0 | 1 | 0 | 4 | 0 | 0 | 0 | 13% | 9% | 10% | 7% | 3% |
| M1387 | 0 | 2 | 16 | 5 | 2 | 0 | 3 | 0 | 0 | 5 | 0 | 0 | 0 | 13% | 9% | 12% | 0% | 0% |
| M1388 | 0 | 1.25 | 17 | 9 | 1 | 0 | 3 | 0 | 0 | 0 | 0 | 0 | 4.5 | 14% | 9% | 5% | 7% | 1% |
| M1389 | 0 | 2 | 16 | 6 | 1 | 0 | 5 | 0 | 0 | 5 | 0 | 0 | 0 | 13% | 9% | 12% | 0% | 1% |
| M1390 | 0 | 3 | 12 | 1.25 | 1 | 2 | 0 | 1 | 0 | 6 | 0 | 0 | 0 | 8% | 9% | 17% | 0% | 4% |
| M1391 | 0 | 1.25 | 17 | 8 | 1 | 0 | 0 | 0 | 0 | 0 | 0 | 0 | 4.5 | 14% | 9% | 5% | 12% | 1% |
| M1392 | 0 | 2 | 16 | 4 | 3 | 0 | 1 | 0 | 0 | 5 | 0 | 0 | 0 | 13% | 9% | 12% | 8% | 0% |
| M1393 | 0 | 2 | 16 | 10 | 4 | 0 | 1 | 0 | 0 | 5 | 0 | 0 | 0 | 13% | 9% | 12% | 25% | 2% |
| M1394 | 0 | 2 | 16 | 8 | 0 | 0 | 6 | 0 | 0 | 5 | 0 | 0 | 0 | 12% | 9% | 12% | 0% | 2% |
| M1395 | 0 | 2 | 16 | 0 | 3 | 0 | 0 | 0 | 0 | 5 | 0 | 0 | 0 | 13% | 9% | 12% | 33% | 0% |
| M1396 | 0 | 1.25 | 17 | 7 | 1 | 0 | 3 | 0 | 0 | 0 | 0 | 0 | 4.5 | 14% | 9% | 5% | 17% | 1% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1397 | 0 | 1.25 | 17 | 9 | 2 | 0 | 2 | 0 | 0 | 0 | 0 | 0 | 4.5 | 14% | 9% | 6% | 31% | 0% |
| M1398 | 0 | 1.25 | 17 | 4 | 2 | 0 | 1 | 0 | 0 | 0 | 0 | 0 | 4.5 | 14% | 9% | 6% | 39% | 0% |
| M1399 | 0 | 2 | 16 | 1 | 2 | 0 | 4 | 0 | 0 | 5 | 0 | 0 | 0 | 13% | 9% | 12% | 0% | 0% |
| M1400 | 0 | 2 | 16 | 6 | 2 | 0 | 3 | 0 | 0 | 5 | 0 | 0 | 0 | 13% | 9% | 12% | 0% | 0% |
| M1401 | 0 | 1.25 | 17 | 6 | 1 | 0 | 3 | 0 | 0 | 0 | 0 | 0 | 4.5 | 14% | 9% | 5% | 21% | 1% |
| M1402 | 0 | 1.25 | 17 | 4 | 0 | 0 | 5 | 0 | 0 | 0 | 0 | 0 | 4.5 | 14% | 9% | 5% | 0% | 2% |
| M1403 | 0 | 1.5 | 17 | 1.25 | 1 | 0 | 0 | 1 | 0 | 3 | 0 | 0 | 0 | 14% | 9% | 7% | 32% | 0% |
| M1404 | 0 | 1.25 | 17 | 5 | 1 | 0 | 3 | 0 | 0 | 0 | 0 | 0 | 4.5 | 14% | 9% | 5% | 25% | 1% |
| M1405 | 0 | 2 | 16 | 3 | 3 | 0 | 1 | 0 | 0 | 5 | 0 | 0 | 0 | 13% | 9% | 12% | 13% | 0% |
| M1406 | 0 | 2.1 | 15.6 | 1.25 | 1 | 0 | 0 | 0 | 0 | 5 | 0 | 0 | 0 | 12% | 9% | 12% | 0% | 0% |
| M1407 | 0 | 1.25 | 17 | 4 | 1 | 0 | 3 | 0 | 0 | 0 | 0 | 0 | 4.5 | 14% | 9% | 5% | 24% | 1% |
| M1408 | 0 | 2 | 16 | 7 | 2 | 0 | 3 | 0 | 0 | 5 | 0 | 0 | 0 | 13% | 9% | 12% | 0% | 0% |
| M1409 | 0 | 2 | 16 | 8 | 5 | 0 | 0 | 0 | 0 | 5 | 0 | 0 | 0 | 13% | 9% | 12% | 34% | 1% |
| M1410 | 0 | 1.25 | 17 | 3 | 1 | 0 | 3 | 0 | 0 | 0 | 0 | 0 | 4.5 | 14% | 9% | 5% | 21% | 1% |
| M1411 | 0 | 2 | 16 | 2 | 2 | 0 | 4 | 0 | 0 | 5 | 0 | 0 | 0 | 13% | 9% | 12% | 0% | 1% |
| M1412 | 0 | 1.9 | 16 | 1.25 | 1 | 0 | 0 | 1 | 0 | 3.5 | 0 | 0 | 0 | 12% | 9% | 9% | 0% | 2% |
| M1413 | 0 | 2 | 16 | 9 | 4 | 0 | 1 | 0 | 0 | 5 | 0 | 0 | 0 | 13% | 9% | 12% | 28% | 0% |
| M1414 | 0 | 2 | 16 | 5 | 1 | 0 | 6 | 0 | 0 | 5 | 0 | 0 | 0 | 12% | 9% | 12% | 0% | 2% |
| M1415 | 0 | 1.25 | 17 | 2 | 1 | 0 | 3 | 0 | 0 | 0 | 0 | 0 | 4.5 | 14% | 9% | 5% | 18% | 0% |
| M1416 | 0 | 1.25 | 17 | 8 | 2 | 0 | 2 | 0 | 0 | 0 | 0 | 0 | 4.5 | 14% | 9% | 6% | 28% | 0% |
| M1417 | 0 | 2.5 | 12.8 | 1.25 | 1 | 0 | 0 | 0 | 0 | 5 | 0 | 0 | 0 | 8% | 9% | 12% | 0% | 1% |
| M1418 | 0 | 1.25 | 17 | 5 | 0 | 0 | 5 | 0 | 0 | 0 | 0 | 0 | 4.5 | 14% | 9% | 5% | 0% | 2% |
| M1419 | 0 | 2.5 | 13 | 0 | 0 | 0 | 0 | 0 | 0 | 5 | 0 | 0 | 0 | 8% | 9% | 12% | 0% | 1% |
| M1420 | 0 | 1.25 | 17 | 1 | 1 | 0 | 3 | 0 | 0 | 0 | 0 | 0 | 4.5 | 14% | 9% | 6% | 15% | 0% |
| M1421 | 0 | 2 | 16 | 9 | 1 | 0 | 4 | 0 | 0 | 5 | 0 | 0 | 0 | 13% | 9% | 12% | 0% | 1% |
| M1422 | 0 | 2 | 16 | 2 | 3 | 0 | 1 | 0 | 0 | 5 | 0 | 0 | 0 | 13% | 9% | 12% | 18% | 0% |
| M1423 | 0 | 1.25 | 17 | 0 | 1 | 0 | 3 | 0 | 0 | 0 | 0 | 0 | 4.5 | 14% | 9% | 6% | 12% | 0% |
| M1424 | 0 | 2.4 | 14.4 | 1.25 | 1 | 0 | 0 | 0 | 0 | 5 | 0 | 0 | 0 | 10% | 9% | 12% | 0% | 1% |
| M1425 | 0 | 2 | 17.4 | 1.25 | 1 | 0 | 0 | 0 | 0 | 5 | 0 | 0 | 0 | 14% | 9% | 12% | 33% | 0% |
| M1426 | 0 | 2 | 16 | 8 | 2 | 0 | 3 | 0 | 0 | 5 | 0 | 0 | 0 | 13% | 9% | 12% | 0% | 1% |
| M1427 | 0 | 2 | 16 | 7 | 1 | 0 | 5 | 0 | 0 | 5 | 0 | 0 | 0 | 13% | 9% | 12% | 0% | 1% |
| M1428 | 0 | 2.2 | 15.8 | 1.25 | 1 | 0 | 0 | 0 | 0 | 5 | 0 | 0 | 0 | 12% | 9% | 12% | 0% | 0% |
| M1429 | 0 | 2 | 16 | 3 | 2 | 0 | 4 | 0 | 0 | 5 | 0 | 0 | 0 | 13% | 9% | 12% | 0% | 1% |
| M1430 | 0 | 2 | 14 | 0 | 0 | 0 | 0 | 0 | 0 | 3.5 | 0 | 0 | 0 | 10% | 9% | 9% | 0% | 1% |
| M1431 | 0 | 2 | 16 | 10 | 3 | 0 | 2 | 0 | 0 | 5 | 0 | 0 | 0 | 13% | 9% | 12% | 7% | 2% |
| M1432 | 0 | 2 | 16 | 4 | 1 | 0 | 7 | 0 | 0 | 5 | 0 | 0 | 0 | 12% | 9% | 12% | 0% | 2% |
| M1433 | 0 | 2 | 16 | 4 | 1 | 0 | 10 | 0 | 0 | 5 | 0 | 0 | 0 | 12% | 9% | 12% | 0% | 3% |
| M1434 | 0 | 1.8 | 15 | 1.25 | 1 | 0 | 0 | 1 | 0 | 3 | 0 | 0 | 0 | 11% | 9% | 7% | 0% | 0% |
| M1435 | 0 | 1.25 | 17 | 6 | 0 | 0 | 5 | 0 | 0 | 0 | 0 | 0 | 4.5 | 14% | 9% | 5% | 0% | 2% |
| M1436 | 0 | 2 | 16 | 10 | 0 | 0 | 5 | 0 | 0 | 5 | 0 | 0 | 0 | 12% | 9% | 12% | 0% | 1% |
| M1437 | 0 | 2 | 16 | 3 | 1 | 0 | 8 | 0 | 0 | 5 | 0 | 0 | 0 | 12% | 9% | 12% | 0% | 2% |
| M1438 | 0 | 1.25 | 17 | 7 | 2 | 0 | 2 | 0 | 0 | 0 | 0 | 0 | 4.5 | 14% | 9% | 6% | 25% | 0% |
| M1439 | 0 | 2 | 16 | 0 | 2 | 0 | 5 | 0 | 0 | 5 | 0 | 0 | 0 | 13% | 9% | 12% | 0% | 0% |
| M1440 | 0 | 2 | 16 | 1 | 3 | 0 | 1 | 0 | 0 | 5 | 0 | 0 | 0 | 13% | 9% | 12% | 23% | 0% |
| M1441 | 0 | 2 | 16 | 9 | 3 | 0 | 2 | 0 | 0 | 5 | 0 | 0 | 0 | 13% | 9% | 12% | 5% | 2% |
| M1442 | 0 | 2 | 16 | 8 | 4 | 0 | 1 | 0 | 0 | 5 | 0 | 0 | 0 | 13% | 9% | 12% | 31% | 2% |
| M1443 | 0 | 2 | 16 | 9 | 2 | 0 | 3 | 0 | 0 | 5 | 0 | 0 | 0 | 13% | 9% | 12% | 0% | 1% |
| M1444 | 0 | 1.5 | 16 | 0 | 0 | 4.5 | 0 | 0 | 0 | 0 | 0 | 0 | 0 | 12% | 9% | 5% | 0% | 1% |
| M1445 | 0 | 2 | 16 | 8 | 3 | 0 | 2 | 0 | 0 | 5 | 0 | 0 | 0 | 13% | 9% | 12% | 2% | 1% |
| M1446 | 0 | 2 | 16 | 4 | 2 | 0 | 4 | 0 | 0 | 5 | 0 | 0 | 0 | 13% | 9% | 12% | 0% | 1% |
| M1447 | 0 | 2.5 | 13 | 1.25 | 1 | 0 | 0 | 1 | 0 | 5 | 0 | 0 | 0 | 9% | 10% | 13% | 0% | 2% |
| M1448 | 0 | 2 | 16 | 7 | 3 | 0 | 2 | 0 | 0 | 5 | 0 | 0 | 0 | 13% | 10% | 12% | 0% | 0% |
| M1449 | 0 | 1.25 | 17 | 7 | 0 | 0 | 5 | 0 | 0 | 0 | 0 | 0 | 4.5 | 14% | 10% | 5% | 0% | 2% |
| M1450 | 0 | 2 | 16 | 7 | 5 | 0 | 0 | 0 | 0 | 5 | 0 | 0 | 0 | 13% | 10% | 12% | 36% | 1% |
| M1451 | 0 | 2 | 16 | 10 | 2 | 0 | 3 | 0 | 0 | 5 | 0 | 0 | 0 | 13% | 10% | 12% | 0% | 2% |
| M1452 | 0 | 2 | 16 | 10 | 1 | 0 | 4 | 0 | 0 | 5 | 0 | 0 | 0 | 13% | 10% | 12% | 0% | 1% |
| M1453 | 0 | 2 | 16 | 0 | 3 | 0 | 1 | 0 | 0 | 5 | 0 | 0 | 0 | 13% | 10% | 12% | 28% | 0% |
| M1454 | 0 | 2 | 16 | 4 | 4 | 0 | 0 | 0 | 0 | 5 | 0 | 0 | 0 | 13% | 10% | 12% | 38% | 0% |
| M1455 | 0 | 2 | 16 | 1 | 2 | 0 | 5 | 0 | 0 | 5 | 0 | 0 | 0 | 13% | 10% | 12% | 0% | 1% |
| M1456 | 0 | 2 | 16 | 6 | 3 | 0 | 2 | 0 | 0 | 5 | 0 | 0 | 0 | 13% | 10% | 12% | 0% | 0% |
| M1457 | 0 | 1.9 | 13 | 1.25 | 1 | 0 | 0 | 1 | 0 | 3 | 0 | 0 | 0 | 9% | 10% | 8% | 0% | 1% |
| M1458 | 0 | 1.25 | 17 | 6 | 2 | 0 | 2 | 0 | 0 | 0 | 0 | 0 | 4.5 | 14% | 10% | 6% | 26% | 0% |
| M1459 | 0 | 2 | 16 | 9 | 0 | 0 | 6 | 0 | 0 | 5 | 0 | 0 | 0 | 12% | 10% | 12% | 0% | 2% |
| M1460 | 0 | 2 | 16 | 10 | 5 | 0 | 1 | 0 | 0 | 5 | 0 | 0 | 0 | 13% | 10% | 12% | 24% | 2% |
| M1461 | 0 | 2.2 | 13 | 1.25 | 1 | 0 | 0 | 1 | 0 | 4 | 0 | 0 | 0 | 9% | 10% | 10% | 0% | 2% |
| M1462 | 0 | 2.3 | 16 | 1.25 | 1 | 0 | 0 | 0 | 0 | 5 | 0 | 0 | 0 | 12% | 10% | 12% | 0% | 0% |
| M1463 | 0 | 1.75 | 17 | 0 | 0 | 0 | 0 | 0 | 0 | 3 | 0 | 0 | 0 | 13% | 10% | 7% | 0% | 1% |
| M1464 | 0 | 2 | 16 | 6 | 1 | 0 | 6 | 0 | 0 | 5 | 0 | 0 | 0 | 12% | 10% | 12% | 0% | 2% |
| M1465 | 0 | 2 | 16 | 7 | 4 | 0 | 1 | 0 | 0 | 5 | 0 | 0 | 0 | 13% | 10% | 12% | 31% | 2% |
| M1466 | 0 | 2 | 16 | 5 | 3 | 0 | 2 | 0 | 0 | 5 | 0 | 0 | 0 | 13% | 10% | 12% | 0% | 0% |
| M1467 | 0 | 2 | 16 | 5 | 2 | 0 | 4 | 0 | 0 | 5 | 0 | 0 | 0 | 13% | 10% | 12% | 0% | 1% |
| M1468 | 0 | 1.25 | 17 | 8 | 0 | 0 | 5 | 0 | 0 | 0 | 0 | 0 | 4.5 | 14% | 10% | 5% | 0% | 2% |
| M1469 | 0 | 2 | 16 | 8 | 0 | 0 | 7 | 0 | 0 | 5 | 0 | 0 | 0 | 12% | 10% | 12% | 0% | 2% |
| M1470 | 0 | 2 | 16 | 8 | 1 | 0 | 5 | 0 | 0 | 5 | 0 | 0 | 0 | 12% | 10% | 12% | 0% | 1% |
| M1471 | 0 | 2 | 16 | 4 | 3 | 0 | 2 | 0 | 0 | 5 | 0 | 0 | 0 | 13% | 10% | 12% | 0% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1472 | 0 | 2 | 16 | 2 | 2 | 0 | 5 | 0 | 0 | 5 | 0 | 0 | 0 | 13% | 10% | 12% | 0% | 1% |
| M1473 | 0 | 1.25 | 17 | 5 | 2 | 0 | 2 | 0 | 0 | 0 | 0 | 0 | 4.5 | 14% | 10% | 6% | 30% | 0% |
| M1474 | 0 | 1.25 | 17 | 9 | 0 | 0 | 5 | 0 | 0 | 0 | 0 | 0 | 4.5 | 14% | 10% | 5% | 0% | 2% |
| M1475 | 0 | 1.25 | 17 | 3 | 0 | 0 | 6 | 0 | 0 | 0 | 0 | 0 | 4.5 | 14% | 10% | 5% | 0% | 0% |
| M1476 | 0 | 2.5 | 16 | 1.25 | 1 | 2 | 0 | 1 | 0 | 5 | 0 | 0 | 0 | 12% | 10% | 14% | 1% | 3% |
| M1477 | 0 | 2 | 16 | 3 | 3 | 0 | 2 | 0 | 0 | 5 | 0 | 0 | 0 | 13% | 10% | 12% | 6% | 0% |
| M1478 | 0 | 2 | 16 | 6 | 2 | 0 | 4 | 0 | 0 | 5 | 0 | 0 | 0 | 13% | 10% | 12% | 0% | 1% |
| M1479 | 0 | 2 | 16 | 5 | 1 | 0 | 7 | 0 | 0 | 5 | 0 | 0 | 0 | 12% | 10% | 12% | 0% | 0% |
| M1480 | 0 | 2.4 | 14.6 | 1.25 | 1 | 0 | 0 | 0 | 0 | 5 | 0 | 0 | 0 | 10% | 10% | 12% | 0% | 2% |
| M1481 | 0 | 2 | 16 | 6 | 4 | 0 | 1 | 0 | 0 | 5 | 0 | 0 | 0 | 13% | 10% | 12% | 28% | 0% |
| M1482 | 0 | 2 | 16 | 0 | 2 | 0 | 6 | 0 | 0 | 5 | 0 | 0 | 0 | 13% | 10% | 12% | 0% | 0% |
| M1483 | 0 | 2 | 16 | 3 | 4 | 0 | 0 | 0 | 0 | 5 | 0 | 0 | 0 | 13% | 10% | 12% | 34% | 0% |
| M1484 | 0 | 2 | 16 | 9 | 5 | 0 | 1 | 0 | 0 | 5 | 0 | 0 | 0 | 13% | 10% | 12% | 27% | 2% |
| M1485 | 0 | 1.25 | 17 | 10 | 0 | 0 | 5 | 0 | 0 | 0 | 0 | 0 | 4.5 | 14% | 10% | 5% | 0% | 2% |
| M1486 | 0 | 2 | 16 | 2 | 3 | 0 | 2 | 0 | 0 | 5 | 0 | 0 | 0 | 13% | 10% | 12% | 12% | 0% |
| M1487 | 0 | 2 | 16 | 6 | 5 | 0 | 0 | 0 | 0 | 5 | 0 | 0 | 0 | 13% | 10% | 12% | 39% | 1% |
| M1488 | 0 | 2 | 16 | 4 | 1 | 0 | 8 | 0 | 0 | 5 | 0 | 0 | 0 | 12% | 10% | 12% | 0% | 2% |
| M1489 | 0 | 2.5 | 13 | 1.25 | 1 | 0 | 0 | 0 | 0 | 5 | 0 | 0 | 0 | 9% | 10% | 12% | 0% | 1% |
| M1490 | 0 | 2 | 14 | 1.25 | 1 | 0 | 0 | 1 | 0 | 3.5 | 0 | 0 | 0 | 10% | 10% | 9% | 0% | 2% |
| M1491 | 0 | 2 | 16 | 3 | 2 | 0 | 5 | 0 | 0 | 5 | 0 | 0 | 0 | 13% | 10% | 12% | 0% | 1% |
| M1492 | 0 | 3 | 17 | 1.25 | 1 | 2 | 0 | 1 | 0 | 7 | 0 | 0 | 0 | 13% | 10% | 18% | 0% | 4% |
| M1493 | 0 | 1.25 | 17 | 3 | 0 | 0 | 7 | 0 | 0 | 0 | 0 | 0 | 4.5 | 14% | 10% | 5% | 0% | 1% |
| M1494 | 0 | 1.25 | 17 | 4 | 2 | 0 | 2 | 0 | 0 | 0 | 0 | 0 | 4.5 | 14% | 10% | 6% | 34% | 0% |
| M1495 | 0 | 2 | 16 | 7 | 2 | 0 | 4 | 0 | 0 | 5 | 0 | 0 | 0 | 13% | 10% | 12% | 0% | 1% |
| M1496 | 0 | 2 | 17.6 | 1.25 | 1 | 0 | 0 | 0 | 0 | 5 | 0 | 0 | 0 | 14% | 10% | 12% | 36% | 0% |
| M1497 | 0 | 1.25 | 17 | 10 | 1 | 0 | 4 | 0 | 0 | 0 | 0 | 0 | 4.5 | 14% | 10% | 5% | 0% | 1% |
| M1498 | 0 | 1.25 | 17 | 4 | 0 | 0 | 6 | 0 | 0 | 0 | 0 | 0 | 4.5 | 14% | 10% | 5% | 0% | 2% |
| M1499 | 0 | 1.25 | 17 | 10 | 2 | 0 | 3 | 0 | 0 | 0 | 0 | 0 | 4.5 | 14% | 10% | 6% | 18% | 4% |
| M1500 | 0 | 2 | 16 | 1 | 3 | 0 | 2 | 0 | 0 | 5 | 0 | 0 | 0 | 13% | 10% | 12% | 17% | 0% |
| M1501 | 0 | 1.25 | 17 | 9 | 1 | 0 | 4 | 0 | 0 | 0 | 0 | 0 | 4.5 | 14% | 10% | 5% | 0% | 1% |
| M1502 | 0 | 1.25 | 17 | 8 | 1 | 0 | 4 | 0 | 0 | 0 | 0 | 0 | 4.5 | 14% | 10% | 5% | 3% | 1% |
| M1503 | 0 | 1.25 | 17 | 7 | 1 | 0 | 4 | 0 | 0 | 0 | 0 | 0 | 4.5 | 14% | 10% | 5% | 9% | 1% |
| M1504 | 0 | 2 | 16 | 7 | 1 | 0 | 6 | 0 | 0 | 5 | 0 | 0 | 0 | 12% | 10% | 12% | 0% | 0% |
| M1505 | 0 | 1.25 | 17 | 6 | 1 | 0 | 4 | 0 | 0 | 0 | 0 | 0 | 4.5 | 14% | 10% | 5% | 9% | 1% |
| M1506 | 0 | 2 | 16 | 10 | 4 | 0 | 2 | 0 | 0 | 5 | 0 | 0 | 0 | 13% | 10% | 12% | 20% | 2% |
| M1507 | 0 | 1.25 | 17 | 5 | 1 | 0 | 4 | 0 | 0 | 0 | 0 | 0 | 4.5 | 14% | 10% | 5% | 8% | 1% |
| M1508 | 0 | 2 | 16 | 9 | 1 | 0 | 5 | 0 | 0 | 5 | 0 | 0 | 0 | 12% | 10% | 12% | 0% | 1% |
| M1509 | 0 | 1.25 | 17 | 4 | 1 | 0 | 4 | 0 | 0 | 0 | 0 | 0 | 4.5 | 14% | 10% | 5% | 6% | 1% |
| M1510 | 0 | 1.25 | 17 | 3 | 1 | 0 | 4 | 0 | 0 | 0 | 0 | 0 | 4.5 | 14% | 10% | 5% | 4% | 1% |
| M1511 | 0 | 1.25 | 17 | 2 | 1 | 0 | 4 | 0 | 0 | 0 | 0 | 0 | 4.5 | 14% | 10% | 6% | 2% | 0% |
| M1512 | 0 | 2 | 16 | 1 | 2 | 0 | 6 | 0 | 0 | 5 | 0 | 0 | 0 | 12% | 10% | 12% | 0% | 1% |
| M1513 | 0 | 2 | 16 | 5 | 4 | 0 | 1 | 0 | 0 | 5 | 0 | 0 | 0 | 13% | 10% | 12% | 26% | 0% |
| M1514 | 0 | 1.25 | 17 | 1 | 1 | 0 | 4 | 0 | 0 | 0 | 0 | 0 | 4.5 | 14% | 10% | 6% | 0% | 0% |
| M1515 | 0 | 1.25 | 17 | 0 | 1 | 0 | 4 | 0 | 0 | 0 | 0 | 0 | 4.5 | 14% | 10% | 6% | 0% | 0% |
| M1516 | 0 | 2 | 16 | 3 | 3 | 0 | 2 | 0 | 0 | 5 | 0 | 0 | 0 | 13% | 10% | 12% | 22% | 0% |
| M1517 | 0 | 1.25 | 17 | 9 | 2 | 0 | 3 | 0 | 0 | 0 | 0 | 0 | 4.5 | 14% | 10% | 6% | 16% | 1% |
| M1518 | 0 | 2 | 16 | 8 | 2 | 0 | 4 | 0 | 0 | 5 | 0 | 0 | 0 | 13% | 10% | 12% | 0% | 1% |
| M1519 | 0 | 2 | 16 | 4 | 2 | 0 | 5 | 0 | 0 | 5 | 0 | 0 | 0 | 12% | 10% | 12% | 0% | 1% |
| M1520 | 0 | 2 | 16 | 10 | 0 | 0 | 6 | 0 | 0 | 5 | 0 | 0 | 0 | 12% | 10% | 12% | 0% | 2% |
| M1521 | 0 | 1.25 | 17 | 3 | 2 | 0 | 2 | 0 | 0 | 0 | 0 | 0 | 4.5 | 14% | 10% | 6% | 37% | 0% |
| M1522 | 0 | 1.25 | 17 | 5 | 0 | 0 | 6 | 0 | 0 | 0 | 0 | 0 | 4.5 | 14% | 10% | 5% | 0% | 2% |
| M1523 | 0 | 2.1 | 15 | 1.25 | 1 | 0 | 0 | 1 | 0 | 4 | 0 | 0 | 0 | 11% | 10% | 10% | 0% | 2% |
| M1524 | 0 | 2 | 16 | 8 | 5 | 0 | 1 | 0 | 0 | 5 | 0 | 0 | 0 | 13% | 10% | 12% | 30% | 2% |
| M1525 | 0 | 2 | 16 | 2 | 4 | 0 | 0 | 0 | 0 | 5 | 0 | 0 | 0 | 13% | 10% | 12% | 31% | 0% |
| M1526 | 0 | 2.1 | 15.8 | 1.25 | 1 | 0 | 0 | 0 | 0 | 5 | 0 | 0 | 0 | 12% | 10% | 12% | 5% | 0% |
| M1527 | 0 | 2.2 | 14 | 8.5 | 1 | 0 | 0 | 0 | 0 | 5 | 0 | 0 | 0 | 11% | 10% | 12% | 0% | 0% |
| M1528 | 0 | 2 | 16 | 9 | 4 | 0 | 2 | 0 | 0 | 5 | 0 | 0 | 0 | 13% | 10% | 12% | 18% | 2% |
| M1529 | 0 | 2.25 | 15 | 0 | 0 | 0 | 0 | 0 | 0 | 4.5 | 0 | 0 | 0 | 11% | 10% | 11% | 0% | 2% |
| M1530 | 0 | 2 | 16 | 6 | 1 | 0 | 7 | 0 | 0 | 5 | 0 | 0 | 0 | 12% | 10% | 12% | 0% | 0% |
| M1531 | 0 | 2.2 | 16 | 1.25 | 1 | 0 | 0 | 1 | 0 | 4.5 | 0 | 0 | 0 | 12% | 10% | 11% | 0% | 3% |
| M1532 | 0 | 2 | 16 | 9 | 0 | 0 | 7 | 0 | 0 | 5 | 0 | 0 | 0 | 12% | 10% | 12% | 0% | 2% |
| M1533 | 0 | 1.25 | 17 | 8 | 2 | 0 | 3 | 0 | 0 | 0 | 0 | 0 | 4.5 | 14% | 10% | 6% | 13% | 1% |
| M1534 | 0 | 2 | 16 | 8 | 0 | 0 | 8 | 0 | 0 | 5 | 0 | 0 | 0 | 12% | 10% | 12% | 0% | 0% |
| M1535 | 0 | 2.3 | 17 | 1.25 | 1 | 0 | 0 | 1 | 0 | 5 | 0 | 0 | 0 | 13% | 10% | 12% | 0% | 3% |
| M1536 | 0 | 2.3 | 14 | 1.25 | 1 | 0 | 0 | 1 | 0 | 4.5 | 0 | 0 | 0 | 10% | 10% | 11% | 0% | 2% |
| M1537 | 0 | 2 | 16 | 2 | 2 | 0 | 6 | 0 | 0 | 5 | 0 | 0 | 0 | 12% | 10% | 12% | 0% | 1% |
| M1538 | 0 | 2 | 16 | 9 | 2 | 0 | 4 | 0 | 0 | 5 | 0 | 0 | 0 | 13% | 10% | 12% | 0% | 1% |
| M1539 | 0 | 2 | 16 | 0 | 2 | 0 | 7 | 0 | 0 | 5 | 0 | 0 | 0 | 12% | 10% | 12% | 0% | 1% |
| M1540 | 0 | 2 | 16 | 4 | 4 | 0 | 1 | 0 | 0 | 5 | 0 | 0 | 0 | 13% | 10% | 12% | 23% | 0% |
| M1541 | 0 | 1.25 | 17 | 6 | 0 | 0 | 6 | 0 | 0 | 0 | 0 | 0 | 4.5 | 14% | 10% | 5% | 0% | 2% |
| M1542 | 0 | 2 | 16 | 5 | 2 | 0 | 5 | 0 | 0 | 5 | 0 | 0 | 0 | 12% | 10% | 12% | 0% | 1% |
| M1543 | 0 | 2 | 16 | 10 | 3 | 0 | 3 | 0 | 0 | 5 | 0 | 0 | 0 | 13% | 10% | 12% | 0% | 2% |
| M1544 | 0 | 2 | 16 | 9 | 3 | 0 | 3 | 0 | 0 | 5 | 0 | 0 | 0 | 13% | 10% | 12% | 0% | 2% |
| M1545 | 0 | 2 | 16 | 8 | 3 | 0 | 3 | 0 | 0 | 5 | 0 | 0 | 0 | 13% | 10% | 12% | 0% | 0% |
| M1546 | 0 | 2 | 16 | 8 | 4 | 0 | 2 | 0 | 0 | 5 | 0 | 0 | 0 | 13% | 10% | 12% | 16% | 2% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1547 | 0 | 2 | 16 | 7 | 3 | 0 | 3 | 0 | 0 | 5 | 0 | 0 | 0 | 13% | 10% | 12% | 0% | 0% |
| M1548 | 0 | 2 | 16 | 6 | 3 | 0 | 3 | 0 | 0 | 5 | 0 | 0 | 0 | 13% | 10% | 12% | 0% | 0% |
| M1549 | 0 | 2 | 16 | 5 | 1 | 0 | 8 | 0 | 0 | 5 | 0 | 0 | 0 | 12% | 10% | 12% | 0% | 2% |
| M1550 | 0 | 2.4 | 14.8 | 1.25 | 1 | 0 | 0 | 0 | 0 | 5 | 0 | 0 | 0 | 10% | 10% | 12% | 0% | 0% |
| M1551 | 0 | 2 | 16 | 5 | 3 | 0 | 3 | 0 | 0 | 5 | 0 | 0 | 0 | 13% | 10% | 12% | 0% | 0% |
| M1552 | 0 | 2 | 16 | 10 | 1 | 0 | 5 | 0 | 0 | 5 | 0 | 0 | 0 | 12% | 10% | 12% | 0% | 1% |
| M1553 | 0 | 1.25 | 17 | 7 | 2 | 0 | 3 | 0 | 0 | 0 | 0 | 0 | 4.5 | 14% | 10% | 6% | 15% | 1% |
| M1554 | 0 | 2 | 16 | 4 | 1 | 0 | 9 | 0 | 0 | 5 | 0 | 0 | 0 | 12% | 10% | 12% | 0% | 2% |
| M1555 | 0 | 2 | 16 | 4 | 3 | 0 | 3 | 0 | 0 | 5 | 0 | 0 | 0 | 13% | 10% | 12% | 0% | 0% |
| M1556 | 0 | 2 | 16 | 8 | 1 | 0 | 6 | 0 | 0 | 5 | 0 | 0 | 0 | 12% | 10% | 12% | 0% | 2% |
| M1557 | 0 | 2 | 16 | 3 | 3 | 0 | 3 | 0 | 0 | 5 | 0 | 0 | 0 | 13% | 10% | 12% | 0% | 0% |
| M1558 | 0 | 2 | 16 | 7 | 5 | 0 | 1 | 0 | 0 | 5 | 0 | 0 | 0 | 13% | 10% | 12% | 33% | 2% |
| M1559 | 0 | 2 | 16 | 10 | 2 | 0 | 4 | 0 | 0 | 5 | 0 | 0 | 0 | 13% | 10% | 12% | 0% | 1% |
| M1560 | 0 | 1.25 | 17 | 7 | 0 | 0 | 6 | 0 | 0 | 0 | 0 | 0 | 4.5 | 14% | 10% | 5% | 0% | 2% |
| M1561 | 0 | 2 | 16 | 2 | 3 | 0 | 3 | 0 | 0 | 5 | 0 | 0 | 0 | 13% | 10% | 12% | 4% | 0% |
| M1562 | 0 | 2 | 16 | 7 | 4 | 0 | 2 | 0 | 0 | 5 | 0 | 0 | 0 | 13% | 10% | 12% | 15% | 0% |
| M1563 | 0 | 2.2 | 14 | 10 | 1 | 0 | 0 | 0 | 0 | 5 | 0 | 0 | 0 | 11% | 10% | 12% | 0% | 1% |
| M1564 | 0 | 2 | 16 | 3 | 2 | 0 | 6 | 0 | 0 | 5 | 0 | 0 | 0 | 12% | 10% | 12% | 0% | 1% |
| M1565 | 0 | 2 | 16 | 6 | 2 | 0 | 5 | 0 | 0 | 5 | 0 | 0 | 0 | 12% | 10% | 12% | 0% | 1% |
| M1566 | 0 | 2 | 16 | 1 | 3 | 0 | 3 | 0 | 0 | 5 | 0 | 0 | 0 | 13% | 10% | 12% | 8% | 0% |
| M1567 | 0 | 2 | 16 | 1 | 2 | 0 | 7 | 0 | 0 | 5 | 0 | 0 | 0 | 12% | 10% | 12% | 0% | 2% |
| M1568 | 0 | 2 | 16 | 3 | 4 | 0 | 1 | 0 | 0 | 5 | 0 | 0 | 0 | 13% | 10% | 12% | 21% | 0% |
| M1569 | 0 | 1.25 | 17 | 6 | 2 | 0 | 3 | 0 | 0 | 0 | 0 | 0 | 4.5 | 14% | 10% | 6% | 20% | 1% |
| M1570 | 0 | 2 | 16 | 0 | 3 | 0 | 3 | 0 | 0 | 5 | 0 | 0 | 0 | 13% | 10% | 12% | 7% | 0% |
| M1571 | 0 | 2.5 | 13.2 | 1.25 | 1 | 0 | 0 | 0 | 0 | 5 | 0 | 0 | 0 | 9% | 10% | 12% | 0% | 1% |
| M1572 | 0 | 1.25 | 17 | 8 | 0 | 0 | 6 | 0 | 0 | 0 | 0 | 0 | 4.5 | 14% | 10% | 5% | 0% | 2% |
| M1573 | 0 | 1.75 | 12 | 0 | 0 | 0 | 0 | 0 | 0 | 0 | 0 | 0 | 5 | 8% | 10% | 6% | 0% | 0% |
| M1574 | 0 | 2 | 17.8 | 1.25 | 1 | 0 | 0 | 0 | 0 | 5 | 0 | 0 | 0 | 14% | 10% | 12% | 36% | 0% |
| M1575 | 0 | 2 | 16 | 10 | 5 | 0 | 2 | 0 | 0 | 5 | 0 | 0 | 0 | 13% | 10% | 12% | 19% | 2% |
| M1576 | 0 | 2 | 16 | 6 | 4 | 0 | 2 | 0 | 0 | 5 | 0 | 0 | 0 | 13% | 10% | 12% | 13% | 0% |
| M1577 | 0 | 2 | 16 | 7 | 1 | 0 | 7 | 0 | 0 | 5 | 0 | 0 | 0 | 12% | 10% | 12% | 0% | 2% |
| M1578 | 0 | 2 | 16 | 0 | 2 | 0 | 8 | 0 | 0 | 5 | 0 | 0 | 0 | 12% | 10% | 12% | 0% | 2% |
| M1579 | 0 | 1.25 | 17 | 5 | 2 | 0 | 3 | 0 | 0 | 0 | 0 | 0 | 4.5 | 14% | 10% | 6% | 24% | 1% |
| M1580 | 0 | 2 | 16 | 7 | 2 | 0 | 5 | 0 | 0 | 5 | 0 | 0 | 0 | 12% | 10% | 12% | 0% | 1% |
| M1581 | 0 | 2.5 | 17 | 1.25 | 1 | 2 | 0 | 1 | 0 | 6 | 0 | 0 | 0 | 14% | 10% | 16% | 21% | 1% |
| M1582 | 0 | 2 | 16 | 4 | 2 | 0 | 6 | 0 | 0 | 5 | 0 | 0 | 0 | 12% | 10% | 12% | 0% | 1% |
| M1583 | 0 | 2 | 16 | 6 | 5 | 0 | 1 | 0 | 0 | 5 | 0 | 0 | 0 | 13% | 10% | 12% | 36% | 2% |
| M1584 | 0 | 1.5 | 17 | 0 | 0 | 4.5 | 0 | 0 | 0 | 0 | 0 | 0 | 0 | 13% | 10% | 5% | 0% | 0% |
| M1585 | 0 | 1.25 | 17 | 9 | 0 | 0 | 6 | 0 | 0 | 0 | 0 | 0 | 4.5 | 14% | 10% | 5% | 0% | 2% |
| M1586 | 0 | 2 | 16 | 2 | 4 | 0 | 1 | 0 | 0 | 5 | 0 | 0 | 0 | 13% | 10% | 12% | 19% | 0% |
| M1587 | 0 | 2 | 16 | 2 | 2 | 0 | 7 | 0 | 0 | 5 | 0 | 0 | 0 | 12% | 10% | 12% | 0% | 2% |
| M1588 | 0 | 2 | 16 | 9 | 1 | 0 | 6 | 0 | 0 | 5 | 0 | 0 | 0 | 12% | 10% | 12% | 0% | 2% |
| M1589 | 0 | 2.4 | 15 | 1.25 | 1 | 0 | 0 | 1 | 0 | 5 | 0 | 0 | 0 | 11% | 10% | 12% | 0% | 3% |
| M1590 | 0 | 2 | 16 | 1 | 4 | 0 | 0 | 0 | 0 | 5 | 0 | 0 | 0 | 13% | 10% | 12% | 28% | 0% |
| M1591 | 0 | 1.25 | 17 | 4 | 0 | 0 | 7 | 0 | 0 | 0 | 0 | 0 | 4.5 | 14% | 10% | 5% | 0% | 2% |
| M1592 | 0 | 2 | 16 | 10 | 0 | 0 | 7 | 0 | 0 | 5 | 0 | 0 | 0 | 12% | 10% | 12% | 0% | 2% |
| M1593 | 0 | 2 | 16 | 6 | 1 | 0 | 8 | 0 | 0 | 5 | 0 | 0 | 0 | 12% | 10% | 12% | 0% | 2% |
| M1594 | 0 | 2 | 16 | 5 | 4 | 0 | 2 | 0 | 0 | 5 | 0 | 0 | 0 | 13% | 10% | 12% | 11% | 0% |
| M1595 | 0 | 1.25 | 17 | 4 | 2 | 0 | 3 | 0 | 0 | 0 | 0 | 0 | 4.5 | 14% | 10% | 6% | 28% | 1% |
| M1596 | 0 | 1.25 | 17 | 0 | 1 | 0 | 5 | 0 | 0 | 0 | 0 | 0 | 4.5 | 14% | 10% | 6% | 0% | 2% |
| M1597 | 0 | 2 | 16 | 9 | 5 | 0 | 2 | 0 | 0 | 5 | 0 | 0 | 0 | 13% | 10% | 12% | 22% | 2% |
| M1598 | 0 | 1.25 | 17 | 1 | 1 | 0 | 5 | 0 | 0 | 0 | 0 | 0 | 4.5 | 14% | 10% | 6% | 0% | 0% |
| M1599 | 0 | 1.25 | 17 | 10 | 0 | 0 | 6 | 0 | 0 | 0 | 0 | 0 | 4.5 | 14% | 10% | 5% | 0% | 2% |
| M1600 | 0 | 2 | 16 | 9 | 0 | 0 | 8 | 0 | 0 | 5 | 0 | 0 | 0 | 12% | 10% | 12% | 0% | 2% |
| M1601 | 0 | 1.25 | 17 | 2 | 1 | 0 | 5 | 0 | 0 | 0 | 0 | 0 | 4.5 | 14% | 10% | 6% | 0% | 2% |
| M1602 | 0 | 2 | 16 | 5 | 1 | 0 | 9 | 0 | 0 | 5 | 0 | 0 | 0 | 12% | 10% | 12% | 0% | 2% |
| M1603 | 0 | 2.4 | 15 | 1.25 | 1 | 0 | 0 | 0 | 0 | 5 | 0 | 0 | 0 | 11% | 10% | 12% | 0% | 2% |
| M1604 | 0 | 1.25 | 17 | 3 | 1 | 0 | 5 | 0 | 0 | 0 | 0 | 0 | 4.5 | 14% | 10% | 6% | 0% | 2% |
| M1605 | 0 | 2 | 16 | 8 | 2 | 0 | 5 | 0 | 0 | 5 | 0 | 0 | 0 | 12% | 10% | 12% | 0% | 1% |
| M1606 | 0 | 1.25 | 17 | 6 | 3 | 0 | 2 | 0 | 0 | 0 | 0 | 0 | 4.5 | 14% | 10% | 6% | 37% | 0% |
| M1607 | 0 | 1.25 | 17 | 4 | 1 | 0 | 5 | 0 | 0 | 0 | 0 | 0 | 4.5 | 14% | 10% | 5% | 0% | 2% |
| M1608 | 0 | 2.1 | 16 | 1 | 1 | 0 | 0 | 0 | 0 | 5 | 0 | 0 | 0 | 12% | 10% | 12% | 8% | 0% |
| M1609 | 0 | 1.25 | 17 | 5 | 1 | 0 | 5 | 0 | 0 | 0 | 0 | 0 | 4.5 | 14% | 10% | 5% | 0% | 2% |
| M1610 | 0 | 1.25 | 17 | 6 | 1 | 0 | 5 | 0 | 0 | 0 | 0 | 0 | 4.5 | 14% | 10% | 5% | 0% | 2% |
| M1611 | 0 | 2 | 16 | 5 | 2 | 0 | 6 | 0 | 0 | 5 | 0 | 0 | 0 | 12% | 10% | 12% | 0% | 1% |
| M1612 | 0 | 1.25 | 17 | 7 | 1 | 0 | 5 | 0 | 0 | 0 | 0 | 0 | 4.5 | 14% | 10% | 5% | 0% | 2% |
| M1613 | 0 | 2 | 16 | 1 | 2 | 0 | 8 | 0 | 0 | 5 | 0 | 0 | 0 | 12% | 10% | 12% | 0% | 2% |
| M1614 | 0 | 1.25 | 17 | 8 | 1 | 0 | 5 | 0 | 0 | 0 | 0 | 0 | 4.5 | 14% | 10% | 5% | 0% | 2% |
| M1615 | 0 | 3.5 | 18 | 1.25 | 1 | 2 | 0 | 1 | 0 | 10 | 0 | 0 | 0 | 15% | 10% | 24% | 30% | 2% |
| M1616 | 0 | 1.25 | 17 | 10 | 3 | 0 | 3 | 0 | 0 | 0 | 0 | 0 | 4.5 | 14% | 10% | 6% | 31% | 4% |
| M1617 | 0 | 1.25 | 17 | 3 | 2 | 0 | 3 | 0 | 0 | 0 | 0 | 0 | 4.5 | 14% | 10% | 6% | 32% | 1% |
| M1618 | 0 | 1.25 | 17 | 9 | 1 | 0 | 5 | 0 | 0 | 0 | 0 | 0 | 4.5 | 14% | 10% | 5% | 0% | 2% |
| M1619 | 0 | 1.25 | 17 | 10 | 1 | 0 | 5 | 0 | 0 | 0 | 0 | 0 | 4.5 | 14% | 10% | 5% | 0% | 2% |
| M1620 | 0 | 2 | 16 | 4 | 4 | 0 | 2 | 0 | 0 | 5 | 0 | 0 | 0 | 13% | 10% | 12% | 10% | 0% |
| M1621 | 0 | 2.1 | 16 | 1.25 | 1 | 0 | 0 | 0 | 0 | 5 | 0 | 0 | 0 | 12% | 10% | 12% | 10% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1622 | 0 | 1.25 | 17 | 5 | 0 | 0 | 7 | 0 | 0 | 0 | 0 | 0 | 4.5 | 14% | 10% | 5% | 0% | 2% |
| M1623 | 0 | 2 | 16 | 10 | 4 | 0 | 3 | 0 | 0 | 5 | 0 | 0 | 0 | 13% | 10% | 12% | 4% | 3% |
| M1624 | 0 | 2 | 16 | 1 | 4 | 0 | 1 | 0 | 0 | 5 | 0 | 0 | 0 | 13% | 10% | 12% | 22% | 0% |
| M1625 | 0 | 2 | 16 | 5 | 5 | 0 | 1 | 0 | 0 | 5 | 0 | 0 | 0 | 13% | 10% | 12% | 38% | 0% |
| M1626 | 0 | 1.25 | 17 | 10 | 2 | 0 | 4 | 0 | 0 | 0 | 0 | 0 | 4.5 | 14% | 10% | 6% | 5% | 1% |
| M1627 | 0 | 2 | 16 | 3 | 2 | 0 | 7 | 0 | 0 | 5 | 0 | 0 | 0 | 12% | 10% | 12% | 0% | 2% |
| M1628 | 0 | 2 | 16 | 2 | 3 | 0 | 4 | 0 | 0 | 5 | 0 | 0 | 0 | 13% | 10% | 12% | 0% | 1% |
| M1629 | 0 | 2 | 16 | 1 | 3 | 0 | 4 | 0 | 0 | 5 | 0 | 0 | 0 | 13% | 10% | 12% | 0% | 1% |
| M1630 | 0 | 2 | 16 | 3 | 3 | 0 | 4 | 0 | 0 | 5 | 0 | 0 | 0 | 13% | 10% | 12% | 0% | 1% |
| M1631 | 0 | 2 | 16 | 0 | 2 | 0 | 9 | 0 | 0 | 5 | 0 | 0 | 0 | 12% | 10% | 12% | 0% | 2% |
| M1632 | 0 | 2 | 16 | 0 | 3 | 0 | 4 | 0 | 0 | 5 | 0 | 0 | 0 | 13% | 10% | 12% | 0% | 0% |
| M1633 | 0 | 2 | 16 | 4 | 3 | 0 | 4 | 0 | 0 | 5 | 0 | 0 | 0 | 13% | 10% | 12% | 0% | 1% |
| M1634 | 0 | 2 | 16 | 8 | 5 | 0 | 2 | 0 | 0 | 5 | 0 | 0 | 0 | 13% | 10% | 12% | 25% | 2% |
| M1635 | 0 | 2 | 16 | 5 | 3 | 0 | 4 | 0 | 0 | 5 | 0 | 0 | 0 | 13% | 10% | 12% | 0% | 1% |
| M1636 | 0 | 2 | 16 | 8 | 1 | 0 | 7 | 0 | 0 | 5 | 0 | 0 | 0 | 12% | 10% | 12% | 0% | 2% |
| M1637 | 0 | 2 | 16 | 9 | 2 | 0 | 5 | 0 | 0 | 5 | 0 | 0 | 0 | 12% | 10% | 12% | 0% | 1% |
| M1638 | 0 | 2 | 16 | 6 | 3 | 0 | 4 | 0 | 0 | 5 | 0 | 0 | 0 | 13% | 10% | 12% | 0% | 1% |
| M1639 | 0 | 1.9 | 17 | 1.25 | 1 | 0 | 0 | 1 | 0 | 3.5 | 0 | 0 | 0 | 13% | 10% | 8% | 6% | 3% |
| M1640 | 0 | 2 | 16 | 9 | 4 | 0 | 3 | 0 | 0 | 5 | 0 | 0 | 0 | 13% | 10% | 12% | 3% | 2% |
| M1641 | 0 | 2 | 16 | 7 | 3 | 0 | 4 | 0 | 0 | 5 | 0 | 0 | 0 | 13% | 10% | 12% | 0% | 1% |
| M1642 | 0 | 1.25 | 17 | 2 | 2 | 0 | 3 | 0 | 0 | 0 | 0 | 0 | 4.5 | 14% | 10% | 6% | 36% | 1% |
| M1643 | 0 | 1.25 | 17 | 9 | 2 | 0 | 4 | 0 | 0 | 0 | 0 | 0 | 4.5 | 14% | 10% | 6% | 3% | 1% |
| M1644 | 0 | 2 | 16 | 10 | 1 | 0 | 6 | 0 | 0 | 5 | 0 | 0 | 0 | 12% | 10% | 12% | 0% | 2% |
| M1645 | 0 | 2 | 16 | 8 | 3 | 0 | 4 | 0 | 0 | 5 | 0 | 0 | 0 | 13% | 10% | 12% | 0% | 1% |
| M1646 | 0 | 1.25 | 17 | 5 | 3 | 0 | 2 | 0 | 0 | 0 | 0 | 0 | 4.5 | 14% | 10% | 6% | 35% | 0% |
| M1647 | 0 | 2.2 | 16 | 1 | 1 | 0 | 0 | 0 | 0 | 5 | 0 | 0 | 0 | 12% | 10% | 12% | 0% | 0% |
| M1648 | 0 | 2 | 16 | 6 | 2 | 0 | 6 | 0 | 0 | 5 | 0 | 0 | 0 | 12% | 10% | 12% | 0% | 1% |
| M1649 | 0 | 2 | 16 | 3 | 4 | 0 | 2 | 0 | 0 | 5 | 0 | 0 | 0 | 13% | 10% | 12% | 8% | 0% |
| M1650 | 0 | 1.25 | 17 | 6 | 0 | 0 | 7 | 0 | 0 | 0 | 0 | 0 | 4.5 | 14% | 10% | 5% | 0% | 2% |
| M1651 | 0 | 1.25 | 17 | 9 | 3 | 0 | 3 | 0 | 0 | 0 | 0 | 0 | 4.5 | 14% | 10% | 6% | 29% | 4% |
| M1652 | 0 | 2 | 16 | 9 | 3 | 0 | 4 | 0 | 0 | 5 | 0 | 0 | 0 | 13% | 10% | 12% | 0% | 2% |
| M1653 | 0 | 2 | 18 | 1 | 1 | 0 | 0 | 0 | 0 | 5 | 0 | 0 | 0 | 15% | 10% | 12% | 37% | 0% |
| M1654 | 0 | 2 | 16 | 9 | 0 | 0 | 10 | 0 | 0 | 5 | 0 | 0 | 0 | 12% | 10% | 12% | 0% | 3% |
| M1655 | 0 | 2 | 16 | 8 | 4 | 0 | 3 | 0 | 0 | 5 | 0 | 0 | 0 | 13% | 10% | 12% | 1% | 2% |
| M1656 | 0 | 2 | 16 | 10 | 3 | 0 | 4 | 0 | 0 | 5 | 0 | 0 | 0 | 12% | 10% | 12% | 0% | 2% |
| M1657 | 0 | 1.25 | 17 | 4 | 0 | 0 | 9 | 0 | 0 | 0 | 0 | 0 | 4.5 | 14% | 10% | 5% | 0% | 3% |
| M1658 | 0 | 1.25 | 17 | 8 | 2 | 0 | 4 | 0 | 0 | 0 | 0 | 0 | 4.5 | 14% | 10% | 6% | 2% | 1% |
| M1659 | 0 | 2 | 16 | 2 | 2 | 0 | 8 | 0 | 0 | 5 | 0 | 0 | 0 | 12% | 10% | 12% | 0% | 2% |
| M1660 | 0 | 2.5 | 13.4 | 1.25 | 1 | 0 | 0 | 0 | 0 | 5 | 0 | 0 | 0 | 9% | 10% | 12% | 0% | 2% |
| M1661 | 0 | 2 | 18 | 1.25 | 1 | 0 | 0 | 0 | 0 | 5 | 0 | 0 | 0 | 15% | 10% | 12% | 36% | 0% |
| M1662 | 0 | 2 | 16 | 7 | 1 | 0 | 8 | 0 | 0 | 5 | 0 | 0 | 0 | 12% | 10% | 12% | 0% | 2% |
| M1663 | 0 | 2 | 16 | 0 | 4 | 0 | 1 | 0 | 0 | 5 | 0 | 0 | 0 | 13% | 10% | 12% | 27% | 0% |
| M1664 | 0 | 1.25 | 17 | 1 | 2 | 0 | 3 | 0 | 0 | 0 | 0 | 0 | 4.5 | 14% | 10% | 6% | 37% | 0% |
| M1665 | 0 | 2 | 16 | 10 | 2 | 0 | 5 | 0 | 0 | 5 | 0 | 0 | 0 | 12% | 10% | 12% | 0% | 1% |
| M1666 | 0 | 2 | 16 | 4 | 2 | 0 | 7 | 0 | 0 | 5 | 0 | 0 | 0 | 12% | 10% | 12% | 0% | 2% |
| M1667 | 0 | 2 | 16 | 7 | 5 | 0 | 2 | 0 | 0 | 5 | 0 | 0 | 0 | 13% | 10% | 12% | 28% | 2% |
| M1668 | 0 | 2 | 16 | 7 | 4 | 0 | 3 | 0 | 0 | 5 | 0 | 0 | 0 | 13% | 10% | 12% | 0% | 2% |
| M1669 | 0 | 2 | 16 | 4 | 5 | 0 | 1 | 0 | 0 | 5 | 0 | 0 | 0 | 13% | 10% | 12% | 40% | 0% |
| M1670 | 0 | 1.25 | 17 | 7 | 2 | 0 | 4 | 0 | 0 | 0 | 0 | 0 | 4.5 | 14% | 10% | 6% | 7% | 1% |
| M1671 | 0 | 1.25 | 17 | 7 | 0 | 0 | 7 | 0 | 0 | 0 | 0 | 0 | 4.5 | 14% | 10% | 5% | 0% | 2% |
| M1672 | 0 | 2.1 | 16 | 2.5 | 1 | 0 | 0 | 0 | 0 | 5 | 0 | 0 | 0 | 12% | 10% | 12% | 6% | 0% |
| M1673 | 0 | 2 | 16 | 5 | 1 | 0 | 10 | 0 | 0 | 5 | 0 | 0 | 0 | 12% | 10% | 12% | 0% | 3% |
| M1674 | 0 | 2 | 16 | 6 | 1 | 0 | 9 | 0 | 0 | 5 | 0 | 0 | 0 | 12% | 10% | 12% | 0% | 2% |
| M1675 | 0 | 2 | 16 | 1 | 2 | 0 | 9 | 0 | 0 | 5 | 0 | 0 | 0 | 12% | 10% | 12% | 0% | 2% |
| M1676 | 0 | 2 | 16 | 2 | 4 | 0 | 2 | 0 | 0 | 5 | 0 | 0 | 0 | 13% | 10% | 12% | 10% | 0% |
| M1677 | 0 | 2 | 16 | 0 | 2 | 0 | 10 | 0 | 0 | 5 | 0 | 0 | 0 | 12% | 10% | 12% | 0% | 2% |
| M1678 | 0 | 2.4 | 15.2 | 1.25 | 1 | 0 | 0 | 0 | 0 | 5 | 0 | 0 | 0 | 11% | 10% | 12% | 0% | 2% |
| M1679 | 0 | 1.25 | 17 | 8 | 3 | 0 | 3 | 0 | 0 | 0 | 0 | 0 | 4.5 | 14% | 10% | 6% | 27% | 4% |
| M1680 | 0 | 2 | 16 | 7 | 2 | 0 | 6 | 0 | 0 | 5 | 0 | 0 | 0 | 12% | 10% | 12% | 0% | 2% |
| M1681 | 0 | 1.25 | 17 | 4 | 3 | 0 | 2 | 0 | 0 | 0 | 0 | 0 | 4.5 | 14% | 10% | 6% | 33% | 0% |
| M1682 | 0 | 2 | 16 | 6 | 4 | 0 | 3 | 0 | 0 | 5 | 0 | 0 | 0 | 13% | 10% | 12% | 0% | 0% |
| M1683 | 0 | 1.25 | 17 | 0 | 2 | 0 | 3 | 0 | 0 | 0 | 0 | 0 | 4.5 | 14% | 10% | 6% | 34% | 0% |
| M1684 | 0 | 2 | 16 | 9 | 0 | 0 | 9 | 0 | 0 | 5 | 0 | 0 | 0 | 12% | 10% | 12% | 0% | 3% |
| M1685 | 0 | 1.25 | 17 | 6 | 2 | 0 | 4 | 0 | 0 | 0 | 0 | 0 | 4.5 | 14% | 10% | 6% | 12% | 1% |
| M1686 | 0 | 2 | 16 | 10 | 0 | 0 | 8 | 0 | 0 | 5 | 0 | 0 | 0 | 12% | 10% | 12% | 0% | 3% |
| M1687 | 0 | 1.8 | 16 | 1.25 | 1 | 0 | 0 | 1 | 0 | 3 | 0 | 0 | 0 | 12% | 10% | 7% | 0% | 3% |
| M1688 | 0 | 2.25 | 13 | 0 | 0 | 0 | 0 | 0 | 0 | 4 | 0 | 0 | 0 | 8% | 10% | 10% | 0% | 1% |
| M1689 | 0 | 2 | 16 | 9 | 1 | 0 | 7 | 0 | 0 | 5 | 0 | 0 | 0 | 12% | 10% | 12% | 0% | 2% |
| M1690 | 0 | 2 | 16 | 0 | 3 | 0 | 5 | 0 | 0 | 5 | 0 | 0 | 0 | 12% | 10% | 12% | 0% | 1% |
| M1691 | 0 | 1.25 | 17 | 8 | 0 | 0 | 7 | 0 | 0 | 0 | 0 | 0 | 4.5 | 14% | 10% | 5% | 0% | 2% |
| M1692 | 0 | 2 | 16 | 3 | 2 | 0 | 8 | 0 | 0 | 5 | 0 | 0 | 0 | 12% | 10% | 12% | 0% | 2% |
| M1693 | 0 | 2 | 16 | 6 | 5 | 0 | 2 | 0 | 0 | 5 | 0 | 0 | 0 | 13% | 10% | 12% | 27% | 2% |
| M1694 | 0 | 2 | 16 | 1 | 3 | 0 | 5 | 0 | 0 | 5 | 0 | 0 | 0 | 12% | 10% | 12% | 0% | 1% |
| M1695 | 0 | 2 | 16 | 5 | 2 | 0 | 7 | 0 | 0 | 5 | 0 | 0 | 0 | 12% | 10% | 12% | 0% | 2% |
| M1696 | 0 | 2 | 16 | 5 | 4 | 0 | 3 | 0 | 0 | 5 | 0 | 0 | 0 | 13% | 10% | 12% | 0% | 0% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1697 | 0 | 2 | 18 | 2.5 | 1 | 0 | 0 | 0 | 0 | 5 | 0 | 0 | 0 | 15% | 10% | 12% | 32% | 0% |
| M1698 | 0 | 2 | 16 | 1 | 4 | 0 | 2 | 0 | 0 | 5 | 0 | 0 | 0 | 13% | 10% | 12% | 15% | 0% |
| M1699 | 0 | 1.25 | 17 | 5 | 2 | 0 | 4 | 0 | 0 | 0 | 0 | 0 | 4.5 | 14% | 10% | 6% | 17% | 1% |
| M1700 | 0 | 1.25 | 17 | 0 | 1 | 0 | 6 | 0 | 0 | 0 | 0 | 0 | 4.5 | 14% | 10% | 6% | 0% | 0% |
| M1701 | 0 | 2 | 16 | 2 | 3 | 0 | 5 | 0 | 0 | 5 | 0 | 0 | 0 | 12% | 10% | 12% | 0% | 1% |
| M1702 | 0 | 2 | 16 | 10 | 5 | 0 | 3 | 0 | 0 | 5 | 0 | 0 | 0 | 13% | 10% | 12% | 13% | 3% |
| M1703 | 0 | 1.25 | 17 | 7 | 3 | 0 | 3 | 0 | 0 | 0 | 0 | 0 | 4.5 | 14% | 10% | 6% | 25% | 1% |
| M1704 | 0 | 1.25 | 17 | 1 | 1 | 0 | 6 | 0 | 0 | 0 | 0 | 0 | 4.5 | 14% | 10% | 6% | 0% | 0% |
| M1705 | 0 | 2 | 16 | 3 | 3 | 0 | 5 | 0 | 0 | 5 | 0 | 0 | 0 | 12% | 10% | 12% | 0% | 1% |
| M1706 | 0 | 2 | 16 | 8 | 2 | 0 | 6 | 0 | 0 | 5 | 0 | 0 | 0 | 12% | 10% | 12% | 0% | 2% |
| M1707 | 0 | 1.25 | 17 | 4 | 0 | 0 | 8 | 0 | 0 | 0 | 0 | 0 | 4.5 | 14% | 10% | 5% | 0% | 3% |
| M1708 | 0 | 1.25 | 17 | 2 | 1 | 0 | 6 | 0 | 0 | 0 | 0 | 0 | 4.5 | 14% | 10% | 6% | 0% | 2% |
| M1709 | 0 | 1.25 | 17 | 9 | 0 | 0 | 7 | 0 | 0 | 0 | 0 | 0 | 4.5 | 14% | 10% | 5% | 0% | 2% |
| M1710 | 0 | 2 | 16 | 4 | 4 | 0 | 3 | 0 | 0 | 5 | 0 | 0 | 0 | 13% | 10% | 12% | 0% | 0% |
| M1711 | 0 | 1.25 | 17 | 4 | 2 | 0 | 4 | 0 | 0 | 0 | 0 | 0 | 4.5 | 14% | 10% | 6% | 22% | 1% |
| M1712 | 0 | 2 | 16 | 2 | 2 | 0 | 9 | 0 | 0 | 5 | 0 | 0 | 0 | 12% | 10% | 12% | 0% | 2% |
| M1713 | 0 | 2 | 16 | 4 | 3 | 0 | 5 | 0 | 0 | 5 | 0 | 0 | 0 | 12% | 10% | 12% | 0% | 1% |
| M1714 | 0 | 4 | 15 | 1.25 | 1 | 2 | 0 | 1 | 0 | 10 | 0 | 0 | 0 | 11% | 10% | 25% | 0% | 4% |
| M1715 | 0 | 1.25 | 17 | 3 | 3 | 0 | 2 | 0 | 0 | 0 | 0 | 0 | 4.5 | 14% | 10% | 6% | 36% | 0% |
| M1716 | 0 | 2.5 | 17 | 1.25 | 1 | 2 | 0 | 1 | 0 | 5 | 0 | 0 | 0 | 13% | 10% | 14% | 1% | 4% |
| M1717 | 0 | 1.25 | 17 | 3 | 1 | 0 | 6 | 0 | 0 | 0 | 0 | 0 | 4.5 | 14% | 10% | 6% | 0% | 2% |
| M1718 | 0 | 2 | 16 | 8 | 1 | 0 | 8 | 0 | 0 | 5 | 0 | 0 | 0 | 12% | 10% | 12% | 0% | 2% |
| M1719 | 0 | 2 | 16 | 3 | 5 | 0 | 1 | 0 | 0 | 5 | 0 | 0 | 0 | 13% | 10% | 12% | 38% | 0% |
| M1720 | 0 | 2 | 16 | 1 | 2 | 0 | 10 | 0 | 0 | 5 | 0 | 0 | 0 | 12% | 10% | 12% | 0% | 2% |
| M1721 | 0 | 2 | 16 | 5 | 3 | 0 | 5 | 0 | 0 | 5 | 0 | 0 | 0 | 12% | 10% | 12% | 0% | 1% |
| M1722 | 0 | 1.25 | 17 | 4 | 1 | 0 | 6 | 0 | 0 | 0 | 0 | 0 | 4.5 | 14% | 10% | 6% | 0% | 2% |
| M1723 | 0 | 2.1 | 16 | 4 | 1 | 0 | 0 | 0 | 0 | 5 | 0 | 0 | 0 | 12% | 10% | 12% | 3% | 0% |
| M1724 | 0 | 2 | 16 | 0 | 4 | 0 | 2 | 0 | 0 | 5 | 0 | 0 | 0 | 13% | 10% | 12% | 21% | 0% |
| M1725 | 0 | 2 | 16 | 9 | 5 | 0 | 3 | 0 | 0 | 5 | 0 | 0 | 0 | 13% | 10% | 12% | 14% | 3% |
| M1726 | 0 | 2 | 16 | 5 | 5 | 0 | 2 | 0 | 0 | 5 | 0 | 0 | 0 | 13% | 10% | 12% | 26% | 0% |
| M1727 | 0 | 1.25 | 17 | 5 | 1 | 0 | 6 | 0 | 0 | 0 | 0 | 0 | 4.5 | 14% | 10% | 6% | 0% | 2% |
| M1728 | 0 | 1.25 | 17 | 3 | 2 | 0 | 4 | 0 | 0 | 0 | 0 | 0 | 4.5 | 14% | 10% | 6% | 23% | 1% |
| M1729 | 0 | 2 | 16 | 3 | 4 | 0 | 3 | 0 | 0 | 5 | 0 | 0 | 0 | 13% | 10% | 12% | 0% | 0% |
| M1730 | 0 | 2 | 16 | 6 | 3 | 0 | 5 | 0 | 0 | 5 | 0 | 0 | 0 | 12% | 10% | 12% | 0% | 1% |
| M1731 | 0 | 2 | 16 | 6 | 2 | 0 | 7 | 0 | 0 | 5 | 0 | 0 | 0 | 12% | 10% | 12% | 0% | 2% |
| M1732 | 0 | 1.25 | 17 | 10 | 0 | 0 | 7 | 0 | 0 | 0 | 0 | 0 | 4.5 | 14% | 10% | 5% | 0% | 2% |
| M1733 | 0 | 2.1 | 16.2 | 1.25 | 1 | 0 | 0 | 0 | 0 | 5 | 0 | 0 | 0 | 13% | 10% | 12% | 13% | 0% |
| M1734 | 0 | 2 | 16 | 4 | 2 | 0 | 8 | 0 | 0 | 5 | 0 | 0 | 0 | 12% | 10% | 12% | 0% | 2% |
| M1735 | 0 | 1.25 | 17 | 6 | 1 | 0 | 6 | 0 | 0 | 0 | 0 | 0 | 4.5 | 14% | 10% | 5% | 0% | 2% |
| M1736 | 0 | 1.25 | 17 | 6 | 3 | 0 | 3 | 0 | 0 | 0 | 0 | 0 | 4.5 | 14% | 10% | 6% | 23% | 1% |
| M1737 | 0 | 2 | 16 | 7 | 1 | 0 | 9 | 0 | 0 | 5 | 0 | 0 | 0 | 12% | 10% | 12% | 0% | 3% |
| M1738 | 0 | 1.25 | 17 | 5 | 0 | 0 | 8 | 0 | 0 | 0 | 0 | 0 | 4.5 | 14% | 10% | 5% | 0% | 3% |
| M1739 | 0 | 2 | 16 | 9 | 2 | 0 | 6 | 0 | 0 | 5 | 0 | 0 | 0 | 12% | 10% | 12% | 0% | 2% |
| M1740 | 0 | 2 | 16 | 6 | 1 | 0 | 10 | 0 | 0 | 5 | 0 | 0 | 0 | 12% | 10% | 12% | 0% | 3% |
| M1741 | 0 | 1.25 | 17 | 7 | 1 | 0 | 6 | 0 | 0 | 0 | 0 | 0 | 4.5 | 14% | 10% | 5% | 0% | 2% |
| M1742 | 0 | 2 | 18 | 4 | 1 | 0 | 0 | 0 | 0 | 5 | 0 | 0 | 0 | 15% | 10% | 11% | 39% | 0% |
| M1743 | 0 | 2 | 16 | 7 | 3 | 0 | 5 | 0 | 0 | 5 | 0 | 0 | 0 | 12% | 10% | 12% | 0% | 1% |
| M1744 | 0 | 3.5 | 14 | 1.25 | 1 | 2 | 0 | 1 | 0 | 8 | 0 | 0 | 0 | 10% | 10% | 21% | 0% | 4% |
| M1745 | 0 | 2 | 16 | 10 | 1 | 0 | 7 | 0 | 0 | 5 | 0 | 0 | 0 | 12% | 10% | 12% | 0% | 2% |
| M1746 | 0 | 2 | 18.2 | 1.25 | 1 | 0 | 0 | 0 | 0 | 5 | 0 | 0 | 0 | 15% | 10% | 12% | 36% | 0% |
| M1747 | 0 | 2.4 | 15.4 | 1.25 | 1 | 0 | 0 | 0 | 0 | 5 | 0 | 0 | 0 | 11% | 10% | 12% | 0% | 2% |
| M1748 | 0 | 1.25 | 17 | 10 | 4 | 0 | 3 | 0 | 0 | 0 | 0 | 0 | 4.5 | 14% | 10% | 6% | 37% | 4% |
| M1749 | 0 | 2 | 15 | 0 | 0 | 0 | 0 | 0 | 0 | 3.5 | 0 | 0 | 0 | 10% | 10% | 9% | 0% | 1% |
| M1750 | 0 | 2.5 | 13.6 | 1.25 | 1 | 0 | 0 | 0 | 0 | 5 | 0 | 0 | 0 | 9% | 10% | 12% | 0% | 0% |
| M1751 | 0 | 1.25 | 17 | 8 | 1 | 0 | 6 | 0 | 0 | 0 | 0 | 0 | 4.5 | 14% | 10% | 5% | 0% | 2% |
| M1752 | 0 | 1.25 | 17 | 2 | 2 | 0 | 4 | 0 | 0 | 0 | 0 | 0 | 4.5 | 14% | 10% | 6% | 22% | 1% |
| M1753 | 0 | 2 | 16 | 0 | 3 | 0 | 6 | 0 | 0 | 5 | 0 | 0 | 0 | 12% | 10% | 12% | 0% | 1% |
| M1754 | 0 | 2 | 16 | 10 | 4 | 0 | 4 | 0 | 0 | 5 | 0 | 0 | 0 | 12% | 10% | 12% | 0% | 3% |
| M1755 | 0 | 1.25 | 17 | 9 | 1 | 0 | 6 | 0 | 0 | 0 | 0 | 0 | 4.5 | 14% | 10% | 5% | 0% | 2% |
| M1756 | 0 | 2 | 16 | 2 | 4 | 0 | 3 | 0 | 0 | 5 | 0 | 0 | 0 | 13% | 10% | 12% | 2% | 0% |
| M1757 | 0 | 2 | 16 | 8 | 5 | 0 | 3 | 0 | 0 | 5 | 0 | 0 | 0 | 13% | 10% | 12% | 13% | 3% |
| M1758 | 0 | 2 | 16 | 8 | 3 | 0 | 5 | 0 | 0 | 5 | 0 | 0 | 0 | 12% | 10% | 12% | 0% | 1% |
| M1759 | 0 | 2.4 | 13 | 1.25 | 1 | 0 | 0 | 1 | 0 | 4.5 | 0 | 0 | 0 | 9% | 10% | 11% | 0% | 2% |
| M1760 | 0 | 1.25 | 17 | 2 | 3 | 0 | 2 | 0 | 0 | 0 | 0 | 0 | 4.5 | 14% | 10% | 6% | 40% | 0% |
| M1761 | 0 | 1.25 | 17 | 10 | 1 | 0 | 6 | 0 | 0 | 0 | 0 | 0 | 4.5 | 14% | 10% | 5% | 0% | 2% |
| M1762 | 0 | 2 | 16 | 9 | 4 | 0 | 4 | 0 | 0 | 5 | 0 | 0 | 0 | 12% | 10% | 12% | 0% | 2% |
| M1763 | 0 | 2 | 16 | 3 | 2 | 0 | 9 | 0 | 0 | 5 | 0 | 0 | 0 | 12% | 10% | 12% | 0% | 2% |
| M1764 | 0 | 2 | 16 | 1 | 3 | 0 | 6 | 0 | 0 | 5 | 0 | 0 | 0 | 12% | 10% | 12% | 0% | 1% |
| M1765 | 0 | 2 | 16 | 9 | 3 | 0 | 5 | 0 | 0 | 5 | 0 | 0 | 0 | 12% | 10% | 12% | 0% | 1% |
| M1766 | 0 | 2 | 16 | 4 | 5 | 0 | 2 | 0 | 0 | 5 | 0 | 0 | 0 | 13% | 10% | 12% | 25% | 0% |
| M1767 | 0 | 1.25 | 17 | 10 | 3 | 0 | 4 | 0 | 0 | 0 | 0 | 0 | 4.5 | 14% | 10% | 6% | 16% | 4% |
| M1768 | 0 | 1.25 | 17 | 6 | 0 | 0 | 8 | 0 | 0 | 0 | 0 | 0 | 4.5 | 14% | 10% | 5% | 0% | 3% |
| M1769 | 0 | 1.25 | 17 | 1 | 2 | 0 | 4 | 0 | 0 | 0 | 0 | 0 | 4.5 | 14% | 10% | 6% | 20% | 1% |
| M1770 | 0 | 2 | 16 | 8 | 4 | 0 | 4 | 0 | 0 | 5 | 0 | 0 | 0 | 12% | 10% | 12% | 0% | 2% |
| M1771 | 0 | 1.25 | 17 | 10 | 2 | 0 | 5 | 0 | 0 | 0 | 0 | 0 | 4.5 | 14% | 10% | 6% | 0% | 1% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1772 | 0 | 1.25 | 17 | 5 | 3 | 0 | 3 | 0 | 0 | 0 | 0 | 0 | 4.5 | 14% | 10% | 6% | 23% | 1% |
| M1773 | 0 | 2 | 16 | 10 | 0 | 0 | 9 | 0 | 0 | 5 | 0 | 0 | 0 | 12% | 10% | 12% | 0% | 3% |
| M1774 | 0 | 2 | 16 | 7 | 2 | 0 | 7 | 0 | 0 | 5 | 0 | 0 | 0 | 12% | 10% | 12% | 0% | 2% |
| M1775 | 0 | 2 | 16 | 1 | 4 | 0 | 3 | 0 | 0 | 5 | 0 | 0 | 0 | 13% | 10% | 12% | 8% | 0% |
| M1776 | 0 | 2 | 16 | 2 | 2 | 0 | 10 | 0 | 0 | 5 | 0 | 0 | 0 | 12% | 10% | 12% | 0% | 2% |
| M1777 | 0 | 2 | 16 | 10 | 2 | 0 | 6 | 0 | 0 | 5 | 0 | 0 | 0 | 12% | 10% | 12% | 0% | 2% |
| M1778 | 0 | 2 | 16 | 2 | 3 | 0 | 6 | 0 | 0 | 5 | 0 | 0 | 0 | 12% | 10% | 12% | 0% | 1% |
| M1779 | 0 | 2 | 16 | 10 | 3 | 0 | 5 | 0 | 0 | 5 | 0 | 0 | 0 | 12% | 10% | 12% | 0% | 3% |
| M1780 | 0 | 2 | 16 | 7 | 4 | 0 | 4 | 0 | 0 | 5 | 0 | 0 | 0 | 12% | 10% | 12% | 0% | 2% |
| M1781 | 0 | 2.1 | 13 | 1.25 | 1 | 0 | 0 | 1 | 0 | 3.5 | 0 | 0 | 0 | 9% | 10% | 9% | 0% | 2% |
| M1782 | 0 | 2 | 16 | 5 | 2 | 0 | 8 | 0 | 0 | 5 | 0 | 0 | 0 | 12% | 10% | 12% | 0% | 2% |
| M1783 | 0 | 2.1 | 16 | 5.5 | 1 | 0 | 0 | 0 | 0 | 5 | 0 | 0 | 0 | 12% | 10% | 12% | 12% | 0% |
| M1784 | 0 | 1.25 | 17 | 9 | 2 | 0 | 5 | 0 | 0 | 0 | 0 | 0 | 4.5 | 14% | 10% | 6% | 0% | 2% |
| M1785 | 0 | 2 | 16 | 7 | 5 | 0 | 3 | 0 | 0 | 5 | 0 | 0 | 0 | 13% | 10% | 12% | 13% | 2% |
| M1786 | 0 | 2 | 16 | 2 | 5 | 0 | 1 | 0 | 0 | 5 | 0 | 0 | 0 | 13% | 10% | 12% | 35% | 0% |
| M1787 | 0 | 2 | 16 | 9 | 1 | 0 | 8 | 0 | 0 | 5 | 0 | 0 | 0 | 12% | 10% | 12% | 0% | 2% |
| M1788 | 0 | 1.25 | 17 | 0 | 2 | 0 | 4 | 0 | 0 | 0 | 0 | 0 | 4.5 | 14% | 10% | 6% | 19% | 0% |
| M1789 | 0 | 2.2 | 16 | 1.25 | 1 | 0 | 0 | 0 | 0 | 5 | 0 | 0 | 0 | 12% | 10% | 12% | 0% | 0% |
| M1790 | 0 | 1.25 | 17 | 9 | 4 | 0 | 3 | 0 | 0 | 0 | 0 | 0 | 4.5 | 14% | 10% | 6% | 40% | 4% |
| M1791 | 0 | 2 | 18 | 5.5 | 1 | 0 | 0 | 0 | 0 | 5 | 0 | 0 | 0 | 15% | 10% | 11% | 35% | 0% |
| M1792 | 0 | 2 | 16 | 6 | 4 | 0 | 4 | 0 | 0 | 5 | 0 | 0 | 0 | 12% | 10% | 12% | 0% | 1% |
| M1793 | 0 | 2 | 16 | 3 | 3 | 0 | 6 | 0 | 0 | 5 | 0 | 0 | 0 | 12% | 10% | 12% | 0% | 1% |
| M1794 | 0 | 1.25 | 17 | 8 | 2 | 0 | 5 | 0 | 0 | 0 | 0 | 0 | 4.5 | 14% | 10% | 6% | 0% | 2% |
| M1795 | 0 | 1.25 | 17 | 9 | 3 | 0 | 4 | 0 | 0 | 0 | 0 | 0 | 4.5 | 14% | 10% | 6% | 15% | 4% |
| M1796 | 0 | 1.75 | 12 | 0 | 0 | 5 | 0 | 0 | 0 | 0 | 0 | 0 | 0 | 8% | 10% | 6% | 0% | 1% |
| M1797 | 0 | 1.25 | 17 | 7 | 0 | 0 | 8 | 0 | 0 | 0 | 0 | 0 | 4.5 | 14% | 10% | 5% | 0% | 3% |
| M1798 | 0 | 2 | 16 | 0 | 4 | 0 | 3 | 0 | 0 | 5 | 0 | 0 | 0 | 13% | 10% | 12% | 14% | 0% |
| M1799 | 0 | 2 | 16 | 5 | 4 | 0 | 4 | 0 | 0 | 5 | 0 | 0 | 0 | 12% | 10% | 12% | 0% | 1% |
| M1800 | 0 | 1.25 | 17 | 4 | 3 | 0 | 3 | 0 | 0 | 0 | 0 | 0 | 4.5 | 14% | 10% | 6% | 27% | 1% |
| M1801 | 0 | 1.25 | 17 | 7 | 2 | 0 | 5 | 0 | 0 | 0 | 0 | 0 | 4.5 | 14% | 10% | 6% | 0% | 2% |
| M1802 | 0 | 2 | 16 | 3 | 5 | 0 | 2 | 0 | 0 | 5 | 0 | 0 | 0 | 13% | 10% | 12% | 23% | 0% |
| M1803 | 0 | 2 | 16 | 4 | 3 | 0 | 6 | 0 | 0 | 5 | 0 | 0 | 0 | 12% | 10% | 12% | 0% | 1% |
| M1804 | 0 | 1.25 | 17 | 0 | 1 | 0 | 7 | 0 | 0 | 0 | 0 | 0 | 4.5 | 14% | 10% | 6% | 0% | 1% |
| M1805 | 0 | 2 | 16 | 8 | 1 | 0 | 9 | 0 | 0 | 5 | 0 | 0 | 0 | 12% | 10% | 12% | 0% | 3% |
| M1806 | 0 | 2 | 16 | 6 | 5 | 0 | 3 | 0 | 0 | 5 | 0 | 0 | 0 | 13% | 10% | 12% | 12% | 2% |
| M1807 | 0 | 2 | 16 | 4 | 4 | 0 | 4 | 0 | 0 | 5 | 0 | 0 | 0 | 12% | 10% | 12% | 0% | 1% |
| M1808 | 0 | 2.5 | 14 | 10 | 1 | 0 | 0 | 0 | 0 | 5 | 0 | 0 | 0 | 10% | 10% | 12% | 0% | 5% |
| M1809 | 0 | 2 | 16 | 4 | 2 | 0 | 9 | 0 | 0 | 5 | 0 | 0 | 0 | 12% | 10% | 12% | 0% | 2% |
| M1810 | 0 | 2 | 16 | 8 | 2 | 0 | 7 | 0 | 0 | 5 | 0 | 0 | 0 | 12% | 10% | 12% | 0% | 2% |
| M1811 | 0 | 2 | 16 | 0 | 3 | 0 | 7 | 0 | 0 | 5 | 0 | 0 | 0 | 12% | 10% | 12% | 0% | 1% |
| M1812 | 0 | 1.25 | 17 | 6 | 2 | 0 | 5 | 0 | 0 | 0 | 0 | 0 | 4.5 | 14% | 10% | 6% | 4% | 2% |
| M1813 | 0 | 1.25 | 17 | 1 | 1 | 0 | 7 | 0 | 0 | 0 | 0 | 0 | 4.5 | 14% | 10% | 6% | 0% | 1% |
| M1814 | 0 | 2.2 | 17 | 1.25 | 1 | 0 | 0 | 1 | 0 | 4.5 | 0 | 0 | 0 | 13% | 10% | 11% | 0% | 3% |
| M1815 | 0 | 2 | 16 | 7 | 1 | 0 | 10 | 0 | 0 | 5 | 0 | 0 | 0 | 12% | 10% | 12% | 0% | 3% |
| M1816 | 0 | 2.4 | 15.6 | 1.25 | 1 | 0 | 0 | 0 | 0 | 5 | 0 | 0 | 0 | 11% | 10% | 12% | 0% | 2% |
| M1817 | 0 | 2 | 16 | 0 | 4 | 0 | 0 | 0 | 0 | 5 | 0 | 0 | 0 | 12% | 10% | 12% | 32% | 0% |
| M1818 | 0 | 1.9 | 14 | 1.25 | 1 | 0 | 0 | 1 | 0 | 3 | 0 | 0 | 0 | 10% | 10% | 8% | 0% | 2% |
| M1819 | 0 | 1.25 | 17 | 8 | 3 | 0 | 4 | 0 | 0 | 0 | 0 | 0 | 4.5 | 14% | 10% | 6% | 13% | 1% |
| M1820 | 0 | 2 | 16 | 5 | 3 | 0 | 6 | 0 | 0 | 5 | 0 | 0 | 0 | 12% | 10% | 12% | 0% | 1% |
| M1821 | 0 | 2.3 | 16.2 | 1.25 | 1 | 0 | 0 | 0 | 0 | 5 | 0 | 0 | 0 | 12% | 10% | 12% | 0% | 2% |
| M1822 | 0 | 1.25 | 17 | 8 | 0 | 0 | 8 | 0 | 0 | 0 | 0 | 0 | 4.5 | 14% | 10% | 5% | 0% | 3% |
| M1823 | 0 | 2 | 16 | 3 | 4 | 0 | 4 | 0 | 0 | 5 | 0 | 0 | 0 | 12% | 10% | 12% | 0% | 1% |
| M1824 | 0 | 2 | 16 | 6 | 2 | 0 | 8 | 0 | 0 | 5 | 0 | 0 | 0 | 12% | 10% | 12% | 0% | 2% |
| M1825 | 0 | 1.25 | 17 | 8 | 4 | 0 | 3 | 0 | 0 | 0 | 0 | 0 | 4.5 | 14% | 10% | 6% | 40% | 4% |
| M1826 | 0 | 1.25 | 17 | 2 | 1 | 0 | 7 | 0 | 0 | 0 | 0 | 0 | 4.5 | 14% | 10% | 6% | 0% | 2% |
| M1827 | 0 | 1.25 | 17 | 5 | 2 | 0 | 5 | 0 | 0 | 0 | 0 | 0 | 4.5 | 14% | 10% | 6% | 7% | 2% |
| M1828 | 0 | 2 | 18 | 7 | 1 | 0 | 0 | 0 | 0 | 5 | 0 | 0 | 0 | 15% | 10% | 11% | 36% | 0% |
| M1829 | 0 | 2 | 16 | 3 | 2 | 0 | 10 | 0 | 0 | 5 | 0 | 0 | 0 | 12% | 10% | 12% | 0% | 2% |
| M1830 | 0 | 2.1 | 16 | 7 | 1 | 0 | 0 | 0 | 0 | 5 | 0 | 0 | 0 | 12% | 10% | 12% | 6% | 1% |
| M1831 | 0 | 2.1 | 16 | 1.25 | 1 | 0 | 0 | 1 | 0 | 4 | 0 | 0 | 0 | 12% | 10% | 10% | 0% | 3% |
| M1832 | 0 | 2 | 16 | 1 | 3 | 0 | 7 | 0 | 0 | 5 | 0 | 0 | 0 | 12% | 10% | 12% | 0% | 1% |
| M1833 | 0 | 2 | 15 | 1.25 | 1 | 0 | 0 | 1 | 0 | 3.5 | 0 | 0 | 0 | 11% | 10% | 9% | 0% | 2% |
| M1834 | 0 | 3 | 18 | 1.25 | 1 | 2 | 0 | 1 | 0 | 8 | 0 | 0 | 0 | 15% | 10% | 20% | 28% | 2% |
| M1835 | 0 | 2 | 16 | 6 | 3 | 0 | 6 | 0 | 0 | 5 | 0 | 0 | 0 | 12% | 10% | 12% | 0% | 1% |
| M1836 | 0 | 2 | 16 | 2 | 4 | 0 | 4 | 0 | 0 | 5 | 0 | 0 | 0 | 12% | 10% | 12% | 0% | 1% |
| M1837 | 0 | 1.25 | 17 | 3 | 3 | 0 | 3 | 0 | 0 | 0 | 0 | 0 | 4.5 | 14% | 10% | 6% | 31% | 1% |
| M1838 | 0 | 1.25 | 17 | 3 | 1 | 0 | 7 | 0 | 0 | 0 | 0 | 0 | 4.5 | 14% | 10% | 6% | 0% | 2% |
| M1839 | 0 | 2 | 16 | 5 | 5 | 0 | 3 | 0 | 0 | 5 | 0 | 0 | 0 | 13% | 10% | 12% | 11% | 0% |
| M1840 | 0 | 2 | 18.4 | 1.25 | 1 | 0 | 0 | 0 | 0 | 5 | 0 | 0 | 0 | 15% | 10% | 12% | 36% | 0% |
| M1841 | 0 | 1.25 | 17 | 4 | 2 | 0 | 5 | 0 | 0 | 0 | 0 | 0 | 4.5 | 14% | 10% | 6% | 7% | 2% |
| M1842 | 0 | 2 | 16 | 1 | 5 | 0 | 1 | 0 | 0 | 5 | 0 | 0 | 0 | 13% | 10% | 12% | 33% | 0% |
| M1843 | 0 | 2.5 | 13.8 | 1.25 | 1 | 0 | 0 | 0 | 0 | 5 | 0 | 0 | 0 | 9% | 10% | 12% | 0% | 2% |
| M1844 | 0 | 2 | 16 | 2 | 5 | 0 | 2 | 0 | 0 | 5 | 0 | 0 | 0 | 13% | 10% | 12% | 22% | 0% |
| M1845 | 0 | 2 | 16 | 10 | 5 | 0 | 4 | 0 | 0 | 5 | 0 | 0 | 0 | 12% | 10% | 12% | 0% | 3% |
| M1846 | 0 | 2.5 | 14 | 8.5 | 1 | 0 | 0 | 0 | 0 | 5 | 0 | 0 | 0 | 10% | 10% | 12% | 0% | 4% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1847 | 0 | 1.25 | 17 | 7 | 3 | 0 | 4 | 0 | 0 | 0 | 0 | 0 | 4.5 | 14% | 10% | 6% | 12% | 1% |
| M1848 | 0 | 1.25 | 17 | 9 | 0 | 0 | 8 | 0 | 0 | 0 | 0 | 0 | 4.5 | 14% | 10% | 5% | 0% | 3% |
| M1849 | 0 | 1.25 | 17 | 4 | 1 | 0 | 7 | 0 | 0 | 0 | 0 | 0 | 4.5 | 14% | 10% | 6% | 0% | 2% |
| M1850 | 0 | 2 | 16 | 10 | 1 | 0 | 8 | 0 | 0 | 5 | 0 | 0 | 0 | 12% | 10% | 12% | 0% | 2% |
| M1851 | 0 | 2 | 16 | 1 | 4 | 0 | 4 | 0 | 0 | 5 | 0 | 0 | 0 | 12% | 10% | 12% | 0% | 0% |
| M1852 | 0 | 2 | 16 | 2 | 3 | 0 | 7 | 0 | 0 | 5 | 0 | 0 | 0 | 12% | 10% | 12% | 0% | 1% |
| M1853 | 0 | 2 | 16 | 9 | 2 | 0 | 7 | 0 | 0 | 5 | 0 | 0 | 0 | 12% | 10% | 12% | 0% | 2% |
| M1854 | 0 | 2 | 16 | 7 | 3 | 0 | 6 | 0 | 0 | 5 | 0 | 0 | 0 | 12% | 10% | 12% | 0% | 1% |
| M1855 | 0 | 1.25 | 17 | 3 | 2 | 0 | 5 | 0 | 0 | 0 | 0 | 0 | 4.5 | 14% | 10% | 6% | 6% | 2% |
| M1856 | 0 | 2.1 | 16.4 | 1.25 | 1 | 0 | 0 | 0 | 0 | 5 | 0 | 0 | 0 | 13% | 10% | 12% | 12% | 0% |
| M1857 | 0 | 2.25 | 16 | 0 | 0 | 0 | 0 | 0 | 0 | 4.5 | 0 | 0 | 0 | 11% | 10% | 11% | 0% | 2% |
| M1858 | 0 | 1.25 | 17 | 5 | 1 | 0 | 7 | 0 | 0 | 0 | 0 | 0 | 4.5 | 14% | 10% | 6% | 0% | 2% |
| M1859 | 0 | 2 | 16 | 10 | 0 | 0 | 10 | 0 | 0 | 5 | 0 | 0 | 0 | 12% | 10% | 12% | 0% | 3% |
| M1860 | 0 | 3 | 13 | 1.25 | 1 | 2 | 0 | 1 | 0 | 6 | 0 | 0 | 0 | 9% | 10% | 16% | 0% | 3% |
| M1861 | 0 | 1.25 | 17 | 5 | 0 | 0 | 9 | 0 | 0 | 0 | 0 | 0 | 4.5 | 14% | 10% | 5% | 0% | 3% |
| M1862 | 0 | 2 | 16 | 5 | 2 | 0 | 9 | 0 | 0 | 5 | 0 | 0 | 0 | 12% | 10% | 12% | 0% | 2% |
| M1863 | 0 | 2.5 | 14 | 0 | 0 | 0 | 0 | 0 | 0 | 5 | 0 | 0 | 0 | 9% | 10% | 12% | 0% | 2% |
| M1864 | 0 | 2.2 | 14 | 1.25 | 1 | 0 | 0 | 1 | 0 | 4 | 0 | 0 | 0 | 10% | 10% | 10% | 0% | 2% |
| M1865 | 0 | 2 | 16 | 9 | 5 | 0 | 4 | 0 | 0 | 5 | 0 | 0 | 0 | 12% | 10% | 12% | 0% | 3% |
| M1866 | 0 | 2 | 18 | 8.5 | 1 | 0 | 0 | 0 | 0 | 5 | 0 | 0 | 0 | 15% | 10% | 11% | 37% | 1% |
| M1867 | 0 | 1.25 | 17 | 2 | 2 | 0 | 5 | 0 | 0 | 0 | 0 | 0 | 4.5 | 14% | 10% | 6% | 6% | 2% |
| M1868 | 0 | 2 | 16 | 0 | 4 | 0 | 4 | 0 | 0 | 5 | 0 | 0 | 0 | 12% | 10% | 12% | 7% | 0% |
| M1869 | 0 | 1.25 | 17 | 6 | 1 | 0 | 7 | 0 | 0 | 0 | 0 | 0 | 4.5 | 14% | 10% | 6% | 0% | 2% |
| M1870 | 0 | 2 | 16 | 4 | 5 | 0 | 3 | 0 | 0 | 5 | 0 | 0 | 0 | 12% | 10% | 12% | 11% | 0% |
| M1871 | 0 | 1.25 | 17 | 7 | 4 | 0 | 3 | 0 | 0 | 0 | 0 | 0 | 4.5 | 14% | 10% | 6% | 38% | 4% |
| M1872 | 0 | 2 | 16 | 7 | 2 | 0 | 8 | 0 | 0 | 5 | 0 | 0 | 0 | 12% | 10% | 12% | 0% | 2% |
| M1873 | 0 | 2 | 16 | 8 | 3 | 0 | 6 | 0 | 0 | 5 | 0 | 0 | 0 | 12% | 10% | 12% | 0% | 1% |
| M1874 | 0 | 2 | 16 | 0 | 3 | 0 | 8 | 0 | 0 | 5 | 0 | 0 | 0 | 12% | 10% | 12% | 0% | 2% |
| M1875 | 0 | 2 | 16 | 3 | 3 | 0 | 7 | 0 | 0 | 5 | 0 | 0 | 0 | 12% | 10% | 12% | 0% | 2% |
| M1876 | 0 | 1.25 | 17 | 10 | 0 | 0 | 8 | 0 | 0 | 0 | 0 | 0 | 4.5 | 14% | 10% | 5% | 0% | 3% |
| M1877 | 0 | 1.25 | 17 | 2 | 3 | 0 | 3 | 0 | 0 | 0 | 0 | 0 | 4.5 | 14% | 10% | 6% | 35% | 1% |
| M1878 | 0 | 2.1 | 16 | 8.5 | 1 | 0 | 0 | 0 | 0 | 5 | 0 | 0 | 0 | 12% | 10% | 12% | 7% | 1% |
| M1879 | 0 | 1.25 | 17 | 6 | 3 | 0 | 4 | 0 | 0 | 0 | 0 | 0 | 4.5 | 14% | 10% | 6% | 11% | 1% |
| M1880 | 0 | 2.5 | 14 | 7 | 1 | 0 | 0 | 0 | 0 | 5 | 0 | 0 | 0 | 10% | 10% | 12% | 0% | 4% |
| M1881 | 0 | 1.25 | 17 | 7 | 1 | 0 | 7 | 0 | 0 | 0 | 0 | 0 | 4.5 | 14% | 10% | 5% | 0% | 2% |
| M1882 | 0 | 2 | 16 | 9 | 1 | 0 | 9 | 0 | 0 | 5 | 0 | 0 | 0 | 12% | 10% | 12% | 0% | 3% |
| M1883 | 0 | 1.25 | 17 | 1 | 2 | 0 | 5 | 0 | 0 | 0 | 0 | 0 | 4.5 | 14% | 10% | 6% | 5% | 2% |
| M1884 | 0 | 1.25 | 17 | 10 | 5 | 0 | 3 | 0 | 0 | 0 | 0 | 0 | 4.5 | 14% | 10% | 6% | 36% | 4% |
| M1885 | 0 | 2 | 16 | 8 | 5 | 0 | 4 | 0 | 0 | 5 | 0 | 0 | 0 | 12% | 10% | 12% | 0% | 3% |
| M1886 | 0 | 2 | 16 | 1 | 5 | 0 | 2 | 0 | 0 | 5 | 0 | 0 | 0 | 13% | 10% | 12% | 21% | 0% |
| M1887 | 0 | 2 | 16 | 4 | 2 | 0 | 10 | 0 | 0 | 5 | 0 | 0 | 0 | 12% | 10% | 12% | 0% | 2% |
| M1888 | 0 | 1.25 | 17 | 8 | 1 | 0 | 7 | 0 | 0 | 0 | 0 | 0 | 4.5 | 14% | 10% | 5% | 0% | 2% |
| M1889 | 0 | 2 | 16 | 9 | 3 | 0 | 6 | 0 | 0 | 5 | 0 | 0 | 0 | 12% | 10% | 12% | 0% | 2% |
| M1890 | 0 | 2 | 16 | 10 | 4 | 0 | 5 | 0 | 0 | 5 | 0 | 0 | 0 | 12% | 10% | 12% | 0% | 3% |
| M1891 | 0 | 2 | 16 | 9 | 4 | 0 | 5 | 0 | 0 | 5 | 0 | 0 | 0 | 12% | 10% | 12% | 0% | 3% |
| M1892 | 0 | 2.5 | 14 | 1.25 | 1 | 0 | 0 | 1 | 0 | 5 | 0 | 0 | 0 | 9% | 10% | 12% | 0% | 3% |
| M1893 | 0 | 2.4 | 15.8 | 1.25 | 1 | 0 | 0 | 0 | 0 | 5 | 0 | 0 | 0 | 11% | 10% | 12% | 0% | 3% |
| M1894 | 0 | 2 | 16 | 8 | 4 | 0 | 5 | 0 | 0 | 5 | 0 | 0 | 0 | 12% | 10% | 12% | 0% | 2% |
| M1895 | 0 | 1.25 | 17 | 6 | 0 | 0 | 9 | 0 | 0 | 0 | 0 | 0 | 4.5 | 14% | 10% | 5% | 0% | 3% |
| M1896 | 0 | 2 | 16 | 4 | 3 | 0 | 7 | 0 | 0 | 5 | 0 | 0 | 0 | 12% | 10% | 12% | 0% | 2% |
| M1897 | 0 | 1.25 | 17 | 0 | 2 | 0 | 5 | 0 | 0 | 0 | 0 | 0 | 4.5 | 14% | 10% | 6% | 5% | 2% |
| M1898 | 0 | 2 | 16 | 10 | 2 | 0 | 7 | 0 | 0 | 5 | 0 | 0 | 0 | 12% | 10% | 12% | 0% | 2% |
| M1899 | 0 | 2 | 16 | 8 | 1 | 0 | 10 | 0 | 0 | 5 | 0 | 0 | 0 | 12% | 10% | 12% | 0% | 3% |
| M1900 | 0 | 1.25 | 17 | 9 | 1 | 0 | 7 | 0 | 0 | 0 | 0 | 0 | 4.5 | 14% | 10% | 5% | 0% | 2% |
| M1901 | 0 | 2 | 16 | 7 | 4 | 0 | 5 | 0 | 0 | 5 | 0 | 0 | 0 | 12% | 10% | 12% | 0% | 1% |
| M1902 | 0 | 2 | 18 | 10 | 1 | 0 | 0 | 0 | 0 | 5 | 0 | 0 | 0 | 15% | 10% | 11% | 34% | 1% |
| M1903 | 0 | 2 | 16 | 1 | 3 | 0 | 8 | 0 | 0 | 5 | 0 | 0 | 0 | 12% | 10% | 12% | 0% | 2% |
| M1904 | 0 | 2 | 16 | 6 | 4 | 0 | 5 | 0 | 0 | 5 | 0 | 0 | 0 | 12% | 10% | 12% | 0% | 1% |
| M1905 | 0 | 2 | 16 | 3 | 5 | 0 | 3 | 0 | 0 | 5 | 0 | 0 | 0 | 12% | 10% | 12% | 10% | 0% |
| M1906 | 0 | 2.5 | 14 | 5.5 | 1 | 0 | 0 | 0 | 0 | 5 | 0 | 0 | 0 | 10% | 10% | 12% | 0% | 4% |
| M1907 | 0 | 1.25 | 17 | 10 | 1 | 0 | 7 | 0 | 0 | 0 | 0 | 0 | 4.5 | 14% | 10% | 5% | 0% | 2% |
| M1908 | 0 | 1.25 | 17 | 5 | 3 | 0 | 4 | 0 | 0 | 0 | 0 | 0 | 4.5 | 14% | 10% | 6% | 16% | 1% |
| M1909 | 0 | 2 | 16 | 5 | 4 | 0 | 5 | 0 | 0 | 5 | 0 | 0 | 0 | 12% | 10% | 12% | 0% | 1% |
| M1910 | 0 | 2 | 16 | 7 | 5 | 0 | 4 | 0 | 0 | 5 | 0 | 0 | 0 | 12% | 10% | 12% | 0% | 2% |
| M1911 | 0 | 2 | 16 | 10 | 3 | 0 | 6 | 0 | 0 | 5 | 0 | 0 | 0 | 12% | 10% | 12% | 0% | 3% |
| M1912 | 0 | 1.25 | 17 | 10 | 4 | 0 | 4 | 0 | 0 | 0 | 0 | 0 | 4.5 | 14% | 10% | 6% | 27% | 4% |
| M1913 | 0 | 2 | 16 | 4 | 4 | 0 | 5 | 0 | 0 | 5 | 0 | 0 | 0 | 12% | 10% | 12% | 0% | 1% |
| M1914 | 0 | 1.25 | 17 | 1 | 3 | 0 | 3 | 0 | 0 | 0 | 0 | 0 | 4.5 | 14% | 10% | 6% | 39% | 1% |
| M1915 | 0 | 1.25 | 17 | 6 | 4 | 0 | 3 | 0 | 0 | 0 | 0 | 0 | 4.5 | 14% | 10% | 6% | 37% | 4% |
| M1916 | 0 | 2 | 16 | 6 | 2 | 0 | 9 | 0 | 0 | 5 | 0 | 0 | 0 | 12% | 10% | 12% | 0% | 2% |
| M1917 | 0 | 2 | 16 | 3 | 4 | 0 | 5 | 0 | 0 | 5 | 0 | 0 | 0 | 12% | 10% | 12% | 0% | 1% |
| M1918 | 0 | 2.1 | 16 | 10 | 1 | 0 | 0 | 0 | 0 | 5 | 0 | 0 | 0 | 12% | 10% | 12% | 13% | 1% |
| M1919 | 0 | 2 | 16 | 5 | 3 | 0 | 7 | 0 | 0 | 5 | 0 | 0 | 0 | 12% | 10% | 12% | 0% | 2% |
| M1920 | 0 | 2 | 16 | 8 | 2 | 0 | 8 | 0 | 0 | 5 | 0 | 0 | 0 | 12% | 10% | 12% | 0% | 2% |
| M1921 | 0 | 1.25 | 17 | 0 | 1 | 0 | 8 | 0 | 0 | 0 | 0 | 0 | 4.5 | 14% | 10% | 6% | 0% | 1% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1922 | 0 | 2 | 17 | 1.25 | 1 | 2 | 0 | 1 | 0 | 4 | 0 | 0 | 0 | 14% | 10% | 11% | 26% | 1% |
| M1923 | 0 | 2.5 | 14 | 4 | 1 | 0 | 0 | 0 | 0 | 5 | 0 | 0 | 0 | 10% | 10% | 12% | 0% | 3% |
| M1924 | 0 | 2 | 16 | 2 | 4 | 0 | 5 | 0 | 0 | 5 | 0 | 0 | 0 | 12% | 10% | 12% | 0% | 1% |
| M1925 | 0 | 1.25 | 17 | 10 | 2 | 0 | 6 | 0 | 0 | 0 | 0 | 0 | 4.5 | 14% | 10% | 6% | 0% | 2% |
| M1926 | 0 | 1.25 | 17 | 10 | 3 | 0 | 5 | 0 | 0 | 0 | 0 | 0 | 4.5 | 14% | 10% | 6% | 4% | 4% |
| M1927 | 0 | 1.75 | 13 | 0 | 0 | 0 | 0 | 0 | 0 | 0 | 0 | 0 | 5 | 9% | 10% | 6% | 0% | 1% |
| M1928 | 0 | 2 | 16 | 2 | 3 | 0 | 8 | 0 | 0 | 5 | 0 | 0 | 0 | 12% | 10% | 12% | 0% | 2% |
| M1929 | 0 | 1.25 | 17 | 7 | 0 | 0 | 9 | 0 | 0 | 0 | 0 | 0 | 4.5 | 14% | 10% | 5% | 0% | 3% |
| M1930 | 0 | 2 | 16 | 6 | 5 | 0 | 4 | 0 | 0 | 5 | 0 | 0 | 0 | 12% | 10% | 12% | 0% | 2% |
| M1931 | 0 | 2.3 | 15 | 1.25 | 1 | 0 | 0 | 1 | 0 | 4.5 | 0 | 0 | 0 | 10% | 10% | 11% | 0% | 3% |
| M1932 | 0 | 2 | 16 | 1 | 4 | 0 | 5 | 0 | 0 | 5 | 0 | 0 | 0 | 12% | 10% | 12% | 0% | 1% |
| M1933 | 0 | 2 | 16 | 0 | 3 | 0 | 9 | 0 | 0 | 5 | 0 | 0 | 0 | 12% | 10% | 12% | 0% | 2% |
| M1934 | 0 | 1.25 | 17 | 9 | 2 | 0 | 6 | 0 | 0 | 0 | 0 | 0 | 4.5 | 14% | 10% | 6% | 0% | 2% |
| M1935 | 0 | 2 | 16 | 10 | 6 | 0 | 1 | 0 | 0 | 5 | 0 | 0 | 0 | 13% | 10% | 12% | 32% | 2% |
| M1936 | 0 | 1.25 | 17 | 1 | 1 | 0 | 8 | 0 | 0 | 0 | 0 | 0 | 4.5 | 14% | 10% | 6% | 0% | 1% |
| M1937 | 0 | 2 | 16 | 2 | 5 | 0 | 3 | 0 | 0 | 5 | 0 | 0 | 0 | 12% | 10% | 12% | 10% | 0% |
| M1938 | 0 | 1.25 | 17 | 4 | 3 | 0 | 4 | 0 | 0 | 0 | 0 | 0 | 4.5 | 14% | 10% | 6% | 21% | 1% |
| M1939 | 0 | 2.5 | 14 | 2.5 | 1 | 0 | 0 | 0 | 0 | 5 | 0 | 0 | 0 | 9% | 10% | 12% | 0% | 3% |
| M1940 | 0 | 2 | 18.6 | 1.25 | 1 | 0 | 0 | 0 | 0 | 5 | 0 | 0 | 0 | 15% | 10% | 11% | 36% | 0% |
| M1941 | 0 | 2 | 16 | 0 | 4 | 0 | 5 | 0 | 0 | 5 | 0 | 0 | 0 | 12% | 10% | 12% | 0% | 1% |
| M1942 | 0 | 1.25 | 17 | 8 | 2 | 0 | 6 | 0 | 0 | 0 | 0 | 0 | 4.5 | 14% | 10% | 6% | 0% | 2% |
| M1943 | 0 | 2 | 16 | 0 | 5 | 0 | 2 | 0 | 0 | 5 | 0 | 0 | 0 | 13% | 10% | 12% | 21% | 0% |
| M1944 | 0 | 2 | 16 | 6 | 3 | 0 | 7 | 0 | 0 | 5 | 0 | 0 | 0 | 12% | 10% | 12% | 0% | 2% |
| M1945 | 0 | 2 | 16 | 5 | 2 | 0 | 10 | 0 | 0 | 5 | 0 | 0 | 0 | 12% | 10% | 12% | 0% | 3% |
| M1946 | 0 | 2.4 | 16 | 2.5 | 1 | 0 | 0 | 0 | 0 | 5 | 0 | 0 | 0 | 12% | 10% | 12% | 0% | 3% |
| M1947 | 0 | 2.5 | 14 | 1.25 | 1 | 0 | 0 | 0 | 0 | 5 | 0 | 0 | 0 | 9% | 10% | 12% | 0% | 2% |
| M1948 | 0 | 2.5 | 14 | 1 | 1 | 0 | 0 | 0 | 0 | 5 | 0 | 0 | 0 | 9% | 10% | 12% | 0% | 2% |
| M1949 | 0 | 1.25 | 17 | 9 | 4 | 0 | 4 | 0 | 0 | 0 | 0 | 0 | 4.5 | 14% | 10% | 6% | 26% | 4% |
| M1950 | 0 | 1.25 | 17 | 7 | 2 | 0 | 6 | 0 | 0 | 0 | 0 | 0 | 4.5 | 14% | 10% | 6% | 0% | 2% |
| M1951 | 0 | 1.25 | 17 | 2 | 1 | 0 | 8 | 0 | 0 | 0 | 0 | 0 | 4.5 | 14% | 10% | 6% | 0% | 3% |
| M1952 | 0 | 1.25 | 17 | 9 | 3 | 0 | 5 | 0 | 0 | 0 | 0 | 0 | 4.5 | 14% | 10% | 6% | 3% | 4% |
| M1953 | 0 | 2 | 16 | 5 | 5 | 0 | 4 | 0 | 0 | 5 | 0 | 0 | 0 | 12% | 10% | 12% | 0% | 0% |
| M1954 | 0 | 2 | 16 | 10 | 1 | 0 | 9 | 0 | 0 | 5 | 0 | 0 | 0 | 12% | 10% | 12% | 0% | 3% |
| M1955 | 0 | 2 | 16 | 3 | 3 | 0 | 8 | 0 | 0 | 5 | 0 | 0 | 0 | 12% | 10% | 12% | 0% | 2% |
| M1956 | 0 | 1.25 | 17 | 6 | 2 | 0 | 6 | 0 | 0 | 0 | 0 | 0 | 4.5 | 14% | 10% | 6% | 0% | 2% |
| M1957 | 0 | 1.25 | 17 | 9 | 5 | 0 | 3 | 0 | 0 | 0 | 0 | 0 | 4.5 | 14% | 10% | 6% | 39% | 4% |
| M1958 | 0 | 1.25 | 17 | 5 | 4 | 0 | 3 | 0 | 0 | 0 | 0 | 0 | 4.5 | 14% | 10% | 6% | 36% | 1% |
| M1959 | 0 | 1.25 | 17 | 8 | 0 | 0 | 9 | 0 | 0 | 0 | 0 | 0 | 4.5 | 14% | 10% | 5% | 0% | 3% |
| M1960 | 0 | 1.25 | 17 | 3 | 1 | 0 | 8 | 0 | 0 | 0 | 0 | 0 | 4.5 | 14% | 10% | 6% | 0% | 3% |
| M1961 | 0 | 1.25 | 17 | 5 | 2 | 0 | 6 | 0 | 0 | 0 | 0 | 0 | 4.5 | 14% | 10% | 6% | 0% | 2% |
| M1962 | 0 | 2 | 16 | 1 | 3 | 0 | 9 | 0 | 0 | 5 | 0 | 0 | 0 | 12% | 10% | 12% | 0% | 2% |
| M1963 | 0 | 2 | 16 | 7 | 3 | 0 | 7 | 0 | 0 | 5 | 0 | 0 | 0 | 12% | 10% | 12% | 0% | 2% |
| M1964 | 0 | 1.25 | 17 | 3 | 3 | 0 | 4 | 0 | 0 | 0 | 0 | 0 | 4.5 | 14% | 10% | 6% | 25% | 1% |
| M1965 | 0 | 2 | 16 | 9 | 2 | 0 | 8 | 0 | 0 | 5 | 0 | 0 | 0 | 12% | 10% | 12% | 0% | 2% |
| M1966 | 0 | 2 | 16 | 1 | 5 | 0 | 3 | 0 | 0 | 5 | 0 | 0 | 0 | 12% | 10% | 12% | 10% | 0% |
| M1967 | 0 | 2 | 16 | 7 | 2 | 0 | 9 | 0 | 0 | 5 | 0 | 0 | 0 | 12% | 10% | 12% | 0% | 2% |
| M1968 | 0 | 2.4 | 16 | 1.25 | 1 | 0 | 0 | 0 | 0 | 5 | 0 | 0 | 0 | 11% | 10% | 12% | 0% | 3% |
| M1969 | 0 | 1.25 | 17 | 4 | 2 | 0 | 6 | 0 | 0 | 0 | 0 | 0 | 4.5 | 14% | 10% | 6% | 0% | 2% |
| M1970 | 0 | 1.8 | 17 | 1.25 | 1 | 0 | 0 | 1 | 0 | 3 | 0 | 0 | 0 | 13% | 10% | 7% | 5% | 2% |
| M1971 | 0 | 1.25 | 17 | 8 | 3 | 0 | 5 | 0 | 0 | 0 | 0 | 0 | 4.5 | 14% | 10% | 6% | 1% | 1% |
| M1972 | 0 | 2 | 16 | 4 | 5 | 0 | 4 | 0 | 0 | 5 | 0 | 0 | 0 | 12% | 10% | 12% | 0% | 0% |
| M1973 | 0 | 2.4 | 16 | 1 | 1 | 0 | 0 | 0 | 0 | 5 | 0 | 0 | 0 | 11% | 10% | 12% | 0% | 3% |
| M1974 | 0 | 2 | 16 | 9 | 1 | 0 | 10 | 0 | 0 | 5 | 0 | 0 | 0 | 12% | 10% | 12% | 0% | 3% |
| M1975 | 0 | 2.4 | 16 | 1.25 | 1 | 0 | 0 | 1 | 0 | 5 | 0 | 0 | 0 | 11% | 10% | 12% | 0% | 3% |
| M1976 | 0 | 1.25 | 17 | 4 | 1 | 0 | 8 | 0 | 0 | 0 | 0 | 0 | 4.5 | 14% | 10% | 6% | 0% | 3% |
| M1977 | 0 | 1.25 | 17 | 3 | 2 | 0 | 6 | 0 | 0 | 0 | 0 | 0 | 4.5 | 14% | 10% | 6% | 0% | 2% |
| M1978 | 0 | 2 | 16 | 0 | 3 | 0 | 10 | 0 | 0 | 5 | 0 | 0 | 0 | 12% | 10% | 12% | 0% | 2% |
| M1979 | 0 | 2 | 16 | 4 | 3 | 0 | 8 | 0 | 0 | 5 | 0 | 0 | 0 | 12% | 10% | 12% | 0% | 2% |
| M1980 | 0 | 1.25 | 17 | 8 | 4 | 0 | 4 | 0 | 0 | 0 | 0 | 0 | 4.5 | 14% | 10% | 6% | 25% | 4% |
| M1981 | 0 | 2.1 | 16.6 | 1.25 | 1 | 0 | 0 | 0 | 0 | 5 | 0 | 0 | 0 | 13% | 10% | 12% | 12% | 0% |
| M1982 | 0 | 1.25 | 17 | 5 | 0 | 0 | 10 | 0 | 0 | 0 | 0 | 0 | 4.5 | 14% | 10% | 5% | 0% | 3% |
| M1983 | 0 | 1.25 | 17 | 9 | 0 | 0 | 9 | 0 | 0 | 0 | 0 | 0 | 4.5 | 14% | 10% | 5% | 0% | 3% |
| M1984 | 0 | 2 | 16 | 8 | 3 | 0 | 7 | 0 | 0 | 5 | 0 | 0 | 0 | 12% | 10% | 12% | 0% | 2% |
| M1985 | 0 | 1.25 | 17 | 2 | 2 | 0 | 6 | 0 | 0 | 0 | 0 | 0 | 4.5 | 14% | 10% | 6% | 0% | 2% |
| M1986 | 0 | 1.25 | 17 | 5 | 1 | 0 | 8 | 0 | 0 | 0 | 0 | 0 | 4.5 | 14% | 10% | 6% | 0% | 3% |
| M1987 | 0 | 2 | 16 | 10 | 5 | 0 | 5 | 0 | 0 | 5 | 0 | 0 | 0 | 12% | 10% | 12% | 0% | 3% |
| M1988 | 0 | 1.25 | 17 | 7 | 3 | 0 | 5 | 0 | 0 | 0 | 0 | 0 | 4.5 | 14% | 10% | 6% | 0% | 1% |
| M1989 | 0 | 1.25 | 17 | 2 | 3 | 0 | 4 | 0 | 0 | 0 | 0 | 0 | 4.5 | 14% | 10% | 6% | 29% | 1% |
| M1990 | 0 | 2 | 16 | 3 | 5 | 0 | 4 | 0 | 0 | 5 | 0 | 0 | 0 | 12% | 10% | 12% | 0% | 0% |
| M1991 | 0 | 2 | 16 | 2 | 3 | 0 | 9 | 0 | 0 | 5 | 0 | 0 | 0 | 12% | 10% | 12% | 0% | 2% |
| M1992 | 0 | 1.25 | 17 | 1 | 2 | 0 | 6 | 0 | 0 | 0 | 0 | 0 | 4.5 | 14% | 10% | 6% | 0% | 2% |
| M1993 | 0 | 2 | 16 | 6 | 2 | 0 | 10 | 0 | 0 | 5 | 0 | 0 | 0 | 12% | 10% | 12% | 0% | 3% |
| M1994 | 0 | 2 | 16 | 0 | 5 | 0 | 3 | 0 | 0 | 5 | 0 | 0 | 0 | 12% | 10% | 12% | 13% | 0% |
| M1995 | 0 | 1.25 | 17 | 4 | 4 | 0 | 3 | 0 | 0 | 0 | 0 | 0 | 4.5 | 14% | 10% | 6% | 34% | 1% |
| M1996 | 0 | 2 | 16 | 9 | 5 | 0 | 5 | 0 | 0 | 5 | 0 | 0 | 0 | 12% | 10% | 12% | 0% | 3% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M1997 | 0 | 2 | 16 | 0 | 4 | 0 | 6 | 0 | 0 | 5 | 0 | 0 | 0 | 12% | 10% | 12% | 0% | 1% |
| M1998 | 0 | 2 | 16 | 1 | 4 | 0 | 6 | 0 | 0 | 5 | 0 | 0 | 0 | 12% | 10% | 12% | 0% | 1% |
| M1999 | 0 | 1.25 | 17 | 6 | 1 | 0 | 8 | 0 | 0 | 0 | 0 | 0 | 4.5 | 14% | 10% | 6% | 0% | 3% |
| M2000 | 0 | 2 | 16 | 2 | 4 | 0 | 6 | 0 | 0 | 5 | 0 | 0 | 0 | 12% | 10% | 12% | 0% | 1% |
| M2001 | 0 | 2 | 16 | 3 | 4 | 0 | 6 | 0 | 0 | 5 | 0 | 0 | 0 | 12% | 10% | 12% | 0% | 1% |
| M2002 | 0 | 1.25 | 17 | 0 | 2 | 0 | 6 | 0 | 0 | 0 | 0 | 0 | 4.5 | 14% | 10% | 6% | 0% | 2% |
| M2003 | 0 | 2 | 16 | 4 | 4 | 0 | 6 | 0 | 0 | 5 | 0 | 0 | 0 | 12% | 10% | 12% | 0% | 1% |
| M2004 | 0 | 2 | 16 | 5 | 4 | 0 | 6 | 0 | 0 | 5 | 0 | 0 | 0 | 12% | 10% | 12% | 0% | 1% |
| M2005 | 0 | 2 | 16 | 5 | 3 | 0 | 8 | 0 | 0 | 5 | 0 | 0 | 0 | 12% | 10% | 12% | 0% | 2% |
| M2006 | 0 | 2 | 16 | 6 | 4 | 0 | 6 | 0 | 0 | 5 | 0 | 0 | 0 | 12% | 10% | 12% | 0% | 1% |
| M2007 | 0 | 2 | 16 | 9 | 3 | 0 | 7 | 0 | 0 | 5 | 0 | 0 | 0 | 12% | 10% | 12% | 0% | 2% |
| M2008 | 0 | 2 | 16 | 10 | 2 | 0 | 8 | 0 | 0 | 5 | 0 | 0 | 0 | 12% | 10% | 12% | 0% | 2% |
| M2009 | 0 | 2 | 16 | 7 | 4 | 0 | 6 | 0 | 0 | 5 | 0 | 0 | 0 | 12% | 10% | 12% | 0% | 1% |
| M2010 | 0 | 2 | 16 | 9 | 6 | 0 | 1 | 0 | 0 | 5 | 0 | 0 | 0 | 13% | 10% | 12% | 30% | 2% |
| M2011 | 0 | 2 | 16 | 8 | 5 | 0 | 5 | 0 | 0 | 5 | 0 | 0 | 0 | 12% | 10% | 12% | 0% | 3% |
| M2012 | 0 | 1.25 | 17 | 10 | 0 | 0 | 9 | 0 | 0 | 0 | 0 | 0 | 4.5 | 14% | 10% | 5% | 0% | 3% |
| M2013 | 0 | 1.25 | 17 | 7 | 1 | 0 | 8 | 0 | 0 | 0 | 0 | 0 | 4.5 | 14% | 10% | 6% | 0% | 3% |
| M2014 | 0 | 2 | 16 | 0 | 5 | 0 | 1 | 0 | 0 | 5 | 0 | 0 | 0 | 12% | 10% | 12% | 31% | 0% |
| M2015 | 0 | 1.25 | 17 | 6 | 3 | 0 | 5 | 0 | 0 | 0 | 0 | 0 | 4.5 | 14% | 10% | 6% | 2% | 1% |
| M2016 | 0 | 2 | 16 | 8 | 4 | 0 | 6 | 0 | 0 | 5 | 0 | 0 | 0 | 12% | 10% | 12% | 0% | 3% |
| M2017 | 0 | 2 | 16 | 8 | 2 | 0 | 9 | 0 | 0 | 5 | 0 | 0 | 0 | 12% | 10% | 12% | 0% | 3% |
| M2018 | 0 | 1.25 | 17 | 7 | 4 | 0 | 4 | 0 | 0 | 0 | 0 | 0 | 4.5 | 14% | 10% | 6% | 24% | 4% |
| M2019 | 0 | 2 | 16 | 2 | 5 | 0 | 4 | 0 | 0 | 5 | 0 | 0 | 0 | 12% | 10% | 12% | 0% | 0% |
| M2020 | 0 | 2 | 16 | 1 | 3 | 0 | 10 | 0 | 0 | 5 | 0 | 0 | 0 | 12% | 10% | 12% | 0% | 2% |
| M2021 | 0 | 1.25 | 17 | 6 | 0 | 0 | 10 | 0 | 0 | 0 | 0 | 0 | 4.5 | 14% | 10% | 5% | 0% | 3% |
| M2022 | 0 | 2 | 16 | 9 | 4 | 0 | 6 | 0 | 0 | 5 | 0 | 0 | 0 | 12% | 10% | 12% | 0% | 3% |
| M2023 | 0 | 1.25 | 17 | 1 | 3 | 0 | 4 | 0 | 0 | 0 | 0 | 0 | 4.5 | 14% | 10% | 6% | 34% | 1% |
| M2024 | 0 | 2 | 16 | 10 | 4 | 0 | 6 | 0 | 0 | 5 | 0 | 0 | 0 | 12% | 10% | 12% | 0% | 3% |
| M2025 | 0 | 1.25 | 17 | 8 | 1 | 0 | 8 | 0 | 0 | 0 | 0 | 0 | 4.5 | 14% | 10% | 5% | 0% | 3% |
| M2026 | 0 | 2 | 16 | 7 | 5 | 0 | 5 | 0 | 0 | 5 | 0 | 0 | 0 | 12% | 10% | 12% | 0% | 2% |
| M2027 | 0 | 1.25 | 17 | 0 | 1 | 0 | 9 | 0 | 0 | 0 | 0 | 0 | 4.5 | 14% | 10% | 6% | 0% | 1% |
| M2028 | 0 | 2 | 16 | 3 | 3 | 0 | 9 | 0 | 0 | 5 | 0 | 0 | 0 | 12% | 10% | 12% | 0% | 2% |
| M2029 | 0 | 2 | 16 | 10 | 3 | 0 | 7 | 0 | 0 | 5 | 0 | 0 | 0 | 12% | 10% | 12% | 0% | 3% |
| M2030 | 0 | 2 | 16 | 6 | 3 | 0 | 8 | 0 | 0 | 5 | 0 | 0 | 0 | 12% | 10% | 12% | 0% | 2% |
| M2031 | 0 | 1.25 | 17 | 9 | 1 | 0 | 8 | 0 | 0 | 0 | 0 | 0 | 4.5 | 14% | 10% | 5% | 0% | 3% |
| M2032 | 0 | 1.25 | 17 | 5 | 3 | 0 | 5 | 0 | 0 | 0 | 0 | 0 | 4.5 | 14% | 10% | 6% | 8% | 2% |
| M2033 | 0 | 1.25 | 17 | 10 | 5 | 0 | 4 | 0 | 0 | 0 | 0 | 0 | 4.5 | 14% | 10% | 6% | 31% | 4% |
| M2034 | 0 | 2.5 | 14.2 | 1.25 | 1 | 0 | 0 | 0 | 0 | 5 | 0 | 0 | 0 | 10% | 10% | 12% | 0% | 2% |
| M2035 | 0 | 2.4 | 16.2 | 1.25 | 1 | 0 | 0 | 0 | 0 | 5 | 0 | 0 | 0 | 12% | 10% | 12% | 0% | 3% |
| M2036 | 0 | 2 | 16 | 6 | 5 | 0 | 5 | 0 | 0 | 5 | 0 | 0 | 0 | 12% | 10% | 12% | 0% | 2% |
| M2037 | 0 | 1.25 | 17 | 3 | 4 | 0 | 3 | 0 | 0 | 0 | 0 | 0 | 4.5 | 14% | 10% | 6% | 33% | 1% |
| M2038 | 0 | 2 | 16 | 1 | 5 | 0 | 4 | 0 | 0 | 5 | 0 | 0 | 0 | 12% | 10% | 12% | 0% | 0% |
| M2039 | 0 | 1.25 | 17 | 1 | 1 | 0 | 9 | 0 | 0 | 0 | 0 | 0 | 4.5 | 14% | 10% | 6% | 0% | 1% |
| M2040 | 0 | 2 | 13 | 0 | 0 | 0 | 0 | 0 | 0 | 3 | 0 | 0 | 0 | 8% | 10% | 8% | 0% | 1% |
| M2041 | 0 | 2 | 16 | 10 | 1 | 0 | 10 | 0 | 0 | 5 | 0 | 0 | 0 | 12% | 10% | 12% | 0% | 3% |
| M2042 | 0 | 1.25 | 17 | 10 | 1 | 0 | 8 | 0 | 0 | 0 | 0 | 0 | 4.5 | 14% | 10% | 5% | 0% | 3% |
| M2043 | 0 | 1.25 | 17 | 0 | 3 | 0 | 4 | 0 | 0 | 0 | 0 | 0 | 4.5 | 14% | 10% | 6% | 37% | 1% |
| M2044 | 0 | 1.25 | 17 | 6 | 4 | 0 | 4 | 0 | 0 | 0 | 0 | 0 | 4.5 | 14% | 10% | 6% | 23% | 1% |
| M2045 | 0 | 1.25 | 17 | 7 | 0 | 0 | 10 | 0 | 0 | 0 | 0 | 0 | 4.5 | 14% | 10% | 5% | 0% | 3% |
| M2046 | 0 | 2 | 16 | 7 | 2 | 0 | 10 | 0 | 0 | 5 | 0 | 0 | 0 | 12% | 10% | 12% | 0% | 3% |
| M2047 | 0 | 2 | 16 | 5 | 5 | 0 | 5 | 0 | 0 | 5 | 0 | 0 | 0 | 12% | 10% | 12% | 0% | 1% |
| M2048 | 0 | 2 | 16 | 2 | 3 | 0 | 10 | 0 | 0 | 5 | 0 | 0 | 0 | 12% | 10% | 12% | 0% | 2% |
| M2049 | 0 | 2 | 16 | 10 | 6 | 0 | 2 | 0 | 0 | 5 | 0 | 0 | 0 | 13% | 10% | 12% | 18% | 2% |
| M2050 | 0 | 2 | 16 | 0 | 4 | 0 | 7 | 0 | 0 | 5 | 0 | 0 | 0 | 12% | 10% | 12% | 0% | 1% |
| M2051 | 0 | 1.25 | 17 | 2 | 1 | 0 | 9 | 0 | 0 | 0 | 0 | 0 | 4.5 | 14% | 10% | 6% | 0% | 3% |
| M2052 | 0 | 2 | 16 | 4 | 3 | 0 | 9 | 0 | 0 | 5 | 0 | 0 | 0 | 12% | 10% | 12% | 0% | 2% |
| M2053 | 0 | 1.25 | 17 | 4 | 3 | 0 | 5 | 0 | 0 | 0 | 0 | 0 | 4.5 | 14% | 10% | 6% | 13% | 2% |
| M2054 | 0 | 2 | 16 | 7 | 3 | 0 | 8 | 0 | 0 | 5 | 0 | 0 | 0 | 12% | 10% | 12% | 0% | 2% |
| M2055 | 0 | 2 | 16 | 0 | 5 | 0 | 4 | 0 | 0 | 5 | 0 | 0 | 0 | 12% | 10% | 12% | 5% | 0% |
| M2056 | 0 | 2 | 16 | 9 | 2 | 0 | 9 | 0 | 0 | 5 | 0 | 0 | 0 | 12% | 10% | 12% | 0% | 3% |
| M2057 | 0 | 2 | 16 | 4 | 5 | 0 | 5 | 0 | 0 | 5 | 0 | 0 | 0 | 12% | 10% | 12% | 0% | 1% |
| M2058 | 0 | 2 | 16 | 1 | 4 | 0 | 7 | 0 | 0 | 5 | 0 | 0 | 0 | 12% | 10% | 12% | 0% | 1% |
| M2059 | 0 | 1.25 | 17 | 10 | 4 | 0 | 5 | 0 | 0 | 0 | 0 | 0 | 4.5 | 14% | 10% | 6% | 14% | 5% |
| M2060 | 0 | 1.25 | 17 | 10 | 2 | 0 | 7 | 0 | 0 | 0 | 0 | 0 | 4.5 | 14% | 10% | 6% | 0% | 2% |
| M2061 | 0 | 1.25 | 17 | 9 | 2 | 0 | 7 | 0 | 0 | 0 | 0 | 0 | 4.5 | 14% | 10% | 6% | 0% | 2% |
| M2062 | 0 | 2 | 16 | 2 | 4 | 0 | 7 | 0 | 0 | 5 | 0 | 0 | 0 | 12% | 10% | 12% | 0% | 1% |
| M2063 | 0 | 1.25 | 17 | 3 | 1 | 0 | 9 | 0 | 0 | 0 | 0 | 0 | 4.5 | 14% | 10% | 6% | 0% | 3% |
| M2064 | 0 | 1.25 | 17 | 8 | 2 | 0 | 7 | 0 | 0 | 0 | 0 | 0 | 4.5 | 14% | 10% | 6% | 0% | 2% |
| M2065 | 0 | 1.25 | 17 | 10 | 3 | 0 | 6 | 0 | 0 | 0 | 0 | 0 | 4.5 | 14% | 10% | 6% | 0% | 5% |
| M2066 | 0 | 1.25 | 17 | 7 | 2 | 0 | 7 | 0 | 0 | 0 | 0 | 0 | 4.5 | 14% | 10% | 6% | 0% | 2% |
| M2067 | 0 | 2 | 16 | 3 | 5 | 0 | 5 | 0 | 0 | 5 | 0 | 0 | 0 | 12% | 10% | 12% | 0% | 1% |
| M2068 | 0 | 1.25 | 17 | 2 | 4 | 0 | 3 | 0 | 0 | 0 | 0 | 0 | 4.5 | 14% | 10% | 6% | 34% | 1% |
| M2069 | 0 | 1.25 | 17 | 3 | 3 | 0 | 5 | 0 | 0 | 0 | 0 | 0 | 4.5 | 14% | 10% | 6% | 18% | 2% |
| M2070 | 0 | 2 | 16 | 3 | 4 | 0 | 7 | 0 | 0 | 5 | 0 | 0 | 0 | 12% | 10% | 12% | 0% | 1% |
| M2071 | 0 | 1.25 | 17 | 8 | 0 | 0 | 10 | 0 | 0 | 0 | 0 | 0 | 4.5 | 13% | 10% | 5% | 0% | 3% |

TABLE 4-continued

Alloy Compositions which Meet Thermodynamic Criteria for Corrosion Resistant Hardfacing which is also Crack Resistant

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2072 | 0 | 1.25 | 17 | 6 | 2 | 0 | 7 | 0 | 0 | 0 | 0 | 0 | 4.5 | 14% | 10% | 6% | 0% | 2% |
| M2073 | 0 | 1.25 | 17 | 9 | 5 | 0 | 4 | 0 | 0 | 0 | 0 | 0 | 4.5 | 14% | 10% | 6% | 34% | 4% |
| M2074 | 0 | 1.25 | 17 | 5 | 4 | 0 | 4 | 0 | 0 | 0 | 0 | 0 | 4.5 | 14% | 10% | 6% | 22% | 1% |
| M2075 | 0 | 1.25 | 17 | 5 | 2 | 0 | 7 | 0 | 0 | 0 | 0 | 0 | 4.5 | 14% | 10% | 6% | 0% | 2% |
| M2076 | 0 | 2 | 16 | 8 | 6 | 0 | 1 | 0 | 0 | 5 | 0 | 0 | 0 | 13% | 10% | 12% | 29% | 2% |
| M2077 | 0 | 1.25 | 17 | 4 | 2 | 0 | 7 | 0 | 0 | 0 | 0 | 0 | 4.5 | 14% | 10% | 6% | 0% | 2% |
| M2078 | 0 | 2 | 16 | 8 | 3 | 0 | 8 | 0 | 0 | 5 | 0 | 0 | 0 | 12% | 10% | 12% | 0% | 2% |
| M2079 | 0 | 2 | 16 | 4 | 4 | 0 | 7 | 0 | 0 | 5 | 0 | 0 | 0 | 12% | 10% | 12% | 0% | 1% |
| M2080 | 0 | 2 | 16 | 5 | 3 | 0 | 9 | 0 | 0 | 5 | 0 | 0 | 0 | 12% | 10% | 12% | 0% | 2% |
| M2081 | 0 | 1.25 | 17 | 4 | 1 | 0 | 9 | 0 | 0 | 0 | 0 | 0 | 4.5 | 14% | 10% | 6% | 0% | 3% |
| M2082 | 0 | 1.25 | 17 | 9 | 3 | 0 | 6 | 0 | 0 | 0 | 0 | 0 | 4.5 | 14% | 10% | 6% | 0% | 5% |
| M2083 | 0 | 1.25 | 17 | 3 | 2 | 0 | 7 | 0 | 0 | 0 | 0 | 0 | 4.5 | 14% | 10% | 6% | 0% | 2% |
| M2084 | 0 | 2 | 16 | 3 | 3 | 0 | 10 | 0 | 0 | 5 | 0 | 0 | 0 | 12% | 10% | 12% | 0% | 2% |
| M2085 | 0 | 2 | 16 | 2 | 5 | 0 | 5 | 0 | 0 | 5 | 0 | 0 | 0 | 12% | 10% | 12% | 0% | 1% |
| M2086 | 0 | 1.25 | 17 | 9 | 4 | 0 | 5 | 0 | 0 | 0 | 0 | 0 | 4.5 | 14% | 10% | 6% | 13% | 5% |
| M2087 | 0 | 1.25 | 17 | 2 | 2 | 0 | 7 | 0 | 0 | 0 | 0 | 0 | 4.5 | 14% | 10% | 6% | 0% | 2% |
| M2088 | 0 | 2 | 16 | 0 | 0 | 0 | 0 | 0 | 0 | 3.5 | 0 | 0 | 0 | 11% | 10% | 8% | 0% | 2% |
| M2089 | 0 | 2 | 16 | 5 | 4 | 0 | 7 | 0 | 0 | 5 | 0 | 0 | 0 | 12% | 10% | 12% | 0% | 2% |
| M2090 | 0 | 2.3 | 14 | 10 | 1 | 0 | 0 | 0 | 0 | 5 | 0 | 0 | 0 | 10% | 10% | 12% | 0% | 2% |
| M2091 | 0 | 1.25 | 17 | 1 | 2 | 0 | 7 | 0 | 0 | 0 | 0 | 0 | 4.5 | 14% | 10% | 6% | 0% | 2% |
| M2092 | 0 | 2.6 | 13 | 1.25 | 1 | 0 | 0 | 1 | 0 | 5 | 0 | 0 | 0 | 8% | 10% | 13% | 0% | 3% |
| M2093 | 0 | 2.1 | 16.8 | 1.25 | 1 | 0 | 0 | 0 | 0 | 5 | 0 | 0 | 0 | 13% | 10% | 12% | 12% | 0% |
| M2094 | 0 | 1.75 | 12 | 0 | 0 | 0 | 0 | 0 | 0 | 0 | 0 | 0 | 4.5 | 8% | 10% | 5% | 0% | 1% |
| M2095 | 0 | 1.25 | 17 | 2 | 3 | 0 | 5 | 0 | 0 | 0 | 0 | 0 | 4.5 | 14% | 10% | 6% | 23% | 2% |
| M2096 | 0 | 2 | 16 | 8 | 2 | 0 | 10 | 0 | 0 | 5 | 0 | 0 | 0 | 12% | 10% | 12% | 0% | 3% |
| M2097 | 0 | 1.25 | 17 | 0 | 2 | 0 | 7 | 0 | 0 | 0 | 0 | 0 | 4.5 | 14% | 10% | 6% | 0% | 2% |
| M2098 | 0 | 2.4 | 16.4 | 1.25 | 1 | 0 | 0 | 0 | 0 | 5 | 0 | 0 | 0 | 12% | 10% | 12% | 0% | 3% |
| M2099 | 0 | 2.5 | 18 | 1.25 | 1 | 2 | 0 | 1 | 0 | 6 | 0 | 0 | 0 | 15% | 10% | 16% | 25% | 2% |
| M2100 | 0 | 1.25 | 17 | 5 | 1 | 0 | 9 | 0 | 0 | 0 | 0 | 0 | 4.5 | 14% | 10% | 6% | 0% | 3% |
| M2101 | 0 | 2 | 16 | 6 | 4 | 0 | 7 | 0 | 0 | 5 | 0 | 0 | 0 | 12% | 10% | 12% | 0% | 2% |
| M2102 | 0 | 2 | 16 | 1 | 5 | 0 | 5 | 0 | 0 | 5 | 0 | 0 | 0 | 12% | 10% | 12% | 0% | 1% |
| M2103 | 0 | 1.25 | 17 | 8 | 3 | 0 | 6 | 0 | 0 | 0 | 0 | 0 | 4.5 | 14% | 10% | 6% | 0% | 2% |
| M2104 | 0 | 1.25 | 17 | 9 | 0 | 0 | 10 | 0 | 0 | 0 | 0 | 0 | 4.5 | 13% | 10% | 5% | 0% | 3% |
| M2105 | 0 | 2 | 16 | 0 | 4 | 0 | 8 | 0 | 0 | 5 | 0 | 0 | 0 | 12% | 10% | 12% | 0% | 1% |
| M2106 | 0 | 2 | 16 | 10 | 2 | 0 | 9 | 0 | 0 | 5 | 0 | 0 | 0 | 12% | 10% | 12% | 0% | 3% |
| M2107 | 0 | 2 | 16 | 7 | 4 | 0 | 7 | 0 | 0 | 5 | 0 | 0 | 0 | 12% | 10% | 12% | 0% | 2% |

TABLE 5

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2108 | 0 | 2 | 16 | 9 | 3 | 0 | 8 | 0 | 0 | 5 | 0 | 0 | 0 | 12% | 11% | 12% | 0% | 2% |
| M2109 | 0 | 2 | 16 | 10 | 5 | 0 | 6 | 0 | 0 | 5 | 0 | 0 | 0 | 12% | 11% | 12% | 0% | 3% |
| M2110 | 0 | 1.25 | 17 | 4 | 4 | 0 | 4 | 0 | 0 | 0 | 0 | 0 | 4.5 | 14% | 11% | 6% | 21% | 1% |
| M2111 | 0 | 2.3 | 16 | 2.5 | 1 | 0 | 0 | 0 | 0 | 5 | 0 | 0 | 0 | 12% | 11% | 12% | 0% | 2% |
| M2112 | 0 | 1.25 | 17 | 1 | 4 | 0 | 3 | 0 | 0 | 0 | 0 | 0 | 4.5 | 14% | 11% | 6% | 38% | 1% |
| M2113 | 0 | 1.25 | 17 | 6 | 1 | 0 | 9 | 0 | 0 | 0 | 0 | 0 | 4.5 | 14% | 11% | 6% | 0% | 3% |
| M2114 | 0 | 2 | 16 | 9 | 5 | 0 | 6 | 0 | 0 | 5 | 0 | 0 | 0 | 12% | 11% | 12% | 0% | 3% |
| M2115 | 0 | 2 | 16 | 6 | 3 | 0 | 9 | 0 | 0 | 5 | 0 | 0 | 0 | 12% | 11% | 12% | 0% | 2% |
| M2116 | 0 | 1.25 | 17 | 8 | 4 | 0 | 5 | 0 | 0 | 0 | 0 | 0 | 4.5 | 14% | 11% | 6% | 12% | 5% |
| M2117 | 0 | 2 | 16 | 0 | 5 | 0 | 5 | 0 | 0 | 5 | 0 | 0 | 0 | 12% | 11% | 12% | 0% | 1% |
| M2118 | 0 | 1.25 | 17 | 0 | 1 | 0 | 10 | 0 | 0 | 0 | 0 | 0 | 4.5 | 14% | 11% | 6% | 0% | 2% |
| M2119 | 0 | 2 | 16 | 9 | 6 | 0 | 2 | 0 | 0 | 5 | 0 | 0 | 0 | 13% | 11% | 12% | 21% | 2% |
| M2120 | 0 | 2 | 16 | 8 | 4 | 0 | 7 | 0 | 0 | 5 | 0 | 0 | 0 | 12% | 11% | 12% | 0% | 2% |
| M2121 | 0 | 1.25 | 17 | 1 | 3 | 0 | 5 | 0 | 0 | 0 | 0 | 0 | 4.5 | 14% | 11% | 6% | 24% | 2% |
| M2122 | 0 | 1.25 | 17 | 7 | 3 | 0 | 6 | 0 | 0 | 0 | 0 | 0 | 4.5 | 14% | 11% | 6% | 0% | 2% |
| M2123 | 0 | 2 | 16 | 1 | 4 | 0 | 8 | 0 | 0 | 5 | 0 | 0 | 0 | 12% | 11% | 12% | 0% | 2% |
| M2124 | 0 | 2.5 | 14.4 | 1.25 | 1 | 0 | 0 | 0 | 0 | 5 | 0 | 0 | 0 | 10% | 11% | 12% | 0% | 3% |
| M2125 | 0 | 2 | 16 | 8 | 5 | 0 | 6 | 0 | 0 | 5 | 0 | 0 | 0 | 12% | 11% | 12% | 0% | 3% |
| M2126 | 0 | 2 | 16 | 4 | 3 | 0 | 10 | 0 | 0 | 5 | 0 | 0 | 0 | 12% | 11% | 12% | 0% | 2% |
| M2127 | 0 | 2 | 16 | 7 | 5 | 0 | 6 | 0 | 0 | 5 | 0 | 0 | 0 | 12% | 11% | 12% | 0% | 3% |
| M2128 | 0 | 2 | 16 | 9 | 4 | 0 | 7 | 0 | 0 | 5 | 0 | 0 | 0 | 12% | 11% | 12% | 0% | 3% |
| M2129 | 0 | 1.25 | 17 | 7 | 1 | 0 | 9 | 0 | 0 | 0 | 0 | 0 | 4.5 | 14% | 11% | 6% | 0% | 3% |
| M2130 | 0 | 1.25 | 17 | 10 | 0 | 0 | 10 | 0 | 0 | 0 | 0 | 0 | 4.5 | 13% | 11% | 5% | 0% | 3% |
| M2131 | 0 | 2 | 16 | 6 | 5 | 0 | 6 | 0 | 0 | 5 | 0 | 0 | 0 | 12% | 11% | 12% | 0% | 3% |
| M2132 | 0 | 2 | 16 | 2 | 4 | 0 | 8 | 0 | 0 | 5 | 0 | 0 | 0 | 12% | 11% | 12% | 0% | 2% |
| M2133 | 0 | 1.25 | 17 | 8 | 5 | 0 | 4 | 0 | 0 | 0 | 0 | 0 | 4.5 | 14% | 11% | 6% | 36% | 4% |
| M2134 | 0 | 1.25 | 17 | 6 | 3 | 0 | 6 | 0 | 0 | 0 | 0 | 0 | 4.5 | 14% | 11% | 6% | 0% | 2% |
| M2135 | 0 | 1.25 | 17 | 1 | 1 | 0 | 10 | 0 | 0 | 0 | 0 | 0 | 4.5 | 14% | 11% | 6% | 0% | 2% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2136 | 0 | 2 | 16 | 10 | 3 | 0 | 8 | 0 | 0 | 5 | 0 | 0 | 0 | 12% | 11% | 12% | 0% | 2% |
| M2137 | 0 | 2 | 16 | 6 | 6 | 0 | 0 | 0 | 0 | 5 | 0 | 0 | 0 | 13% | 11% | 12% | 39% | 1% |
| M2138 | 0 | 2 | 16 | 10 | 4 | 0 | 7 | 0 | 0 | 5 | 0 | 0 | 0 | 12% | 11% | 12% | 0% | 3% |
| M2139 | 0 | 2 | 16 | 5 | 5 | 0 | 6 | 0 | 0 | 5 | 0 | 0 | 0 | 12% | 11% | 12% | 0% | 1% |
| M2140 | 0 | 1.25 | 17 | 0 | 3 | 0 | 5 | 0 | 0 | 0 | 0 | 0 | 4.5 | 14% | 11% | 6% | 24% | 2% |
| M2141 | 0 | 2.3 | 13 | 1.25 | 1 | 0 | 0 | 1 | 0 | 4 | 0 | 0 | 0 | 8% | 11% | 10% | 0% | 3% |
| M2142 | 0 | 1.25 | 17 | 8 | 1 | 0 | 9 | 0 | 0 | 0 | 0 | 0 | 4.5 | 13% | 11% | 6% | 0% | 3% |
| M2143 | 0 | 1.25 | 17 | 7 | 4 | 0 | 5 | 0 | 0 | 0 | 0 | 0 | 4.5 | 14% | 11% | 6% | 11% | 4% |
| M2144 | 0 | 2 | 16 | 4 | 5 | 0 | 6 | 0 | 0 | 5 | 0 | 0 | 0 | 12% | 11% | 12% | 0% | 1% |
| M2145 | 0 | 1.25 | 17 | 3 | 4 | 0 | 4 | 0 | 0 | 0 | 0 | 0 | 4.5 | 14% | 11% | 6% | 24% | 1% |
| M2146 | 0 | 2 | 16 | 7 | 3 | 0 | 9 | 0 | 0 | 5 | 0 | 0 | 0 | 12% | 11% | 12% | 0% | 2% |
| M2147 | 0 | 2 | 16 | 3 | 4 | 0 | 8 | 0 | 0 | 5 | 0 | 0 | 0 | 12% | 11% | 12% | 0% | 2% |
| M2148 | 0 | 2.1 | 17 | 1.25 | 1 | 0 | 0 | 1 | 0 | 4 | 0 | 0 | 0 | 12% | 11% | 10% | 0% | 4% |
| M2149 | 0 | 2 | 16 | 9 | 2 | 0 | 10 | 0 | 0 | 5 | 0 | 0 | 0 | 12% | 11% | 12% | 0% | 3% |
| M2150 | 0 | 1.25 | 17 | 5 | 3 | 0 | 6 | 0 | 0 | 0 | 0 | 0 | 4.5 | 14% | 11% | 6% | 0% | 2% |
| M2151 | 0 | 2 | 16 | 3 | 5 | 0 | 6 | 0 | 0 | 5 | 0 | 0 | 0 | 12% | 11% | 12% | 0% | 1% |
| M2152 | 0 | 2 | 16 | 7 | 6 | 0 | 1 | 0 | 0 | 5 | 0 | 0 | 0 | 13% | 11% | 12% | 31% | 2% |
| M2153 | 0 | 2 | 16 | 0 | 4 | 0 | 9 | 0 | 0 | 5 | 0 | 0 | 0 | 12% | 11% | 12% | 0% | 2% |
| M2154 | 0 | 1.25 | 17 | 2 | 1 | 0 | 10 | 0 | 0 | 0 | 0 | 0 | 4.5 | 14% | 11% | 6% | 0% | 3% |
| M2155 | 0 | 1.25 | 17 | 9 | 1 | 0 | 9 | 0 | 0 | 0 | 0 | 0 | 4.5 | 13% | 11% | 5% | 0% | 3% |
| M2156 | 0 | 2 | 16 | 2 | 5 | 0 | 6 | 0 | 0 | 5 | 0 | 0 | 0 | 12% | 11% | 12% | 0% | 1% |
| M2157 | 0 | 2 | 16 | 5 | 3 | 0 | 10 | 0 | 0 | 5 | 0 | 0 | 0 | 12% | 11% | 12% | 0% | 2% |
| M2158 | 0 | 2 | 16 | 4 | 4 | 0 | 8 | 0 | 0 | 5 | 0 | 0 | 0 | 12% | 11% | 12% | 0% | 2% |
| M2159 | 0 | 2 | 16 | 1 | 5 | 0 | 6 | 0 | 0 | 5 | 0 | 0 | 0 | 12% | 11% | 12% | 0% | 1% |
| M2160 | 0 | 2 | 16 | 10 | 6 | 0 | 3 | 0 | 0 | 5 | 0 | 0 | 0 | 13% | 11% | 12% | 11% | 3% |
| M2161 | 0 | 1.25 | 17 | 4 | 3 | 0 | 6 | 0 | 0 | 0 | 0 | 0 | 4.5 | 14% | 11% | 6% | 5% | 2% |
| M2162 | 0 | 1.25 | 17 | 10 | 1 | 0 | 9 | 0 | 0 | 0 | 0 | 0 | 4.5 | 13% | 11% | 5% | 0% | 3% |
| M2163 | 0 | 1.25 | 17 | 6 | 4 | 0 | 5 | 0 | 0 | 0 | 0 | 0 | 4.5 | 14% | 11% | 6% | 11% | 1% |
| M2164 | 0 | 2 | 16 | 0 | 5 | 0 | 6 | 0 | 0 | 5 | 0 | 0 | 0 | 12% | 11% | 12% | 0% | 1% |
| M2165 | 0 | 2.25 | 14 | 0 | 0 | 0 | 0 | 0 | 0 | 4 | 0 | 0 | 0 | 9% | 11% | 10% | 0% | 2% |
| M2166 | 0 | 2 | 13 | 1.25 | 1 | 0 | 0 | 1 | 0 | 3 | 0 | 0 | 0 | 9% | 11% | 8% | 0% | 2% |
| M2167 | 0 | 1.25 | 17 | 3 | 1 | 0 | 10 | 0 | 0 | 0 | 0 | 0 | 4.5 | 14% | 11% | 6% | 0% | 3% |
| M2168 | 0 | 2 | 16 | 1 | 4 | 0 | 9 | 0 | 0 | 5 | 0 | 0 | 0 | 12% | 11% | 12% | 0% | 2% |
| M2169 | 0 | 2 | 16 | 5 | 4 | 0 | 8 | 0 | 0 | 5 | 0 | 0 | 0 | 12% | 11% | 12% | 0% | 2% |
| M2170 | 0 | 2 | 16 | 8 | 3 | 0 | 9 | 0 | 0 | 5 | 0 | 0 | 0 | 12% | 11% | 12% | 0% | 2% |
| M2171 | 0 | 2 | 16 | 1.25 | 1 | 0 | 0 | 1 | 0 | 3.5 | 0 | 0 | 0 | 11% | 11% | 9% | 0% | 3% |
| M2172 | 0 | 1.25 | 17 | 2 | 4 | 0 | 4 | 0 | 0 | 0 | 0 | 0 | 4.5 | 14% | 11% | 6% | 29% | 1% |
| M2173 | 0 | 1.25 | 17 | 10 | 5 | 0 | 5 | 0 | 0 | 0 | 0 | 0 | 4.5 | 14% | 11% | 6% | 23% | 5% |
| M2174 | 0 | 2.25 | 17 | 0 | 0 | 0 | 0 | 0 | 0 | 4.5 | 0 | 0 | 0 | 12% | 11% | 11% | 0% | 3% |
| M2175 | 0 | 2 | 16 | 8 | 6 | 0 | 2 | 0 | 0 | 5 | 0 | 0 | 0 | 13% | 11% | 12% | 24% | 2% |
| M2176 | 0 | 1.25 | 17 | 3 | 3 | 0 | 6 | 0 | 0 | 0 | 0 | 0 | 4.5 | 14% | 11% | 6% | 7% | 2% |
| M2177 | 0 | 1.25 | 17 | 7 | 5 | 0 | 4 | 0 | 0 | 0 | 0 | 0 | 4.5 | 14% | 11% | 6% | 36% | 4% |
| M2178 | 0 | 2 | 16 | 6 | 4 | 0 | 8 | 0 | 0 | 5 | 0 | 0 | 0 | 12% | 11% | 12% | 0% | 2% |
| M2179 | 0 | 1.25 | 17 | 4 | 1 | 0 | 10 | 0 | 0 | 0 | 0 | 0 | 4.5 | 14% | 11% | 6% | 0% | 3% |
| M2180 | 0 | 1.25 | 17 | 0 | 2 | 0 | 8 | 0 | 0 | 0 | 0 | 0 | 4.5 | 14% | 11% | 6% | 0% | 2% |
| M2181 | 0 | 1.25 | 17 | 1 | 2 | 0 | 8 | 0 | 0 | 0 | 0 | 0 | 4.5 | 14% | 11% | 6% | 0% | 2% |
| M2182 | 0 | 1.25 | 17 | 2 | 2 | 0 | 8 | 0 | 0 | 0 | 0 | 0 | 4.5 | 14% | 11% | 6% | 0% | 2% |
| M2183 | 0 | 1.25 | 17 | 3 | 2 | 0 | 8 | 0 | 0 | 0 | 0 | 0 | 4.5 | 14% | 11% | 6% | 0% | 3% |
| M2184 | 0 | 2 | 16 | 6 | 3 | 0 | 10 | 0 | 0 | 5 | 0 | 0 | 0 | 12% | 11% | 12% | 0% | 3% |
| M2185 | 0 | 1.25 | 17 | 4 | 2 | 0 | 8 | 0 | 0 | 0 | 0 | 0 | 4.5 | 14% | 11% | 6% | 0% | 3% |
| M2186 | 0 | 2 | 16 | 2 | 4 | 0 | 9 | 0 | 0 | 5 | 0 | 0 | 0 | 12% | 11% | 12% | 0% | 2% |
| M2187 | 0 | 1.25 | 17 | 5 | 2 | 0 | 8 | 0 | 0 | 0 | 0 | 0 | 4.5 | 14% | 11% | 6% | 0% | 3% |
| M2188 | 0 | 1.25 | 17 | 6 | 2 | 0 | 8 | 0 | 0 | 0 | 0 | 0 | 4.5 | 14% | 11% | 6% | 0% | 3% |
| M2189 | 0 | 1.25 | 17 | 7 | 2 | 0 | 8 | 0 | 0 | 0 | 0 | 0 | 4.5 | 14% | 11% | 6% | 0% | 3% |
| M2190 | 0 | 1.25 | 17 | 8 | 2 | 0 | 8 | 0 | 0 | 0 | 0 | 0 | 4.5 | 13% | 11% | 6% | 0% | 3% |
| M2191 | 0 | 1.25 | 17 | 10 | 2 | 0 | 8 | 0 | 0 | 0 | 0 | 0 | 4.5 | 13% | 11% | 6% | 0% | 3% |
| M2192 | 0 | 1.25 | 17 | 9 | 2 | 0 | 8 | 0 | 0 | 0 | 0 | 0 | 4.5 | 13% | 11% | 6% | 0% | 3% |
| M2193 | 0 | 1.9 | 15 | 1.25 | 1 | 0 | 0 | 1 | 0 | 3 | 0 | 0 | 0 | 10% | 11% | 8% | 0% | 3% |
| M2194 | 0 | 2 | 16 | 0 | 4 | 0 | 10 | 0 | 0 | 5 | 0 | 0 | 0 | 12% | 11% | 12% | 0% | 2% |
| M2195 | 0 | 2 | 16 | 10 | 2 | 0 | 10 | 0 | 0 | 5 | 0 | 0 | 0 | 12% | 11% | 12% | 0% | 3% |
| M2196 | 0 | 1.25 | 17 | 5 | 4 | 0 | 5 | 0 | 0 | 0 | 0 | 0 | 4.5 | 14% | 11% | 6% | 10% | 1% |
| M2197 | 0 | 1.25 | 17 | 2 | 3 | 0 | 6 | 0 | 0 | 0 | 0 | 0 | 4.5 | 14% | 11% | 6% | 7% | 2% |
| M2198 | 0 | 1.25 | 17 | 10 | 4 | 0 | 6 | 0 | 0 | 0 | 0 | 0 | 4.5 | 13% | 11% | 6% | 2% | 5% |
| M2199 | 0 | 2 | 16 | 7 | 4 | 0 | 8 | 0 | 0 | 5 | 0 | 0 | 0 | 12% | 11% | 12% | 0% | 2% |
| M2200 | 0 | 1.75 | 13 | 0 | 0 | 5 | 0 | 0 | 0 | 0 | 0 | 0 | 0 | 9% | 11% | 6% | 0% | 2% |
| M2201 | 0 | 2.5 | 14.6 | 1.25 | 1 | 0 | 0 | 0 | 0 | 5 | 0 | 0 | 0 | 10% | 11% | 12% | 0% | 3% |
| M2202 | 0 | 2.1 | 17 | 1.25 | 1 | 0 | 0 | 0 | 0 | 5 | 0 | 0 | 0 | 13% | 11% | 12% | 12% | 0% |
| M2203 | 0 | 2 | 16 | 9 | 3 | 0 | 9 | 0 | 0 | 5 | 0 | 0 | 0 | 12% | 11% | 12% | 0% | 2% |
| M2204 | 0 | 1.25 | 17 | 5 | 1 | 0 | 10 | 0 | 0 | 0 | 0 | 0 | 4.5 | 13% | 11% | 6% | 0% | 3% |
| M2205 | 0 | 1.25 | 17 | 9 | 5 | 0 | 5 | 0 | 0 | 0 | 0 | 0 | 4.5 | 14% | 11% | 6% | 23% | 5% |
| M2206 | 0 | 1.25 | 17 | 1 | 4 | 0 | 4 | 0 | 0 | 0 | 0 | 0 | 4.5 | 14% | 11% | 6% | 33% | 1% |
| M2207 | 0 | 2 | 16 | 3 | 4 | 0 | 9 | 0 | 0 | 5 | 0 | 0 | 0 | 12% | 11% | 12% | 0% | 2% |
| M2208 | 0 | 1.25 | 17 | 1 | 3 | 0 | 6 | 0 | 0 | 0 | 0 | 0 | 4.5 | 14% | 11% | 6% | 8% | 2% |
| M2209 | 0 | 2.2 | 16.2 | 1.25 | 1 | 0 | 0 | 0 | 0 | 5 | 0 | 0 | 0 | 12% | 11% | 12% | 0% | 1% |
| M2210 | 0 | 2 | 16 | 8 | 4 | 0 | 8 | 0 | 0 | 5 | 0 | 0 | 0 | 12% | 11% | 12% | 0% | 2% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2211 | 0 | 1.25 | 17 | 9 | 3 | 0 | 7 | 0 | 0 | 0 | 0 | 0 | 4.5 | 13% | 11% | 6% | 0% | 2% |
| M2212 | 0 | 2 | 16 | 6 | 6 | 0 | 1 | 0 | 0 | 5 | 0 | 0 | 0 | 13% | 11% | 12% | 34% | 2% |
| M2213 | 0 | 2 | 16 | 9 | 6 | 0 | 3 | 0 | 0 | 5 | 0 | 0 | 0 | 13% | 11% | 12% | 15% | 3% |
| M2214 | 0 | 2 | 16 | 0 | 5 | 0 | 7 | 0 | 0 | 5 | 0 | 0 | 0 | 12% | 11% | 12% | 0% | 1% |
| M2215 | 0 | 2 | 16 | 1 | 5 | 0 | 7 | 0 | 0 | 5 | 0 | 0 | 0 | 12% | 11% | 12% | 0% | 1% |
| M2216 | 0 | 2 | 16 | 1 | 4 | 0 | 10 | 0 | 0 | 5 | 0 | 0 | 0 | 12% | 11% | 12% | 0% | 2% |
| M2217 | 0 | 2 | 16 | 2 | 5 | 0 | 7 | 0 | 0 | 5 | 0 | 0 | 0 | 12% | 11% | 12% | 0% | 1% |
| M2218 | 0 | 1.25 | 17 | 9 | 4 | 0 | 6 | 0 | 0 | 0 | 0 | 0 | 4.5 | 13% | 11% | 6% | 2% | 5% |
| M2219 | 0 | 2 | 16 | 3 | 5 | 0 | 7 | 0 | 0 | 5 | 0 | 0 | 0 | 12% | 11% | 12% | 0% | 1% |
| M2220 | 0 | 2 | 16 | 4 | 5 | 0 | 7 | 0 | 0 | 5 | 0 | 0 | 0 | 12% | 11% | 12% | 0% | 1% |
| M2221 | 0 | 2 | 16 | 5 | 5 | 0 | 7 | 0 | 0 | 5 | 0 | 0 | 0 | 12% | 11% | 12% | 0% | 1% |
| M2222 | 0 | 2 | 16 | 6 | 5 | 0 | 7 | 0 | 0 | 5 | 0 | 0 | 0 | 12% | 11% | 12% | 0% | 1% |
| M2223 | 0 | 1.25 | 17 | 4 | 4 | 0 | 5 | 0 | 0 | 0 | 0 | 0 | 4.5 | 14% | 11% | 6% | 12% | 1% |
| M2224 | 0 | 2 | 16 | 7 | 5 | 0 | 7 | 0 | 0 | 5 | 0 | 0 | 0 | 12% | 11% | 12% | 0% | 3% |
| M2225 | 0 | 1.25 | 17 | 6 | 1 | 0 | 10 | 0 | 0 | 0 | 0 | 0 | 4.5 | 13% | 11% | 6% | 0% | 3% |
| M2226 | 0 | 2 | 16 | 8 | 5 | 0 | 7 | 0 | 0 | 5 | 0 | 0 | 0 | 12% | 11% | 12% | 0% | 3% |
| M2227 | 0 | 2 | 16 | 9 | 5 | 0 | 7 | 0 | 0 | 5 | 0 | 0 | 0 | 12% | 11% | 12% | 0% | 3% |
| M2228 | 0 | 2 | 16 | 10 | 5 | 0 | 7 | 0 | 0 | 5 | 0 | 0 | 0 | 12% | 11% | 12% | 0% | 4% |
| M2229 | 0 | 2 | 16 | 7 | 3 | 0 | 10 | 0 | 0 | 5 | 0 | 0 | 0 | 12% | 11% | 12% | 0% | 3% |
| M2230 | 0 | 1.25 | 17 | 8 | 3 | 0 | 7 | 0 | 0 | 0 | 0 | 0 | 4.5 | 13% | 11% | 6% | 0% | 2% |
| M2231 | 0 | 2 | 16 | 9 | 4 | 0 | 8 | 0 | 0 | 5 | 0 | 0 | 0 | 12% | 11% | 12% | 0% | 3% |
| M2232 | 0 | 1.25 | 17 | 0 | 3 | 0 | 6 | 0 | 0 | 0 | 0 | 0 | 4.5 | 14% | 11% | 6% | 9% | 2% |
| M2233 | 0 | 2.1 | 14 | 1.25 | 1 | 0 | 0 | 1 | 0 | 3.5 | 0 | 0 | 0 | 9% | 11% | 9% | 0% | 3% |
| M2234 | 0 | 2 | 16 | 4 | 4 | 0 | 9 | 0 | 0 | 5 | 0 | 0 | 0 | 12% | 11% | 12% | 0% | 2% |
| M2235 | 0 | 1.75 | 14 | 0 | 0 | 0 | 0 | 0 | 0 | 0 | 0 | 0 | 5 | 10% | 11% | 6% | 0% | 2% |
| M2236 | 0 | 2 | 16 | 10 | 3 | 0 | 9 | 0 | 0 | 5 | 0 | 0 | 0 | 12% | 11% | 12% | 0% | 3% |
| M2237 | 0 | 3.5 | 15 | 1.25 | 1 | 2 | 0 | 1 | 0 | 8 | 0 | 0 | 0 | 10% | 11% | 20% | 0% | 5% |
| M2238 | 0 | 1.25 | 17 | 6 | 5 | 0 | 4 | 0 | 0 | 0 | 0 | 0 | 4.5 | 14% | 11% | 6% | 35% | 4% |
| M2239 | 0 | 1.25 | 17 | 8 | 5 | 0 | 5 | 0 | 0 | 0 | 0 | 0 | 4.5 | 14% | 11% | 6% | 23% | 5% |
| M2240 | 0 | 2 | 16 | 7 | 6 | 0 | 2 | 0 | 0 | 5 | 0 | 0 | 0 | 13% | 11% | 12% | 27% | 2% |
| M2241 | 0 | 1.25 | 17 | 7 | 3 | 0 | 7 | 0 | 0 | 0 | 0 | 0 | 4.5 | 13% | 11% | 6% | 0% | 2% |
| M2242 | 0 | 1.25 | 17 | 7 | 1 | 0 | 10 | 0 | 0 | 0 | 0 | 0 | 4.5 | 13% | 11% | 6% | 0% | 3% |
| M2243 | 0 | 2.3 | 16.4 | 1.25 | 1 | 0 | 0 | 0 | 0 | 5 | 0 | 0 | 0 | 12% | 11% | 12% | 0% | 2% |
| M2244 | 0 | 1.25 | 17 | 0 | 4 | 0 | 4 | 0 | 0 | 0 | 0 | 0 | 4.5 | 14% | 11% | 6% | 37% | 1% |
| M2245 | 0 | 1.25 | 17 | 8 | 4 | 0 | 6 | 0 | 0 | 0 | 0 | 0 | 4.5 | 13% | 11% | 6% | 1% | 5% |
| M2246 | 0 | 2 | 16 | 10 | 4 | 0 | 8 | 0 | 0 | 5 | 0 | 0 | 0 | 12% | 11% | 12% | 0% | 3% |
| M2247 | 0 | 2 | 16 | 2 | 4 | 0 | 10 | 0 | 0 | 5 | 0 | 0 | 0 | 12% | 11% | 12% | 0% | 2% |
| M2248 | 0 | 2.4 | 14 | 1.25 | 1 | 0 | 0 | 1 | 0 | 4.5 | 0 | 0 | 0 | 9% | 11% | 11% | 0% | 3% |
| M2249 | 0 | 1.25 | 17 | 3 | 4 | 0 | 5 | 0 | 0 | 0 | 0 | 0 | 4.5 | 14% | 11% | 6% | 17% | 1% |
| M2250 | 0 | 2 | 16 | 5 | 4 | 0 | 9 | 0 | 0 | 5 | 0 | 0 | 0 | 12% | 11% | 12% | 0% | 2% |
| M2251 | 0 | 1.25 | 17 | 6 | 3 | 0 | 7 | 0 | 0 | 0 | 0 | 0 | 4.5 | 14% | 11% | 6% | 0% | 2% |
| M2252 | 0 | 1.25 | 17 | 8 | 1 | 0 | 10 | 0 | 0 | 0 | 0 | 0 | 4.5 | 13% | 11% | 6% | 0% | 3% |
| M2253 | 0 | 2 | 16 | 8 | 3 | 0 | 10 | 0 | 0 | 5 | 0 | 0 | 0 | 12% | 11% | 12% | 0% | 3% |
| M2254 | 0 | 1.25 | 17 | 5 | 3 | 0 | 7 | 0 | 0 | 0 | 0 | 0 | 4.5 | 14% | 11% | 6% | 0% | 2% |
| M2255 | 0 | 1.25 | 17 | 7 | 4 | 0 | 6 | 0 | 0 | 0 | 0 | 0 | 4.5 | 13% | 11% | 6% | 0% | 5% |
| M2256 | 0 | 2 | 16 | 0 | 5 | 0 | 8 | 0 | 0 | 5 | 0 | 0 | 0 | 12% | 11% | 12% | 0% | 1% |
| M2257 | 0 | 2 | 16 | 10 | 6 | 0 | 4 | 0 | 0 | 5 | 0 | 0 | 0 | 13% | 11% | 12% | 5% | 3% |
| M2258 | 0 | 2 | 16 | 6 | 4 | 0 | 9 | 0 | 0 | 5 | 0 | 0 | 0 | 12% | 11% | 12% | 0% | 2% |
| M2259 | 0 | 2.2 | 15 | 1.25 | 1 | 0 | 0 | 1 | 0 | 4 | 0 | 0 | 0 | 10% | 11% | 10% | 0% | 3% |
| M2260 | 0 | 1.25 | 17 | 9 | 1 | 0 | 10 | 0 | 0 | 0 | 0 | 0 | 4.5 | 13% | 11% | 6% | 0% | 3% |
| M2261 | 0 | 2 | 16 | 8 | 6 | 0 | 3 | 0 | 0 | 5 | 0 | 0 | 0 | 13% | 11% | 12% | 19% | 3% |
| M2262 | 0 | 2 | 16 | 3 | 4 | 0 | 10 | 0 | 0 | 5 | 0 | 0 | 0 | 12% | 11% | 12% | 0% | 2% |
| M2263 | 0 | 1.25 | 17 | 4 | 3 | 0 | 7 | 0 | 0 | 0 | 0 | 0 | 4.5 | 14% | 11% | 6% | 0% | 2% |
| M2264 | 0 | 2 | 16 | 1 | 5 | 0 | 8 | 0 | 0 | 5 | 0 | 0 | 0 | 12% | 11% | 12% | 0% | 1% |
| M2265 | 0 | 1.25 | 17 | 2 | 4 | 0 | 5 | 0 | 0 | 0 | 0 | 0 | 4.5 | 14% | 11% | 6% | 22% | 1% |
| M2266 | 0 | 2.4 | 16.6 | 1.25 | 1 | 0 | 0 | 0 | 0 | 5 | 0 | 0 | 0 | 12% | 11% | 12% | 0% | 3% |
| M2267 | 0 | 1.25 | 17 | 0 | 2 | 0 | 9 | 0 | 0 | 0 | 0 | 0 | 4.5 | 14% | 11% | 6% | 0% | 3% |
| M2268 | 0 | 2 | 16 | 2 | 5 | 0 | 8 | 0 | 0 | 5 | 0 | 0 | 0 | 12% | 11% | 12% | 0% | 1% |
| M2269 | 0 | 2.5 | 14.8 | 1.25 | 1 | 0 | 0 | 0 | 0 | 5 | 0 | 0 | 0 | 10% | 11% | 12% | 0% | 3% |
| M2270 | 0 | 2 | 16 | 5 | 6 | 0 | 1 | 0 | 0 | 5 | 0 | 0 | 0 | 13% | 11% | 12% | 37% | 2% |
| M2271 | 0 | 1.25 | 17 | 1 | 2 | 0 | 9 | 0 | 0 | 0 | 0 | 0 | 4.5 | 14% | 11% | 6% | 0% | 3% |
| M2272 | 0 | 1.25 | 17 | 3 | 3 | 0 | 7 | 0 | 0 | 0 | 0 | 0 | 4.5 | 14% | 11% | 6% | 0% | 2% |
| M2273 | 0 | 1.25 | 17 | 10 | 1 | 0 | 10 | 0 | 0 | 0 | 0 | 0 | 4.5 | 13% | 11% | 6% | 0% | 3% |
| M2274 | 0 | 1.25 | 17 | 6 | 4 | 0 | 6 | 0 | 0 | 0 | 0 | 0 | 4.5 | 14% | 11% | 6% | 0% | 2% |
| M2275 | 0 | 1.25 | 17 | 5 | 5 | 0 | 4 | 0 | 0 | 0 | 0 | 0 | 4.5 | 14% | 11% | 6% | 35% | 4% |
| M2276 | 0 | 1.25 | 17 | 2 | 2 | 0 | 9 | 0 | 0 | 0 | 0 | 0 | 4.5 | 14% | 11% | 6% | 0% | 3% |
| M2277 | 0 | 1.25 | 17 | 7 | 5 | 0 | 5 | 0 | 0 | 0 | 0 | 0 | 4.5 | 14% | 11% | 6% | 22% | 5% |
| M2278 | 0 | 2 | 16 | 7 | 4 | 0 | 9 | 0 | 0 | 5 | 0 | 0 | 0 | 12% | 11% | 12% | 0% | 2% |
| M2279 | 0 | 2 | 16 | 3 | 5 | 0 | 8 | 0 | 0 | 5 | 0 | 0 | 0 | 12% | 11% | 12% | 0% | 2% |
| M2280 | 0 | 1.25 | 17 | 3 | 2 | 0 | 9 | 0 | 0 | 0 | 0 | 0 | 4.5 | 13% | 11% | 6% | 0% | 3% |
| M2281 | 0 | 2 | 16 | 9 | 3 | 0 | 10 | 0 | 0 | 5 | 0 | 0 | 0 | 12% | 11% | 12% | 0% | 3% |
| M2282 | 0 | 2.3 | 16 | 1.25 | 1 | 0 | 0 | 1 | 0 | 4.5 | 0 | 0 | 0 | 11% | 11% | 11% | 0% | 4% |
| M2283 | 0 | 1.25 | 17 | 4 | 2 | 0 | 9 | 0 | 0 | 0 | 0 | 0 | 4.5 | 13% | 11% | 6% | 0% | 3% |
| M2284 | 0 | 2 | 16 | 4 | 5 | 0 | 8 | 0 | 0 | 5 | 0 | 0 | 0 | 12% | 11% | 12% | 0% | 2% |
| M2285 | 0 | 1.25 | 17 | 2 | 3 | 0 | 7 | 0 | 0 | 0 | 0 | 0 | 4.5 | 14% | 11% | 6% | 0% | 2% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2286 | 0 | 2 | 16 | 6 | 6 | 0 | 2 | 0 | 0 | 5 | 0 | 0 | 0 | 13% | 11% | 12% | 31% | 2% |
| M2287 | 0 | 2 | 16 | 4 | 4 | 0 | 10 | 0 | 0 | 5 | 0 | 0 | 0 | 12% | 11% | 12% | 0% | 2% |
| M2288 | 0 | 1.25 | 17 | 5 | 2 | 0 | 9 | 0 | 0 | 0 | 0 | 0 | 4.5 | 13% | 11% | 6% | 0% | 3% |
| M2289 | 0 | 1.25 | 17 | 1 | 4 | 0 | 5 | 0 | 0 | 0 | 0 | 0 | 4.5 | 14% | 11% | 6% | 27% | 1% |
| M2290 | 0 | 2 | 16 | 5 | 5 | 0 | 8 | 0 | 0 | 5 | 0 | 0 | 0 | 12% | 11% | 12% | 0% | 2% |
| M2291 | 0 | 1.25 | 17 | 6 | 2 | 0 | 9 | 0 | 0 | 0 | 0 | 0 | 4.5 | 13% | 11% | 6% | 0% | 3% |
| M2292 | 0 | 2.4 | 17 | 1.25 | 1 | 0 | 0 | 1 | 0 | 5 | 0 | 0 | 0 | 12% | 11% | 12% | 0% | 4% |
| M2293 | 0 | 1.25 | 17 | 7 | 2 | 0 | 9 | 0 | 0 | 0 | 0 | 0 | 4.5 | 13% | 11% | 6% | 0% | 3% |
| M2294 | 0 | 1.25 | 17 | 1 | 3 | 0 | 7 | 0 | 0 | 0 | 0 | 0 | 4.5 | 14% | 11% | 6% | 0% | 2% |
| M2295 | 0 | 2 | 16 | 8 | 4 | 0 | 9 | 0 | 0 | 5 | 0 | 0 | 0 | 12% | 11% | 12% | 0% | 2% |
| M2296 | 0 | 2 | 16 | 6 | 5 | 0 | 8 | 0 | 0 | 5 | 0 | 0 | 0 | 12% | 11% | 12% | 0% | 2% |
| M2297 | 0 | 1.25 | 17 | 5 | 4 | 0 | 6 | 0 | 0 | 0 | 0 | 0 | 4.5 | 14% | 11% | 6% | 0% | 2% |
| M2298 | 0 | 1.25 | 17 | 8 | 2 | 0 | 9 | 0 | 0 | 0 | 0 | 0 | 4.5 | 13% | 11% | 6% | 0% | 3% |
| M2299 | 0 | 2.1 | 17.2 | 1.25 | 1 | 0 | 0 | 0 | 0 | 5 | 0 | 0 | 0 | 13% | 11% | 12% | 13% | 0% |
| M2300 | 0 | 2.5 | 15 | 0 | 0 | 0 | 0 | 0 | 0 | 5 | 0 | 0 | 0 | 10% | 11% | 12% | 0% | 3% |
| M2301 | 0 | 2 | 16 | 0 | 5 | 0 | 9 | 0 | 0 | 5 | 0 | 0 | 0 | 12% | 11% | 12% | 0% | 2% |
| M2302 | 0 | 1.25 | 17 | 9 | 2 | 0 | 9 | 0 | 0 | 0 | 0 | 0 | 4.5 | 13% | 11% | 6% | 0% | 3% |
| M2303 | 0 | 2 | 16 | 7 | 5 | 0 | 8 | 0 | 0 | 5 | 0 | 0 | 0 | 12% | 11% | 12% | 0% | 3% |
| M2304 | 0 | 1.25 | 17 | 10 | 2 | 0 | 9 | 0 | 0 | 0 | 0 | 0 | 4.5 | 13% | 11% | 6% | 0% | 3% |
| M2305 | 0 | 2 | 16 | 9 | 6 | 0 | 4 | 0 | 0 | 5 | 0 | 0 | 0 | 13% | 11% | 12% | 9% | 3% |
| M2306 | 0 | 1.25 | 17 | 0 | 3 | 0 | 7 | 0 | 0 | 0 | 0 | 0 | 4.5 | 14% | 11% | 6% | 0% | 2% |
| M2307 | 0 | 2 | 16 | 8 | 5 | 0 | 8 | 0 | 0 | 5 | 0 | 0 | 0 | 12% | 11% | 12% | 0% | 3% |
| M2308 | 0 | 2 | 16 | 5 | 4 | 0 | 10 | 0 | 0 | 5 | 0 | 0 | 0 | 12% | 11% | 12% | 0% | 2% |
| M2309 | 0 | 2 | 16 | 7 | 6 | 0 | 3 | 0 | 0 | 5 | 0 | 0 | 0 | 13% | 11% | 12% | 23% | 2% |
| M2310 | 0 | 2 | 16 | 1 | 5 | 0 | 9 | 0 | 0 | 5 | 0 | 0 | 0 | 12% | 11% | 12% | 0% | 2% |
| M2311 | 0 | 2 | 16 | 9 | 4 | 0 | 9 | 0 | 0 | 5 | 0 | 0 | 0 | 12% | 11% | 12% | 0% | 2% |
| M2312 | 0 | 2 | 16 | 9 | 5 | 0 | 8 | 0 | 0 | 5 | 0 | 0 | 0 | 12% | 11% | 12% | 0% | 3% |
| M2313 | 0 | 1.25 | 17 | 0 | 4 | 0 | 5 | 0 | 0 | 0 | 0 | 0 | 4.5 | 14% | 11% | 6% | 31% | 1% |
| M2314 | 0 | 2 | 16 | 10 | 3 | 0 | 10 | 0 | 0 | 5 | 0 | 0 | 0 | 12% | 11% | 12% | 0% | 3% |
| M2315 | 0 | 1.25 | 17 | 4 | 4 | 0 | 6 | 0 | 0 | 0 | 0 | 0 | 4.5 | 14% | 11% | 6% | 4% | 2% |
| M2316 | 0 | 2 | 16 | 10 | 5 | 0 | 8 | 0 | 0 | 5 | 0 | 0 | 0 | 12% | 11% | 12% | 0% | 4% |
| M2317 | 0 | 2.5 | 15 | 1.25 | 1 | 0 | 0 | 1 | 0 | 5 | 0 | 0 | 0 | 10% | 11% | 12% | 0% | 4% |
| M2318 | 0 | 1.25 | 17 | 6 | 5 | 0 | 5 | 0 | 0 | 0 | 0 | 0 | 4.5 | 14% | 11% | 6% | 22% | 5% |
| M2319 | 0 | 1.25 | 17 | 4 | 5 | 0 | 4 | 0 | 0 | 0 | 0 | 0 | 4.5 | 14% | 11% | 6% | 34% | 1% |
| M2320 | 0 | 2 | 16 | 2 | 5 | 0 | 9 | 0 | 0 | 5 | 0 | 0 | 0 | 12% | 11% | 12% | 0% | 2% |
| M2321 | 0 | 1.25 | 17 | 9 | 3 | 0 | 8 | 0 | 0 | 0 | 0 | 0 | 4.5 | 13% | 11% | 6% | 0% | 3% |
| M2322 | 0 | 3 | 14 | 1.25 | 1 | 2 | 0 | 1 | 0 | 6 | 0 | 0 | 0 | 10% | 11% | 16% | 0% | 4% |
| M2323 | 0 | 2 | 16 | 10 | 4 | 0 | 9 | 0 | 0 | 5 | 0 | 0 | 0 | 12% | 11% | 12% | 0% | 4% |
| M2324 | 0 | 2 | 16 | 6 | 4 | 0 | 10 | 0 | 0 | 5 | 0 | 0 | 0 | 12% | 11% | 12% | 0% | 2% |
| M2325 | 0 | 1.25 | 17 | 8 | 3 | 0 | 8 | 0 | 0 | 0 | 0 | 0 | 4.5 | 13% | 11% | 6% | 0% | 3% |
| M2326 | 0 | 1.25 | 17 | 3 | 4 | 0 | 6 | 0 | 0 | 0 | 0 | 0 | 4.5 | 14% | 11% | 6% | 10% | 2% |
| M2327 | 0 | 2 | 16 | 0 | 5 | 0 | 10 | 0 | 0 | 5 | 0 | 0 | 0 | 12% | 11% | 12% | 0% | 2% |
| M2328 | 0 | 2 | 16 | 3 | 5 | 0 | 9 | 0 | 0 | 5 | 0 | 0 | 0 | 12% | 11% | 12% | 0% | 2% |
| M2329 | 0 | 2 | 16 | 5 | 6 | 0 | 2 | 0 | 0 | 5 | 0 | 0 | 0 | 13% | 11% | 12% | 34% | 2% |
| M2330 | 0 | 1.25 | 17 | 7 | 3 | 0 | 8 | 0 | 0 | 0 | 0 | 0 | 4.5 | 13% | 11% | 6% | 0% | 3% |
| M2331 | 0 | 2 | 16 | 8 | 6 | 0 | 4 | 0 | 0 | 5 | 0 | 0 | 0 | 13% | 11% | 12% | 10% | 3% |
| M2332 | 0 | 1.25 | 17 | 10 | 6 | 0 | 3 | 0 | 0 | 0 | 0 | 0 | 4.5 | 14% | 11% | 6% | 36% | 4% |
| M2333 | 0 | 1.25 | 17 | 6 | 3 | 0 | 8 | 0 | 0 | 0 | 0 | 0 | 4.5 | 13% | 11% | 6% | 0% | 3% |
| M2334 | 0 | 2.5 | 15 | 1.25 | 1 | 0 | 0 | 0 | 0 | 5 | 0 | 0 | 0 | 10% | 11% | 12% | 0% | 3% |
| M2335 | 0 | 2 | 18 | 1.25 | 1 | 2 | 0 | 1 | 0 | 4 | 0 | 0 | 0 | 15% | 11% | 11% | 26% | 1% |
| M2336 | 0 | 2 | 16 | 4 | 5 | 0 | 9 | 0 | 0 | 5 | 0 | 0 | 0 | 12% | 11% | 12% | 0% | 2% |
| M2337 | 0 | 1.25 | 17 | 8 | 5 | 0 | 6 | 0 | 0 | 0 | 0 | 0 | 4.5 | 13% | 11% | 6% | 10% | 5% |
| M2338 | 0 | 1.25 | 17 | 0 | 2 | 0 | 10 | 0 | 0 | 0 | 0 | 0 | 4.5 | 14% | 11% | 6% | 0% | 3% |
| M2339 | 0 | 2 | 16 | 10 | 6 | 0 | 5 | 0 | 0 | 5 | 0 | 0 | 0 | 12% | 11% | 12% | 0% | 3% |
| M2340 | 0 | 1.25 | 17 | 5 | 3 | 0 | 8 | 0 | 0 | 0 | 0 | 0 | 4.5 | 13% | 11% | 6% | 0% | 3% |
| M2341 | 0 | 2 | 16 | 7 | 4 | 0 | 10 | 0 | 0 | 5 | 0 | 0 | 0 | 12% | 11% | 12% | 0% | 2% |
| M2342 | 0 | 1.25 | 17 | 2 | 4 | 0 | 6 | 0 | 0 | 0 | 0 | 0 | 4.5 | 14% | 11% | 6% | 15% | 2% |
| M2343 | 0 | 2 | 16 | 1 | 5 | 0 | 10 | 0 | 0 | 5 | 0 | 0 | 0 | 12% | 11% | 12% | 0% | 2% |
| M2344 | 0 | 2 | 16 | 6 | 6 | 0 | 3 | 0 | 0 | 5 | 0 | 0 | 0 | 13% | 11% | 12% | 25% | 2% |
| M2345 | 0 | 1.25 | 17 | 1 | 2 | 0 | 10 | 0 | 0 | 0 | 0 | 0 | 4.5 | 13% | 11% | 6% | 0% | 3% |
| M2346 | 0 | 1.25 | 17 | 5 | 5 | 0 | 5 | 0 | 0 | 0 | 0 | 0 | 4.5 | 14% | 11% | 6% | 22% | 5% |
| M2347 | 0 | 2 | 17 | 0 | 0 | 0 | 0 | 3.5 | 0 | 0 | 0 | 0 | 0 | 12% | 11% | 8% | 0% | 3% |
| M2348 | 0 | 1.25 | 17 | 4 | 3 | 0 | 8 | 0 | 0 | 0 | 0 | 0 | 4.5 | 13% | 11% | 6% | 0% | 3% |
| M2349 | 0 | 2 | 16 | 5 | 5 | 0 | 9 | 0 | 0 | 5 | 0 | 0 | 0 | 12% | 11% | 12% | 0% | 2% |
| M2350 | 0 | 1.25 | 17 | 3 | 5 | 0 | 4 | 0 | 0 | 0 | 0 | 0 | 4.5 | 14% | 11% | 6% | 34% | 1% |
| M2351 | 0 | 1.25 | 17 | 2 | 2 | 0 | 10 | 0 | 0 | 0 | 0 | 0 | 4.5 | 13% | 11% | 6% | 0% | 3% |
| M2352 | 0 | 1.25 | 17 | 7 | 4 | 0 | 7 | 0 | 0 | 0 | 0 | 0 | 4.5 | 13% | 11% | 6% | 0% | 2% |
| M2353 | 0 | 1.25 | 17 | 3 | 3 | 0 | 8 | 0 | 0 | 0 | 0 | 0 | 4.5 | 13% | 11% | 6% | 0% | 2% |
| M2354 | 0 | 1.25 | 17 | 3 | 2 | 0 | 10 | 0 | 0 | 0 | 0 | 0 | 4.5 | 13% | 11% | 6% | 0% | 3% |
| M2355 | 0 | 2 | 16 | 6 | 5 | 0 | 9 | 0 | 0 | 5 | 0 | 0 | 0 | 12% | 11% | 12% | 0% | 2% |
| M2356 | 0 | 1.25 | 17 | 2 | 3 | 0 | 8 | 0 | 0 | 0 | 0 | 0 | 4.5 | 13% | 11% | 6% | 0% | 2% |
| M2357 | 0 | 2 | 16 | 2 | 5 | 0 | 10 | 0 | 0 | 5 | 0 | 0 | 0 | 12% | 11% | 12% | 0% | 2% |
| M2358 | 0 | 1.25 | 17 | 7 | 5 | 0 | 6 | 0 | 0 | 0 | 0 | 0 | 4.5 | 13% | 11% | 6% | 10% | 5% |
| M2359 | 0 | 1.25 | 17 | 1 | 4 | 0 | 6 | 0 | 0 | 0 | 0 | 0 | 4.5 | 14% | 11% | 6% | 20% | 2% |
| M2360 | 0 | 2 | 16 | 8 | 4 | 0 | 10 | 0 | 0 | 5 | 0 | 0 | 0 | 12% | 11% | 12% | 0% | 3% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2361 | 0 | 1.25 | 17 | 4 | 2 | 0 | 10 | 0 | 0 | 0 | 0 | 0 | 4.5 | 13% | 11% | 6% | 0% | 3% |
| M2362 | 0 | 1.25 | 17 | 1 | 3 | 0 | 8 | 0 | 0 | 0 | 0 | 0 | 4.5 | 14% | 11% | 6% | 0% | 2% |
| M2363 | 0 | 1.25 | 17 | 6 | 4 | 0 | 7 | 0 | 0 | 0 | 0 | 0 | 4.5 | 13% | 11% | 6% | 0% | 2% |
| M2364 | 0 | 2 | 16 | 7 | 5 | 0 | 9 | 0 | 0 | 5 | 0 | 0 | 0 | 12% | 11% | 12% | 0% | 2% |
| M2365 | 0 | 1.25 | 17 | 5 | 2 | 0 | 10 | 0 | 0 | 0 | 0 | 0 | 4.5 | 13% | 11% | 6% | 0% | 3% |
| M2366 | 0 | 1.25 | 17 | 0 | 3 | 0 | 8 | 0 | 0 | 0 | 0 | 0 | 4.5 | 14% | 11% | 6% | 0% | 2% |
| M2367 | 0 | 2 | 16 | 7 | 6 | 0 | 4 | 0 | 0 | 5 | 0 | 0 | 0 | 13% | 11% | 12% | 10% | 3% |
| M2368 | 0 | 2 | 16 | 9 | 6 | 0 | 5 | 0 | 0 | 5 | 0 | 0 | 0 | 13% | 11% | 12% | 0% | 3% |
| M2369 | 0 | 2 | 16 | 4 | 6 | 0 | 2 | 0 | 0 | 5 | 0 | 0 | 0 | 13% | 11% | 12% | 37% | 2% |
| M2370 | 0 | 1.25 | 17 | 6 | 2 | 0 | 10 | 0 | 0 | 0 | 0 | 0 | 4.5 | 13% | 11% | 6% | 0% | 3% |
| M2371 | 0 | 2 | 16 | 3 | 5 | 0 | 10 | 0 | 0 | 5 | 0 | 0 | 0 | 12% | 11% | 12% | 0% | 2% |
| M2372 | 0 | 2 | 16 | 8 | 5 | 0 | 9 | 0 | 0 | 5 | 0 | 0 | 0 | 12% | 11% | 12% | 0% | 3% |
| M2373 | 0 | 1.25 | 17 | 0 | 4 | 0 | 6 | 0 | 0 | 0 | 0 | 0 | 4.5 | 14% | 11% | 6% | 25% | 2% |
| M2374 | 0 | 2.1 | 17.4 | 1.25 | 1 | 0 | 0 | 0 | 0 | 5 | 0 | 0 | 0 | 13% | 11% | 12% | 18% | 0% |
| M2375 | 0 | 1.25 | 17 | 7 | 2 | 0 | 10 | 0 | 0 | 0 | 0 | 0 | 4.5 | 13% | 11% | 6% | 0% | 3% |
| M2376 | 0 | 2 | 16 | 9 | 4 | 0 | 10 | 0 | 0 | 5 | 0 | 0 | 0 | 12% | 11% | 12% | 0% | 3% |
| M2377 | 0 | 1.25 | 17 | 4 | 5 | 0 | 5 | 0 | 0 | 0 | 0 | 0 | 4.5 | 14% | 11% | 6% | 22% | 1% |
| M2378 | 0 | 1.25 | 17 | 5 | 4 | 0 | 7 | 0 | 0 | 0 | 0 | 0 | 4.5 | 13% | 11% | 6% | 0% | 2% |
| M2379 | 0 | 2 | 16 | 5 | 6 | 0 | 3 | 0 | 0 | 5 | 0 | 0 | 0 | 13% | 11% | 12% | 25% | 2% |
| M2380 | 0 | 1.25 | 17 | 8 | 2 | 0 | 10 | 0 | 0 | 0 | 0 | 0 | 4.5 | 13% | 11% | 6% | 0% | 3% |
| M2381 | 0 | 2 | 16 | 9 | 5 | 0 | 9 | 0 | 0 | 5 | 0 | 0 | 0 | 12% | 11% | 12% | 0% | 4% |
| M2382 | 0 | 1.25 | 17 | 6 | 5 | 0 | 6 | 0 | 0 | 0 | 0 | 0 | 4.5 | 13% | 11% | 6% | 10% | 5% |
| M2383 | 0 | 1.25 | 17 | 2 | 5 | 0 | 4 | 0 | 0 | 0 | 0 | 0 | 4.5 | 14% | 11% | 6% | 34% | 1% |
| M2384 | 0 | 1.25 | 17 | 9 | 2 | 0 | 10 | 0 | 0 | 0 | 0 | 0 | 4.5 | 13% | 11% | 6% | 0% | 3% |
| M2385 | 0 | 2 | 16 | 4 | 5 | 0 | 10 | 0 | 0 | 5 | 0 | 0 | 0 | 12% | 11% | 12% | 0% | 2% |
| M2386 | 0 | 1.25 | 17 | 10 | 2 | 0 | 10 | 0 | 0 | 0 | 0 | 0 | 4.5 | 13% | 11% | 6% | 0% | 3% |
| M2387 | 0 | 1.25 | 17 | 4 | 4 | 0 | 7 | 0 | 0 | 0 | 0 | 0 | 4.5 | 13% | 11% | 6% | 0% | 2% |
| M2388 | 0 | 2 | 16 | 10 | 5 | 0 | 9 | 0 | 0 | 5 | 0 | 0 | 0 | 12% | 11% | 12% | 0% | 4% |
| M2389 | 0 | 2 | 16 | 10 | 4 | 0 | 10 | 0 | 0 | 5 | 0 | 0 | 0 | 12% | 11% | 12% | 0% | 4% |
| M2390 | 0 | 2.5 | 15.2 | 1.25 | 1 | 0 | 0 | 0 | 0 | 5 | 0 | 0 | 0 | 10% | 11% | 12% | 0% | 3% |
| M2391 | 0 | 2 | 16 | 6 | 6 | 0 | 4 | 0 | 0 | 5 | 0 | 0 | 0 | 13% | 11% | 12% | 10% | 3% |
| M2392 | 0 | 2 | 16 | 8 | 6 | 0 | 5 | 0 | 0 | 5 | 0 | 0 | 0 | 13% | 11% | 12% | 0% | 3% |
| M2393 | 0 | 2 | 16 | 5 | 5 | 0 | 10 | 0 | 0 | 5 | 0 | 0 | 0 | 12% | 11% | 12% | 0% | 2% |
| M2394 | 0 | 1.25 | 17 | 3 | 4 | 0 | 7 | 0 | 0 | 0 | 0 | 0 | 4.5 | 13% | 11% | 6% | 1% | 2% |
| M2395 | 0 | 1.25 | 17 | 10 | 3 | 0 | 9 | 0 | 0 | 0 | 0 | 0 | 4.5 | 13% | 11% | 6% | 0% | 3% |
| M2396 | 0 | 1.25 | 17 | 3 | 5 | 0 | 5 | 0 | 0 | 0 | 0 | 0 | 4.5 | 14% | 11% | 6% | 22% | 1% |
| M2397 | 0 | 1.25 | 17 | 9 | 3 | 0 | 9 | 0 | 0 | 0 | 0 | 0 | 4.5 | 13% | 11% | 6% | 0% | 3% |
| M2398 | 0 | 1.25 | 17 | 5 | 5 | 0 | 6 | 0 | 0 | 0 | 0 | 0 | 4.5 | 13% | 11% | 6% | 10% | 5% |
| M2399 | 0 | 1.25 | 17 | 8 | 3 | 0 | 9 | 0 | 0 | 0 | 0 | 0 | 4.5 | 13% | 11% | 6% | 0% | 3% |
| M2400 | 0 | 2 | 16 | 3 | 6 | 0 | 2 | 0 | 0 | 5 | 0 | 0 | 0 | 13% | 11% | 12% | 39% | 0% |
| M2401 | 0 | 2 | 16 | 10 | 6 | 0 | 6 | 0 | 0 | 5 | 0 | 0 | 0 | 12% | 11% | 12% | 0% | 4% |
| M2402 | 0 | 2 | 16 | 6 | 5 | 0 | 10 | 0 | 0 | 5 | 0 | 0 | 0 | 12% | 11% | 12% | 0% | 2% |
| M2403 | 0 | 1.75 | 13 | 0 | 0 | 0 | 0 | 0 | 0 | 0 | 0 | 0 | 4.5 | 9% | 11% | 5% | 0% | 2% |
| M2404 | 0 | 1.25 | 17 | 2 | 4 | 0 | 7 | 0 | 0 | 0 | 0 | 0 | 4.5 | 13% | 11% | 6% | 7% | 2% |
| M2405 | 0 | 1.25 | 17 | 7 | 3 | 0 | 9 | 0 | 0 | 0 | 0 | 0 | 4.5 | 13% | 11% | 6% | 0% | 3% |
| M2406 | 0 | 2 | 16 | 4 | 6 | 0 | 3 | 0 | 0 | 5 | 0 | 0 | 0 | 13% | 11% | 12% | 24% | 2% |
| M2407 | 0 | 2 | 17 | 1.25 | 1 | 0 | 0 | 1 | 0 | 3.5 | 0 | 0 | 0 | 12% | 11% | 8% | 0% | 4% |
| M2408 | 0 | 1.25 | 17 | 1 | 5 | 0 | 4 | 0 | 0 | 0 | 0 | 0 | 4.5 | 14% | 11% | 6% | 34% | 1% |
| M2409 | 0 | 1.25 | 17 | 6 | 3 | 0 | 9 | 0 | 0 | 0 | 0 | 0 | 4.5 | 13% | 11% | 6% | 0% | 3% |
| M2410 | 0 | 1.25 | 17 | 5 | 3 | 0 | 9 | 0 | 0 | 0 | 0 | 0 | 4.5 | 13% | 11% | 6% | 0% | 3% |
| M2411 | 0 | 1.25 | 17 | 4 | 3 | 0 | 9 | 0 | 0 | 0 | 0 | 0 | 4.5 | 13% | 11% | 6% | 0% | 3% |
| M2412 | 0 | 2 | 14 | 0 | 0 | 0 | 0 | 0 | 0 | 3 | 0 | 0 | 0 | 9% | 11% | 7% | 0% | 2% |
| M2413 | 0 | 1.25 | 17 | 3 | 3 | 0 | 9 | 0 | 0 | 0 | 0 | 0 | 4.5 | 13% | 11% | 6% | 0% | 3% |
| M2414 | 0 | 1.25 | 17 | 1 | 4 | 0 | 7 | 0 | 0 | 0 | 0 | 0 | 4.5 | 13% | 11% | 6% | 9% | 2% |
| M2415 | 0 | 2 | 16 | 7 | 6 | 0 | 5 | 0 | 0 | 5 | 0 | 0 | 0 | 13% | 11% | 12% | 0% | 3% |
| M2416 | 0 | 2 | 16 | 7 | 5 | 0 | 10 | 0 | 0 | 5 | 0 | 0 | 0 | 12% | 11% | 12% | 0% | 2% |
| M2417 | 0 | 1.25 | 17 | 2 | 3 | 0 | 9 | 0 | 0 | 0 | 0 | 0 | 4.5 | 13% | 11% | 6% | 0% | 3% |
| M2418 | 0 | 2 | 16 | 5 | 6 | 0 | 4 | 0 | 0 | 5 | 0 | 0 | 0 | 13% | 11% | 12% | 10% | 3% |
| M2419 | 0 | 1.25 | 17 | 1 | 3 | 0 | 9 | 0 | 0 | 0 | 0 | 0 | 4.5 | 13% | 11% | 6% | 0% | 3% |
| M2420 | 0 | 1.25 | 17 | 0 | 3 | 0 | 9 | 0 | 0 | 0 | 0 | 0 | 4.5 | 13% | 11% | 6% | 0% | 3% |
| M2421 | 0 | 1.25 | 17 | 9 | 6 | 0 | 3 | 0 | 0 | 0 | 0 | 0 | 4.5 | 14% | 11% | 6% | 38% | 4% |
| M2422 | 0 | 1.75 | 15 | 0 | 0 | 0 | 0 | 0 | 0 | 0 | 0 | 0 | 5 | 11% | 11% | 6% | 0% | 3% |
| M2423 | 0 | 1.25 | 17 | 2 | 5 | 0 | 5 | 0 | 0 | 0 | 0 | 0 | 4.5 | 14% | 11% | 6% | 22% | 1% |
| M2424 | 0 | 2 | 16 | 9 | 6 | 0 | 6 | 0 | 0 | 5 | 0 | 0 | 0 | 12% | 11% | 12% | 0% | 4% |
| M2425 | 0 | 1.25 | 17 | 0 | 4 | 0 | 7 | 0 | 0 | 0 | 0 | 0 | 4.5 | 13% | 11% | 6% | 11% | 2% |
| M2426 | 0 | 1.25 | 17 | 4 | 5 | 0 | 6 | 0 | 0 | 0 | 0 | 0 | 4.5 | 13% | 11% | 6% | 10% | 2% |
| M2427 | 0 | 1.25 | 17 | 7 | 4 | 0 | 8 | 0 | 0 | 0 | 0 | 0 | 4.5 | 13% | 11% | 6% | 0% | 3% |
| M2428 | 0 | 2 | 16 | 8 | 5 | 0 | 10 | 0 | 0 | 5 | 0 | 0 | 0 | 12% | 11% | 12% | 0% | 4% |
| M2429 | 0 | 1.25 | 17 | 6 | 4 | 0 | 8 | 0 | 0 | 0 | 0 | 0 | 4.5 | 13% | 11% | 6% | 0% | 3% |
| M2430 | 0 | 1.25 | 17 | 0 | 5 | 0 | 4 | 0 | 0 | 0 | 0 | 0 | 4.5 | 14% | 11% | 6% | 36% | 1% |
| M2431 | 0 | 2 | 16 | 3 | 6 | 0 | 3 | 0 | 0 | 5 | 0 | 0 | 0 | 13% | 11% | 12% | 24% | 0% |
| M2432 | 0 | 2 | 16 | 9 | 5 | 0 | 10 | 0 | 0 | 5 | 0 | 0 | 0 | 12% | 11% | 12% | 0% | 4% |
| M2433 | 0 | 1.9 | 16 | 1.25 | 1 | 0 | 0 | 1 | 0 | 3 | 0 | 0 | 0 | 11% | 11% | 7% | 0% | 4% |
| M2434 | 0 | 2 | 16 | 6 | 6 | 0 | 5 | 0 | 0 | 5 | 0 | 0 | 0 | 13% | 11% | 12% | 0% | 3% |
| M2435 | 0 | 2 | 16 | 2 | 6 | 0 | 2 | 0 | 0 | 5 | 0 | 0 | 0 | 13% | 11% | 12% | 38% | 0% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2436 | 0 | 2.2 | 13 | 1.25 | 1 | 0 | 0 | 1 | 0 | 3.5 | 0 | 0 | 0 | 8% | 11% | 9% | 0% | 5% |
| M2437 | 0 | 2.5 | 15.4 | 1.25 | 1 | 0 | 0 | 0 | 0 | 5 | 0 | 0 | 0 | 10% | 11% | 12% | 0% | 3% |
| M2438 | 0 | 2.1 | 17.6 | 1.25 | 1 | 0 | 0 | 0 | 0 | 5 | 0 | 0 | 0 | 14% | 11% | 12% | 22% | 0% |
| M2439 | 0 | 1.25 | 17 | 5 | 4 | 0 | 8 | 0 | 0 | 0 | 0 | 0 | 4.5 | 13% | 11% | 6% | 0% | 2% |
| M2440 | 0 | 2.4 | 16 | 4 | 1 | 0 | 0 | 0 | 0 | 5 | 0 | 0 | 0 | 11% | 11% | 12% | 0% | 3% |
| M2441 | 0 | 2 | 16 | 4 | 6 | 0 | 4 | 0 | 0 | 5 | 0 | 0 | 0 | 13% | 11% | 12% | 11% | 2% |
| M2442 | 0 | 2.5 | 13 | 1.25 | 1 | 2 | 0 | 1 | 0 | 4 | 0 | 0 | 0 | 9% | 11% | 12% | 0% | 4% |
| M2443 | 0 | 2 | 16 | 8 | 6 | 0 | 6 | 0 | 0 | 5 | 0 | 0 | 0 | 12% | 11% | 12% | 0% | 3% |
| M2444 | 0 | 2 | 16 | 10 | 5 | 0 | 10 | 0 | 0 | 5 | 0 | 0 | 0 | 12% | 11% | 12% | 0% | 4% |
| M2445 | 0 | 1.25 | 17 | 3 | 5 | 0 | 6 | 0 | 0 | 0 | 0 | 0 | 4.5 | 13% | 11% | 6% | 11% | 2% |
| M2446 | 0 | 1.25 | 17 | 1 | 5 | 0 | 5 | 0 | 0 | 0 | 0 | 0 | 4.5 | 14% | 11% | 6% | 26% | 1% |
| M2447 | 0 | 1.25 | 17 | 4 | 4 | 0 | 8 | 0 | 0 | 0 | 0 | 0 | 4.5 | 13% | 11% | 6% | 0% | 2% |
| M2448 | 0 | 1.75 | 14 | 0 | 0 | 5 | 0 | 0 | 0 | 0 | 0 | 0 | 0 | 10% | 11% | 6% | 0% | 3% |
| M2449 | 0 | 1.25 | 17 | 3 | 4 | 0 | 8 | 0 | 0 | 0 | 0 | 0 | 4.5 | 13% | 11% | 6% | 0% | 2% |
| M2450 | 0 | 2 | 16 | 5 | 6 | 0 | 5 | 0 | 0 | 5 | 0 | 0 | 0 | 13% | 11% | 12% | 0% | 3% |
| M2451 | 0 | 1.25 | 17 | 5 | 5 | 0 | 7 | 0 | 0 | 0 | 0 | 0 | 4.5 | 13% | 11% | 6% | 0% | 2% |
| M2452 | 0 | 2 | 16 | 10 | 6 | 0 | 7 | 0 | 0 | 5 | 0 | 0 | 0 | 12% | 11% | 12% | 0% | 4% |
| M2453 | 0 | 2 | 16 | 7 | 6 | 0 | 6 | 0 | 0 | 5 | 0 | 0 | 0 | 12% | 11% | 12% | 0% | 3% |
| M2454 | 0 | 2 | 16 | 2 | 6 | 0 | 3 | 0 | 0 | 5 | 0 | 0 | 0 | 13% | 11% | 12% | 25% | 0% |
| M2455 | 0 | 1.25 | 17 | 2 | 4 | 0 | 8 | 0 | 0 | 0 | 0 | 0 | 4.5 | 13% | 11% | 6% | 0% | 2% |
| M2456 | 0 | 2 | 16 | 3 | 6 | 0 | 4 | 0 | 0 | 5 | 0 | 0 | 0 | 13% | 11% | 12% | 11% | 0% |
| M2457 | 0 | 1.25 | 17 | 2 | 5 | 0 | 6 | 0 | 0 | 0 | 0 | 0 | 4.5 | 13% | 11% | 6% | 14% | 2% |
| M2458 | 0 | 1.25 | 17 | 0 | 5 | 0 | 5 | 0 | 0 | 0 | 0 | 0 | 4.5 | 14% | 11% | 6% | 31% | 1% |
| M2459 | 0 | 1.25 | 17 | 1 | 4 | 0 | 8 | 0 | 0 | 0 | 0 | 0 | 4.5 | 13% | 11% | 6% | 0% | 2% |
| M2460 | 0 | 2 | 16 | 1 | 6 | 0 | 2 | 0 | 0 | 5 | 0 | 0 | 0 | 13% | 11% | 12% | 37% | 0% |
| M2461 | 0 | 1.25 | 17 | 0 | 3 | 0 | 10 | 0 | 0 | 0 | 0 | 0 | 4.5 | 13% | 11% | 6% | 0% | 3% |
| M2462 | 0 | 1.25 | 17 | 10 | 3 | 0 | 10 | 0 | 0 | 0 | 0 | 0 | 4.5 | 13% | 11% | 6% | 0% | 3% |
| M2463 | 0 | 1.25 | 17 | 1 | 3 | 0 | 10 | 0 | 0 | 0 | 0 | 0 | 4.5 | 13% | 11% | 6% | 0% | 3% |
| M2464 | 0 | 1.25 | 17 | 9 | 3 | 0 | 10 | 0 | 0 | 0 | 0 | 0 | 4.5 | 13% | 11% | 6% | 0% | 3% |
| M2465 | 0 | 1.25 | 17 | 2 | 3 | 0 | 10 | 0 | 0 | 0 | 0 | 0 | 4.5 | 13% | 11% | 6% | 0% | 3% |
| M2466 | 0 | 1.25 | 17 | 8 | 3 | 0 | 10 | 0 | 0 | 0 | 0 | 0 | 4.5 | 13% | 11% | 6% | 0% | 3% |
| M2467 | 0 | 1.25 | 17 | 3 | 3 | 0 | 10 | 0 | 0 | 0 | 0 | 0 | 4.5 | 13% | 11% | 6% | 0% | 3% |
| M2468 | 0 | 1.25 | 17 | 10 | 6 | 0 | 4 | 0 | 0 | 0 | 0 | 0 | 4.5 | 14% | 11% | 6% | 30% | 4% |
| M2469 | 0 | 1.25 | 17 | 7 | 3 | 0 | 10 | 0 | 0 | 0 | 0 | 0 | 4.5 | 13% | 11% | 6% | 0% | 3% |
| M2470 | 0 | 1.25 | 17 | 4 | 3 | 0 | 10 | 0 | 0 | 0 | 0 | 0 | 4.5 | 13% | 11% | 6% | 0% | 3% |
| M2471 | 0 | 1.25 | 17 | 6 | 3 | 0 | 10 | 0 | 0 | 0 | 0 | 0 | 4.5 | 13% | 11% | 6% | 0% | 3% |
| M2472 | 0 | 1.25 | 17 | 5 | 3 | 0 | 10 | 0 | 0 | 0 | 0 | 0 | 4.5 | 13% | 11% | 6% | 0% | 3% |
| M2473 | 0 | 1.25 | 17 | 4 | 5 | 0 | 7 | 0 | 0 | 0 | 0 | 0 | 4.5 | 13% | 11% | 6% | 0% | 2% |
| M2474 | 0 | 2 | 16 | 4 | 6 | 0 | 5 | 0 | 0 | 5 | 0 | 0 | 0 | 13% | 11% | 12% | 0% | 2% |
| M2475 | 0 | 1.25 | 17 | 0 | 4 | 0 | 8 | 0 | 0 | 0 | 0 | 0 | 4.5 | 13% | 11% | 6% | 0% | 2% |
| M2476 | 0 | 2 | 16 | 9 | 6 | 0 | 7 | 0 | 0 | 5 | 0 | 0 | 0 | 12% | 11% | 12% | 0% | 4% |
| M2477 | 0 | 2 | 16 | 6 | 6 | 0 | 6 | 0 | 0 | 5 | 0 | 0 | 0 | 12% | 11% | 12% | 0% | 3% |
| M2478 | 0 | 2.25 | 15 | 0 | 0 | 0 | 0 | 0 | 0 | 4 | 0 | 0 | 0 | 10% | 11% | 10% | 0% | 3% |
| M2479 | 0 | 1.25 | 17 | 1 | 5 | 0 | 6 | 0 | 0 | 0 | 0 | 0 | 4.5 | 14% | 11% | 6% | 20% | 2% |
| M2480 | 0 | 2.5 | 15.6 | 1.25 | 1 | 0 | 0 | 0 | 0 | 5 | 0 | 0 | 0 | 11% | 11% | 12% | 0% | 4% |
| M2481 | 0 | 2 | 16 | 2 | 6 | 0 | 4 | 0 | 0 | 5 | 0 | 0 | 0 | 13% | 11% | 12% | 12% | 0% |
| M2482 | 0 | 2 | 14 | 1.25 | 1 | 0 | 0 | 1 | 0 | 3 | 0 | 0 | 0 | 9% | 11% | 8% | 0% | 3% |
| M2483 | 0 | 2.6 | 14 | 1.25 | 1 | 0 | 0 | 1 | 0 | 5 | 0 | 0 | 0 | 9% | 11% | 12% | 0% | 4% |
| M2484 | 0 | 2 | 16 | 1 | 6 | 0 | 3 | 0 | 0 | 5 | 0 | 0 | 0 | 13% | 11% | 12% | 25% | 0% |
| M2485 | 0 | 2 | 16 | 8 | 6 | 0 | 7 | 0 | 0 | 5 | 0 | 0 | 0 | 12% | 11% | 12% | 0% | 3% |
| M2486 | 0 | 1.25 | 17 | 3 | 5 | 0 | 7 | 0 | 0 | 0 | 0 | 0 | 4.5 | 13% | 11% | 6% | 0% | 2% |
| M2487 | 0 | 2 | 16 | 5 | 6 | 0 | 6 | 0 | 0 | 5 | 0 | 0 | 0 | 12% | 11% | 12% | 0% | 3% |
| M2488 | 0 | 2 | 16 | 3 | 6 | 0 | 5 | 0 | 0 | 5 | 0 | 0 | 0 | 13% | 11% | 12% | 0% | 1% |
| M2489 | 0 | 2.3 | 14 | 1.25 | 1 | 0 | 0 | 1 | 0 | 4 | 0 | 0 | 0 | 9% | 11% | 10% | 0% | 4% |
| M2490 | 0 | 1.25 | 17 | 7 | 4 | 0 | 9 | 0 | 0 | 0 | 0 | 0 | 4.5 | 13% | 11% | 6% | 0% | 3% |
| M2491 | 0 | 2.6 | 14 | 8.5 | 1 | 0 | 0 | 0 | 0 | 5 | 0 | 0 | 0 | 9% | 11% | 12% | 0% | 5% |
| M2492 | 0 | 2 | 16 | 0 | 6 | 0 | 2 | 0 | 0 | 5 | 0 | 0 | 0 | 13% | 11% | 12% | 37% | 0% |
| M2493 | 0 | 1.25 | 17 | 6 | 4 | 0 | 9 | 0 | 0 | 0 | 0 | 0 | 4.5 | 13% | 11% | 6% | 0% | 3% |
| M2494 | 0 | 1.25 | 17 | 0 | 5 | 0 | 6 | 0 | 0 | 0 | 0 | 0 | 4.5 | 14% | 11% | 6% | 25% | 2% |
| M2495 | 0 | 2.1 | 15 | 1.25 | 1 | 0 | 0 | 1 | 0 | 3.5 | 0 | 0 | 0 | 10% | 11% | 9% | 0% | 4% |
| M2496 | 0 | 2.1 | 17.8 | 1.25 | 1 | 0 | 0 | 0 | 0 | 5 | 0 | 0 | 0 | 14% | 11% | 12% | 26% | 0% |
| M2497 | 0 | 2.3 | 17 | 1.25 | 1 | 0 | 0 | 1 | 0 | 4.5 | 0 | 0 | 0 | 12% | 11% | 11% | 0% | 4% |
| M2498 | 0 | 2 | 16 | 7 | 6 | 0 | 7 | 0 | 0 | 5 | 0 | 0 | 0 | 12% | 11% | 12% | 0% | 3% |
| M2499 | 0 | 1.25 | 17 | 5 | 4 | 0 | 9 | 0 | 0 | 0 | 0 | 0 | 4.5 | 13% | 11% | 6% | 0% | 3% |
| M2500 | 0 | 2 | 16 | 4 | 6 | 0 | 6 | 0 | 0 | 5 | 0 | 0 | 0 | 12% | 11% | 12% | 0% | 1% |
| M2501 | 0 | 2.2 | 16 | 2.5 | 1 | 0 | 0 | 0 | 0 | 5 | 0 | 0 | 0 | 12% | 11% | 12% | 0% | 0% |
| M2502 | 0 | 1.25 | 17 | 2 | 5 | 0 | 7 | 0 | 0 | 0 | 0 | 0 | 4.5 | 13% | 11% | 6% | 6% | 2% |
| M2503 | 0 | 2.2 | 16 | 1.25 | 1 | 0 | 0 | 1 | 0 | 4 | 0 | 0 | 0 | 11% | 11% | 10% | 0% | 4% |
| M2504 | 0 | 2 | 16 | 1 | 6 | 0 | 4 | 0 | 0 | 5 | 0 | 0 | 0 | 13% | 11% | 12% | 13% | 0% |
| M2505 | 0 | 2.6 | 14 | 7 | 1 | 0 | 0 | 0 | 0 | 5 | 0 | 0 | 0 | 9% | 11% | 12% | 0% | 5% |
| M2506 | 0 | 2 | 16 | 2 | 6 | 0 | 5 | 0 | 0 | 5 | 0 | 0 | 0 | 13% | 11% | 12% | 0% | 1% |
| M2507 | 0 | 1.25 | 17 | 4 | 4 | 0 | 9 | 0 | 0 | 0 | 0 | 0 | 4.5 | 13% | 11% | 6% | 0% | 3% |
| M2508 | 0 | 2.2 | 16.4 | 1.25 | 1 | 0 | 0 | 0 | 0 | 5 | 0 | 0 | 0 | 12% | 11% | 12% | 2% | 1% |
| M2509 | 0 | 1.25 | 17 | 9 | 6 | 0 | 4 | 0 | 0 | 0 | 0 | 0 | 4.5 | 14% | 11% | 6% | 33% | 4% |
| M2510 | 0 | 2 | 16 | 10 | 6 | 0 | 8 | 0 | 0 | 5 | 0 | 0 | 0 | 12% | 11% | 12% | 0% | 4% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2511 | 0 | 1.25 | 17 | 3 | 4 | 0 | 9 | 0 | 0 | 0 | 0 | 0 | 4.5 | 13% | 11% | 6% | 0% | 3% |
| M2512 | 0 | 2 | 16 | 0 | 6 | 0 | 3 | 0 | 0 | 5 | 0 | 0 | 0 | 13% | 11% | 12% | 25% | 0% |
| M2513 | 0 | 2 | 16 | 6 | 6 | 0 | 7 | 0 | 0 | 5 | 0 | 0 | 0 | 12% | 11% | 12% | 0% | 3% |
| M2514 | 0 | 2.6 | 14 | 5.5 | 1 | 0 | 0 | 0 | 0 | 5 | 0 | 0 | 0 | 9% | 11% | 12% | 0% | 5% |
| M2515 | 0 | 2 | 16 | 3 | 6 | 0 | 6 | 0 | 0 | 5 | 0 | 0 | 0 | 12% | 11% | 12% | 0% | 1% |
| M2516 | 0 | 1.25 | 17 | 2 | 4 | 0 | 9 | 0 | 0 | 0 | 0 | 0 | 4.5 | 13% | 11% | 6% | 0% | 3% |
| M2517 | 0 | 1.25 | 17 | 5 | 5 | 0 | 8 | 0 | 0 | 0 | 0 | 0 | 4.5 | 13% | 11% | 6% | 0% | 2% |
| M2518 | 0 | 1.25 | 17 | 1 | 4 | 0 | 9 | 0 | 0 | 0 | 0 | 0 | 4.5 | 13% | 11% | 6% | 0% | 3% |
| M2519 | 0 | 2.3 | 16.6 | 1.25 | 1 | 0 | 0 | 0 | 0 | 5 | 0 | 0 | 0 | 12% | 11% | 12% | 0% | 2% |
| M2520 | 0 | 1.25 | 17 | 1 | 5 | 0 | 7 | 0 | 0 | 0 | 0 | 0 | 4.5 | 13% | 11% | 6% | 12% | 2% |
| M2521 | 0 | 2.6 | 14 | 4 | 1 | 0 | 0 | 0 | 0 | 5 | 0 | 0 | 0 | 9% | 11% | 12% | 0% | 4% |
| M2522 | 0 | 2 | 16 | 9 | 6 | 0 | 8 | 0 | 0 | 5 | 0 | 0 | 0 | 12% | 11% | 12% | 0% | 4% |
| M2523 | 0 | 2 | 16 | 1 | 6 | 0 | 5 | 0 | 0 | 5 | 0 | 0 | 0 | 13% | 11% | 12% | 1% | 1% |
| M2524 | 0 | 1.25 | 17 | 0 | 4 | 0 | 9 | 0 | 0 | 0 | 0 | 0 | 4.5 | 13% | 11% | 6% | 0% | 3% |
| M2525 | 0 | 2 | 16 | 5 | 6 | 0 | 7 | 0 | 0 | 5 | 0 | 0 | 0 | 12% | 11% | 12% | 0% | 3% |
| M2526 | 0 | 2.6 | 14 | 1 | 1 | 0 | 0 | 0 | 0 | 5 | 0 | 0 | 0 | 9% | 11% | 12% | 0% | 3% |
| M2527 | 0 | 2.6 | 14 | 2.5 | 1 | 0 | 0 | 0 | 0 | 5 | 0 | 0 | 0 | 9% | 11% | 12% | 0% | 4% |
| M2528 | 0 | 2 | 16 | 0 | 6 | 0 | 4 | 0 | 0 | 5 | 0 | 0 | 0 | 13% | 11% | 12% | 14% | 0% |
| M2529 | 0 | 2 | 16 | 2 | 6 | 0 | 6 | 0 | 0 | 5 | 0 | 0 | 0 | 13% | 11% | 12% | 0% | 1% |
| M2530 | 0 | 1.25 | 17 | 4 | 5 | 0 | 8 | 0 | 0 | 0 | 0 | 0 | 4.5 | 13% | 11% | 6% | 0% | 2% |
| M2531 | 0 | 2.5 | 15.8 | 1.25 | 1 | 0 | 0 | 0 | 0 | 5 | 0 | 0 | 0 | 11% | 11% | 12% | 0% | 4% |
| M2532 | 0 | 2 | 16 | 4 | 6 | 0 | 7 | 0 | 0 | 5 | 0 | 0 | 0 | 12% | 11% | 12% | 0% | 1% |
| M2533 | 0 | 2 | 16 | 8 | 6 | 0 | 8 | 0 | 0 | 5 | 0 | 0 | 0 | 12% | 11% | 12% | 0% | 4% |
| M2534 | 0 | 1.25 | 17 | 0 | 5 | 0 | 7 | 0 | 0 | 0 | 0 | 0 | 4.5 | 13% | 11% | 6% | 18% | 2% |
| M2535 | 0 | 2.4 | 15 | 1.25 | 1 | 0 | 0 | 1 | 0 | 4.5 | 0 | 0 | 0 | 10% | 11% | 11% | 0% | 4% |
| M2536 | 0 | 2 | 16 | 0 | 6 | 0 | 5 | 0 | 0 | 5 | 0 | 0 | 0 | 13% | 11% | 12% | 3% | 0% |
| M2537 | 0 | 2 | 16 | 1 | 6 | 0 | 6 | 0 | 0 | 5 | 0 | 0 | 0 | 13% | 11% | 12% | 0% | 1% |
| M2538 | 0 | 1.25 | 17 | 3 | 5 | 0 | 8 | 0 | 0 | 0 | 0 | 0 | 4.5 | 13% | 11% | 6% | 0% | 2% |
| M2539 | 0 | 2.4 | 16.8 | 1.25 | 1 | 0 | 0 | 0 | 0 | 5 | 0 | 0 | 0 | 12% | 11% | 12% | 0% | 3% |
| M2540 | 0 | 2 | 16 | 3 | 6 | 0 | 7 | 0 | 0 | 5 | 0 | 0 | 0 | 12% | 11% | 12% | 0% | 1% |
| M2541 | 0 | 2 | 16 | 7 | 6 | 0 | 8 | 0 | 0 | 5 | 0 | 0 | 0 | 12% | 11% | 12% | 0% | 3% |
| M2542 | 0 | 2 | 16 | 2 | 6 | 0 | 7 | 0 | 0 | 5 | 0 | 0 | 0 | 12% | 11% | 12% | 0% | 1% |
| M2543 | 0 | 1.25 | 17 | 8 | 6 | 0 | 4 | 0 | 0 | 0 | 0 | 0 | 4.5 | 14% | 11% | 6% | 36% | 4% |
| M2544 | 0 | 2 | 16 | 0 | 6 | 0 | 6 | 0 | 0 | 5 | 0 | 0 | 0 | 13% | 11% | 12% | 0% | 1% |
| M2545 | 0 | 1.25 | 17 | 2 | 5 | 0 | 8 | 0 | 0 | 0 | 0 | 0 | 4.5 | 13% | 11% | 6% | 0% | 2% |
| M2546 | 0 | 1.25 | 17 | 10 | 6 | 0 | 5 | 0 | 0 | 0 | 0 | 0 | 4.5 | 14% | 11% | 6% | 25% | 5% |
| M2547 | 0 | 2.5 | 16 | 4 | 1 | 0 | 0 | 0 | 0 | 5 | 0 | 0 | 0 | 11% | 11% | 12% | 0% | 5% |
| M2548 | 0 | 2 | 16 | 6 | 6 | 0 | 8 | 0 | 0 | 5 | 0 | 0 | 0 | 12% | 11% | 12% | 0% | 3% |
| M2549 | 0 | 2 | 16 | 1 | 6 | 0 | 7 | 0 | 0 | 5 | 0 | 0 | 0 | 12% | 11% | 12% | 0% | 1% |
| M2550 | 0 | 1.75 | 13 | 0 | 0 | 4.5 | 0 | 0 | 0 | 0 | 0 | 0 | 0 | 9% | 11% | 5% | 0% | 2% |
| M2551 | 0 | 2.5 | 16 | 0 | 0 | 0 | 0 | 0 | 0 | 5 | 0 | 0 | 0 | 11% | 11% | 12% | 0% | 3% |
| M2552 | 0 | 2 | 16 | 0 | 6 | 0 | 7 | 0 | 0 | 5 | 0 | 0 | 0 | 12% | 11% | 12% | 0% | 1% |
| M2553 | 0 | 2 | 16 | 5 | 6 | 0 | 8 | 0 | 0 | 5 | 0 | 0 | 0 | 12% | 11% | 12% | 0% | 3% |
| M2554 | 0 | 1.25 | 17 | 8 | 4 | 0 | 10 | 0 | 0 | 0 | 0 | 0 | 4.5 | 13% | 11% | 6% | 0% | 3% |
| M2555 | 0 | 1.25 | 17 | 1 | 5 | 0 | 8 | 0 | 0 | 0 | 0 | 0 | 4.5 | 13% | 11% | 6% | 4% | 2% |
| M2556 | 0 | 2 | 16 | 10 | 6 | 0 | 9 | 0 | 0 | 5 | 0 | 0 | 0 | 12% | 11% | 12% | 0% | 4% |
| M2557 | 0 | 1.25 | 17 | 7 | 4 | 0 | 10 | 0 | 0 | 0 | 0 | 0 | 4.5 | 13% | 11% | 6% | 0% | 3% |
| M2558 | 0 | 2.1 | 18 | 1 | 1 | 0 | 0 | 0 | 0 | 5 | 0 | 0 | 0 | 14% | 11% | 12% | 29% | 0% |
| M2559 | 0 | 2 | 16 | 4 | 6 | 0 | 8 | 0 | 0 | 5 | 0 | 0 | 0 | 12% | 11% | 12% | 0% | 1% |
| M2560 | 0 | 2 | 16 | 10 | 7 | 0 | 2 | 0 | 0 | 5 | 0 | 0 | 0 | 13% | 11% | 12% | 29% | 2% |
| M2561 | 0 | 2 | 16 | 0 | 6 | 0 | 8 | 0 | 0 | 5 | 0 | 0 | 0 | 12% | 11% | 12% | 0% | 1% |
| M2562 | 0 | 2 | 16 | 3 | 6 | 0 | 8 | 0 | 0 | 5 | 0 | 0 | 0 | 12% | 11% | 12% | 0% | 1% |
| M2563 | 0 | 1.25 | 17 | 6 | 4 | 0 | 10 | 0 | 0 | 0 | 0 | 0 | 4.5 | 13% | 11% | 6% | 0% | 3% |
| M2564 | 0 | 2 | 16 | 1 | 6 | 0 | 8 | 0 | 0 | 5 | 0 | 0 | 0 | 12% | 11% | 12% | 0% | 1% |
| M2565 | 0 | 2 | 16 | 2 | 6 | 0 | 8 | 0 | 0 | 5 | 0 | 0 | 0 | 12% | 11% | 12% | 0% | 1% |
| M2566 | 0 | 1.75 | 16 | 0 | 0 | 0 | 0 | 0 | 0 | 0 | 0 | 0 | 5 | 12% | 11% | 6% | 0% | 3% |
| M2567 | 0 | 2 | 16 | 0 | 6 | 0 | 9 | 0 | 0 | 5 | 0 | 0 | 0 | 12% | 11% | 12% | 0% | 1% |
| M2568 | 0 | 1.25 | 17 | 5 | 4 | 0 | 10 | 0 | 0 | 0 | 0 | 0 | 4.5 | 13% | 11% | 6% | 0% | 3% |
| M2569 | 0 | 2.5 | 16 | 2.5 | 1 | 0 | 0 | 0 | 0 | 5 | 0 | 0 | 0 | 11% | 11% | 12% | 0% | 4% |
| M2570 | 0 | 2.1 | 18 | 1.25 | 1 | 0 | 0 | 0 | 0 | 5 | 0 | 0 | 0 | 14% | 11% | 12% | 29% | 0% |
| M2571 | 0 | 2 | 16 | 0 | 6 | 0 | 10 | 0 | 0 | 5 | 0 | 0 | 0 | 12% | 11% | 12% | 0% | 2% |
| M2572 | 0 | 2 | 16 | 9 | 6 | 0 | 9 | 0 | 0 | 5 | 0 | 0 | 0 | 12% | 11% | 12% | 0% | 4% |
| M2573 | 0 | 1.25 | 17 | 4 | 4 | 0 | 10 | 0 | 0 | 0 | 0 | 0 | 4.5 | 13% | 11% | 6% | 0% | 3% |
| M2574 | 0 | 1.25 | 17 | 0 | 5 | 0 | 8 | 0 | 0 | 0 | 0 | 0 | 4.5 | 13% | 11% | 6% | 10% | 2% |
| M2575 | 0 | 2.5 | 16 | 1.25 | 1 | 0 | 0 | 1 | 0 | 5 | 0 | 0 | 0 | 11% | 11% | 12% | 0% | 4% |
| M2576 | 0 | 1.25 | 17 | 3 | 4 | 0 | 10 | 0 | 0 | 0 | 0 | 0 | 4.5 | 13% | 11% | 6% | 0% | 3% |
| M2577 | 0 | 2.2 | 16 | 4 | 1 | 0 | 0 | 0 | 0 | 5 | 0 | 0 | 0 | 12% | 11% | 12% | 0% | 1% |
| M2578 | 0 | 1.25 | 17 | 2 | 4 | 0 | 10 | 0 | 0 | 0 | 0 | 0 | 4.5 | 13% | 11% | 6% | 0% | 3% |
| M2579 | 0 | 2 | 16 | 1 | 6 | 0 | 9 | 0 | 0 | 5 | 0 | 0 | 0 | 12% | 11% | 12% | 0% | 2% |
| M2580 | 0 | 1.25 | 17 | 1 | 4 | 0 | 10 | 0 | 0 | 0 | 0 | 0 | 4.5 | 13% | 11% | 6% | 0% | 3% |
| M2581 | 0 | 1.25 | 17 | 0 | 4 | 0 | 10 | 0 | 0 | 0 | 0 | 0 | 4.5 | 13% | 11% | 6% | 0% | 3% |
| M2582 | 0 | 2 | 16 | 8 | 6 | 0 | 9 | 0 | 0 | 5 | 0 | 0 | 0 | 12% | 11% | 12% | 0% | 4% |
| M2583 | 0 | 2.5 | 16 | 1.25 | 1 | 0 | 0 | 0 | 0 | 5 | 0 | 0 | 0 | 11% | 11% | 12% | 0% | 4% |
| M2584 | 0 | 2 | 16 | 2 | 6 | 0 | 9 | 0 | 0 | 5 | 0 | 0 | 0 | 12% | 11% | 12% | 0% | 2% |
| M2585 | 0 | 2 | 16 | 1 | 6 | 0 | 10 | 0 | 0 | 5 | 0 | 0 | 0 | 12% | 11% | 12% | 0% | 2% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2586 | 0 | 2.5 | 16 | 1 | 1 | 0 | 0 | 0 | 0 | 5 | 0 | 0 | 0 | 11% | 11% | 12% | 0% | 4% |
| M2587 | 0 | 2 | 16 | 7 | 6 | 0 | 9 | 0 | 0 | 5 | 0 | 0 | 0 | 12% | 11% | 12% | 0% | 3% |
| M2588 | 0 | 2 | 16 | 3 | 6 | 0 | 9 | 0 | 0 | 5 | 0 | 0 | 0 | 12% | 11% | 12% | 0% | 2% |
| M2589 | 0 | 2 | 16 | 6 | 6 | 0 | 9 | 0 | 0 | 5 | 0 | 0 | 0 | 12% | 11% | 12% | 0% | 3% |
| M2590 | 0 | 1.25 | 17 | 7 | 6 | 0 | 4 | 0 | 0 | 0 | 0 | 0 | 4.5 | 14% | 11% | 6% | 39% | 4% |
| M2591 | 0 | 1.25 | 17 | 9 | 6 | 0 | 5 | 0 | 0 | 0 | 0 | 0 | 4.5 | 14% | 11% | 6% | 28% | 5% |
| M2592 | 0 | 1.25 | 17 | 5 | 5 | 0 | 9 | 0 | 0 | 0 | 0 | 0 | 4.5 | 13% | 11% | 6% | 0% | 3% |
| M2593 | 0 | 2 | 16 | 4 | 6 | 0 | 9 | 0 | 0 | 5 | 0 | 0 | 0 | 12% | 11% | 12% | 0% | 2% |
| M2594 | 0 | 2 | 16 | 5 | 6 | 0 | 9 | 0 | 0 | 5 | 0 | 0 | 0 | 12% | 11% | 12% | 0% | 2% |
| M2595 | 0 | 2 | 16 | 2 | 6 | 0 | 10 | 0 | 0 | 5 | 0 | 0 | 0 | 12% | 11% | 12% | 0% | 2% |
| M2596 | 0 | 1.25 | 17 | 4 | 5 | 0 | 9 | 0 | 0 | 0 | 0 | 0 | 4.5 | 13% | 11% | 6% | 0% | 3% |
| M2597 | 0 | 1.25 | 17 | 3 | 5 | 0 | 9 | 0 | 0 | 0 | 0 | 0 | 4.5 | 13% | 11% | 6% | 0% | 3% |
| M2598 | 0 | 2 | 16 | 3 | 6 | 0 | 10 | 0 | 0 | 5 | 0 | 0 | 0 | 12% | 11% | 12% | 0% | 2% |
| M2599 | 0 | 2.1 | 18 | 2.5 | 1 | 0 | 0 | 0 | 0 | 5 | 0 | 0 | 0 | 14% | 11% | 12% | 24% | 0% |
| M2600 | 0 | 3 | 15 | 1.25 | 1 | 2 | 0 | 1 | 0 | 6 | 0 | 0 | 0 | 10% | 11% | 16% | 0% | 5% |
| M2601 | 0 | 1.25 | 17 | 2 | 5 | 0 | 9 | 0 | 0 | 0 | 0 | 0 | 4.5 | 13% | 11% | 6% | 0% | 3% |
| M2602 | 0 | 2 | 16 | 10 | 6 | 0 | 10 | 0 | 0 | 5 | 0 | 0 | 0 | 12% | 11% | 12% | 0% | 4% |
| M2603 | 0 | 2 | 16 | 9 | 7 | 0 | 2 | 0 | 0 | 5 | 0 | 0 | 0 | 13% | 11% | 12% | 28% | 2% |
| M2604 | 0 | 2 | 16 | 4 | 6 | 0 | 10 | 0 | 0 | 5 | 0 | 0 | 0 | 12% | 11% | 12% | 0% | 2% |
| M2605 | 0 | 1.25 | 17 | 1 | 5 | 0 | 9 | 0 | 0 | 0 | 0 | 0 | 4.5 | 13% | 11% | 6% | 0% | 3% |
| M2606 | 0 | 2 | 16 | 9 | 6 | 0 | 10 | 0 | 0 | 5 | 0 | 0 | 0 | 12% | 11% | 12% | 0% | 4% |
| M2607 | 0 | 2.2 | 16 | 5.5 | 1 | 0 | 0 | 0 | 0 | 5 | 0 | 0 | 0 | 12% | 11% | 12% | 0% | 1% |
| M2608 | 0 | 2 | 16 | 5 | 6 | 0 | 10 | 0 | 0 | 5 | 0 | 0 | 0 | 12% | 11% | 12% | 0% | 2% |
| M2609 | 0 | 1.75 | 14 | 0 | 0 | 0 | 0 | 0 | 0 | 0 | 0 | 0 | 4.5 | 10% | 11% | 5% | 0% | 3% |
| M2610 | 0 | 1.25 | 17 | 0 | 5 | 0 | 9 | 0 | 0 | 0 | 0 | 0 | 4.5 | 13% | 11% | 6% | 0% | 3% |
| M2611 | 0 | 2 | 16 | 8 | 6 | 0 | 10 | 0 | 0 | 5 | 0 | 0 | 0 | 12% | 11% | 12% | 0% | 4% |
| M2612 | 0 | 2 | 16 | 6 | 6 | 0 | 10 | 0 | 0 | 5 | 0 | 0 | 0 | 12% | 11% | 12% | 0% | 3% |
| M2613 | 0 | 2 | 16 | 7 | 6 | 0 | 10 | 0 | 0 | 5 | 0 | 0 | 0 | 12% | 11% | 12% | 0% | 4% |
| M2614 | 0 | 1.25 | 17 | 8 | 6 | 0 | 5 | 0 | 0 | 0 | 0 | 0 | 4.5 | 14% | 11% | 6% | 31% | 5% |
| M2615 | 0 | 1.9 | 17 | 1.25 | 1 | 0 | 0 | 1 | 0 | 3 | 0 | 0 | 0 | 12% | 11% | 7% | 0% | 4% |
| M2616 | 0 | 2.5 | 16.2 | 1.25 | 1 | 0 | 0 | 0 | 0 | 5 | 0 | 0 | 0 | 11% | 12% | 12% | 0% | 4% |
| M2617 | 0 | 2 | 16 | 7 | 7 | 0 | 1 | 0 | 0 | 5 | 0 | 0 | 0 | 13% | 12% | 12% | 40% | 2% |
| M2618 | 0 | 2.1 | 18.2 | 1.25 | 1 | 0 | 0 | 0 | 0 | 5 | 0 | 0 | 0 | 14% | 12% | 12% | 29% | 0% |
| M2619 | 0 | 2.1 | 18 | 4 | 1 | 0 | 0 | 0 | 0 | 5 | 0 | 0 | 0 | 14% | 12% | 12% | 26% | 1% |
| M2620 | 0 | 2 | 16 | 10 | 7 | 0 | 3 | 0 | 0 | 5 | 0 | 0 | 0 | 13% | 12% | 12% | 16% | 3% |
| M2621 | 0 | 1.25 | 17 | 6 | 5 | 0 | 10 | 0 | 0 | 0 | 0 | 0 | 4.5 | 13% | 12% | 6% | 0% | 3% |
| M2622 | 0 | 1.75 | 15 | 0 | 0 | 5 | 0 | 0 | 0 | 0 | 0 | 0 | 0 | 11% | 12% | 6% | 0% | 3% |
| M2623 | 0 | 1.25 | 17 | 5 | 5 | 0 | 10 | 0 | 0 | 0 | 0 | 0 | 4.5 | 13% | 12% | 6% | 0% | 3% |
| M2624 | 0 | 2.2 | 16 | 7 | 1 | 0 | 0 | 0 | 0 | 5 | 0 | 0 | 0 | 12% | 12% | 12% | 0% | 2% |
| M2625 | 0 | 2 | 16 | 8 | 7 | 0 | 2 | 0 | 0 | 5 | 0 | 0 | 0 | 13% | 12% | 12% | 27% | 2% |
| M2626 | 0 | 1.25 | 17 | 4 | 5 | 0 | 10 | 0 | 0 | 0 | 0 | 0 | 4.5 | 13% | 12% | 6% | 0% | 3% |
| M2627 | 0 | 1.25 | 17 | 7 | 6 | 0 | 5 | 0 | 0 | 0 | 0 | 0 | 4.5 | 14% | 12% | 6% | 32% | 5% |
| M2628 | 0 | 1.25 | 17 | 3 | 5 | 0 | 10 | 0 | 0 | 0 | 0 | 0 | 4.5 | 13% | 12% | 6% | 0% | 3% |
| M2629 | 0 | 1.25 | 17 | 2 | 5 | 0 | 10 | 0 | 0 | 0 | 0 | 0 | 4.5 | 13% | 12% | 6% | 0% | 3% |
| M2630 | 0 | 1.25 | 17 | 1 | 5 | 0 | 10 | 0 | 0 | 0 | 0 | 0 | 4.5 | 13% | 12% | 6% | 0% | 3% |
| M2631 | 0 | 1.25 | 17 | 0 | 5 | 0 | 10 | 0 | 0 | 0 | 0 | 0 | 4.5 | 13% | 12% | 6% | 0% | 3% |
| M2632 | 0 | 2 | 15 | 0 | 0 | 0 | 0 | 0 | 3 | 0 | 0 | 0 | 0 | 10% | 12% | 7% | 0% | 3% |
| M2633 | 0 | 2.1 | 18 | 5.5 | 1 | 0 | 0 | 0 | 0 | 5 | 0 | 0 | 0 | 14% | 12% | 12% | 28% | 1% |
| M2634 | 0 | 2.5 | 16.4 | 1.25 | 1 | 0 | 0 | 0 | 0 | 5 | 0 | 0 | 0 | 11% | 12% | 12% | 0% | 4% |
| M2635 | 0 | 2 | 16 | 9 | 7 | 0 | 3 | 0 | 0 | 5 | 0 | 0 | 0 | 13% | 12% | 12% | 15% | 3% |
| M2636 | 0 | 2.2 | 16 | 8.5 | 1 | 0 | 0 | 0 | 0 | 5 | 0 | 0 | 0 | 12% | 12% | 12% | 0% | 2% |
| M2637 | 0 | 2 | 16 | 6 | 7 | 0 | 1 | 0 | 0 | 5 | 0 | 0 | 0 | 13% | 12% | 12% | 38% | 2% |
| M2638 | 0 | 1.25 | 17 | 6 | 6 | 0 | 5 | 0 | 0 | 0 | 0 | 0 | 4.5 | 14% | 12% | 6% | 33% | 5% |
| M2639 | 0 | 2.5 | 14 | 0 | 0 | 0 | 0 | 0 | 0 | 4.5 | 0 | 0 | 0 | 9% | 12% | 11% | 0% | 3% |
| M2640 | 0 | 2 | 16 | 7 | 7 | 0 | 2 | 0 | 0 | 5 | 0 | 0 | 0 | 13% | 12% | 12% | 26% | 2% |
| M2641 | 0 | 1.75 | 17 | 0 | 0 | 0 | 0 | 0 | 0 | 0 | 0 | 0 | 5 | 13% | 12% | 6% | 0% | 4% |
| M2642 | 0 | 2.1 | 18.4 | 1.25 | 1 | 0 | 0 | 0 | 0 | 5 | 0 | 0 | 0 | 14% | 12% | 12% | 29% | 1% |
| M2643 | 0 | 2.5 | 16 | 5.5 | 1 | 0 | 0 | 0 | 0 | 5 | 0 | 0 | 0 | 11% | 12% | 12% | 0% | 5% |
| M2644 | 0 | 2.1 | 18 | 7 | 1 | 0 | 0 | 0 | 0 | 5 | 0 | 0 | 0 | 14% | 12% | 11% | 23% | 2% |
| M2645 | 0 | 2.2 | 16 | 10 | 1 | 0 | 0 | 0 | 0 | 5 | 0 | 0 | 0 | 12% | 12% | 12% | 0% | 2% |
| M2646 | 0 | 2 | 16 | 10 | 7 | 0 | 4 | 0 | 0 | 5 | 0 | 0 | 0 | 13% | 12% | 12% | 6% | 3% |
| M2647 | 0 | 1.25 | 17 | 5 | 6 | 0 | 5 | 0 | 0 | 0 | 0 | 0 | 4.5 | 14% | 12% | 6% | 33% | 4% |
| M2648 | 0 | 2 | 16 | 8 | 7 | 0 | 3 | 0 | 0 | 5 | 0 | 0 | 0 | 13% | 12% | 12% | 18% | 3% |
| M2649 | 0 | 1.25 | 17 | 7 | 6 | 0 | 6 | 0 | 0 | 0 | 0 | 0 | 4.5 | 14% | 12% | 6% | 20% | 5% |
| M2650 | 0 | 2.5 | 16.6 | 1.25 | 1 | 0 | 0 | 0 | 0 | 5 | 0 | 0 | 0 | 11% | 12% | 12% | 0% | 4% |
| M2651 | 0 | 2.5 | 14 | 1.25 | 1 | 2 | 0 | 1 | 0 | 4 | 0 | 0 | 0 | 9% | 12% | 12% | 0% | 4% |
| M2652 | 0 | 2.2 | 17 | 1.25 | 1 | 0 | 0 | 1 | 0 | 4 | 0 | 0 | 0 | 12% | 12% | 10% | 0% | 5% |
| M2653 | 0 | 3.5 | 18 | 1.25 | 1 | 2 | 0 | 1 | 0 | 9 | 0 | 0 | 0 | 14% | 12% | 22% | 3% | 4% |
| M2654 | 0.8 | 0.8 | 12 | 1 | 1 | 3.5 | 0 | 0.5 | 0 | 0.5 | 0.5 | 0 | 0 | 9% | 12% | 5% | 30% | 0% |
| M2655 | 0 | 2.25 | 16 | 0 | 0 | 0 | 0 | 0 | 0 | 4 | 0 | 0 | 0 | 11% | 12% | 10% | 0% | 4% |
| M2656 | 0 | 2.1 | 18 | 8.5 | 1 | 0 | 0 | 0 | 0 | 5 | 0 | 0 | 0 | 14% | 12% | 11% | 31% | 2% |
| M2657 | 0 | 2 | 16 | 5 | 7 | 0 | 1 | 0 | 0 | 5 | 0 | 0 | 0 | 13% | 12% | 12% | 37% | 2% |
| M2658 | 0 | 2.5 | 14 | 1.25 | 1 | 0 | 0 | 1 | 0 | 4.5 | 0 | 0 | 0 | 9% | 12% | 11% | 0% | 4% |
| M2659 | 0 | 2 | 16 | 6 | 7 | 0 | 2 | 0 | 0 | 5 | 0 | 0 | 0 | 13% | 12% | 12% | 29% | 2% |
| M2660 | 0 | 2.1 | 16 | 1.25 | 1 | 0 | 0 | 1 | 0 | 3.5 | 0 | 0 | 0 | 11% | 12% | 9% | 0% | 5% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2661 | 0 | 2.2 | 16.6 | 1.25 | 1 | 0 | 0 | 0 | 0 | 5 | 0 | 0 | 0 | 12% | 12% | 12% | 3% | 1% |
| M2662 | 0 | 2.2 | 14 | 1.25 | 1 | 0 | 0 | 1 | 0 | 3.5 | 0 | 0 | 0 | 9% | 12% | 9% | 0% | 4% |
| M2663 | 0 | 1.25 | 17 | 4 | 6 | 0 | 5 | 0 | 0 | 0 | 0 | 0 | 4.5 | 14% | 12% | 6% | 34% | 4% |
| M2664 | 0 | 2 | 15 | 1.25 | 1 | 0 | 0 | 1 | 0 | 3 | 0 | 0 | 0 | 10% | 12% | 8% | 0% | 4% |
| M2665 | 0 | 1.25 | 17 | 6 | 6 | 0 | 6 | 0 | 0 | 0 | 0 | 0 | 4.5 | 14% | 12% | 6% | 20% | 5% |
| M2666 | 0 | 2 | 16 | 9 | 7 | 0 | 4 | 0 | 0 | 5 | 0 | 0 | 0 | 13% | 12% | 12% | 8% | 3% |
| M2667 | 0 | 1.25 | 17 | 10 | 7 | 0 | 4 | 0 | 0 | 0 | 0 | 0 | 4.5 | 14% | 12% | 6% | 33% | 4% |
| M2668 | 0 | 2.1 | 18 | 10 | 1 | 0 | 0 | 0 | 0 | 5 | 0 | 0 | 0 | 14% | 12% | 11% | 27% | 2% |
| M2669 | 0 | 2 | 16 | 7 | 7 | 0 | 3 | 0 | 0 | 5 | 0 | 0 | 0 | 13% | 12% | 12% | 21% | 2% |
| M2670 | 0 | 2.5 | 16.8 | 1.25 | 1 | 0 | 0 | 0 | 0 | 5 | 0 | 0 | 0 | 12% | 12% | 12% | 0% | 4% |
| M2671 | 0 | 2.1 | 18.6 | 1.25 | 1 | 0 | 0 | 0 | 0 | 5 | 0 | 0 | 0 | 14% | 12% | 12% | 29% | 1% |
| M2672 | 0 | 1.25 | 17 | 3 | 6 | 0 | 5 | 0 | 0 | 0 | 0 | 0 | 4.5 | 14% | 12% | 6% | 34% | 4% |
| M2673 | 0 | 1.25 | 17 | 5 | 6 | 0 | 6 | 0 | 0 | 0 | 0 | 0 | 4.5 | 14% | 12% | 6% | 21% | 5% |
| M2674 | 0 | 2 | 16 | 4 | 7 | 0 | 1 | 0 | 0 | 5 | 0 | 0 | 0 | 13% | 12% | 12% | 39% | 2% |
| M2675 | 0 | 2.3 | 15 | 1.25 | 1 | 0 | 0 | 1 | 0 | 4 | 0 | 0 | 0 | 10% | 12% | 10% | 0% | 4% |
| M2676 | 0 | 2 | 16 | 5 | 7 | 0 | 2 | 0 | 0 | 5 | 0 | 0 | 0 | 13% | 12% | 12% | 33% | 2% |
| M2677 | 0 | 2 | 16 | 8 | 7 | 0 | 4 | 0 | 0 | 5 | 0 | 0 | 0 | 13% | 12% | 12% | 12% | 3% |
| M2678 | 0 | 2 | 16 | 10 | 7 | 0 | 5 | 0 | 0 | 5 | 0 | 0 | 0 | 13% | 12% | 12% | 0% | 3% |
| M2679 | 0 | 2 | 16 | 6 | 7 | 0 | 3 | 0 | 0 | 5 | 0 | 0 | 0 | 13% | 12% | 12% | 25% | 2% |
| M2680 | 0 | 2.5 | 17 | 0 | 0 | 0 | 0 | 0 | 0 | 5 | 0 | 0 | 0 | 12% | 12% | 12% | 0% | 4% |
| M2681 | 0 | 1.75 | 14 | 0 | 0 | 4.5 | 0 | 0 | 0 | 0 | 0 | 0 | 0 | 9% | 12% | 5% | 0% | 3% |
| M2682 | 0 | 1.25 | 17 | 4 | 6 | 0 | 6 | 0 | 0 | 0 | 0 | 0 | 4.5 | 14% | 12% | 6% | 21% | 5% |
| M2683 | 0 | 2.6 | 15 | 1.25 | 1 | 0 | 0 | 1 | 0 | 5 | 0 | 0 | 0 | 10% | 12% | 12% | 0% | 5% |
| M2684 | 0 | 1.25 | 17 | 2 | 6 | 0 | 5 | 0 | 0 | 0 | 0 | 0 | 4.5 | 14% | 12% | 6% | 35% | 1% |
| M2685 | 0 | 2.4 | 16 | 1.25 | 1 | 0 | 0 | 1 | 0 | 4.5 | 0 | 0 | 0 | 11% | 12% | 11% | 0% | 5% |
| M2686 | 0 | 1.75 | 15 | 0 | 0 | 0 | 0 | 0 | 0 | 0 | 0 | 0 | 4.5 | 10% | 12% | 5% | 0% | 3% |
| M2687 | 0 | 2.3 | 16.8 | 1.25 | 1 | 0 | 0 | 0 | 0 | 5 | 0 | 0 | 0 | 12% | 12% | 12% | 0% | 2% |
| M2688 | 0 | 2.5 | 17 | 1.25 | 1 | 0 | 0 | 0 | 0 | 5 | 0 | 0 | 0 | 12% | 12% | 12% | 0% | 5% |
| M2689 | 0 | 2 | 16 | 9 | 7 | 0 | 5 | 0 | 0 | 5 | 0 | 0 | 0 | 13% | 12% | 12% | 2% | 3% |
| M2690 | 0 | 2 | 16 | 7 | 7 | 0 | 4 | 0 | 0 | 5 | 0 | 0 | 0 | 13% | 12% | 12% | 16% | 3% |
| M2691 | 0 | 2 | 16 | 4 | 7 | 0 | 2 | 0 | 0 | 5 | 0 | 0 | 0 | 13% | 12% | 12% | 36% | 2% |
| M2692 | 0 | 1.25 | 17 | 3 | 6 | 0 | 6 | 0 | 0 | 0 | 0 | 0 | 4.5 | 14% | 12% | 6% | 22% | 5% |
| M2693 | 0 | 2.4 | 17 | 1.25 | 1 | 0 | 0 | 0 | 0 | 5 | 0 | 0 | 0 | 12% | 12% | 12% | 0% | 3% |
| M2694 | 0 | 2.2 | 16.8 | 1.25 | 1 | 0 | 0 | 0 | 0 | 5 | 0 | 0 | 0 | 12% | 12% | 12% | 3% | 1% |
| M2695 | 0 | 1.25 | 17 | 1 | 6 | 0 | 5 | 0 | 0 | 0 | 0 | 0 | 4.5 | 14% | 12% | 6% | 36% | 1% |
| M2696 | 0 | 1.75 | 16 | 0 | 0 | 5 | 0 | 0 | 0 | 0 | 0 | 0 | 0 | 11% | 12% | 6% | 0% | 4% |
| M2697 | 0 | 2 | 16 | 5 | 7 | 0 | 3 | 0 | 0 | 5 | 0 | 0 | 0 | 13% | 12% | 12% | 29% | 2% |
| M2698 | 0 | 2.1 | 18.8 | 1.25 | 1 | 0 | 0 | 0 | 0 | 5 | 0 | 0 | 0 | 14% | 12% | 12% | 29% | 1% |
| M2699 | 0 | 1.25 | 17 | 9 | 7 | 0 | 4 | 0 | 0 | 0 | 0 | 0 | 4.5 | 14% | 12% | 6% | 32% | 4% |
| M2700 | 0 | 2 | 16 | 8 | 7 | 0 | 5 | 0 | 0 | 5 | 0 | 0 | 0 | 13% | 12% | 12% | 5% | 3% |
| M2701 | 0 | 3 | 18 | 1.25 | 1 | 2 | 0 | 1 | 0 | 7 | 0 | 0 | 0 | 14% | 12% | 18% | 0% | 4% |
| M2702 | 0 | 2 | 16 | 6 | 7 | 0 | 4 | 0 | 0 | 5 | 0 | 0 | 0 | 13% | 12% | 12% | 20% | 3% |
| M2703 | 0 | 1.25 | 17 | 2 | 6 | 0 | 6 | 0 | 0 | 0 | 0 | 0 | 4.5 | 14% | 12% | 6% | 23% | 2% |
| M2704 | 0 | 2 | 16 | 10 | 7 | 0 | 6 | 0 | 0 | 5 | 0 | 0 | 0 | 13% | 12% | 12% | 0% | 4% |
| M2705 | 0 | 1.25 | 17 | 0 | 6 | 0 | 5 | 0 | 0 | 0 | 0 | 0 | 4.5 | 14% | 12% | 6% | 37% | 1% |
| M2706 | 0 | 2.5 | 17.2 | 1.25 | 1 | 0 | 0 | 0 | 0 | 5 | 0 | 0 | 0 | 12% | 12% | 12% | 0% | 5% |
| M2707 | 0 | 2 | 16 | 3 | 7 | 0 | 2 | 0 | 0 | 5 | 0 | 0 | 0 | 13% | 12% | 12% | 39% | 2% |
| M2708 | 0 | 2 | 16 | 4 | 7 | 0 | 3 | 0 | 0 | 5 | 0 | 0 | 0 | 13% | 12% | 12% | 32% | 2% |
| M2709 | 0 | 1.25 | 17 | 1 | 6 | 0 | 6 | 0 | 0 | 0 | 0 | 0 | 4.5 | 14% | 12% | 6% | 24% | 2% |
| M2710 | 0 | 2 | 16 | 7 | 7 | 0 | 5 | 0 | 0 | 5 | 0 | 0 | 0 | 13% | 12% | 12% | 6% | 3% |
| M2711 | 0 | 1.25 | 17 | 3 | 6 | 0 | 7 | 0 | 0 | 0 | 0 | 0 | 4.5 | 14% | 12% | 6% | 11% | 2% |
| M2712 | 0 | 2 | 16 | 5 | 7 | 0 | 4 | 0 | 0 | 5 | 0 | 0 | 0 | 13% | 12% | 12% | 22% | 3% |
| M2713 | 0 | 2 | 16 | 9 | 7 | 0 | 6 | 0 | 0 | 5 | 0 | 0 | 0 | 13% | 12% | 12% | 0% | 4% |
| M2714 | 0 | 2.3 | 16 | 4 | 1 | 0 | 0 | 0 | 0 | 5 | 0 | 0 | 0 | 12% | 12% | 12% | 0% | 2% |
| M2715 | 0 | 1.25 | 17 | 0 | 6 | 0 | 6 | 0 | 0 | 0 | 0 | 0 | 4.5 | 14% | 12% | 6% | 25% | 2% |
| M2716 | 0 | 1.25 | 17 | 2 | 6 | 0 | 7 | 0 | 0 | 0 | 0 | 0 | 4.5 | 14% | 12% | 6% | 12% | 2% |
| M2717 | 0 | 2 | 16 | 6 | 7 | 0 | 5 | 0 | 0 | 5 | 0 | 0 | 0 | 13% | 12% | 12% | 7% | 3% |
| M2718 | 0 | 2 | 16 | 3 | 7 | 0 | 3 | 0 | 0 | 5 | 0 | 0 | 0 | 13% | 12% | 12% | 35% | 2% |
| M2719 | 0 | 2.1 | 19 | 1.25 | 1 | 0 | 0 | 0 | 0 | 5 | 0 | 0 | 0 | 15% | 12% | 12% | 30% | 1% |
| M2720 | 0 | 2 | 16 | 8 | 7 | 0 | 6 | 0 | 0 | 5 | 0 | 0 | 0 | 13% | 12% | 12% | 0% | 4% |
| M2721 | 0 | 2 | 16 | 4 | 7 | 0 | 4 | 0 | 0 | 5 | 0 | 0 | 0 | 13% | 12% | 12% | 23% | 2% |
| M2722 | 0 | 1.25 | 17 | 1 | 6 | 0 | 7 | 0 | 0 | 0 | 0 | 0 | 4.5 | 14% | 12% | 6% | 13% | 2% |
| M2723 | 0 | 2.2 | 17 | 1.25 | 1 | 0 | 0 | 0 | 0 | 5 | 0 | 0 | 0 | 13% | 12% | 12% | 3% | 1% |
| M2724 | 0 | 2 | 16 | 0 | 0 | 0 | 0 | 0 | 0 | 3 | 0 | 0 | 0 | 11% | 12% | 7% | 0% | 4% |
| M2725 | 0 | 2 | 16 | 10 | 7 | 0 | 7 | 0 | 0 | 5 | 0 | 0 | 0 | 13% | 12% | 12% | 0% | 4% |
| M2726 | 0 | 2 | 16 | 5 | 7 | 0 | 5 | 0 | 0 | 5 | 0 | 0 | 0 | 13% | 12% | 12% | 8% | 3% |
| M2727 | 0 | 1.25 | 17 | 3 | 6 | 0 | 8 | 0 | 0 | 0 | 0 | 0 | 4.5 | 14% | 12% | 6% | 1% | 2% |
| M2728 | 0 | 1.25 | 17 | 8 | 7 | 0 | 4 | 0 | 0 | 0 | 0 | 0 | 4.5 | 14% | 12% | 6% | 35% | 4% |
| M2729 | 0 | 1.25 | 17 | 10 | 7 | 0 | 5 | 0 | 0 | 0 | 0 | 0 | 4.5 | 14% | 12% | 6% | 24% | 4% |
| M2730 | 0 | 2 | 16 | 7 | 7 | 0 | 6 | 0 | 0 | 5 | 0 | 0 | 0 | 13% | 12% | 12% | 0% | 3% |
| M2731 | 0 | 1.25 | 17 | 0 | 6 | 0 | 7 | 0 | 0 | 0 | 0 | 0 | 4.5 | 14% | 12% | 6% | 17% | 2% |
| M2732 | 0 | 2 | 16 | 2 | 7 | 0 | 3 | 0 | 0 | 5 | 0 | 0 | 0 | 13% | 12% | 12% | 39% | 0% |
| M2733 | 0 | 2 | 16 | 3 | 7 | 0 | 4 | 0 | 0 | 5 | 0 | 0 | 0 | 13% | 12% | 12% | 24% | 2% |
| M2734 | 0 | 2.25 | 14 | 0 | 0 | 0 | 0 | 0 | 0 | 3.5 | 0 | 0 | 0 | 9% | 12% | 9% | 0% | 3% |
| M2735 | 0 | 1.25 | 17 | 2 | 6 | 0 | 8 | 0 | 0 | 0 | 0 | 0 | 4.5 | 14% | 12% | 6% | 2% | 2% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2736 | 0 | 2 | 16 | 9 | 7 | 0 | 7 | 0 | 0 | 5 | 0 | 0 | 0 | 13% | 12% | 12% | 0% | 4% |
| M2737 | 0 | 2 | 16 | 4 | 7 | 0 | 5 | 0 | 0 | 5 | 0 | 0 | 0 | 13% | 12% | 12% | 10% | 3% |
| M2738 | 0 | 2 | 16 | 6 | 7 | 0 | 6 | 0 | 0 | 5 | 0 | 0 | 0 | 13% | 12% | 12% | 0% | 3% |
| M2739 | 0 | 1.25 | 17 | 1 | 6 | 0 | 8 | 0 | 0 | 0 | 0 | 0 | 4.5 | 14% | 12% | 6% | 3% | 2% |
| M2740 | 0 | 2 | 16 | 8 | 7 | 0 | 7 | 0 | 0 | 5 | 0 | 0 | 0 | 13% | 12% | 12% | 0% | 4% |
| M2741 | 0 | 2 | 16 | 2 | 7 | 0 | 4 | 0 | 0 | 5 | 0 | 0 | 0 | 13% | 12% | 12% | 25% | 0% |
| M2742 | 0 | 1.25 | 17 | 0 | 6 | 0 | 8 | 0 | 0 | 0 | 0 | 0 | 4.5 | 14% | 12% | 6% | 9% | 2% |
| M2743 | 0 | 2 | 16 | 5 | 7 | 0 | 6 | 0 | 0 | 5 | 0 | 0 | 0 | 13% | 12% | 12% | 0% | 3% |
| M2744 | 0 | 2 | 16 | 1 | 7 | 0 | 3 | 0 | 0 | 5 | 0 | 0 | 0 | 13% | 12% | 12% | 40% | 0% |
| M2745 | 0 | 2 | 16 | 3 | 7 | 0 | 5 | 0 | 0 | 5 | 0 | 0 | 0 | 13% | 12% | 12% | 11% | 3% |
| M2746 | 0 | 2.25 | 17 | 0 | 0 | 0 | 0 | 0 | 0 | 4 | 0 | 0 | 0 | 11% | 12% | 10% | 0% | 4% |
| M2747 | 0 | 2.1 | 19.2 | 1.25 | 1 | 0 | 0 | 0 | 0 | 5 | 0 | 0 | 0 | 15% | 12% | 11% | 34% | 1% |
| M2748 | 0 | 1.25 | 17 | 3 | 6 | 0 | 9 | 0 | 0 | 0 | 0 | 0 | 4.5 | 14% | 12% | 6% | 0% | 3% |
| M2749 | 0 | 2 | 16 | 7 | 7 | 0 | 7 | 0 | 0 | 5 | 0 | 0 | 0 | 13% | 12% | 12% | 0% | 4% |
| M2750 | 0 | 2.7 | 14 | 1.25 | 1 | 0 | 0 | 1 | 0 | 5 | 0 | 0 | 0 | 9% | 12% | 13% | 0% | 5% |
| M2751 | 0 | 2 | 16 | 10 | 7 | 0 | 8 | 0 | 0 | 5 | 0 | 0 | 0 | 12% | 12% | 12% | 0% | 4% |
| M2752 | 0 | 2 | 16 | 4 | 7 | 0 | 6 | 0 | 0 | 5 | 0 | 0 | 0 | 13% | 12% | 12% | 0% | 3% |
| M2753 | 0 | 1.25 | 17 | 2 | 6 | 0 | 9 | 0 | 0 | 0 | 0 | 0 | 4.5 | 14% | 12% | 6% | 0% | 3% |
| M2754 | 0 | 1.25 | 17 | 9 | 7 | 0 | 5 | 0 | 0 | 0 | 0 | 0 | 4.5 | 14% | 12% | 6% | 27% | 4% |
| M2755 | 0 | 1.75 | 16 | 0 | 0 | 0 | 0 | 0 | 0 | 0 | 0 | 0 | 4.5 | 11% | 12% | 5% | 0% | 4% |
| M2756 | 0 | 2 | 16 | 2 | 7 | 0 | 5 | 0 | 0 | 5 | 0 | 0 | 0 | 13% | 12% | 12% | 12% | 0% |
| M2757 | 0 | 2 | 16 | 1 | 7 | 0 | 4 | 0 | 0 | 5 | 0 | 0 | 0 | 13% | 12% | 12% | 26% | 0% |
| M2758 | 0 | 1.25 | 17 | 7 | 7 | 0 | 4 | 0 | 0 | 0 | 0 | 0 | 4.5 | 14% | 12% | 6% | 38% | 4% |
| M2759 | 0 | 2.5 | 18 | 1.25 | 1 | 2 | 0 | 1 | 0 | 5 | 0 | 0 | 0 | 14% | 12% | 13% | 2% | 4% |
| M2760 | 0 | 1.25 | 17 | 1 | 6 | 0 | 9 | 0 | 0 | 0 | 0 | 0 | 4.5 | 14% | 12% | 6% | 0% | 3% |
| M2761 | 0 | 2 | 16 | 6 | 7 | 0 | 7 | 0 | 0 | 5 | 0 | 0 | 0 | 13% | 12% | 12% | 0% | 4% |
| M2762 | 0 | 1.75 | 17 | 0 | 0 | 5 | 0 | 0 | 0 | 0 | 0 | 0 | 0 | 12% | 12% | 6% | 0% | 5% |
| M2763 | 0 | 2 | 16 | 3 | 7 | 0 | 6 | 0 | 0 | 5 | 0 | 0 | 0 | 13% | 12% | 12% | 0% | 3% |
| M2764 | 0 | 2 | 16 | 9 | 7 | 0 | 8 | 0 | 0 | 5 | 0 | 0 | 0 | 12% | 12% | 12% | 0% | 4% |
| M2765 | 0 | 1.25 | 17 | 0 | 6 | 0 | 9 | 0 | 0 | 0 | 0 | 0 | 4.5 | 14% | 12% | 6% | 0% | 2% |
| M2766 | 0 | 2 | 16 | 1.25 | 1 | 0 | 0 | 1 | 0 | 3 | 0 | 0 | 0 | 11% | 12% | 7% | 0% | 5% |
| M2767 | 0 | 2.2 | 17.2 | 1.25 | 1 | 0 | 0 | 0 | 0 | 5 | 0 | 0 | 0 | 13% | 12% | 12% | 3% | 1% |
| M2768 | 0 | 2 | 16 | 5 | 7 | 0 | 7 | 0 | 0 | 5 | 0 | 0 | 0 | 13% | 12% | 12% | 0% | 3% |
| M2769 | 0 | 2 | 16 | 1 | 7 | 0 | 5 | 0 | 0 | 5 | 0 | 0 | 0 | 13% | 12% | 12% | 14% | 0% |
| M2770 | 0 | 1.25 | 17 | 4 | 6 | 0 | 10 | 0 | 0 | 0 | 0 | 0 | 4.5 | 13% | 12% | 6% | 0% | 3% |
| M2771 | 0 | 2.4 | 14 | 1.25 | 1 | 0 | 0 | 1 | 0 | 4 | 0 | 0 | 0 | 9% | 12% | 10% | 0% | 5% |
| M2772 | 0 | 2 | 16 | 2 | 7 | 0 | 6 | 0 | 0 | 5 | 0 | 0 | 0 | 13% | 12% | 12% | 1% | 1% |
| M2773 | 0 | 2 | 16 | 8 | 7 | 0 | 8 | 0 | 0 | 5 | 0 | 0 | 0 | 13% | 12% | 12% | 0% | 4% |
| M2774 | 0 | 2 | 16 | 0 | 7 | 0 | 4 | 0 | 0 | 5 | 0 | 0 | 0 | 13% | 12% | 12% | 28% | 0% |
| M2775 | 0 | 2 | 16 | 4 | 7 | 0 | 7 | 0 | 0 | 5 | 0 | 0 | 0 | 13% | 12% | 12% | 0% | 3% |
| M2776 | 0 | 1.25 | 17 | 3 | 6 | 0 | 10 | 0 | 0 | 0 | 0 | 0 | 4.5 | 14% | 12% | 6% | 0% | 3% |
| M2777 | 0 | 2 | 16 | 1 | 7 | 0 | 6 | 0 | 0 | 5 | 0 | 0 | 0 | 13% | 12% | 12% | 2% | 1% |
| M2778 | 0 | 2 | 16 | 7 | 7 | 0 | 8 | 0 | 0 | 5 | 0 | 0 | 0 | 13% | 12% | 12% | 0% | 4% |
| M2779 | 0 | 1.25 | 17 | 2 | 6 | 0 | 10 | 0 | 0 | 0 | 0 | 0 | 4.5 | 14% | 12% | 6% | 0% | 3% |
| M2780 | 0 | 2 | 16 | 0 | 7 | 0 | 5 | 0 | 0 | 5 | 0 | 0 | 0 | 13% | 12% | 12% | 16% | 0% |
| M2781 | 0 | 2 | 16 | 3 | 7 | 0 | 7 | 0 | 0 | 5 | 0 | 0 | 0 | 13% | 12% | 12% | 0% | 3% |
| M2782 | 0 | 1.25 | 17 | 8 | 7 | 0 | 5 | 0 | 0 | 0 | 0 | 0 | 4.5 | 14% | 12% | 6% | 30% | 4% |
| M2783 | 0 | 2.5 | 15 | 0 | 0 | 0 | 0 | 0 | 0 | 4.5 | 0 | 0 | 0 | 9% | 12% | 11% | 0% | 4% |
| M2784 | 0 | 1.25 | 17 | 10 | 7 | 0 | 6 | 0 | 0 | 0 | 0 | 0 | 4.5 | 14% | 12% | 6% | 18% | 5% |
| M2785 | 0 | 1.25 | 17 | 1 | 6 | 0 | 10 | 0 | 0 | 0 | 0 | 0 | 4.5 | 14% | 12% | 6% | 0% | 3% |
| M2786 | 0 | 2.1 | 14 | 1.25 | 1 | 0 | 0 | 1 | 0 | 3 | 0 | 0 | 0 | 9% | 12% | 8% | 0% | 4% |
| M2787 | 0 | 2.7 | 14 | 1 | 1 | 0 | 0 | 0 | 0 | 5 | 0 | 0 | 0 | 8% | 12% | 12% | 0% | 4% |
| M2788 | 0 | 2 | 16 | 2 | 7 | 0 | 7 | 0 | 0 | 5 | 0 | 0 | 0 | 13% | 12% | 12% | 0% | 1% |
| M2789 | 0 | 1.75 | 15 | 0 | 0 | 4.5 | 0 | 0 | 0 | 0 | 0 | 0 | 0 | 10% | 12% | 5% | 0% | 4% |
| M2790 | 0 | 1.25 | 17 | 0 | 6 | 0 | 10 | 0 | 0 | 0 | 0 | 0 | 4.5 | 14% | 12% | 6% | 0% | 3% |
| M2791 | 0 | 2 | 16 | 6 | 7 | 0 | 8 | 0 | 0 | 5 | 0 | 0 | 0 | 13% | 12% | 12% | 0% | 4% |
| M2792 | 0 | 2 | 16 | 0 | 7 | 0 | 6 | 0 | 0 | 5 | 0 | 0 | 0 | 13% | 12% | 12% | 4% | 1% |
| M2793 | 0 | 2.1 | 19.4 | 1.25 | 1 | 0 | 0 | 0 | 0 | 5 | 0 | 0 | 0 | 15% | 12% | 11% | 38% | 1% |
| M2794 | 0 | 2 | 16 | 1 | 7 | 0 | 7 | 0 | 0 | 5 | 0 | 0 | 0 | 13% | 12% | 12% | 0% | 1% |
| M2795 | 0 | 2 | 16 | 10 | 7 | 0 | 9 | 0 | 0 | 5 | 0 | 0 | 0 | 12% | 12% | 12% | 0% | 5% |
| M2796 | 0 | 2 | 16 | 5 | 7 | 0 | 8 | 0 | 0 | 5 | 0 | 0 | 0 | 13% | 12% | 12% | 0% | 3% |
| M2797 | 0 | 2 | 16 | 0 | 7 | 0 | 7 | 0 | 0 | 5 | 0 | 0 | 0 | 13% | 12% | 12% | 0% | 1% |
| M2798 | 0 | 2 | 16 | 10 | 8 | 0 | 2 | 0 | 0 | 5 | 0 | 0 | 0 | 14% | 12% | 12% | 39% | 2% |
| M2799 | 0 | 2 | 16 | 4 | 7 | 0 | 8 | 0 | 0 | 5 | 0 | 0 | 0 | 13% | 12% | 12% | 0% | 3% |
| M2800 | 0 | 2 | 16 | 0 | 7 | 0 | 8 | 0 | 0 | 5 | 0 | 0 | 0 | 13% | 12% | 12% | 0% | 1% |
| M2801 | 0 | 2 | 16 | 3 | 7 | 0 | 8 | 0 | 0 | 5 | 0 | 0 | 0 | 13% | 12% | 12% | 0% | 1% |
| M2802 | 0 | 2 | 16 | 1 | 7 | 0 | 8 | 0 | 0 | 5 | 0 | 0 | 0 | 13% | 12% | 12% | 0% | 1% |
| M2803 | 0 | 2 | 16 | 0 | 7 | 0 | 9 | 0 | 0 | 5 | 0 | 0 | 0 | 13% | 12% | 12% | 0% | 1% |
| M2804 | 0 | 2 | 16 | 9 | 7 | 0 | 9 | 0 | 0 | 5 | 0 | 0 | 0 | 12% | 12% | 12% | 0% | 4% |
| M2805 | 0 | 2 | 16 | 0 | 7 | 0 | 10 | 0 | 0 | 5 | 0 | 0 | 0 | 13% | 12% | 12% | 0% | 1% |
| M2806 | 0 | 2 | 16 | 2 | 7 | 0 | 8 | 0 | 0 | 5 | 0 | 0 | 0 | 13% | 12% | 12% | 0% | 1% |
| M2807 | 0 | 2.2 | 15 | 1.25 | 1 | 0 | 0 | 1 | 0 | 3.5 | 0 | 0 | 0 | 10% | 12% | 9% | 0% | 5% |
| M2808 | 0 | 2 | 16 | 1 | 7 | 0 | 9 | 0 | 0 | 5 | 0 | 0 | 0 | 13% | 12% | 12% | 0% | 1% |
| M2809 | 0 | 2 | 16 | 8 | 7 | 0 | 9 | 0 | 0 | 5 | 0 | 0 | 0 | 12% | 12% | 12% | 0% | 4% |
| M2810 | 0 | 1.25 | 17 | 7 | 7 | 0 | 5 | 0 | 0 | 0 | 0 | 0 | 4.5 | 14% | 12% | 6% | 33% | 4% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2811 | 0 | 2 | 16 | 1 | 7 | 0 | 10 | 0 | 0 | 5 | 0 | 0 | 0 | 13% | 12% | 12% | 0% | 2% |
| M2812 | 0 | 1.25 | 17 | 9 | 7 | 0 | 6 | 0 | 0 | 0 | 0 | 0 | 4.5 | 14% | 12% | 6% | 22% | 5% |
| M2813 | 0 | 2 | 16 | 2 | 7 | 0 | 9 | 0 | 0 | 5 | 0 | 0 | 0 | 13% | 12% | 12% | 0% | 1% |
| M2814 | 0 | 2 | 16 | 7 | 7 | 0 | 9 | 0 | 0 | 5 | 0 | 0 | 0 | 12% | 12% | 12% | 0% | 4% |
| M2815 | 0 | 2 | 16 | 3 | 7 | 0 | 9 | 0 | 0 | 5 | 0 | 0 | 0 | 13% | 12% | 12% | 0% | 2% |
| M2816 | 0 | 2 | 16 | 6 | 7 | 0 | 9 | 0 | 0 | 5 | 0 | 0 | 0 | 12% | 12% | 12% | 0% | 4% |
| M2817 | 0 | 2 | 16 | 4 | 7 | 0 | 9 | 0 | 0 | 5 | 0 | 0 | 0 | 13% | 12% | 12% | 0% | 3% |
| M2818 | 0 | 2 | 16 | 5 | 7 | 0 | 9 | 0 | 0 | 5 | 0 | 0 | 0 | 13% | 12% | 12% | 0% | 3% |
| M2819 | 0 | 2 | 16 | 2 | 7 | 0 | 10 | 0 | 0 | 5 | 0 | 0 | 0 | 13% | 12% | 12% | 0% | 2% |
| M2820 | 0 | 2 | 16 | 3 | 7 | 0 | 10 | 0 | 0 | 5 | 0 | 0 | 0 | 13% | 12% | 12% | 0% | 2% |
| M2821 | 0 | 2 | 16 | 10 | 7 | 0 | 10 | 0 | 0 | 5 | 0 | 0 | 0 | 12% | 12% | 12% | 0% | 5% |
| M2822 | 0 | 2.2 | 17.4 | 1.25 | 1 | 0 | 0 | 0 | 0 | 5 | 0 | 0 | 0 | 13% | 12% | 12% | 3% | 1% |
| M2823 | 0 | 2 | 16 | 4 | 7 | 0 | 10 | 0 | 0 | 5 | 0 | 0 | 0 | 12% | 12% | 12% | 0% | 3% |
| M2824 | 0 | 2 | 16 | 9 | 8 | 0 | 2 | 0 | 0 | 5 | 0 | 0 | 0 | 14% | 12% | 12% | 38% | 2% |
| M2825 | 0 | 2 | 16 | 9 | 7 | 0 | 10 | 0 | 0 | 5 | 0 | 0 | 0 | 12% | 12% | 12% | 0% | 5% |
| M2826 | 0 | 1.25 | 17 | 6 | 7 | 0 | 5 | 0 | 0 | 0 | 0 | 0 | 4.5 | 14% | 12% | 6% | 36% | 4% |
| M2827 | 0 | 1.25 | 17 | 8 | 7 | 0 | 6 | 0 | 0 | 0 | 0 | 0 | 4.5 | 14% | 12% | 6% | 25% | 4% |
| M2828 | 0 | 2 | 16 | 5 | 7 | 0 | 10 | 0 | 0 | 5 | 0 | 0 | 0 | 12% | 12% | 12% | 0% | 4% |
| M2829 | 0 | 2 | 16 | 8 | 7 | 0 | 10 | 0 | 0 | 5 | 0 | 0 | 0 | 12% | 12% | 12% | 0% | 4% |
| M2830 | 0 | 2 | 16 | 6 | 7 | 0 | 10 | 0 | 0 | 5 | 0 | 0 | 0 | 12% | 12% | 12% | 0% | 4% |
| M2831 | 0 | 2 | 16 | 7 | 7 | 0 | 10 | 0 | 0 | 5 | 0 | 0 | 0 | 12% | 12% | 12% | 0% | 4% |
| M2832 | 0 | 2.6 | 16 | 2.5 | 1 | 0 | 0 | 0 | 0 | 5 | 0 | 0 | 0 | 11% | 12% | 12% | 0% | 5% |
| M2833 | 0 | 2.3 | 17 | 1.25 | 1 | 0 | 0 | 0 | 0 | 5 | 0 | 0 | 0 | 12% | 12% | 12% | 0% | 2% |
| M2834 | 0 | 2 | 16 | 10 | 8 | 0 | 3 | 0 | 0 | 5 | 0 | 0 | 0 | 13% | 12% | 12% | 25% | 2% |
| M2835 | 0 | 1.25 | 17 | 7 | 7 | 0 | 6 | 0 | 0 | 0 | 0 | 0 | 4.5 | 14% | 12% | 6% | 29% | 4% |
| M2836 | 0 | 1.25 | 17 | 5 | 7 | 0 | 5 | 0 | 0 | 0 | 0 | 0 | 4.5 | 14% | 12% | 6% | 39% | 4% |
| M2837 | 0 | 2.6 | 16 | 1 | 1 | 0 | 0 | 0 | 0 | 5 | 0 | 0 | 0 | 10% | 12% | 12% | 0% | 5% |
| M2838 | 0 | 2.4 | 17.2 | 1.25 | 1 | 0 | 0 | 0 | 0 | 5 | 0 | 0 | 0 | 12% | 12% | 12% | 0% | 4% |
| M2839 | 0 | 1.25 | 17 | 9 | 7 | 0 | 7 | 0 | 0 | 0 | 0 | 0 | 4.5 | 14% | 12% | 6% | 15% | 5% |
| M2840 | 0 | 1.75 | 17 | 0 | 0 | 0 | 0 | 0 | 0 | 0 | 0 | 0 | 4.5 | 12% | 12% | 5% | 0% | 5% |
| M2841 | 0 | 2 | 16 | 8 | 8 | 0 | 2 | 0 | 0 | 5 | 0 | 0 | 0 | 14% | 13% | 12% | 37% | 2% |
| M2842 | 0 | 2 | 17 | 0 | 0 | 0 | 0 | 0 | 0 | 3 | 0 | 0 | 0 | 11% | 13% | 7% | 0% | 4% |
| M2843 | 0 | 2.5 | 17.4 | 1.25 | 1 | 0 | 0 | 0 | 0 | 5 | 0 | 0 | 0 | 12% | 13% | 12% | 0% | 5% |
| M2844 | 0 | 1.25 | 17 | 6 | 7 | 0 | 6 | 0 | 0 | 0 | 0 | 0 | 4.5 | 14% | 13% | 6% | 29% | 4% |
| M2845 | 0 | 1.25 | 17 | 8 | 7 | 0 | 7 | 0 | 0 | 0 | 0 | 0 | 4.5 | 14% | 13% | 6% | 16% | 5% |
| M2846 | 0 | 2.2 | 17.6 | 1.25 | 1 | 0 | 0 | 0 | 0 | 5 | 0 | 0 | 0 | 13% | 13% | 12% | 6% | 1% |
| M2847 | 0 | 2 | 16 | 9 | 8 | 0 | 3 | 0 | 0 | 5 | 0 | 0 | 0 | 13% | 13% | 12% | 24% | 2% |
| M2848 | 0 | 2.75 | 14 | 0 | 0 | 0 | 0 | 0 | 0 | 5 | 0 | 0 | 0 | 8% | 13% | 12% | 0% | 4% |
| M2849 | 0 | 1.25 | 17 | 5 | 7 | 0 | 6 | 0 | 0 | 0 | 0 | 0 | 4.5 | 14% | 13% | 6% | 30% | 4% |
| M2850 | 0 | 2 | 16 | 7 | 8 | 0 | 2 | 0 | 0 | 5 | 0 | 0 | 0 | 14% | 13% | 12% | 37% | 2% |
| M2851 | 0 | 1.25 | 17 | 7 | 7 | 0 | 7 | 0 | 0 | 0 | 0 | 0 | 4.5 | 14% | 13% | 6% | 17% | 5% |
| M2852 | 0 | 1.25 | 17 | 10 | 8 | 0 | 5 | 0 | 0 | 0 | 0 | 0 | 4.5 | 14% | 13% | 6% | 29% | 4% |
| M2853 | 0 | 2 | 16 | 10 | 8 | 0 | 4 | 0 | 0 | 5 | 0 | 0 | 0 | 13% | 13% | 12% | 13% | 3% |
| M2854 | 0 | 2 | 16 | 8 | 8 | 0 | 3 | 0 | 0 | 5 | 0 | 0 | 0 | 13% | 13% | 12% | 24% | 2% |
| M2855 | 0 | 1.25 | 17 | 4 | 7 | 0 | 6 | 0 | 0 | 0 | 0 | 0 | 4.5 | 14% | 13% | 6% | 32% | 4% |
| M2856 | 0 | 1.25 | 17 | 6 | 7 | 0 | 7 | 0 | 0 | 0 | 0 | 0 | 4.5 | 14% | 13% | 6% | 18% | 5% |
| M2857 | 0 | 1.75 | 16 | 0 | 0 | 4.5 | 0 | 0 | 0 | 0 | 0 | 0 | 0 | 11% | 13% | 5% | 0% | 5% |
| M2858 | 0 | 2 | 16 | 6 | 8 | 0 | 2 | 0 | 0 | 5 | 0 | 0 | 0 | 14% | 13% | 12% | 37% | 2% |
| M2859 | 0 | 1.25 | 17 | 3 | 7 | 0 | 6 | 0 | 0 | 0 | 0 | 0 | 4.5 | 14% | 13% | 6% | 33% | 4% |
| M2860 | 0 | 2 | 16 | 9 | 8 | 0 | 4 | 0 | 0 | 5 | 0 | 0 | 0 | 13% | 13% | 12% | 13% | 3% |
| M2861 | 0 | 2.4 | 16 | 5.5 | 1 | 0 | 0 | 0 | 0 | 5 | 0 | 0 | 0 | 11% | 13% | 12% | 0% | 3% |
| M2862 | 0 | 1.25 | 17 | 5 | 7 | 0 | 7 | 0 | 0 | 0 | 0 | 0 | 4.5 | 14% | 13% | 6% | 19% | 4% |
| M2863 | 0 | 2.2 | 17.8 | 1.25 | 1 | 0 | 0 | 0 | 0 | 5 | 0 | 0 | 0 | 13% | 13% | 12% | 11% | 1% |
| M2864 | 0 | 2 | 16 | 7 | 8 | 0 | 3 | 0 | 0 | 5 | 0 | 0 | 0 | 13% | 13% | 12% | 24% | 2% |
| M2865 | 0 | 2.1 | 20 | 2.5 | 1 | 0 | 0 | 0 | 0 | 5 | 0 | 0 | 0 | 15% | 13% | 11% | 38% | 3% |
| M2866 | 0 | 2.25 | 15 | 0 | 0 | 0 | 0 | 0 | 0 | 3.5 | 0 | 0 | 0 | 9% | 13% | 9% | 0% | 4% |
| M2867 | 0 | 1.25 | 17 | 2 | 7 | 0 | 6 | 0 | 0 | 0 | 0 | 0 | 4.5 | 14% | 13% | 6% | 34% | 1% |
| M2868 | 0 | 1.25 | 17 | 4 | 7 | 0 | 7 | 0 | 0 | 0 | 0 | 0 | 4.5 | 14% | 13% | 6% | 20% | 4% |
| M2869 | 0 | 1.25 | 17 | 6 | 7 | 0 | 8 | 0 | 0 | 0 | 0 | 0 | 4.5 | 14% | 13% | 6% | 7% | 5% |
| M2870 | 0 | 2 | 16 | 10 | 8 | 0 | 5 | 0 | 0 | 5 | 0 | 0 | 0 | 13% | 13% | 12% | 4% | 3% |
| M2871 | 0 | 2 | 16 | 8 | 8 | 0 | 4 | 0 | 0 | 5 | 0 | 0 | 0 | 13% | 13% | 12% | 13% | 2% |
| M2872 | 0 | 1.25 | 17 | 9 | 8 | 0 | 5 | 0 | 0 | 0 | 0 | 0 | 4.5 | 14% | 13% | 6% | 29% | 4% |
| M2873 | 0 | 2 | 16 | 5 | 8 | 0 | 2 | 0 | 0 | 5 | 0 | 0 | 0 | 14% | 13% | 12% | 36% | 2% |
| M2874 | 0 | 1.25 | 17 | 1 | 7 | 0 | 6 | 0 | 0 | 0 | 0 | 0 | 4.5 | 14% | 13% | 6% | 36% | 1% |
| M2875 | 0 | 1.25 | 17 | 3 | 7 | 0 | 7 | 0 | 0 | 0 | 0 | 0 | 4.5 | 14% | 13% | 6% | 21% | 4% |
| M2876 | 0 | 2 | 16 | 6 | 8 | 0 | 3 | 0 | 0 | 5 | 0 | 0 | 0 | 13% | 13% | 12% | 24% | 2% |
| M2877 | 0 | 1.25 | 17 | 5 | 7 | 0 | 8 | 0 | 0 | 0 | 0 | 0 | 4.5 | 14% | 13% | 6% | 8% | 5% |
| M2878 | 0 | 1.25 | 17 | 2 | 7 | 0 | 7 | 0 | 0 | 0 | 0 | 0 | 4.5 | 14% | 13% | 6% | 23% | 1% |
| M2879 | 0 | 1.25 | 17 | 0 | 7 | 0 | 6 | 0 | 0 | 0 | 0 | 0 | 4.5 | 14% | 13% | 6% | 38% | 1% |
| M2880 | 0 | 2 | 16 | 9 | 8 | 0 | 5 | 0 | 0 | 5 | 0 | 0 | 0 | 13% | 13% | 12% | 4% | 3% |
| M2881 | 0 | 2 | 16 | 7 | 8 | 0 | 4 | 0 | 0 | 5 | 0 | 0 | 0 | 13% | 13% | 12% | 15% | 2% |
| M2882 | 0 | 1.25 | 17 | 4 | 7 | 0 | 8 | 0 | 0 | 0 | 0 | 0 | 4.5 | 14% | 13% | 6% | 9% | 5% |
| M2883 | 0 | 2.2 | 18 | 1 | 1 | 0 | 0 | 0 | 0 | 5 | 0 | 0 | 0 | 13% | 13% | 12% | 13% | 2% |
| M2884 | 0 | 1.25 | 17 | 1 | 7 | 0 | 7 | 0 | 0 | 0 | 0 | 0 | 4.5 | 14% | 13% | 6% | 24% | 1% |
| M2885 | 0 | 2.2 | 18 | 1.25 | 1 | 0 | 0 | 0 | 0 | 5 | 0 | 0 | 0 | 13% | 13% | 12% | 15% | 2% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2886 | 0 | 2 | 16 | 4 | 8 | 0 | 2 | 0 | 0 | 5 | 0 | 0 | 0 | 14% | 13% | 12% | 36% | 2% |
| M2887 | 0 | 2.1 | 20 | 5.5 | 1 | 0 | 0 | 0 | 0 | 5 | 0 | 0 | 0 | 15% | 13% | 11% | 38% | 3% |
| M2888 | 0 | 2.5 | 16 | 0 | 0 | 0 | 0 | 0 | 0 | 4.5 | 0 | 0 | 0 | 10% | 13% | 11% | 0% | 5% |
| M2889 | 0 | 1.25 | 17 | 3 | 7 | 0 | 8 | 0 | 0 | 0 | 0 | 0 | 4.5 | 14% | 13% | 6% | 10% | 2% |
| M2890 | 0 | 2 | 16 | 5 | 8 | 0 | 3 | 0 | 0 | 5 | 0 | 0 | 0 | 13% | 13% | 12% | 28% | 2% |
| M2891 | 0 | 2.3 | 16 | 5.5 | 1 | 0 | 0 | 0 | 0 | 5 | 0 | 0 | 0 | 11% | 13% | 12% | 0% | 2% |
| M2892 | 0 | 1.25 | 17 | 0 | 7 | 0 | 7 | 0 | 0 | 0 | 0 | 0 | 4.5 | 14% | 13% | 6% | 26% | 1% |
| M2893 | 0 | 2 | 16 | 8 | 8 | 0 | 5 | 0 | 0 | 5 | 0 | 0 | 0 | 13% | 13% | 12% | 5% | 3% |
| M2894 | 0 | 2 | 16 | 10 | 8 | 0 | 6 | 0 | 0 | 5 | 0 | 0 | 0 | 13% | 13% | 12% | 0% | 3% |
| M2895 | 0 | 1.25 | 17 | 2 | 7 | 0 | 8 | 0 | 0 | 0 | 0 | 0 | 4.5 | 14% | 13% | 6% | 12% | 2% |
| M2896 | 0 | 2 | 16 | 6 | 8 | 0 | 4 | 0 | 0 | 5 | 0 | 0 | 0 | 13% | 13% | 12% | 19% | 2% |
| M2897 | 0.8 | 1 | 12 | 1 | 1 | 3.5 | 0 | 0.5 | 0 | 0.5 | 0.5 | 0 | 0 | 9% | 13% | 5% | 0% | 0% |
| M2898 | 0 | 1.25 | 17 | 10 | 8 | 0 | 6 | 0 | 0 | 0 | 0 | 0 | 4.5 | 14% | 13% | 6% | 20% | 4% |
| M2899 | 0 | 1.25 | 17 | 1 | 7 | 0 | 8 | 0 | 0 | 0 | 0 | 0 | 4.5 | 14% | 13% | 6% | 13% | 2% |
| M2900 | 0 | 1.25 | 17 | 8 | 8 | 0 | 5 | 0 | 0 | 0 | 0 | 0 | 4.5 | 14% | 13% | 6% | 29% | 4% |
| M2901 | 0 | 2.2 | 18 | 2.5 | 1 | 0 | 0 | 0 | 0 | 5 | 0 | 0 | 0 | 13% | 13% | 12% | 17% | 2% |
| M2902 | 0 | 2 | 16 | 4 | 8 | 0 | 3 | 0 | 0 | 5 | 0 | 0 | 0 | 13% | 13% | 12% | 31% | 2% |
| M2903 | 0 | 2 | 16 | 3 | 8 | 0 | 2 | 0 | 0 | 5 | 0 | 0 | 0 | 14% | 13% | 12% | 38% | 2% |
| M2904 | 0 | 2 | 16 | 7 | 8 | 0 | 5 | 0 | 0 | 5 | 0 | 0 | 0 | 13% | 13% | 12% | 9% | 3% |
| M2905 | 0 | 1.25 | 17 | 0 | 7 | 0 | 8 | 0 | 0 | 0 | 0 | 0 | 4.5 | 14% | 13% | 6% | 15% | 2% |
| M2906 | 0 | 2 | 16 | 9 | 8 | 0 | 6 | 0 | 0 | 5 | 0 | 0 | 0 | 13% | 13% | 12% | 0% | 3% |
| M2907 | 0 | 1.25 | 17 | 3 | 7 | 0 | 9 | 0 | 0 | 0 | 0 | 0 | 4.5 | 14% | 13% | 6% | 0% | 2% |
| M2908 | 0 | 2.3 | 16 | 7 | 1 | 0 | 0 | 0 | 0 | 5 | 0 | 0 | 0 | 11% | 13% | 12% | 0% | 3% |
| M2909 | 0 | 2 | 16 | 5 | 8 | 0 | 4 | 0 | 0 | 5 | 0 | 0 | 0 | 13% | 13% | 12% | 23% | 2% |
| M2910 | 0 | 2.1 | 20 | 8.5 | 1 | 0 | 0 | 0 | 0 | 5 | 0 | 0 | 0 | 15% | 13% | 11% | 40% | 5% |
| M2911 | 0 | 1.25 | 17 | 2 | 7 | 0 | 9 | 0 | 0 | 0 | 0 | 0 | 4.5 | 14% | 13% | 6% | 2% | 2% |
| M2912 | 0 | 1.25 | 17 | 1 | 7 | 0 | 9 | 0 | 0 | 0 | 0 | 0 | 4.5 | 14% | 13% | 6% | 3% | 2% |
| M2913 | 0 | 2 | 16 | 6 | 8 | 0 | 5 | 0 | 0 | 5 | 0 | 0 | 0 | 13% | 13% | 12% | 13% | 3% |
| M2914 | 0 | 2 | 16 | 8 | 8 | 0 | 6 | 0 | 0 | 5 | 0 | 0 | 0 | 13% | 13% | 12% | 0% | 3% |
| M2915 | 0 | 1.25 | 17 | 0 | 7 | 0 | 9 | 0 | 0 | 0 | 0 | 0 | 4.5 | 14% | 13% | 6% | 5% | 2% |
| M2916 | 0 | 2.2 | 18.2 | 1.25 | 1 | 0 | 0 | 0 | 0 | 5 | 0 | 0 | 0 | 13% | 13% | 12% | 19% | 2% |
| M2917 | 0 | 2 | 16 | 3 | 8 | 0 | 3 | 0 | 0 | 5 | 0 | 0 | 0 | 13% | 13% | 12% | 35% | 2% |
| M2918 | 0 | 2 | 16 | 4 | 8 | 0 | 4 | 0 | 0 | 5 | 0 | 0 | 0 | 13% | 13% | 12% | 27% | 2% |
| M2919 | 0 | 2 | 16 | 10 | 8 | 0 | 7 | 0 | 0 | 5 | 0 | 0 | 0 | 13% | 13% | 12% | 0% | 4% |
| M2920 | 0 | 2.2 | 18 | 4 | 1 | 0 | 0 | 0 | 0 | 5 | 0 | 0 | 0 | 13% | 13% | 12% | 11% | 2% |
| M2921 | 0 | 1.25 | 17 | 3 | 7 | 0 | 10 | 0 | 0 | 0 | 0 | 0 | 4.5 | 14% | 13% | 6% | 0% | 2% |
| M2922 | 0 | 2.3 | 16 | 8.5 | 1 | 0 | 0 | 0 | 0 | 5 | 0 | 0 | 0 | 11% | 13% | 12% | 0% | 3% |
| M2923 | 0 | 2 | 16 | 5 | 8 | 0 | 5 | 0 | 0 | 5 | 0 | 0 | 0 | 13% | 13% | 12% | 18% | 2% |
| M2924 | 0 | 2 | 16 | 7 | 8 | 0 | 6 | 0 | 0 | 5 | 0 | 0 | 0 | 13% | 13% | 12% | 2% | 3% |
| M2925 | 0 | 1.25 | 17 | 2 | 7 | 0 | 10 | 0 | 0 | 0 | 0 | 0 | 4.5 | 14% | 13% | 6% | 0% | 2% |
| M2926 | 0 | 1.25 | 17 | 1 | 7 | 0 | 10 | 0 | 0 | 0 | 0 | 0 | 4.5 | 14% | 13% | 6% | 0% | 2% |
| M2927 | 0 | 1.25 | 17 | 0 | 7 | 0 | 10 | 0 | 0 | 0 | 0 | 0 | 4.5 | 14% | 13% | 6% | 0% | 2% |
| M2928 | 0 | 2 | 16 | 9 | 8 | 0 | 7 | 0 | 0 | 5 | 0 | 0 | 0 | 13% | 13% | 12% | 0% | 4% |
| M2929 | 0 | 1.25 | 17 | 9 | 8 | 0 | 6 | 0 | 0 | 0 | 0 | 0 | 4.5 | 14% | 13% | 6% | 21% | 4% |
| M2930 | 0 | 2.3 | 17.2 | 1.25 | 1 | 0 | 0 | 0 | 0 | 5 | 0 | 0 | 0 | 13% | 13% | 12% | 0% | 2% |
| M2931 | 0 | 1.25 | 17 | 7 | 8 | 0 | 5 | 0 | 0 | 0 | 0 | 0 | 4.5 | 15% | 13% | 6% | 33% | 3% |
| M2932 | 0 | 2 | 16 | 3 | 8 | 0 | 4 | 0 | 0 | 5 | 0 | 0 | 0 | 13% | 13% | 12% | 30% | 2% |
| M2933 | 0 | 2 | 16 | 2 | 8 | 0 | 3 | 0 | 0 | 5 | 0 | 0 | 0 | 13% | 13% | 12% | 38% | 0% |
| M2934 | 0 | 2.4 | 17.4 | 1.25 | 1 | 0 | 0 | 0 | 0 | 5 | 0 | 0 | 0 | 12% | 13% | 12% | 0% | 4% |
| M2935 | 0 | 2 | 16 | 6 | 8 | 0 | 6 | 0 | 0 | 5 | 0 | 0 | 0 | 13% | 13% | 12% | 4% | 3% |
| M2936 | 0 | 2 | 16 | 4 | 8 | 0 | 5 | 0 | 0 | 5 | 0 | 0 | 0 | 13% | 13% | 12% | 20% | 2% |
| M2937 | 0 | 2.3 | 16 | 10 | 1 | 0 | 0 | 0 | 0 | 5 | 0 | 0 | 0 | 11% | 13% | 12% | 0% | 3% |
| M2938 | 0 | 2 | 16 | 8 | 8 | 0 | 7 | 0 | 0 | 5 | 0 | 0 | 0 | 13% | 13% | 12% | 0% | 3% |
| M2939 | 0 | 2.2 | 18 | 5.5 | 1 | 0 | 0 | 0 | 0 | 5 | 0 | 0 | 0 | 13% | 13% | 12% | 19% | 2% |
| M2940 | 0 | 2.5 | 17.6 | 1.25 | 1 | 0 | 0 | 0 | 0 | 5 | 0 | 0 | 0 | 12% | 13% | 12% | 0% | 5% |
| M2941 | 0 | 2.5 | 14 | 0 | 0 | 0 | 0 | 0 | 0 | 4 | 0 | 0 | 0 | 8% | 13% | 10% | 0% | 5% |
| M2942 | 0 | 2 | 16 | 5 | 8 | 0 | 6 | 0 | 0 | 5 | 0 | 0 | 0 | 13% | 13% | 12% | 5% | 3% |
| M2943 | 0 | 2 | 16 | 2 | 8 | 0 | 4 | 0 | 0 | 5 | 0 | 0 | 0 | 13% | 13% | 12% | 34% | 0% |
| M2944 | 0 | 2 | 16 | 3 | 8 | 0 | 5 | 0 | 0 | 5 | 0 | 0 | 0 | 13% | 13% | 12% | 22% | 2% |
| M2945 | 0 | 1.25 | 17 | 10 | 9 | 0 | 5 | 0 | 0 | 0 | 0 | 0 | 4.5 | 14% | 13% | 6% | 36% | 3% |
| M2946 | 0 | 2 | 16 | 10 | 8 | 0 | 8 | 0 | 0 | 5 | 0 | 0 | 0 | 13% | 13% | 12% | 0% | 4% |
| M2947 | 0 | 2 | 16 | 7 | 8 | 0 | 7 | 0 | 0 | 5 | 0 | 0 | 0 | 13% | 13% | 12% | 0% | 3% |
| M2948 | 0 | 2.2 | 18.4 | 1.25 | 1 | 0 | 0 | 0 | 0 | 5 | 0 | 0 | 0 | 14% | 13% | 12% | 21% | 2% |
| M2949 | 0 | 2 | 16 | 4 | 8 | 0 | 6 | 0 | 0 | 5 | 0 | 0 | 0 | 13% | 13% | 12% | 7% | 3% |
| M2950 | 0 | 2 | 16 | 6 | 8 | 0 | 7 | 0 | 0 | 5 | 0 | 0 | 0 | 13% | 13% | 12% | 0% | 3% |
| M2951 | 0 | 2 | 16 | 2 | 8 | 0 | 5 | 0 | 0 | 5 | 0 | 0 | 0 | 13% | 13% | 12% | 24% | 0% |
| M2952 | 0 | 2 | 16 | 9 | 8 | 0 | 8 | 0 | 0 | 5 | 0 | 0 | 0 | 13% | 13% | 12% | 0% | 4% |
| M2953 | 0 | 2 | 16 | 1 | 8 | 0 | 4 | 0 | 0 | 5 | 0 | 0 | 0 | 13% | 13% | 12% | 38% | 0% |
| M2954 | 0 | 2.2 | 18 | 7 | 1 | 0 | 0 | 0 | 0 | 5 | 0 | 0 | 0 | 13% | 13% | 12% | 16% | 3% |
| M2955 | 0 | 2 | 13 | 0 | 0 | 0 | 0 | 0 | 0 | 0 | 0 | 0 | 5 | 8% | 13% | 6% | 0% | 4% |
| M2956 | 0 | 2 | 16 | 3 | 8 | 0 | 6 | 0 | 0 | 5 | 0 | 0 | 0 | 13% | 13% | 12% | 9% | 2% |
| M2957 | 0 | 2 | 16 | 5 | 8 | 0 | 7 | 0 | 0 | 5 | 0 | 0 | 0 | 13% | 13% | 12% | 0% | 3% |
| M2958 | 0 | 2 | 16 | 8 | 8 | 0 | 8 | 0 | 0 | 5 | 0 | 0 | 0 | 13% | 13% | 12% | 0% | 4% |
| M2959 | 0 | 1.25 | 17 | 8 | 8 | 0 | 6 | 0 | 0 | 0 | 0 | 0 | 4.5 | 15% | 13% | 6% | 24% | 4% |
| M2960 | 0 | 1.25 | 17 | 10 | 8 | 0 | 7 | 0 | 0 | 0 | 0 | 0 | 4.5 | 14% | 13% | 6% | 11% | 4% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M2961 | 0 | 2 | 16 | 1 | 8 | 0 | 5 | 0 | 0 | 5 | 0 | 0 | 0 | 13% | 13% | 12% | 26% | 0% |
| M2962 | 0 | 1.25 | 17 | 6 | 8 | 0 | 5 | 0 | 0 | 0 | 0 | 0 | 4.5 | 15% | 13% | 6% | 36% | 3% |
| M2963 | 0 | 2 | 16 | 2 | 8 | 0 | 6 | 0 | 0 | 5 | 0 | 0 | 0 | 13% | 13% | 12% | 11% | 0% |
| M2964 | 0 | 2 | 16 | 4 | 8 | 0 | 7 | 0 | 0 | 5 | 0 | 0 | 0 | 13% | 13% | 12% | 0% | 3% |
| M2965 | 0 | 2 | 16 | 7 | 8 | 0 | 8 | 0 | 0 | 5 | 0 | 0 | 0 | 13% | 13% | 12% | 0% | 4% |
| M2966 | 0 | 2 | 16 | 3 | 8 | 0 | 7 | 0 | 0 | 5 | 0 | 0 | 0 | 13% | 13% | 12% | 0% | 3% |
| M2967 | 0 | 2 | 16 | 1 | 8 | 0 | 6 | 0 | 0 | 5 | 0 | 0 | 0 | 13% | 13% | 12% | 14% | 0% |
| M2968 | 0 | 2.2 | 18 | 8.5 | 1 | 0 | 0 | 0 | 0 | 5 | 0 | 0 | 0 | 13% | 13% | 11% | 17% | 3% |
| M2969 | 0 | 2 | 16 | 0 | 8 | 0 | 5 | 0 | 0 | 5 | 0 | 0 | 0 | 13% | 13% | 12% | 29% | 0% |
| M2970 | 0 | 2 | 16 | 10 | 8 | 0 | 9 | 0 | 0 | 5 | 0 | 0 | 0 | 13% | 13% | 12% | 0% | 4% |
| M2971 | 0 | 2 | 16 | 6 | 8 | 0 | 8 | 0 | 0 | 5 | 0 | 0 | 0 | 13% | 13% | 12% | 0% | 3% |
| M2972 | 0 | 2 | 16 | 2 | 8 | 0 | 7 | 0 | 0 | 5 | 0 | 0 | 0 | 13% | 13% | 12% | 0% | 0% |
| M2973 | 0 | 2 | 16 | 0 | 8 | 0 | 6 | 0 | 0 | 5 | 0 | 0 | 0 | 13% | 13% | 12% | 16% | 0% |
| M2974 | 0 | 2 | 16 | 1 | 8 | 0 | 7 | 0 | 0 | 5 | 0 | 0 | 0 | 13% | 13% | 12% | 2% | 0% |
| M2975 | 0 | 2 | 16 | 5 | 8 | 0 | 8 | 0 | 0 | 5 | 0 | 0 | 0 | 13% | 13% | 12% | 0% | 3% |
| M2976 | 0 | 2 | 16 | 0 | 8 | 0 | 7 | 0 | 0 | 5 | 0 | 0 | 0 | 13% | 13% | 12% | 5% | 0% |
| M2977 | 0 | 2 | 16 | 9 | 8 | 0 | 9 | 0 | 0 | 5 | 0 | 0 | 0 | 13% | 13% | 12% | 0% | 4% |
| M2978 | 0 | 1.25 | 17 | 7 | 8 | 0 | 6 | 0 | 0 | 0 | 0 | 0 | 4.5 | 15% | 13% | 6% | 28% | 4% |
| M2979 | 0 | 1.25 | 17 | 9 | 8 | 0 | 7 | 0 | 0 | 0 | 0 | 0 | 4.5 | 14% | 13% | 6% | 15% | 4% |
| M2980 | 0 | 2 | 16 | 4 | 8 | 0 | 8 | 0 | 0 | 5 | 0 | 0 | 0 | 13% | 13% | 12% | 0% | 3% |
| M2981 | 0 | 2 | 16 | 0 | 8 | 0 | 10 | 0 | 0 | 5 | 0 | 0 | 0 | 13% | 13% | 12% | 0% | 1% |
| M2982 | 0 | 2 | 16 | 0 | 8 | 0 | 8 | 0 | 0 | 5 | 0 | 0 | 0 | 13% | 13% | 12% | 0% | 1% |
| M2983 | 0 | 2 | 16 | 0 | 8 | 0 | 9 | 0 | 0 | 5 | 0 | 0 | 0 | 13% | 13% | 12% | 0% | 1% |
| M2984 | 0 | 2 | 16 | 3 | 8 | 0 | 8 | 0 | 0 | 5 | 0 | 0 | 0 | 13% | 13% | 12% | 0% | 3% |
| M2985 | 0 | 2 | 16 | 1 | 8 | 0 | 8 | 0 | 0 | 5 | 0 | 0 | 0 | 13% | 13% | 12% | 0% | 1% |
| M2986 | 0 | 1.25 | 17 | 5 | 8 | 0 | 5 | 0 | 0 | 0 | 0 | 0 | 4.5 | 15% | 13% | 6% | 39% | 3% |
| M2987 | 0 | 2 | 16 | 2 | 8 | 0 | 8 | 0 | 0 | 5 | 0 | 0 | 0 | 13% | 13% | 12% | 0% | 1% |
| M2988 | 0 | 2 | 16 | 8 | 8 | 0 | 9 | 0 | 0 | 5 | 0 | 0 | 0 | 13% | 13% | 12% | 0% | 4% |
| M2989 | 0 | 2 | 16 | 1 | 8 | 0 | 9 | 0 | 0 | 5 | 0 | 0 | 0 | 13% | 13% | 12% | 0% | 1% |
| M2990 | 0 | 2.2 | 18 | 10 | 1 | 0 | 0 | 0 | 0 | 5 | 0 | 0 | 0 | 13% | 13% | 11% | 20% | 3% |
| M2991 | 0 | 2.2 | 18.6 | 1.25 | 1 | 0 | 0 | 0 | 0 | 5 | 0 | 0 | 0 | 14% | 13% | 12% | 21% | 2% |
| M2992 | 0 | 2 | 16 | 1 | 8 | 0 | 10 | 0 | 0 | 5 | 0 | 0 | 0 | 13% | 13% | 12% | 0% | 1% |
| M2993 | 0 | 2 | 16 | 7 | 8 | 0 | 9 | 0 | 0 | 5 | 0 | 0 | 0 | 13% | 13% | 12% | 0% | 4% |
| M2994 | 0 | 1.25 | 17 | 9 | 9 | 0 | 5 | 0 | 0 | 0 | 0 | 0 | 4.5 | 14% | 13% | 6% | 36% | 3% |
| M2995 | 0 | 2 | 16 | 2 | 8 | 0 | 9 | 0 | 0 | 5 | 0 | 0 | 0 | 13% | 13% | 12% | 0% | 1% |
| M2996 | 0 | 2 | 16 | 6 | 8 | 0 | 9 | 0 | 0 | 5 | 0 | 0 | 0 | 13% | 13% | 12% | 0% | 4% |
| M2997 | 0 | 2 | 16 | 3 | 8 | 0 | 9 | 0 | 0 | 5 | 0 | 0 | 0 | 13% | 13% | 12% | 0% | 1% |
| M2998 | 0 | 2 | 16 | 5 | 8 | 0 | 9 | 0 | 0 | 5 | 0 | 0 | 0 | 13% | 13% | 12% | 0% | 3% |
| M2999 | 0 | 2 | 16 | 4 | 8 | 0 | 9 | 0 | 0 | 5 | 0 | 0 | 0 | 13% | 13% | 12% | 0% | 3% |
| M3000 | 0 | 2 | 16 | 2 | 8 | 0 | 10 | 0 | 0 | 5 | 0 | 0 | 0 | 13% | 13% | 12% | 0% | 1% |
| M3001 | 0 | 1.25 | 17 | 6 | 8 | 0 | 6 | 0 | 0 | 0 | 0 | 0 | 4.5 | 15% | 13% | 6% | 31% | 4% |
| M3002 | 0 | 1.25 | 17 | 8 | 8 | 0 | 7 | 0 | 0 | 0 | 0 | 0 | 4.5 | 14% | 13% | 6% | 18% | 4% |
| M3003 | 0 | 2 | 16 | 10 | 8 | 0 | 10 | 0 | 0 | 5 | 0 | 0 | 0 | 13% | 13% | 12% | 0% | 5% |
| M3004 | 0 | 1.25 | 17 | 10 | 8 | 0 | 8 | 0 | 0 | 0 | 0 | 0 | 4.5 | 14% | 13% | 6% | 4% | 5% |
| M3005 | 0 | 2 | 16 | 3 | 8 | 0 | 10 | 0 | 0 | 5 | 0 | 0 | 0 | 13% | 13% | 12% | 0% | 1% |
| M3006 | 0 | 2 | 16 | 9 | 8 | 0 | 10 | 0 | 0 | 5 | 0 | 0 | 0 | 13% | 13% | 12% | 0% | 4% |
| M3007 | 0 | 2 | 16 | 4 | 8 | 0 | 10 | 0 | 0 | 5 | 0 | 0 | 0 | 13% | 13% | 12% | 0% | 4% |
| M3008 | 0 | 2 | 16 | 8 | 8 | 0 | 10 | 0 | 0 | 5 | 0 | 0 | 0 | 13% | 13% | 12% | 0% | 4% |
| M3009 | 0 | 2 | 16 | 5 | 8 | 0 | 10 | 0 | 0 | 5 | 0 | 0 | 0 | 13% | 13% | 12% | 0% | 4% |
| M3010 | 0 | 2 | 16 | 7 | 8 | 0 | 10 | 0 | 0 | 5 | 0 | 0 | 0 | 13% | 13% | 12% | 0% | 4% |
| M3011 | 0 | 2 | 16 | 6 | 8 | 0 | 10 | 0 | 0 | 5 | 0 | 0 | 0 | 13% | 13% | 12% | 0% | 4% |
| M3012 | 0.8 | 1 | 13 | 1 | 1 | 3.5 | 0 | 0.5 | 0 | 0.5 | 0.5 | 0 | 0 | 9% | 13% | 5% | 0% | 0% |
| M3013 | 0 | 1.25 | 17 | 5 | 8 | 0 | 6 | 0 | 0 | 0 | 0 | 0 | 4.5 | 15% | 13% | 6% | 34% | 3% |
| M3014 | 0 | 1.25 | 17 | 7 | 8 | 0 | 7 | 0 | 0 | 0 | 0 | 0 | 4.5 | 15% | 13% | 6% | 22% | 4% |
| M3015 | 0 | 1.25 | 17 | 9 | 8 | 0 | 8 | 0 | 0 | 0 | 0 | 0 | 4.5 | 14% | 13% | 6% | 8% | 5% |
| M3016 | 0 | 2 | 16 | 10 | 9 | 0 | 3 | 0 | 0 | 5 | 0 | 0 | 0 | 14% | 13% | 12% | 33% | 2% |
| M3017 | 0 | 1.25 | 17 | 10 | 9 | 0 | 6 | 0 | 0 | 0 | 0 | 0 | 4.5 | 14% | 13% | 6% | 26% | 3% |
| M3018 | 0 | 2.2 | 18.8 | 1.25 | 1 | 0 | 0 | 0 | 0 | 5 | 0 | 0 | 0 | 14% | 13% | 12% | 21% | 2% |
| M3019 | 0 | 1.25 | 17 | 4 | 8 | 0 | 6 | 0 | 0 | 0 | 0 | 0 | 4.5 | 15% | 13% | 6% | 37% | 3% |
| M3020 | 0 | 1.25 | 17 | 6 | 8 | 0 | 7 | 0 | 0 | 0 | 0 | 0 | 4.5 | 15% | 13% | 6% | 26% | 4% |
| M3021 | 0 | 1.25 | 17 | 8 | 8 | 0 | 8 | 0 | 0 | 0 | 0 | 0 | 4.5 | 14% | 13% | 6% | 12% | 4% |
| M3022 | 0 | 1.25 | 17 | 8 | 9 | 0 | 5 | 0 | 0 | 0 | 0 | 0 | 4.5 | 14% | 13% | 6% | 37% | 3% |
| M3023 | 0 | 1.25 | 17 | 5 | 8 | 0 | 7 | 0 | 0 | 0 | 0 | 0 | 4.5 | 15% | 13% | 6% | 27% | 4% |
| M3024 | 0 | 1.25 | 17 | 7 | 8 | 0 | 8 | 0 | 0 | 0 | 0 | 0 | 4.5 | 14% | 13% | 6% | 13% | 4% |
| M3025 | 0 | 2 | 16 | 9 | 9 | 0 | 3 | 0 | 0 | 5 | 0 | 0 | 0 | 14% | 14% | 12% | 33% | 2% |
| M3026 | 0 | 1.25 | 17 | 9 | 8 | 0 | 9 | 0 | 0 | 0 | 0 | 0 | 4.5 | 14% | 14% | 6% | 1% | 5% |
| M3027 | 0 | 1.25 | 17 | 4 | 8 | 0 | 7 | 0 | 0 | 0 | 0 | 0 | 4.5 | 15% | 14% | 6% | 29% | 4% |
| M3028 | 0 | 1.25 | 17 | 6 | 8 | 0 | 8 | 0 | 0 | 0 | 0 | 0 | 4.5 | 14% | 14% | 6% | 15% | 4% |
| M3029 | 0 | 1.25 | 17 | 8 | 8 | 0 | 9 | 0 | 0 | 0 | 0 | 0 | 4.5 | 14% | 14% | 6% | 2% | 5% |
| M3030 | 0 | 2 | 16 | 10 | 10 | 0 | 2 | 0 | 0 | 5 | 0 | 0 | 0 | 14% | 14% | 12% | 39% | 1% |
| M3031 | 0 | 2 | 16 | 10 | 9 | 0 | 4 | 0 | 0 | 5 | 0 | 0 | 0 | 14% | 14% | 12% | 21% | 2% |
| M3032 | 0 | 1.25 | 17 | 3 | 8 | 0 | 7 | 0 | 0 | 0 | 0 | 0 | 4.5 | 15% | 14% | 6% | 31% | 4% |
| M3033 | 0 | 2.2 | 19 | 1.25 | 1 | 0 | 0 | 0 | 0 | 5 | 0 | 0 | 0 | 14% | 14% | 12% | 21% | 2% |
| M3034 | 0 | 1.25 | 17 | 5 | 8 | 0 | 8 | 0 | 0 | 0 | 0 | 0 | 4.5 | 14% | 14% | 6% | 16% | 4% |
| M3035 | 0 | 1.25 | 17 | 9 | 9 | 0 | 6 | 0 | 0 | 0 | 0 | 0 | 4.5 | 14% | 14% | 6% | 26% | 3% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M3036 | 0 | 2 | 16 | 8 | 9 | 0 | 3 | 0 | 0 | 5 | 0 | 0 | 0 | 14% | 14% | 12% | 33% | 2% |
| M3037 | 0 | 1.25 | 17 | 7 | 8 | 0 | 9 | 0 | 0 | 0 | 0 | 0 | 4.5 | 14% | 14% | 6% | 3% | 5% |
| M3038 | 0 | 1.25 | 17 | 7 | 9 | 0 | 5 | 0 | 0 | 0 | 0 | 0 | 4.5 | 15% | 14% | 6% | 37% | 3% |
| M3039 | 0.6 | 1.2 | 14 | 1 | 1 | 3.5 | 0 | 0.5 | 0 | 0.5 | 0.5 | 0 | 0 | 10% | 14% | 5% | 0% | 0% |
| M3040 | 0 | 1.25 | 17 | 2 | 8 | 0 | 7 | 0 | 0 | 0 | 0 | 0 | 4.5 | 15% | 14% | 6% | 33% | 1% |
| M3041 | 0 | 1.25 | 17 | 4 | 8 | 0 | 8 | 0 | 0 | 0 | 0 | 0 | 4.5 | 15% | 14% | 6% | 17% | 4% |
| M3042 | 0 | 1.25 | 17 | 6 | 8 | 0 | 9 | 0 | 0 | 0 | 0 | 0 | 4.5 | 14% | 14% | 6% | 4% | 5% |
| M3043 | 0 | 1.25 | 17 | 1 | 8 | 0 | 7 | 0 | 0 | 0 | 0 | 0 | 4.5 | 15% | 14% | 6% | 35% | 1% |
| M3044 | 0 | 2 | 16 | 9 | 9 | 0 | 4 | 0 | 0 | 5 | 0 | 0 | 0 | 14% | 14% | 12% | 21% | 2% |
| M3045 | 0 | 1.25 | 17 | 3 | 8 | 0 | 8 | 0 | 0 | 0 | 0 | 0 | 4.5 | 15% | 14% | 6% | 19% | 1% |
| M3046 | 0 | 1.25 | 17 | 0 | 8 | 0 | 7 | 0 | 0 | 0 | 0 | 0 | 4.5 | 15% | 14% | 6% | 38% | 1% |
| M3047 | 0 | 1.25 | 17 | 5 | 8 | 0 | 9 | 0 | 0 | 0 | 0 | 0 | 4.5 | 14% | 14% | 6% | 6% | 4% |
| M3048 | 0 | 2 | 16 | 7 | 9 | 0 | 3 | 0 | 0 | 5 | 0 | 0 | 0 | 14% | 14% | 12% | 34% | 2% |
| M3049 | 0 | 1.25 | 17 | 2 | 8 | 0 | 8 | 0 | 0 | 0 | 0 | 0 | 4.5 | 15% | 14% | 6% | 21% | 1% |
| M3050 | 0 | 2.4 | 17.6 | 1.25 | 1 | 0 | 0 | 0 | 0 | 5 | 0 | 0 | 0 | 12% | 14% | 12% | 0% | 4% |
| M3051 | 0 | 2.3 | 17.4 | 1.25 | 1 | 0 | 0 | 0 | 0 | 5 | 0 | 0 | 0 | 12% | 14% | 12% | 0% | 2% |
| M3052 | 0 | 1.25 | 17 | 7 | 8 | 0 | 10 | 0 | 0 | 0 | 0 | 0 | 4.5 | 14% | 14% | 6% | 0% | 5% |
| M3053 | 0 | 1.25 | 17 | 4 | 8 | 0 | 9 | 0 | 0 | 0 | 0 | 0 | 4.5 | 14% | 14% | 6% | 7% | 4% |
| M3054 | 0 | 1.25 | 17 | 1 | 8 | 0 | 8 | 0 | 0 | 0 | 0 | 0 | 4.5 | 15% | 14% | 6% | 23% | 1% |
| M3055 | 0 | 2.2 | 19.2 | 1.25 | 1 | 0 | 0 | 0 | 0 | 5 | 0 | 0 | 0 | 14% | 14% | 12% | 21% | 2% |
| M3056 | 0 | 2 | 16 | 10 | 9 | 0 | 5 | 0 | 0 | 5 | 0 | 0 | 0 | 13% | 14% | 12% | 11% | 3% |
| M3057 | 0 | 1.25 | 17 | 10 | 9 | 0 | 7 | 0 | 0 | 0 | 0 | 0 | 4.5 | 14% | 14% | 6% | 17% | 4% |
| M3058 | 0 | 2 | 16 | 8 | 9 | 0 | 4 | 0 | 0 | 5 | 0 | 0 | 0 | 14% | 14% | 12% | 21% | 2% |
| M3059 | 0 | 1.25 | 17 | 3 | 8 | 0 | 9 | 0 | 0 | 0 | 0 | 0 | 4.5 | 14% | 14% | 6% | 9% | 2% |
| M3060 | 0 | 1.25 | 17 | 0 | 8 | 0 | 8 | 0 | 0 | 0 | 0 | 0 | 4.5 | 15% | 14% | 6% | 26% | 1% |
| M3061 | 0 | 1.25 | 17 | 6 | 8 | 0 | 10 | 0 | 0 | 0 | 0 | 0 | 4.5 | 14% | 14% | 6% | 0% | 5% |
| M3062 | 0 | 1.25 | 17 | 8 | 9 | 0 | 6 | 0 | 0 | 0 | 0 | 0 | 4.5 | 15% | 14% | 6% | 26% | 3% |
| M3063 | 0 | 1.25 | 17 | 6 | 9 | 0 | 5 | 0 | 0 | 0 | 0 | 0 | 4.5 | 15% | 14% | 6% | 38% | 3% |
| M3064 | 0 | 1.25 | 17 | 2 | 8 | 0 | 9 | 0 | 0 | 0 | 0 | 0 | 4.5 | 14% | 14% | 6% | 11% | 1% |
| M3065 | 0 | 1.25 | 17 | 5 | 8 | 0 | 10 | 0 | 0 | 0 | 0 | 0 | 4.5 | 14% | 14% | 6% | 0% | 5% |
| M3066 | 0 | 2 | 16 | 6 | 9 | 0 | 3 | 0 | 0 | 5 | 0 | 0 | 0 | 14% | 14% | 12% | 34% | 2% |
| M3067 | 1.6 | 0.8 | 15 | 1 | 1 | 3.5 | 0 | 0.5 | 0 | 0.5 | 0.5 | 0 | 0 | 9% | 14% | 5% | 37% | 0% |
| M3068 | 0.8 | 1 | 14 | 1 | 1 | 3.5 | 0 | 0.5 | 0 | 0.5 | 0.5 | 0 | 0 | 10% | 14% | 5% | 24% | 0% |
| M3069 | 0 | 1.25 | 17 | 1 | 8 | 0 | 9 | 0 | 0 | 0 | 0 | 0 | 4.5 | 15% | 14% | 6% | 13% | 1% |
| M3070 | 0 | 2 | 16 | 9 | 9 | 0 | 5 | 0 | 0 | 5 | 0 | 0 | 0 | 14% | 14% | 12% | 11% | 2% |
| M3071 | 0 | 1.25 | 17 | 4 | 8 | 0 | 10 | 0 | 0 | 0 | 0 | 0 | 4.5 | 14% | 14% | 6% | 0% | 5% |
| M3072 | 0 | 1.25 | 17 | 0 | 8 | 0 | 9 | 0 | 0 | 0 | 0 | 0 | 4.5 | 15% | 14% | 6% | 15% | 1% |
| M3073 | 0 | 2 | 16 | 7 | 9 | 0 | 4 | 0 | 0 | 5 | 0 | 0 | 0 | 14% | 14% | 12% | 22% | 2% |
| M3074 | 0 | 1.25 | 17 | 3 | 8 | 0 | 10 | 0 | 0 | 0 | 0 | 0 | 4.5 | 14% | 14% | 6% | 0% | 2% |
| M3075 | 0 | 1.25 | 17 | 2 | 8 | 0 | 10 | 0 | 0 | 0 | 0 | 0 | 4.5 | 14% | 14% | 6% | 1% | 2% |
| M3076 | 0 | 1.25 | 17 | 1 | 8 | 0 | 10 | 0 | 0 | 0 | 0 | 0 | 4.5 | 14% | 14% | 6% | 3% | 2% |
| M3077 | 0 | 1.25 | 17 | 0 | 8 | 0 | 10 | 0 | 0 | 0 | 0 | 0 | 4.5 | 14% | 14% | 6% | 5% | 2% |
| M3078 | 0 | 2 | 16 | 5 | 9 | 0 | 3 | 0 | 0 | 5 | 0 | 0 | 0 | 14% | 14% | 12% | 34% | 1% |
| M3079 | 0 | 2.2 | 19.4 | 1.25 | 1 | 0 | 0 | 0 | 0 | 5 | 0 | 0 | 0 | 14% | 14% | 12% | 24% | 2% |
| M3080 | 0 | 2 | 16 | 8 | 9 | 0 | 5 | 0 | 0 | 5 | 0 | 0 | 0 | 14% | 14% | 12% | 11% | 2% |
| M3081 | 0 | 2 | 16 | 10 | 9 | 0 | 6 | 0 | 0 | 5 | 0 | 0 | 0 | 13% | 14% | 12% | 1% | 3% |
| M3082 | 0 | 1.25 | 17 | 9 | 9 | 0 | 7 | 0 | 0 | 0 | 0 | 0 | 4.5 | 15% | 14% | 6% | 17% | 4% |
| M3083 | 0 | 2 | 16 | 6 | 9 | 0 | 4 | 0 | 0 | 5 | 0 | 0 | 0 | 14% | 14% | 12% | 22% | 2% |
| M3084 | 0 | 1.25 | 17 | 7 | 9 | 0 | 6 | 0 | 0 | 0 | 0 | 0 | 4.5 | 15% | 14% | 6% | 27% | 3% |
| M3085 | 0 | 1.25 | 17 | 5 | 9 | 0 | 5 | 0 | 0 | 0 | 0 | 0 | 4.5 | 15% | 14% | 6% | 39% | 3% |
| M3086 | 0 | 2 | 16 | 9 | 9 | 0 | 6 | 0 | 0 | 5 | 0 | 0 | 0 | 13% | 14% | 12% | 2% | 3% |
| M3087 | 0 | 2 | 16 | 7 | 9 | 0 | 5 | 0 | 0 | 5 | 0 | 0 | 0 | 14% | 14% | 12% | 11% | 2% |
| M3088 | 0 | 2 | 16 | 4 | 9 | 0 | 3 | 0 | 0 | 5 | 0 | 0 | 0 | 14% | 14% | 12% | 35% | 1% |
| M3089 | 0 | 2 | 16 | 5 | 9 | 0 | 4 | 0 | 0 | 5 | 0 | 0 | 0 | 14% | 14% | 12% | 23% | 2% |
| M3090 | 0 | 3.5 | 19 | 1.25 | 1 | 2 | 0 | 1 | 0 | 9 | 0 | 0 | 0 | 14% | 14% | 22% | 21% | 5% |
| M3091 | 0 | 1.25 | 17 | 10 | 10 | 0 | 6 | 0 | 0 | 0 | 0 | 0 | 4.5 | 14% | 14% | 6% | 32% | 3% |
| M3092 | 0 | 2 | 16 | 8 | 9 | 0 | 6 | 0 | 0 | 5 | 0 | 0 | 0 | 13% | 14% | 12% | 2% | 3% |
| M3093 | 0 | 2 | 16 | 6 | 9 | 0 | 5 | 0 | 0 | 5 | 0 | 0 | 0 | 14% | 14% | 12% | 12% | 2% |
| M3094 | 0 | 2 | 16 | 10 | 9 | 0 | 7 | 0 | 0 | 5 | 0 | 0 | 0 | 13% | 14% | 12% | 0% | 3% |
| M3095 | 0 | 2.2 | 19.6 | 1.25 | 1 | 0 | 0 | 0 | 0 | 5 | 0 | 0 | 0 | 14% | 14% | 12% | 28% | 2% |
| M3096 | 0 | 1.25 | 17 | 10 | 9 | 0 | 8 | 0 | 0 | 0 | 0 | 0 | 4.5 | 15% | 14% | 6% | 9% | 4% |
| M3097 | 0 | 2 | 16 | 3 | 9 | 0 | 3 | 0 | 0 | 5 | 0 | 0 | 0 | 14% | 14% | 12% | 36% | 1% |
| M3098 | 0 | 2 | 16 | 4 | 9 | 0 | 4 | 0 | 0 | 5 | 0 | 0 | 0 | 14% | 14% | 12% | 26% | 1% |
| M3099 | 0 | 1.25 | 17 | 8 | 9 | 0 | 7 | 0 | 0 | 0 | 0 | 0 | 4.5 | 15% | 14% | 6% | 18% | 3% |
| M3100 | 0 | 1.25 | 17 | 6 | 9 | 0 | 6 | 0 | 0 | 0 | 0 | 0 | 4.5 | 15% | 14% | 6% | 30% | 3% |
| M3101 | 0 | 2.3 | 17.6 | 1.25 | 1 | 0 | 0 | 0 | 0 | 5 | 0 | 0 | 0 | 12% | 14% | 12% | 0% | 3% |
| M3102 | 0 | 2 | 16 | 7 | 9 | 0 | 6 | 0 | 0 | 5 | 0 | 0 | 0 | 13% | 14% | 12% | 2% | 2% |
| M3103 | 0 | 2 | 16 | 5 | 9 | 0 | 5 | 0 | 0 | 5 | 0 | 0 | 0 | 14% | 14% | 12% | 17% | 2% |
| M3104 | 0 | 2 | 16 | 9 | 9 | 0 | 7 | 0 | 0 | 5 | 0 | 0 | 0 | 13% | 14% | 12% | 0% | 3% |
| M3105 | 0 | 2 | 16 | 3 | 9 | 0 | 4 | 0 | 0 | 5 | 0 | 0 | 0 | 14% | 14% | 12% | 30% | 1% |
| M3106 | 0 | 2 | 16 | 6 | 9 | 0 | 6 | 0 | 0 | 5 | 0 | 0 | 0 | 13% | 14% | 12% | 6% | 2% |
| M3107 | 0 | 2 | 16 | 2 | 9 | 0 | 3 | 0 | 0 | 5 | 0 | 0 | 0 | 14% | 14% | 12% | 37% | 0% |
| M3108 | 0 | 2 | 16 | 4 | 9 | 0 | 5 | 0 | 0 | 5 | 0 | 0 | 0 | 14% | 14% | 12% | 21% | 2% |
| M3109 | 0 | 2 | 16 | 8 | 9 | 0 | 7 | 0 | 0 | 5 | 0 | 0 | 0 | 13% | 14% | 12% | 0% | 3% |
| M3110 | 0 | 2 | 16 | 10 | 10 | 0 | 3 | 0 | 0 | 5 | 0 | 0 | 0 | 14% | 14% | 12% | 36% | 2% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M3111 | 0 | 2 | 16 | 10 | 9 | 0 | 8 | 0 | 0 | 5 | 0 | 0 | 0 | 13% | 14% | 12% | 0% | 4% |
| M3112 | 0 | 2 | 16 | 5 | 9 | 0 | 6 | 0 | 0 | 5 | 0 | 0 | 0 | 13% | 14% | 12% | 11% | 2% |
| M3113 | 0 | 2 | 16 | 7 | 9 | 0 | 7 | 0 | 0 | 5 | 0 | 0 | 0 | 13% | 14% | 12% | 0% | 3% |
| M3114 | 0 | 2 | 16 | 2 | 9 | 0 | 4 | 0 | 0 | 5 | 0 | 0 | 0 | 14% | 14% | 12% | 33% | 0% |
| M3115 | 0.8 | 1 | 15 | 1 | 1 | 3.5 | 0 | 0.5 | 0 | 0.5 | 0.5 | 0 | 0 | 11% | 14% | 5% | 29% | 0% |
| M3116 | 0 | 2 | 16 | 3 | 9 | 0 | 5 | 0 | 0 | 5 | 0 | 0 | 0 | 14% | 14% | 12% | 25% | 2% |
| M3117 | 0 | 2.2 | 19.8 | 1.25 | 1 | 0 | 0 | 0 | 0 | 5 | 0 | 0 | 0 | 15% | 14% | 11% | 31% | 3% |
| M3118 | 0 | 1.25 | 17 | 9 | 10 | 0 | 6 | 0 | 0 | 0 | 0 | 0 | 4.5 | 14% | 14% | 6% | 32% | 3% |
| M3119 | 0 | 1.25 | 17 | 9 | 9 | 0 | 8 | 0 | 0 | 0 | 0 | 0 | 4.5 | 15% | 14% | 6% | 9% | 4% |
| M3120 | 0 | 2 | 16 | 9 | 9 | 0 | 8 | 0 | 0 | 5 | 0 | 0 | 0 | 13% | 14% | 12% | 0% | 3% |
| M3121 | 0 | 1.25 | 17 | 5 | 9 | 0 | 6 | 0 | 0 | 0 | 0 | 0 | 4.5 | 15% | 14% | 6% | 34% | 3% |
| M3122 | 0 | 2 | 16 | 4 | 9 | 0 | 6 | 0 | 0 | 5 | 0 | 0 | 0 | 14% | 14% | 12% | 15% | 2% |
| M3123 | 0 | 1.25 | 17 | 7 | 9 | 0 | 7 | 0 | 0 | 0 | 0 | 0 | 4.5 | 15% | 14% | 6% | 21% | 3% |
| M3124 | 0 | 2 | 16 | 6 | 9 | 0 | 7 | 0 | 0 | 5 | 0 | 0 | 0 | 13% | 14% | 12% | 0% | 3% |
| M3125 | 0 | 2 | 16 | 2 | 9 | 0 | 5 | 0 | 0 | 5 | 0 | 0 | 0 | 14% | 14% | 12% | 29% | 0% |
| M3126 | 0 | 2 | 16 | 1 | 9 | 0 | 4 | 0 | 0 | 5 | 0 | 0 | 0 | 14% | 14% | 12% | 37% | 0% |
| M3127 | 0 | 2 | 16 | 3 | 9 | 0 | 6 | 0 | 0 | 5 | 0 | 0 | 0 | 14% | 14% | 12% | 19% | 2% |
| M3128 | 0 | 2 | 16 | 8 | 9 | 0 | 8 | 0 | 0 | 5 | 0 | 0 | 0 | 13% | 14% | 12% | 0% | 3% |
| M3129 | 0 | 2 | 16 | 5 | 9 | 0 | 7 | 0 | 0 | 5 | 0 | 0 | 0 | 13% | 14% | 12% | 2% | 2% |
| M3130 | 0 | 2.3 | 17.8 | 1.25 | 1 | 0 | 0 | 0 | 0 | 5 | 0 | 0 | 0 | 13% | 14% | 12% | 0% | 3% |
| M3131 | 0 | 2 | 16 | 1 | 9 | 0 | 5 | 0 | 0 | 5 | 0 | 0 | 0 | 14% | 14% | 12% | 33% | 0% |
| M3132 | 0 | 2 | 16 | 2 | 9 | 0 | 6 | 0 | 0 | 5 | 0 | 0 | 0 | 14% | 14% | 12% | 22% | 0% |
| M3133 | 0 | 2 | 16 | 4 | 9 | 0 | 7 | 0 | 0 | 5 | 0 | 0 | 0 | 13% | 14% | 12% | 4% | 2% |
| M3134 | 0 | 2 | 16 | 7 | 9 | 0 | 8 | 0 | 0 | 5 | 0 | 0 | 0 | 13% | 14% | 12% | 0% | 3% |
| M3135 | 0 | 2 | 16 | 10 | 9 | 0 | 9 | 0 | 0 | 5 | 0 | 0 | 0 | 13% | 14% | 12% | 0% | 4% |
| M3136 | 0 | 2 | 16 | 3 | 9 | 0 | 7 | 0 | 0 | 5 | 0 | 0 | 0 | 13% | 14% | 12% | 7% | 2% |
| M3137 | 0 | 2 | 16 | 1 | 9 | 0 | 6 | 0 | 0 | 5 | 0 | 0 | 0 | 14% | 14% | 12% | 25% | 0% |
| M3138 | 0 | 2 | 16 | 6 | 9 | 0 | 8 | 0 | 0 | 5 | 0 | 0 | 0 | 13% | 14% | 12% | 0% | 3% |
| M3139 | 0 | 2 | 16 | 0 | 9 | 0 | 5 | 0 | 0 | 5 | 0 | 0 | 0 | 14% | 14% | 12% | 37% | 0% |
| M3140 | 0 | 2 | 16 | 2 | 9 | 0 | 7 | 0 | 0 | 5 | 0 | 0 | 0 | 14% | 14% | 12% | 9% | 0% |
| M3141 | 0 | 2 | 16 | 9 | 9 | 0 | 9 | 0 | 0 | 5 | 0 | 0 | 0 | 13% | 14% | 12% | 0% | 4% |
| M3142 | 0 | 2.2 | 20 | 1 | 1 | 0 | 0 | 0 | 0 | 5 | 0 | 0 | 0 | 15% | 14% | 11% | 34% | 3% |
| M3143 | 0 | 2 | 16 | 5 | 9 | 0 | 8 | 0 | 0 | 5 | 0 | 0 | 0 | 13% | 14% | 12% | 0% | 3% |
| M3144 | 0 | 2 | 16 | 0 | 9 | 0 | 6 | 0 | 0 | 5 | 0 | 0 | 0 | 14% | 14% | 12% | 28% | 0% |
| M3145 | 0 | 2 | 16 | 1 | 9 | 0 | 7 | 0 | 0 | 5 | 0 | 0 | 0 | 14% | 14% | 12% | 12% | 0% |
| M3146 | 0 | 2 | 16 | 0 | 9 | 0 | 10 | 0 | 0 | 5 | 0 | 0 | 0 | 13% | 14% | 12% | 0% | 0% |
| M3147 | 0 | 1.25 | 17 | 8 | 9 | 0 | 8 | 0 | 0 | 0 | 0 | 0 | 4.5 | 15% | 14% | 6% | 11% | 4% |
| M3148 | 0 | 1.25 | 17 | 10 | 9 | 0 | 9 | 0 | 0 | 0 | 0 | 0 | 4.5 | 15% | 14% | 6% | 2% | 4% |
| M3149 | 0 | 1.25 | 17 | 6 | 9 | 0 | 7 | 0 | 0 | 0 | 0 | 0 | 4.5 | 15% | 14% | 6% | 25% | 3% |
| M3150 | 0 | 1.25 | 17 | 10 | 10 | 0 | 7 | 0 | 0 | 0 | 0 | 0 | 4.5 | 14% | 14% | 6% | 23% | 3% |
| M3151 | 0 | 2 | 16 | 0 | 9 | 0 | 7 | 0 | 0 | 5 | 0 | 0 | 0 | 14% | 14% | 12% | 16% | 0% |
| M3152 | 0 | 2 | 16 | 0 | 9 | 0 | 9 | 0 | 0 | 5 | 0 | 0 | 0 | 13% | 14% | 12% | 0% | 0% |
| M3153 | 0 | 2.2 | 20 | 1.25 | 1 | 0 | 0 | 0 | 0 | 5 | 0 | 0 | 0 | 15% | 14% | 11% | 34% | 3% |
| M3154 | 0 | 2 | 16 | 4 | 9 | 0 | 8 | 0 | 0 | 5 | 0 | 0 | 0 | 13% | 14% | 12% | 0% | 3% |
| M3155 | 0 | 1.25 | 17 | 4 | 9 | 0 | 6 | 0 | 0 | 0 | 0 | 0 | 4.5 | 15% | 14% | 6% | 37% | 3% |
| M3156 | 0 | 2 | 16 | 0 | 9 | 0 | 8 | 0 | 0 | 5 | 0 | 0 | 0 | 14% | 14% | 12% | 4% | 0% |
| M3157 | 0 | 2 | 16 | 8 | 9 | 0 | 9 | 0 | 0 | 5 | 0 | 0 | 0 | 13% | 14% | 12% | 0% | 3% |
| M3158 | 0 | 2 | 16 | 3 | 9 | 0 | 8 | 0 | 0 | 5 | 0 | 0 | 0 | 13% | 14% | 12% | 0% | 2% |
| M3159 | 0 | 2 | 16 | 1 | 9 | 0 | 8 | 0 | 0 | 5 | 0 | 0 | 0 | 13% | 14% | 12% | 1% | 0% |
| M3160 | 0 | 2 | 16 | 2 | 9 | 0 | 8 | 0 | 0 | 5 | 0 | 0 | 0 | 13% | 14% | 12% | 0% | 0% |
| M3161 | 0 | 2 | 16 | 1 | 9 | 0 | 9 | 0 | 0 | 5 | 0 | 0 | 0 | 13% | 14% | 12% | 0% | 0% |
| M3162 | 0 | 2 | 16 | 1 | 9 | 0 | 10 | 0 | 0 | 5 | 0 | 0 | 0 | 13% | 14% | 12% | 0% | 1% |
| M3163 | 0 | 2 | 16 | 7 | 9 | 0 | 9 | 0 | 0 | 5 | 0 | 0 | 0 | 13% | 14% | 12% | 0% | 3% |
| M3164 | 0 | 1.25 | 17 | 8 | 10 | 0 | 6 | 0 | 0 | 0 | 0 | 0 | 4.5 | 15% | 14% | 6% | 33% | 3% |
| M3165 | 0 | 2 | 16 | 2 | 9 | 0 | 9 | 0 | 0 | 5 | 0 | 0 | 0 | 13% | 14% | 12% | 0% | 0% |
| M3166 | 0 | 2 | 16 | 6 | 9 | 0 | 9 | 0 | 0 | 5 | 0 | 0 | 0 | 13% | 14% | 12% | 0% | 3% |
| M3167 | 0 | 2 | 16 | 3 | 9 | 0 | 9 | 0 | 0 | 5 | 0 | 0 | 0 | 13% | 14% | 12% | 0% | 3% |
| M3168 | 0 | 2 | 16 | 10 | 9 | 0 | 10 | 0 | 0 | 5 | 0 | 0 | 0 | 13% | 14% | 12% | 0% | 4% |
| M3169 | 0 | 2 | 16 | 5 | 9 | 0 | 9 | 0 | 0 | 5 | 0 | 0 | 0 | 13% | 14% | 12% | 0% | 3% |
| M3170 | 0 | 1.25 | 17 | 5 | 9 | 0 | 7 | 0 | 0 | 0 | 0 | 0 | 4.5 | 15% | 14% | 6% | 29% | 3% |
| M3171 | 0 | 2 | 16 | 4 | 9 | 0 | 9 | 0 | 0 | 5 | 0 | 0 | 0 | 13% | 14% | 12% | 0% | 3% |
| M3172 | 0 | 1.25 | 17 | 7 | 9 | 0 | 8 | 0 | 0 | 0 | 0 | 0 | 4.5 | 15% | 14% | 6% | 15% | 4% |
| M3173 | 0 | 1.25 | 17 | 9 | 9 | 0 | 9 | 0 | 0 | 0 | 0 | 0 | 4.5 | 15% | 14% | 6% | 2% | 4% |
| M3174 | 0 | 2 | 16 | 2 | 9 | 0 | 10 | 0 | 0 | 5 | 0 | 0 | 0 | 13% | 14% | 12% | 0% | 1% |
| M3175 | 0 | 2.4 | 17.8 | 1.25 | 1 | 0 | 0 | 0 | 0 | 5 | 0 | 0 | 0 | 12% | 14% | 12% | 0% | 4% |
| M3176 | 0 | 2 | 16 | 9 | 9 | 0 | 10 | 0 | 0 | 5 | 0 | 0 | 0 | 13% | 14% | 12% | 0% | 4% |
| M3177 | 0 | 2 | 16 | 3 | 9 | 0 | 10 | 0 | 0 | 5 | 0 | 0 | 0 | 13% | 14% | 12% | 0% | 1% |
| M3178 | 0 | 2.2 | 20 | 2.5 | 1 | 0 | 0 | 0 | 0 | 5 | 0 | 0 | 0 | 15% | 14% | 11% | 30% | 3% |
| M3179 | 0 | 2.3 | 18 | 1 | 1 | 0 | 0 | 0 | 0 | 5 | 0 | 0 | 0 | 13% | 14% | 12% | 0% | 3% |
| M3180 | 0 | 2 | 16 | 8 | 9 | 0 | 10 | 0 | 0 | 5 | 0 | 0 | 0 | 13% | 14% | 12% | 0% | 4% |
| M3181 | 0 | 2 | 16 | 9 | 10 | 0 | 3 | 0 | 0 | 5 | 0 | 0 | 0 | 14% | 14% | 12% | 38% | 1% |
| M3182 | 0 | 2 | 16 | 4 | 9 | 0 | 10 | 0 | 0 | 5 | 0 | 0 | 0 | 13% | 14% | 12% | 0% | 3% |
| M3183 | 0 | 2 | 16 | 7 | 9 | 0 | 10 | 0 | 0 | 5 | 0 | 0 | 0 | 13% | 14% | 12% | 0% | 4% |
| M3184 | 0 | 2 | 16 | 5 | 9 | 0 | 10 | 0 | 0 | 5 | 0 | 0 | 0 | 13% | 14% | 12% | 0% | 3% |
| M3185 | 0 | 1.25 | 17 | 4 | 9 | 0 | 7 | 0 | 0 | 0 | 0 | 0 | 4.5 | 15% | 14% | 6% | 32% | 3% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M3186 | 0 | 1.25 | 17 | 6 | 9 | 0 | 8 | 0 | 0 | 0 | 0 | 0 | 4.5 | 15% | 14% | 6% | 19% | 4% |
| M3187 | 0 | 2 | 16 | 6 | 9 | 0 | 10 | 0 | 0 | 5 | 0 | 0 | 0 | 13% | 14% | 12% | 0% | 3% |
| M3188 | 0 | 1.25 | 17 | 8 | 9 | 0 | 9 | 0 | 0 | 0 | 0 | 0 | 4.5 | 15% | 14% | 6% | 4% | 4% |
| M3189 | 0 | 2.3 | 18 | 1.25 | 1 | 0 | 0 | 0 | 0 | 5 | 0 | 0 | 0 | 13% | 14% | 12% | 0% | 3% |
| M3190 | 0 | 1.25 | 17 | 10 | 9 | 0 | 10 | 0 | 0 | 0 | 0 | 0 | 4.5 | 15% | 14% | 6% | 0% | 5% |
| M3191 | 1.4 | 0.8 | 14 | 1 | 1 | 3.5 | 0 | 0.5 | 0 | 0.5 | 0.5 | 0 | 0 | 8% | 14% | 5% | 30% | 0% |
| M3192 | 0 | 2.4 | 16 | 7 | 1 | 0 | 0 | 0 | 0 | 5 | 0 | 0 | 0 | 11% | 14% | 12% | 0% | 4% |
| M3193 | 0 | 1.25 | 17 | 3 | 9 | 0 | 7 | 0 | 0 | 0 | 0 | 0 | 4.5 | 15% | 14% | 6% | 36% | 3% |
| M3194 | 0 | 1.25 | 17 | 5 | 9 | 0 | 8 | 0 | 0 | 0 | 0 | 0 | 4.5 | 15% | 14% | 6% | 23% | 3% |
| M3195 | 0 | 3 | 19 | 1.25 | 1 | 2 | 0 | 1 | 0 | 7 | 0 | 0 | 0 | 14% | 14% | 18% | 18% | 5% |
| M3196 | 0 | 1.25 | 17 | 9 | 10 | 0 | 7 | 0 | 0 | 0 | 0 | 0 | 4.5 | 15% | 14% | 6% | 23% | 3% |
| M3197 | 0 | 1.25 | 17 | 7 | 9 | 0 | 9 | 0 | 0 | 0 | 0 | 0 | 4.5 | 15% | 14% | 6% | 9% | 4% |
| M3198 | 0.8 | 1 | 16 | 1 | 1 | 3.5 | 0 | 0.5 | 0 | 0.5 | 0.5 | 0 | 0 | 12% | 14% | 5% | 28% | 0% |
| M3199 | 0 | 1.25 | 17 | 9 | 9 | 0 | 10 | 0 | 0 | 0 | 0 | 0 | 4.5 | 15% | 14% | 6% | 0% | 5% |
| M3200 | 0 | 2.2 | 20 | 4 | 1 | 0 | 0 | 0 | 0 | 5 | 0 | 0 | 0 | 15% | 14% | 11% | 33% | 3% |
| M3201 | 0 | 1.25 | 17 | 2 | 9 | 0 | 7 | 0 | 0 | 0 | 0 | 0 | 4.5 | 15% | 14% | 6% | 39% | 0% |
| M3202 | 0 | 1.25 | 17 | 7 | 10 | 0 | 6 | 0 | 0 | 0 | 0 | 0 | 4.5 | 15% | 14% | 6% | 34% | 2% |
| M3203 | 0 | 1.25 | 17 | 4 | 9 | 0 | 8 | 0 | 0 | 0 | 0 | 0 | 4.5 | 15% | 14% | 6% | 25% | 3% |
| M3204 | 0 | 1.25 | 17 | 6 | 9 | 0 | 9 | 0 | 0 | 0 | 0 | 0 | 4.5 | 15% | 14% | 6% | 11% | 4% |
| M3205 | 0 | 2.3 | 18 | 2.5 | 1 | 0 | 0 | 0 | 0 | 5 | 0 | 0 | 0 | 13% | 14% | 12% | 7% | 3% |
| M3206 | 0 | 1.25 | 17 | 8 | 9 | 0 | 10 | 0 | 0 | 0 | 0 | 0 | 4.5 | 15% | 14% | 6% | 0% | 4% |
| M3207 | 0 | 1.25 | 17 | 3 | 9 | 0 | 8 | 0 | 0 | 0 | 0 | 0 | 4.5 | 15% | 14% | 6% | 28% | 1% |
| M3208 | 0 | 2.4 | 16 | 8.5 | 1 | 0 | 0 | 0 | 0 | 5 | 0 | 0 | 0 | 11% | 14% | 12% | 0% | 4% |
| M3209 | 0 | 1.25 | 17 | 5 | 9 | 0 | 9 | 0 | 0 | 0 | 0 | 0 | 4.5 | 15% | 14% | 6% | 13% | 4% |
| M3210 | 0 | 2.2 | 20 | 5.5 | 1 | 0 | 0 | 0 | 0 | 5 | 0 | 0 | 0 | 15% | 14% | 11% | 32% | 3% |
| M3211 | 0 | 1.25 | 17 | 7 | 9 | 0 | 10 | 0 | 0 | 0 | 0 | 0 | 4.5 | 15% | 14% | 6% | 0% | 4% |
| M3212 | 0 | 1.25 | 17 | 2 | 9 | 0 | 8 | 0 | 0 | 0 | 0 | 0 | 4.5 | 15% | 14% | 6% | 30% | 1% |
| M3213 | 0 | 1.25 | 17 | 10 | 10 | 0 | 8 | 0 | 0 | 0 | 0 | 0 | 4.5 | 15% | 14% | 6% | 14% | 3% |
| M3214 | 0 | 1.25 | 17 | 4 | 9 | 0 | 9 | 0 | 0 | 0 | 0 | 0 | 4.5 | 15% | 14% | 6% | 15% | 4% |
| M3215 | 0 | 2.3 | 18.2 | 1.25 | 1 | 0 | 0 | 0 | 0 | 5 | 0 | 0 | 0 | 13% | 14% | 12% | 4% | 3% |
| M3216 | 0 | 1.25 | 17 | 1 | 9 | 0 | 8 | 0 | 0 | 0 | 0 | 0 | 4.5 | 15% | 14% | 6% | 33% | 0% |
| M3217 | 0 | 1.25 | 17 | 6 | 9 | 0 | 10 | 0 | 0 | 0 | 0 | 0 | 4.5 | 15% | 14% | 6% | 1% | 4% |
| M3218 | 0 | 1.25 | 17 | 3 | 9 | 0 | 9 | 0 | 0 | 0 | 0 | 0 | 4.5 | 15% | 14% | 6% | 17% | 1% |
| M3219 | 0 | 1.25 | 17 | 8 | 10 | 0 | 7 | 0 | 0 | 0 | 0 | 0 | 4.5 | 15% | 14% | 6% | 23% | 3% |
| M3220 | 1 | 0.8 | 12 | 1 | 1 | 3.5 | 0 | 0.5 | 0 | 0.5 | 0.5 | 0 | 0 | 8% | 15% | 5% | 16% | 0% |
| M3221 | 0 | 1.25 | 17 | 0 | 9 | 0 | 8 | 0 | 0 | 0 | 0 | 0 | 4.5 | 15% | 15% | 6% | 36% | 0% |
| M3222 | 0 | 2.3 | 18 | 4 | 1 | 0 | 0 | 0 | 0 | 5 | 0 | 0 | 0 | 13% | 15% | 12% | 3% | 4% |
| M3223 | 0 | 2.4 | 16 | 10 | 1 | 0 | 0 | 0 | 0 | 5 | 0 | 0 | 0 | 11% | 15% | 12% | 0% | 4% |
| M3224 | 0 | 2 | 16 | 10 | 10 | 0 | 4 | 0 | 0 | 5 | 0 | 0 | 0 | 14% | 15% | 12% | 28% | 2% |
| M3225 | 0 | 1.25 | 17 | 5 | 9 | 0 | 10 | 0 | 0 | 0 | 0 | 0 | 4.5 | 15% | 15% | 6% | 3% | 4% |
| M3226 | 1 | 0.8 | 13 | 1 | 1 | 3.5 | 0 | 0.5 | 0 | 0.5 | 0.5 | 0 | 0 | 9% | 15% | 5% | 38% | 0% |
| M3227 | 0 | 1.25 | 17 | 2 | 9 | 0 | 9 | 0 | 0 | 0 | 0 | 0 | 4.5 | 15% | 15% | 6% | 19% | 1% |
| M3228 | 0 | 1.25 | 17 | 6 | 10 | 0 | 6 | 0 | 0 | 0 | 0 | 0 | 4.5 | 15% | 15% | 6% | 34% | 2% |
| M3229 | 0 | 1.25 | 17 | 1 | 9 | 0 | 9 | 0 | 0 | 0 | 0 | 0 | 4.5 | 15% | 15% | 6% | 22% | 1% |
| M3230 | 0 | 1.25 | 17 | 4 | 9 | 0 | 10 | 0 | 0 | 0 | 0 | 0 | 4.5 | 15% | 15% | 6% | 5% | 4% |
| M3231 | 0 | 1.25 | 17 | 0 | 9 | 0 | 9 | 0 | 0 | 0 | 0 | 0 | 4.5 | 15% | 15% | 6% | 24% | 1% |
| M3232 | 0 | 1.25 | 17 | 3 | 9 | 0 | 10 | 0 | 0 | 0 | 0 | 0 | 4.5 | 15% | 15% | 6% | 7% | 1% |
| M3233 | 0 | 1.25 | 17 | 2 | 9 | 0 | 10 | 0 | 0 | 0 | 0 | 0 | 4.5 | 15% | 15% | 6% | 9% | 1% |
| M3234 | 0 | 1.25 | 17 | 1 | 9 | 0 | 10 | 0 | 0 | 0 | 0 | 0 | 4.5 | 15% | 15% | 6% | 11% | 1% |
| M3235 | 0 | 2 | 16 | 9 | 10 | 0 | 4 | 0 | 0 | 5 | 0 | 0 | 0 | 14% | 15% | 12% | 28% | 2% |
| M3236 | 0 | 2.3 | 18 | 5.5 | 1 | 0 | 0 | 0 | 0 | 5 | 0 | 0 | 0 | 13% | 15% | 12% | 5% | 4% |
| M3237 | 0 | 1.25 | 17 | 0 | 9 | 0 | 10 | 0 | 0 | 0 | 0 | 0 | 4.5 | 15% | 15% | 6% | 14% | 1% |
| M3238 | 0 | 1.25 | 17 | 9 | 10 | 0 | 8 | 0 | 0 | 0 | 0 | 0 | 4.5 | 15% | 15% | 6% | 14% | 3% |
| M3239 | 0 | 2.5 | 19 | 1.25 | 1 | 2 | 0 | 1 | 0 | 5 | 0 | 0 | 0 | 14% | 15% | 13% | 15% | 5% |
| M3240 | 0 | 2.4 | 18 | 1 | 1 | 0 | 0 | 0 | 0 | 5 | 0 | 0 | 0 | 12% | 15% | 12% | 0% | 4% |
| M3241 | 0 | 2.3 | 18.4 | 1.25 | 1 | 0 | 0 | 0 | 0 | 5 | 0 | 0 | 0 | 13% | 15% | 12% | 8% | 3% |
| M3242 | 0 | 1.25 | 17 | 7 | 10 | 0 | 7 | 0 | 0 | 0 | 0 | 0 | 4.5 | 15% | 15% | 6% | 24% | 3% |
| M3243 | 0 | 1.25 | 17 | 5 | 10 | 0 | 6 | 0 | 0 | 0 | 0 | 0 | 4.5 | 15% | 15% | 6% | 35% | 2% |
| M3244 | 0 | 2 | 16 | 10 | 10 | 0 | 5 | 0 | 0 | 5 | 0 | 0 | 0 | 14% | 15% | 12% | 17% | 2% |
| M3245 | 0 | 2.3 | 18 | 7 | 1 | 0 | 0 | 0 | 0 | 5 | 0 | 0 | 0 | 13% | 15% | 12% | 8% | 4% |
| M3246 | 0 | 2 | 16 | 8 | 10 | 0 | 4 | 0 | 0 | 5 | 0 | 0 | 0 | 14% | 15% | 12% | 29% | 2% |
| M3247 | 0 | 1.25 | 17 | 10 | 10 | 0 | 9 | 0 | 0 | 0 | 0 | 0 | 4.5 | 15% | 15% | 6% | 7% | 4% |
| M3248 | 0 | 2 | 16 | 9 | 10 | 0 | 5 | 0 | 0 | 5 | 0 | 0 | 0 | 14% | 15% | 12% | 17% | 2% |
| M3249 | 0 | 1.25 | 17 | 8 | 10 | 0 | 8 | 0 | 0 | 0 | 0 | 0 | 4.5 | 15% | 15% | 6% | 15% | 3% |
| M3250 | 0 | 2.3 | 18 | 8.5 | 1 | 0 | 0 | 0 | 0 | 5 | 0 | 0 | 0 | 13% | 15% | 12% | 4% | 4% |
| M3251 | 0 | 2 | 16 | 7 | 10 | 0 | 4 | 0 | 0 | 5 | 0 | 0 | 0 | 14% | 15% | 12% | 30% | 1% |
| M3252 | 0 | 1.25 | 17 | 6 | 10 | 0 | 7 | 0 | 0 | 0 | 0 | 0 | 4.5 | 15% | 15% | 6% | 25% | 2% |
| M3253 | 0 | 1.25 | 17 | 4 | 10 | 0 | 6 | 0 | 0 | 0 | 0 | 0 | 4.5 | 15% | 15% | 6% | 37% | 2% |
| M3254 | 0 | 2 | 16 | 10 | 10 | 0 | 6 | 0 | 0 | 5 | 0 | 0 | 0 | 14% | 15% | 12% | 7% | 2% |
| M3255 | 0 | 2.3 | 18.6 | 1.25 | 1 | 0 | 0 | 0 | 0 | 5 | 0 | 0 | 0 | 13% | 15% | 12% | 12% | 3% |
| M3256 | 0 | 2 | 16 | 8 | 10 | 0 | 5 | 0 | 0 | 5 | 0 | 0 | 0 | 14% | 15% | 12% | 18% | 2% |
| M3257 | 0 | 2.3 | 18 | 10 | 1 | 0 | 0 | 0 | 0 | 5 | 0 | 0 | 0 | 13% | 15% | 11% | 12% | 4% |
| M3258 | 0 | 2 | 16 | 6 | 10 | 0 | 4 | 0 | 0 | 5 | 0 | 0 | 0 | 14% | 15% | 12% | 31% | 1% |
| M3259 | 0 | 1.25 | 17 | 9 | 10 | 0 | 9 | 0 | 0 | 0 | 0 | 0 | 4.5 | 15% | 15% | 6% | 7% | 4% |
| M3260 | 0 | 2 | 16 | 9 | 10 | 0 | 6 | 0 | 0 | 5 | 0 | 0 | 0 | 14% | 15% | 12% | 8% | 2% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M3261 | 0 | 2 | 16 | 7 | 10 | 0 | 5 | 0 | 0 | 5 | 0 | 0 | 0 | 14% | 15% | 12% | 19% | 2% |
| M3262 | 0 | 1.25 | 17 | 7 | 10 | 0 | 8 | 0 | 0 | 0 | 0 | 0 | 4.5 | 15% | 15% | 6% | 15% | 3% |
| M3263 | 0 | 1.25 | 17 | 3 | 10 | 0 | 6 | 0 | 0 | 0 | 0 | 0 | 4.5 | 15% | 15% | 6% | 40% | 2% |
| M3264 | 0 | 1.25 | 17 | 5 | 10 | 0 | 7 | 0 | 0 | 0 | 0 | 0 | 4.5 | 15% | 15% | 6% | 28% | 2% |
| M3265 | 1.2 | 0.8 | 13 | 1 | 1 | 3.5 | 0 | 0.5 | 0 | 0.5 | 0.5 | 0 | 0 | 8% | 15% | 5% | 23% | 0% |
| M3266 | 0 | 2 | 16 | 5 | 10 | 0 | 4 | 0 | 0 | 5 | 0 | 0 | 0 | 14% | 15% | 12% | 32% | 1% |
| M3267 | 0 | 2.4 | 18 | 1.25 | 1 | 0 | 0 | 0 | 0 | 5 | 0 | 0 | 0 | 12% | 15% | 12% | 0% | 4% |
| M3268 | 0 | 2 | 16 | 8 | 10 | 0 | 6 | 0 | 0 | 5 | 0 | 0 | 0 | 14% | 15% | 12% | 9% | 2% |
| M3269 | 0 | 2 | 16 | 10 | 10 | 0 | 7 | 0 | 0 | 5 | 0 | 0 | 0 | 14% | 15% | 12% | 0% | 3% |
| M3270 | 0 | 2 | 16 | 6 | 10 | 0 | 5 | 0 | 0 | 5 | 0 | 0 | 0 | 14% | 15% | 12% | 20% | 2% |
| M3271 | 0 | 1.25 | 17 | 10 | 10 | 0 | 10 | 0 | 0 | 0 | 0 | 0 | 4.5 | 15% | 15% | 6% | 0% | 4% |
| M3272 | 0 | 2.3 | 18.8 | 1.25 | 1 | 0 | 0 | 0 | 0 | 5 | 0 | 0 | 0 | 13% | 15% | 12% | 14% | 3% |
| M3273 | 0 | 2 | 16 | 4 | 10 | 0 | 4 | 0 | 0 | 5 | 0 | 0 | 0 | 14% | 15% | 12% | 33% | 1% |
| M3274 | 0 | 2 | 16 | 7 | 10 | 0 | 6 | 0 | 0 | 5 | 0 | 0 | 0 | 14% | 15% | 12% | 9% | 2% |
| M3275 | 0 | 2 | 16 | 9 | 10 | 0 | 7 | 0 | 0 | 5 | 0 | 0 | 0 | 14% | 15% | 12% | 0% | 3% |
| M3276 | 0 | 1.25 | 17 | 8 | 10 | 0 | 9 | 0 | 0 | 0 | 0 | 0 | 4.5 | 15% | 15% | 6% | 7% | 3% |
| M3277 | 0 | 2 | 16 | 5 | 10 | 0 | 5 | 0 | 0 | 5 | 0 | 0 | 0 | 14% | 15% | 12% | 21% | 1% |
| M3278 | 0 | 1.25 | 17 | 4 | 10 | 0 | 7 | 0 | 0 | 0 | 0 | 0 | 4.5 | 15% | 15% | 6% | 32% | 2% |
| M3279 | 0 | 1.25 | 17 | 6 | 10 | 0 | 8 | 0 | 0 | 0 | 0 | 0 | 4.5 | 15% | 15% | 6% | 19% | 3% |
| M3280 | 0 | 2 | 16 | 6 | 10 | 0 | 6 | 0 | 0 | 5 | 0 | 0 | 0 | 14% | 15% | 12% | 10% | 2% |
| M3281 | 0 | 2 | 16 | 8 | 10 | 0 | 7 | 0 | 0 | 5 | 0 | 0 | 0 | 14% | 15% | 12% | 0% | 2% |
| M3282 | 0 | 2 | 16 | 3 | 10 | 0 | 4 | 0 | 0 | 5 | 0 | 0 | 0 | 14% | 15% | 12% | 35% | 0% |
| M3283 | 0 | 2 | 16 | 10 | 10 | 0 | 8 | 0 | 0 | 5 | 0 | 0 | 0 | 13% | 15% | 12% | 0% | 3% |
| M3284 | 0 | 2 | 16 | 4 | 10 | 0 | 5 | 0 | 0 | 5 | 0 | 0 | 0 | 14% | 15% | 12% | 22% | 1% |
| M3285 | 0 | 2 | 16 | 5 | 10 | 0 | 6 | 0 | 0 | 5 | 0 | 0 | 0 | 14% | 15% | 12% | 11% | 2% |
| M3286 | 0 | 2 | 16 | 7 | 10 | 0 | 7 | 0 | 0 | 5 | 0 | 0 | 0 | 14% | 15% | 12% | 1% | 2% |
| M3287 | 0 | 1.25 | 17 | 9 | 10 | 0 | 10 | 0 | 0 | 0 | 0 | 0 | 4.5 | 15% | 15% | 6% | 0% | 4% |
| M3288 | 0 | 2 | 16 | 9 | 10 | 0 | 8 | 0 | 0 | 5 | 0 | 0 | 0 | 14% | 15% | 12% | 0% | 3% |
| M3289 | 0 | 2 | 16 | 3 | 10 | 0 | 5 | 0 | 0 | 5 | 0 | 0 | 0 | 14% | 15% | 12% | 24% | 0% |
| M3290 | 0 | 2 | 16 | 2 | 10 | 0 | 4 | 0 | 0 | 5 | 0 | 0 | 0 | 14% | 15% | 12% | 36% | 0% |
| M3291 | 0 | 1.25 | 17 | 3 | 10 | 0 | 7 | 0 | 0 | 0 | 0 | 0 | 4.5 | 15% | 15% | 6% | 35% | 0% |
| M3292 | 0 | 1.25 | 17 | 7 | 10 | 0 | 9 | 0 | 0 | 0 | 0 | 0 | 4.5 | 15% | 15% | 6% | 8% | 3% |
| M3293 | 0 | 1.25 | 17 | 5 | 10 | 0 | 8 | 0 | 0 | 0 | 0 | 0 | 4.5 | 15% | 15% | 6% | 23% | 3% |
| M3294 | 0 | 2 | 16 | 4 | 10 | 0 | 6 | 0 | 0 | 5 | 0 | 0 | 0 | 14% | 15% | 12% | 14% | 2% |
| M3295 | 0 | 2 | 16 | 6 | 10 | 0 | 7 | 0 | 0 | 5 | 0 | 0 | 0 | 14% | 15% | 12% | 2% | 2% |
| M3296 | 0 | 2.3 | 19 | 1.25 | 1 | 0 | 0 | 0 | 0 | 5 | 0 | 0 | 0 | 13% | 15% | 12% | 14% | 3% |
| M3297 | 0 | 2 | 16 | 8 | 10 | 0 | 8 | 0 | 0 | 5 | 0 | 0 | 0 | 14% | 15% | 12% | 0% | 3% |
| M3298 | 0 | 2 | 16 | 2 | 10 | 0 | 5 | 0 | 0 | 5 | 0 | 0 | 0 | 14% | 15% | 12% | 28% | 0% |
| M3299 | 0 | 2 | 16 | 5 | 10 | 0 | 7 | 0 | 0 | 5 | 0 | 0 | 0 | 14% | 15% | 12% | 3% | 2% |
| M3300 | 0 | 2 | 16 | 3 | 10 | 0 | 6 | 0 | 0 | 5 | 0 | 0 | 0 | 14% | 15% | 12% | 19% | 0% |
| M3301 | 0 | 2 | 16 | 1 | 10 | 0 | 4 | 0 | 0 | 5 | 0 | 0 | 0 | 14% | 15% | 12% | 39% | 0% |
| M3302 | 0 | 2 | 16 | 10 | 10 | 0 | 9 | 0 | 0 | 5 | 0 | 0 | 0 | 13% | 15% | 12% | 0% | 3% |
| M3303 | 0 | 2 | 16 | 7 | 10 | 0 | 8 | 0 | 0 | 5 | 0 | 0 | 0 | 14% | 15% | 12% | 0% | 3% |
| M3304 | 0 | 2 | 16 | 4 | 10 | 0 | 7 | 0 | 0 | 5 | 0 | 0 | 0 | 14% | 15% | 12% | 8% | 2% |
| M3305 | 0 | 2 | 16 | 2 | 10 | 0 | 6 | 0 | 0 | 5 | 0 | 0 | 0 | 14% | 15% | 12% | 23% | 0% |
| M3306 | 0 | 2 | 16 | 1 | 10 | 0 | 5 | 0 | 0 | 5 | 0 | 0 | 0 | 14% | 15% | 12% | 32% | 0% |
| M3307 | 0 | 2 | 16 | 9 | 10 | 0 | 9 | 0 | 0 | 5 | 0 | 0 | 0 | 13% | 15% | 12% | 0% | 3% |
| M3308 | 0 | 2 | 16 | 6 | 10 | 0 | 8 | 0 | 0 | 5 | 0 | 0 | 0 | 14% | 15% | 12% | 0% | 2% |
| M3309 | 0 | 2 | 16 | 3 | 10 | 0 | 7 | 0 | 0 | 5 | 0 | 0 | 0 | 14% | 15% | 12% | 13% | 0% |
| M3310 | 0 | 1.25 | 17 | 2 | 10 | 0 | 7 | 0 | 0 | 0 | 0 | 0 | 4.5 | 16% | 15% | 6% | 39% | 0% |
| M3311 | 0 | 2 | 16 | 1 | 10 | 0 | 6 | 0 | 0 | 5 | 0 | 0 | 0 | 14% | 15% | 12% | 28% | 0% |
| M3312 | 0 | 1.25 | 17 | 8 | 10 | 0 | 10 | 0 | 0 | 0 | 0 | 0 | 4.5 | 15% | 15% | 6% | 0% | 4% |
| M3313 | 0 | 2 | 16 | 2 | 10 | 0 | 7 | 0 | 0 | 5 | 0 | 0 | 0 | 14% | 15% | 12% | 18% | 0% |
| M3314 | 0 | 2 | 16 | 0 | 10 | 0 | 10 | 0 | 0 | 5 | 0 | 0 | 0 | 14% | 15% | 12% | 0% | 0% |
| M3315 | 0 | 2 | 16 | 5 | 10 | 0 | 8 | 0 | 0 | 5 | 0 | 0 | 0 | 14% | 15% | 12% | 0% | 2% |
| M3316 | 0 | 1.25 | 17 | 4 | 10 | 0 | 8 | 0 | 0 | 0 | 0 | 0 | 4.5 | 15% | 15% | 6% | 26% | 3% |
| M3317 | 0 | 2 | 16 | 0 | 10 | 0 | 5 | 0 | 0 | 5 | 0 | 0 | 0 | 14% | 15% | 12% | 36% | 0% |
| M3318 | 0 | 1.25 | 17 | 6 | 10 | 0 | 9 | 0 | 0 | 0 | 0 | 0 | 4.5 | 15% | 15% | 6% | 12% | 3% |
| M3319 | 0 | 2 | 16 | 8 | 10 | 0 | 9 | 0 | 0 | 5 | 0 | 0 | 0 | 13% | 15% | 12% | 0% | 3% |
| M3320 | 0 | 2 | 16 | 0 | 10 | 0 | 9 | 0 | 0 | 5 | 0 | 0 | 0 | 14% | 15% | 12% | 2% | 0% |
| M3321 | 0 | 2 | 16 | 1 | 10 | 0 | 7 | 0 | 0 | 5 | 0 | 0 | 0 | 14% | 15% | 12% | 22% | 0% |
| M3322 | 1.6 | 1 | 18 | 1 | 1 | 3.5 | 0 | 0.5 | 0 | 0.5 | 0.5 | 0 | 0 | 11% | 15% | 5% | 18% | 0% |
| M3323 | 0 | 2 | 16 | 0 | 10 | 0 | 6 | 0 | 0 | 5 | 0 | 0 | 0 | 14% | 15% | 12% | 32% | 0% |
| M3324 | 0 | 2 | 16 | 4 | 10 | 0 | 8 | 0 | 0 | 5 | 0 | 0 | 0 | 14% | 15% | 12% | 0% | 2% |
| M3325 | 0 | 2 | 16 | 0 | 10 | 0 | 8 | 0 | 0 | 5 | 0 | 0 | 0 | 14% | 15% | 12% | 13% | 0% |
| M3326 | 0 | 2 | 16 | 0 | 10 | 0 | 7 | 0 | 0 | 5 | 0 | 0 | 0 | 14% | 15% | 12% | 26% | 0% |
| M3327 | 0 | 2 | 16 | 3 | 10 | 0 | 8 | 0 | 0 | 5 | 0 | 0 | 0 | 14% | 15% | 12% | 3% | 0% |
| M3328 | 0 | 2 | 16 | 1 | 10 | 0 | 8 | 0 | 0 | 5 | 0 | 0 | 0 | 14% | 15% | 12% | 10% | 0% |
| M3329 | 0 | 2 | 16 | 2 | 10 | 0 | 8 | 0 | 0 | 5 | 0 | 0 | 0 | 14% | 15% | 12% | 6% | 0% |
| M3330 | 0 | 2 | 16 | 7 | 10 | 0 | 9 | 0 | 0 | 5 | 0 | 0 | 0 | 13% | 15% | 12% | 0% | 3% |
| M3331 | 0 | 2 | 16 | 1 | 10 | 0 | 9 | 0 | 0 | 5 | 0 | 0 | 0 | 14% | 15% | 12% | 0% | 0% |
| M3332 | 0 | 2 | 16 | 1 | 10 | 0 | 10 | 0 | 0 | 5 | 0 | 0 | 0 | 14% | 15% | 12% | 0% | 0% |
| M3333 | 0 | 2 | 16 | 10 | 10 | 0 | 10 | 0 | 0 | 5 | 0 | 0 | 0 | 13% | 15% | 12% | 0% | 4% |
| M3334 | 1.6 | 1 | 17 | 1 | 1 | 3.5 | 0 | 0.5 | 0 | 0.5 | 0.5 | 0 | 0 | 10% | 15% | 5% | 18% | 0% |
| M3335 | 0 | 2 | 16 | 2 | 10 | 0 | 9 | 0 | 0 | 5 | 0 | 0 | 0 | 14% | 15% | 12% | 0% | 0% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M3336 | 0 | 2 | 16 | 6 | 10 | 0 | 9 | 0 | 0 | 5 | 0 | 0 | 0 | 14% | 15% | 12% | 0% | 3% |
| M3337 | 0 | 1.25 | 17 | 3 | 10 | 0 | 8 | 0 | 0 | 0 | 0 | 0 | 4.5 | 15% | 15% | 6% | 30% | 0% |
| M3338 | 0 | 1.25 | 17 | 5 | 10 | 0 | 9 | 0 | 0 | 0 | 0 | 0 | 4.5 | 15% | 15% | 6% | 17% | 3% |
| M3339 | 0 | 1.25 | 17 | 7 | 10 | 0 | 10 | 0 | 0 | 0 | 0 | 0 | 4.5 | 15% | 15% | 6% | 1% | 4% |
| M3340 | 1.6 | 1 | 15 | 1 | 1 | 3.5 | 0 | 0.5 | 0 | 0.5 | 0.5 | 0 | 0 | 8% | 15% | 5% | 0% | 0% |
| M3341 | 0 | 2 | 16 | 3 | 10 | 0 | 9 | 0 | 0 | 5 | 0 | 0 | 0 | 14% | 15% | 12% | 0% | 2% |
| M3342 | 0 | 2 | 16 | 5 | 10 | 0 | 9 | 0 | 0 | 5 | 0 | 0 | 0 | 14% | 15% | 12% | 0% | 2% |
| M3343 | 0 | 2 | 16 | 4 | 10 | 0 | 9 | 0 | 0 | 5 | 0 | 0 | 0 | 14% | 15% | 12% | 0% | 2% |
| M3344 | 1.6 | 1 | 16 | 1 | 1 | 3.5 | 0 | 0.5 | 0 | 0.5 | 0.5 | 0 | 0 | 9% | 15% | 5% | 7% | 0% |
| M3345 | 0 | 2 | 16 | 2 | 10 | 0 | 10 | 0 | 0 | 5 | 0 | 0 | 0 | 14% | 15% | 12% | 0% | 0% |
| M3346 | 0 | 2.3 | 19.2 | 1.25 | 1 | 0 | 0 | 0 | 0 | 5 | 0 | 0 | 0 | 14% | 15% | 12% | 14% | 3% |
| M3347 | 0 | 2 | 16 | 9 | 10 | 0 | 10 | 0 | 0 | 5 | 0 | 0 | 0 | 13% | 15% | 12% | 0% | 3% |
| M3348 | 0 | 1.25 | 17 | 2 | 10 | 0 | 8 | 0 | 0 | 0 | 0 | 0 | 4.5 | 16% | 15% | 6% | 34% | 0% |
| M3349 | 0 | 2 | 16 | 3 | 10 | 0 | 10 | 0 | 0 | 5 | 0 | 0 | 0 | 14% | 15% | 12% | 0% | 0% |
| M3350 | 0 | 1.25 | 17 | 4 | 10 | 0 | 9 | 0 | 0 | 0 | 0 | 0 | 4.5 | 15% | 15% | 6% | 21% | 3% |
| M3351 | 0 | 2 | 16 | 8 | 10 | 0 | 10 | 0 | 0 | 5 | 0 | 0 | 0 | 13% | 15% | 12% | 0% | 3% |
| M3352 | 0 | 1.25 | 17 | 6 | 10 | 0 | 10 | 0 | 0 | 0 | 0 | 0 | 4.5 | 15% | 15% | 6% | 5% | 3% |
| M3353 | 0 | 2 | 16 | 4 | 10 | 0 | 10 | 0 | 0 | 5 | 0 | 0 | 0 | 14% | 15% | 12% | 0% | 3% |
| M3354 | 0 | 2 | 16 | 7 | 10 | 0 | 10 | 0 | 0 | 5 | 0 | 0 | 0 | 13% | 15% | 12% | 0% | 3% |
| M3355 | 0 | 2 | 16 | 5 | 10 | 0 | 10 | 0 | 0 | 5 | 0 | 0 | 0 | 14% | 15% | 12% | 0% | 3% |
| M3356 | 0 | 2 | 16 | 6 | 10 | 0 | 10 | 0 | 0 | 5 | 0 | 0 | 0 | 13% | 15% | 12% | 0% | 3% |
| M3357 | 0 | 1.25 | 17 | 1 | 10 | 0 | 8 | 0 | 0 | 0 | 0 | 0 | 4.5 | 16% | 15% | 6% | 38% | 0% |
| M3358 | 0 | 1.25 | 17 | 3 | 10 | 0 | 9 | 0 | 0 | 0 | 0 | 0 | 4.5 | 15% | 15% | 6% | 24% | 1% |
| M3359 | 0 | 1.25 | 17 | 5 | 10 | 0 | 10 | 0 | 0 | 0 | 0 | 0 | 4.5 | 15% | 15% | 6% | 9% | 3% |
| M3360 | 0 | 1.25 | 17 | 2 | 10 | 0 | 9 | 0 | 0 | 0 | 0 | 0 | 4.5 | 15% | 15% | 6% | 27% | 0% |
| M3361 | 0 | 1.25 | 17 | 4 | 10 | 0 | 10 | 0 | 0 | 0 | 0 | 0 | 4.5 | 15% | 15% | 6% | 11% | 3% |
| M3362 | 0 | 1.25 | 17 | 1 | 10 | 0 | 9 | 0 | 0 | 0 | 0 | 0 | 4.5 | 15% | 15% | 6% | 30% | 0% |
| M3363 | 0 | 1.25 | 17 | 3 | 10 | 0 | 10 | 0 | 0 | 0 | 0 | 0 | 4.5 | 15% | 15% | 6% | 14% | 1% |
| M3364 | 0 | 1.25 | 17 | 0 | 10 | 0 | 9 | 0 | 0 | 0 | 0 | 0 | 4.5 | 16% | 15% | 6% | 33% | 0% |
| M3365 | 0 | 1.25 | 17 | 2 | 10 | 0 | 10 | 0 | 0 | 0 | 0 | 0 | 4.5 | 15% | 15% | 6% | 16% | 1% |
| M3366 | 0 | 1.25 | 17 | 1 | 10 | 0 | 10 | 0 | 0 | 0 | 0 | 0 | 4.5 | 15% | 15% | 6% | 19% | 1% |
| M3367 | 0 | 2.3 | 19.4 | 1.25 | 1 | 0 | 0 | 0 | 0 | 5 | 0 | 0 | 0 | 14% | 15% | 12% | 14% | 4% |
| M3368 | 0 | 1.25 | 17 | 0 | 10 | 0 | 10 | 0 | 0 | 0 | 0 | 0 | 4.5 | 15% | 15% | 6% | 22% | 0% |
| M3369 | 1.4 | 1 | 18 | 1 | 1 | 3.5 | 0 | 0.5 | 0 | 0.5 | 0.5 | 0 | 0 | 12% | 15% | 5% | 20% | 0% |
| M3370 | 0 | 2.3 | 19.6 | 1.25 | 1 | 0 | 0 | 0 | 0 | 5 | 0 | 0 | 0 | 14% | 15% | 12% | 14% | 4% |
| M3371 | 0 | 2.4 | 18.2 | 1.25 | 1 | 0 | 0 | 0 | 0 | 5 | 0 | 0 | 0 | 12% | 15% | 12% | 0% | 4% |
| M3372 | 1.4 | 1 | 17 | 1 | 1 | 3.5 | 0 | 0.5 | 0 | 0.5 | 0.5 | 0 | 0 | 11% | 16% | 5% | 21% | 0% |
| M3373 | 0.6 | 1.4 | 13 | 1 | 1 | 3.5 | 0 | 0.5 | 0 | 0.5 | 0.5 | 0 | 0 | 8% | 16% | 5% | 0% | 3% |
| M3374 | 1.4 | 1 | 14 | 1 | 1 | 3.5 | 0 | 0.5 | 0 | 0.5 | 0.5 | 0 | 0 | 8% | 16% | 5% | 0% | 0% |
| M3375 | 1.4 | 1 | 16 | 1 | 1 | 3.5 | 0 | 0.5 | 0 | 0.5 | 0.5 | 0 | 0 | 10% | 16% | 5% | 21% | 0% |
| M3376 | 1.4 | 1 | 15 | 1 | 1 | 3.5 | 0 | 0.5 | 0 | 0.5 | 0.5 | 0 | 0 | 9% | 16% | 5% | 0% | 0% |
| M3377 | 0 | 2.3 | 19.8 | 1.25 | 1 | 0 | 0 | 0 | 0 | 5 | 0 | 0 | 0 | 14% | 16% | 12% | 18% | 4% |
| M3378 | 0.8 | 1.2 | 13 | 1 | 1 | 3.5 | 0 | 0.5 | 0 | 0.5 | 0.5 | 0 | 0 | 8% | 16% | 5% | 0% | 0% |
| M3379 | 0 | 2.3 | 20 | 1 | 1 | 0 | 0 | 0 | 0 | 5 | 0 | 0 | 0 | 14% | 16% | 12% | 20% | 4% |
| M3380 | 0 | 2.3 | 20 | 1.25 | 1 | 0 | 0 | 0 | 0 | 5 | 0 | 0 | 0 | 14% | 16% | 12% | 22% | 4% |
| M3381 | 1.2 | 1 | 17 | 1 | 1 | 3.5 | 0 | 0.5 | 0 | 0.5 | 0.5 | 0 | 0 | 11% | 16% | 5% | 23% | 0% |
| M3382 | 1.2 | 1 | 16 | 1 | 1 | 3.5 | 0 | 0.5 | 0 | 0.5 | 0.5 | 0 | 0 | 10% | 16% | 5% | 23% | 0% |
| M3383 | 0 | 2.3 | 20 | 2.5 | 1 | 0 | 0 | 0 | 0 | 5 | 0 | 0 | 0 | 14% | 16% | 11% | 24% | 4% |
| M3384 | 0 | 2.4 | 18 | 2.5 | 1 | 0 | 0 | 0 | 0 | 5 | 0 | 0 | 0 | 12% | 16% | 12% | 0% | 4% |
| M3385 | 1.2 | 1 | 15 | 1 | 1 | 3.5 | 0 | 0.5 | 0 | 0.5 | 0.5 | 0 | 0 | 10% | 16% | 5% | 16% | 0% |
| M3386 | 1.2 | 1 | 14 | 1 | 1 | 3.5 | 0 | 0.5 | 0 | 0.5 | 0.5 | 0 | 0 | 9% | 16% | 5% | 0% | 0% |
| M3387 | 1 | 1 | 13 | 1 | 1 | 3.5 | 0 | 0.5 | 0 | 0.5 | 0.5 | 0 | 0 | 9% | 16% | 5% | 0% | 0% |
| M3388 | 1.4 | 1.2 | 17 | 1 | 1 | 3.5 | 0 | 0.5 | 0 | 0.5 | 0.5 | 0 | 0 | 10% | 16% | 5% | 0% | 2% |
| M3389 | 0 | 2.3 | 20 | 4 | 1 | 0 | 0 | 0 | 0 | 5 | 0 | 0 | 0 | 14% | 16% | 11% | 20% | 5% |
| M3390 | 1.4 | 1.2 | 18 | 1 | 1 | 3.5 | 0 | 0.5 | 0 | 0.5 | 0.5 | 0 | 0 | 11% | 16% | 5% | 0% | 1% |
| M3391 | 0 | 2.4 | 18 | 4 | 1 | 0 | 0 | 0 | 0 | 5 | 0 | 0 | 0 | 12% | 16% | 12% | 0% | 5% |
| M3392 | 1.4 | 1.2 | 19 | 1 | 1 | 3.5 | 0 | 0.5 | 0 | 0.5 | 0.5 | 0 | 0 | 11% | 16% | 5% | 0% | 1% |
| M3393 | 0.8 | 1 | 17 | 1 | 1 | 3.5 | 0 | 0.5 | 0 | 0.5 | 0.5 | 0 | 0 | 13% | 16% | 5% | 27% | 0% |
| M3394 | 1.4 | 1 | 19 | 1 | 1 | 3.5 | 0 | 0.5 | 0 | 0.5 | 0.5 | 0 | 0 | 12% | 16% | 5% | 20% | 0% |
| M3395 | 0 | 2.3 | 20 | 5.5 | 1 | 0 | 0 | 0 | 0 | 5 | 0 | 0 | 0 | 14% | 16% | 11% | 26% | 5% |
| M3396 | 1.2 | 1 | 18 | 1 | 1 | 3.5 | 0 | 0.5 | 0 | 0.5 | 0.5 | 0 | 0 | 12% | 16% | 5% | 23% | 0% |
| M3397 | 0 | 2.4 | 18 | 5.5 | 1 | 0 | 0 | 0 | 0 | 5 | 0 | 0 | 0 | 12% | 16% | 12% | 0% | 5% |
| M3398 | 0 | 2.4 | 18.4 | 1.25 | 1 | 0 | 0 | 0 | 0 | 5 | 0 | 0 | 0 | 12% | 16% | 12% | 0% | 4% |
| M3399 | 1 | 1 | 17 | 1 | 1 | 3.5 | 0 | 0.5 | 0 | 0.5 | 0.5 | 0 | 0 | 12% | 16% | 5% | 25% | 0% |
| M3400 | 1 | 1 | 16 | 1 | 1 | 3.5 | 0 | 0.5 | 0 | 0.5 | 0.5 | 0 | 0 | 11% | 16% | 5% | 26% | 0% |
| M3401 | 1 | 1 | 15 | 1 | 1 | 3.5 | 0 | 0.5 | 0 | 0.5 | 0.5 | 0 | 0 | 10% | 16% | 5% | 26% | 0% |
| M3402 | 1.4 | 1.2 | 20 | 1 | 1 | 3.5 | 0 | 0.5 | 0 | 0.5 | 0.5 | 0 | 0 | 12% | 16% | 5% | 0% | 2% |
| M3403 | 1 | 1 | 14 | 1 | 1 | 3.5 | 0 | 0.5 | 0 | 0.5 | 0.5 | 0 | 0 | 9% | 16% | 5% | 7% | 0% |
| M3404 | 0.8 | 1.2 | 14 | 1 | 1 | 3.5 | 0 | 0.5 | 0 | 0.5 | 0.5 | 0 | 0 | 9% | 16% | 5% | 0% | 0% |
| M3405 | 0 | 2.4 | 18.6 | 1.25 | 1 | 0 | 0 | 0 | 0 | 5 | 0 | 0 | 0 | 13% | 16% | 12% | 0% | 4% |
| M3406 | 0 | 2.4 | 18.8 | 1.25 | 1 | 0 | 0 | 0 | 0 | 5 | 0 | 0 | 0 | 13% | 16% | 12% | 1% | 4% |
| M3407 | 0.8 | 1.2 | 15 | 1 | 1 | 3.5 | 0 | 0.5 | 0 | 0.5 | 0.5 | 0 | 0 | 10% | 17% | 5% | 5% | 0% |
| M3408 | 0 | 2.4 | 19 | 1.25 | 1 | 0 | 0 | 0 | 0 | 5 | 0 | 0 | 0 | 13% | 17% | 12% | 5% | 5% |
| M3409 | 0.8 | 1 | 18 | 1 | 1 | 3.5 | 0 | 0.5 | 0 | 0.5 | 0.5 | 0 | 0 | 13% | 17% | 5% | 32% | 0% |
| M3410 | 0 | 2.4 | 19.2 | 1.25 | 1 | 0 | 0 | 0 | 0 | 5 | 0 | 0 | 0 | 13% | 17% | 12% | 7% | 5% |

TABLE 5-continued

Alloys which meet thermodynamic criteria of corrosion resistant hardfacing alloys and increased abrasion resistance.

| No | B | C | Cr | Mn | Mo | Nb | Ni | Si | Ta | Ti | V | W | Zr | T1 | T2 | T3 | T4 | T5 |
|---|---|---|---|---|---|---|---|---|---|---|---|---|---|---|---|---|---|---|
| M3411 | 0 | 2.4 | 19.4 | 1.25 | 1 | 0 | 0 | 0 | 0 | 5 | 0 | 0 | 0 | 13% | 17% | 12% | 7% | 5% |
| M3412 | 0.8 | 1.2 | 16 | 1 | 1 | 3.5 | 0 | 0.5 | 0 | 0.5 | 0.5 | 0 | 0 | 11% | 17% | 5% | 6% | 0% |
| M3413 | 1.4 | 1 | 20 | 1 | 1 | 3.5 | 0 | 0.5 | 0 | 0.5 | 0.5 | 0 | 0 | 13% | 17% | 5% | 27% | 0% |
| M3414 | 0 | 2.4 | 19.6 | 1.25 | 1 | 0 | 0 | 0 | 0 | 5 | 0 | 0 | 0 | 13% | 17% | 12% | 6% | 5% |
| M3415 | 0.6 | 1.4 | 17 | 1 | 1 | 3.5 | 0 | 0.5 | 0 | 0.5 | 0.5 | 0 | 0 | 12% | 17% | 5% | 6% | 3% |
| M3416 | 0.8 | 1.2 | 17 | 1 | 1 | 3.5 | 0 | 0.5 | 0 | 0.5 | 0.5 | 0 | 0 | 12% | 17% | 5% | 5% | 1% |
| M3417 | 1.2 | 1 | 19 | 1 | 1 | 3.5 | 0 | 0.5 | 0 | 0.5 | 0.5 | 0 | 0 | 13% | 17% | 5% | 24% | 0% |
| M3418 | 1 | 1 | 18 | 1 | 1 | 3.5 | 0 | 0.5 | 0 | 0.5 | 0.5 | 0 | 0 | 13% | 17% | 5% | 25% | 0% |
| M3419 | 1.6 | 1.2 | 16 | 1 | 1 | 3.5 | 0 | 0.5 | 0 | 0.5 | 0.5 | 0 | 0 | 8% | 18% | 5% | 0% | 1% |
| M3420 | 1 | 1 | 19 | 1 | 1 | 3.5 | 0 | 0.5 | 0 | 0.5 | 0.5 | 0 | 0 | 13% | 18% | 5% | 36% | 0% |
| M3421 | 1.4 | 1.2 | 16 | 1 | 1 | 3.5 | 0 | 0.5 | 0 | 0.5 | 0.5 | 0 | 0 | 9% | 18% | 5% | 0% | 1% |
| M3422 | 1.4 | 1.4 | 17 | 1 | 1 | 3.5 | 0 | 0.5 | 0 | 0.5 | 0.5 | 0 | 0 | 9% | 18% | 5% | 0% | 4% |
| M3423 | 1.2 | 1.2 | 15 | 1 | 1 | 3.5 | 0 | 0.5 | 0 | 0.5 | 0.5 | 0 | 0 | 9% | 18% | 5% | 0% | 0% |
| M3424 | 1.2 | 1.2 | 19 | 1 | 1 | 3.5 | 0 | 0.5 | 0 | 0.5 | 0.5 | 0 | 0 | 12% | 18% | 5% | 0% | 1% |
| M3425 | 1.2 | 1.2 | 16 | 1 | 1 | 3.5 | 0 | 0.5 | 0 | 0.5 | 0.5 | 0 | 0 | 10% | 18% | 5% | 0% | 0% |
| M3426 | 1.2 | 1.2 | 18 | 1 | 1 | 3.5 | 0 | 0.5 | 0 | 0.5 | 0.5 | 0 | 0 | 11% | 18% | 5% | 1% | 1% |
| M3427 | 1.2 | 1.2 | 17 | 1 | 1 | 3.5 | 0 | 0.5 | 0 | 0.5 | 0.5 | 0 | 0 | 10% | 18% | 5% | 1% | 0% |
| M3428 | 0.8 | 1.4 | 14 | 1 | 1 | 3.5 | 0 | 0.5 | 0 | 0.5 | 0.5 | 0 | 0 | 8% | 18% | 5% | 0% | 3% |
| M3429 | 1.2 | 1.2 | 20 | 1 | 1 | 3.5 | 0 | 0.5 | 0 | 0.5 | 0.5 | 0 | 0 | 13% | 18% | 5% | 11% | 2% |
| M3430 | 1.4 | 1.4 | 18 | 1 | 1 | 3.5 | 0 | 0.5 | 0 | 0.5 | 0.5 | 0 | 0 | 10% | 18% | 5% | 0% | 4% |
| M3431 | 1.4 | 1.4 | 19 | 1 | 1 | 3.5 | 0 | 0.5 | 0 | 0.5 | 0.5 | 0 | 0 | 10% | 19% | 5% | 0% | 4% |
| M3432 | 1.4 | 1.4 | 20 | 1 | 1 | 3.5 | 0 | 0.5 | 0 | 0.5 | 0.5 | 0 | 0 | 11% | 19% | 5% | 0% | 4% |
| M3433 | 1 | 1.2 | 14 | 1 | 1 | 3.5 | 0 | 0.5 | 0 | 0.5 | 0.5 | 0 | 0 | 9% | 19% | 5% | 0% | 0% |
| M3434 | 1.2 | 1.4 | 16 | 1 | 1 | 3.5 | 0 | 0.5 | 0 | 0.5 | 0.5 | 0 | 0 | 9% | 19% | 5% | 0% | 4% |
| M3435 | 1 | 1.2 | 15 | 1 | 1 | 3.5 | 0 | 0.5 | 0 | 0.5 | 0.5 | 0 | 0 | 9% | 19% | 5% | 0% | 0% |
| M3436 | 1 | 1.2 | 16 | 1 | 1 | 3.5 | 0 | 0.5 | 0 | 0.5 | 0.5 | 0 | 0 | 10% | 19% | 5% | 4% | 0% |
| M3437 | 1.2 | 1.4 | 17 | 1 | 1 | 3.5 | 0 | 0.5 | 0 | 0.5 | 0.5 | 0 | 0 | 9% | 19% | 5% | 0% | 4% |
| M3438 | 1 | 1.2 | 18 | 1 | 1 | 3.5 | 0 | 0.5 | 0 | 0.5 | 0.5 | 0 | 0 | 12% | 19% | 5% | 3% | 1% |
| M3439 | 1 | 1.2 | 17 | 1 | 1 | 3.5 | 0 | 0.5 | 0 | 0.5 | 0.5 | 0 | 0 | 11% | 19% | 5% | 3% | 0% |
| M3440 | 1.2 | 1.4 | 18 | 1 | 1 | 3.5 | 0 | 0.5 | 0 | 0.5 | 0.5 | 0 | 0 | 10% | 19% | 5% | 0% | 3% |
| M3441 | 0.8 | 1.4 | 15 | 1 | 1 | 3.5 | 0 | 0.5 | 0 | 0.5 | 0.5 | 0 | 0 | 9% | 19% | 5% | 0% | 4% |
| M3442 | 1 | 1.4 | 15 | 1 | 1 | 3.5 | 0 | 0.5 | 0 | 0.5 | 0.5 | 0 | 0 | 9% | 19% | 5% | 0% | 3% |
| M3443 | 1.2 | 1.4 | 19 | 1 | 1 | 3.5 | 0 | 0.5 | 0 | 0.5 | 0.5 | 0 | 0 | 11% | 19% | 5% | 0% | 4% |
| M3444 | 0.8 | 1.2 | 18 | 1 | 1 | 3.5 | 0 | 0.5 | 0 | 0.5 | 0.5 | 0 | 0 | 12% | 19% | 5% | 4% | 1% |
| M3445 | 1.2 | 1.4 | 20 | 1 | 1 | 3.5 | 0 | 0.5 | 0 | 0.5 | 0.5 | 0 | 0 | 12% | 19% | 5% | 0% | 4% |
| M3446 | 1 | 1.4 | 16 | 1 | 1 | 3.5 | 0 | 0.5 | 0 | 0.5 | 0.5 | 0 | 0 | 9% | 19% | 5% | 0% | 4% |
| M3447 | 1 | 1.4 | 17 | 1 | 1 | 3.5 | 0 | 0.5 | 0 | 0.5 | 0.5 | 0 | 0 | 10% | 19% | 5% | 0% | 3% |
| M3448 | 1 | 1.4 | 18 | 1 | 1 | 3.5 | 0 | 0.5 | 0 | 0.5 | 0.5 | 0 | 0 | 11% | 19% | 5% | 0% | 3% |
| M3449 | 1 | 1.4 | 19 | 1 | 1 | 3.5 | 0 | 0.5 | 0 | 0.5 | 0.5 | 0 | 0 | 12% | 19% | 5% | 0% | 4% |
| M3450 | 0.8 | 1.4 | 16 | 1 | 1 | 3.5 | 0 | 0.5 | 0 | 0.5 | 0.5 | 0 | 0 | 10% | 19% | 5% | 0% | 3% |
| M3451 | 0.8 | 1.4 | 17 | 1 | 1 | 3.5 | 0 | 0.5 | 0 | 0.5 | 0.5 | 0 | 0 | 11% | 19% | 5% | 0% | 3% |
| M3452 | 0.8 | 1.4 | 18 | 1 | 1 | 3.5 | 0 | 0.5 | 0 | 0.5 | 0.5 | 0 | 0 | 12% | 20% | 5% | 0% | 4% |
| M3453 | 0.8 | 1.2 | 19 | 1 | 1 | 3.5 | 0 | 0.5 | 0 | 0.5 | 0.5 | 0 | 0 | 13% | 20% | 5% | 20% | 1% |
| M3454 | 0.8 | 1.4 | 19 | 1 | 1 | 3.5 | 0 | 0.5 | 0 | 0.5 | 0.5 | 0 | 0 | 12% | 21% | 5% | 0% | 4% |
| M3455 | 1 | 1.4 | 20 | 1 | 1 | 3.5 | 0 | 0.5 | 0 | 0.5 | 0.5 | 0 | 0 | 13% | 21% | 5% | 0% | 4% |
| M3456 | 1 | 1.2 | 19 | 1 | 1 | 3.5 | 0 | 0.5 | 0 | 0.5 | 0.5 | 0 | 0 | 13% | 21% | 5% | 6% | 1% |
| M3457 | 0.8 | 1.2 | 20 | 1 | 1 | 3.5 | 0 | 0.5 | 0 | 0.5 | 0.5 | 0 | 0 | 14% | 21% | 5% | 38% | 2% |
| M3458 | 1 | 1.2 | 20 | 1 | 1 | 3.5 | 0 | 0.5 | 0 | 0.5 | 0.5 | 0 | 0 | 13% | 22% | 5% | 24% | 2% |
| M3459 | 0.8 | 1.6 | 16 | 1 | 1 | 3.5 | 0 | 0.5 | 0 | 0.5 | 0.5 | 0 | 0 | 9% | 22% | 5% | 0% | 5% |
| M3460 | 0.8 | 1.4 | 20 | 1 | 1 | 3.5 | 0 | 0.5 | 0 | 0.5 | 0.5 | 0 | 0 | 13% | 23% | 5% | 10% | 4% |

Microstructural Criteria: Corrosion Resistance

In some embodiments, the alloy can be described by microstructural features which result in the desired performance of the alloy. The first microstructural criteria pertains to the alloy's corrosion resistance and is defined as the experimentally measured Cr content in the ferritic, austenitic, or martensitic matrix at room temperature. The Cr content in the matrix is experimentally measured using energy dispersive spectroscopy (EDS). In a non-limiting example the Cr content can be experimentally measured in an alloy in the form of an ingot, casting, weld, or thermal spray coating.

In some embodiments, the alloy can be said to meet a certain microstructural criteria that describes the alloy's corrosion resistance. The alloy can be said to meet the microstructural criteria for corrosion resistance if it contains a minimum experimentally measured Cr content in the matrix. In some embodiments, the minimum experimentally measured Cr content in the matrix is at or above 6 wt % (or at or above about 6 wt %). In some embodiments, the minimum experimentally measured Cr content in the matrix is at or above 8 wt % (or at or above about 8 wt %). In some embodiments, the minimum experimentally measured Cr content in the matrix is at or above 10 wt % (or at or above about 10 wt %). In some embodiments, the minimum experimentally measured Cr content in the matrix is at or above 12 wt % (or at or above about 12 wt %). Table 6 shows the measured chromium content in the matrix (Cr in matrix) for each alloy.

Figure 7:
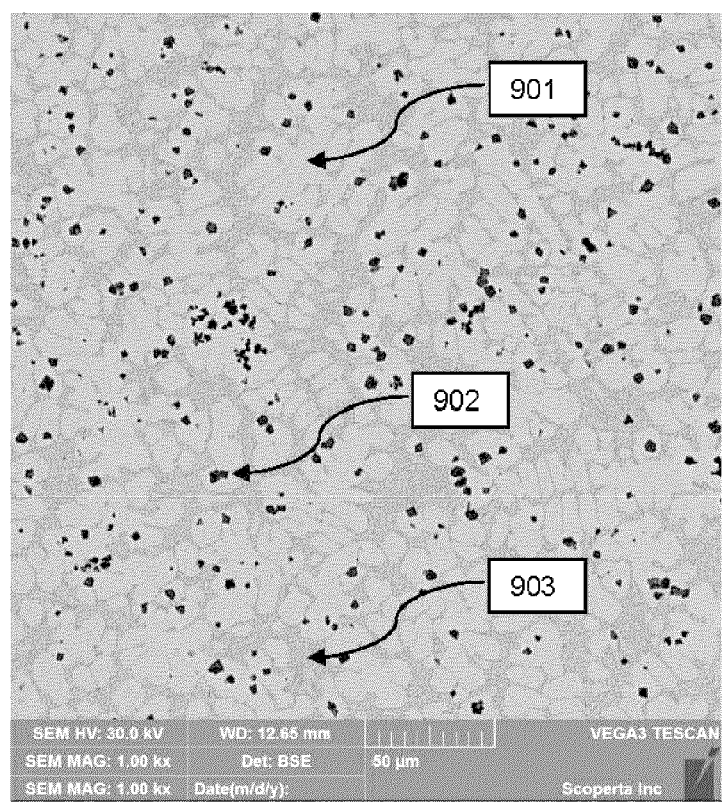
FIG. 7 shows an SEM micrograph of an embodiment of the disclosure (Alloy X21).
Figure 8:
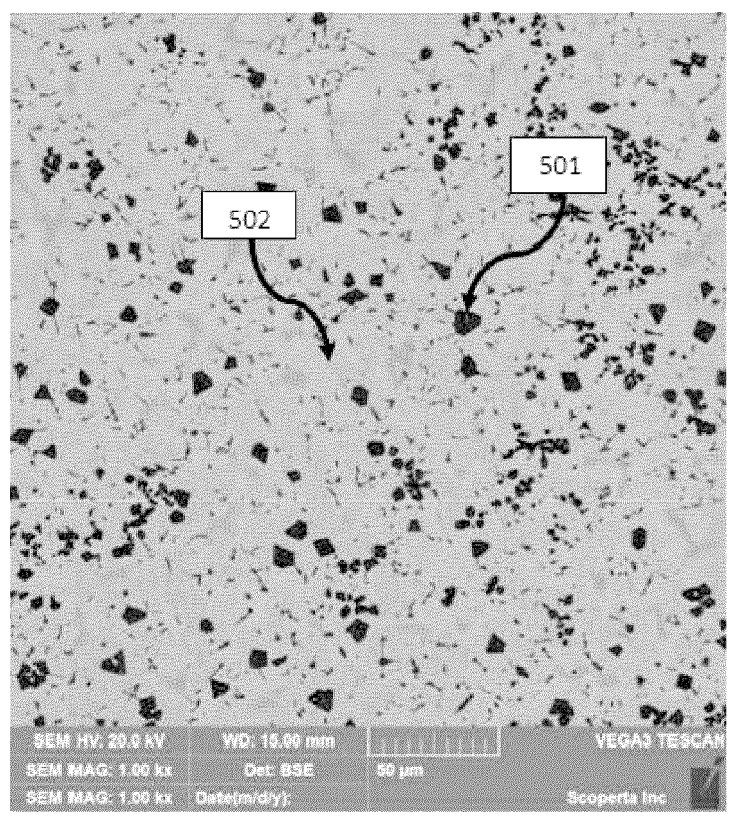
FIG. 8 shows an SEM micrograph of an embodiment of the disclosure (Alloy X24) illustrating isolated primary hard phase and matrix.
Figure 9:
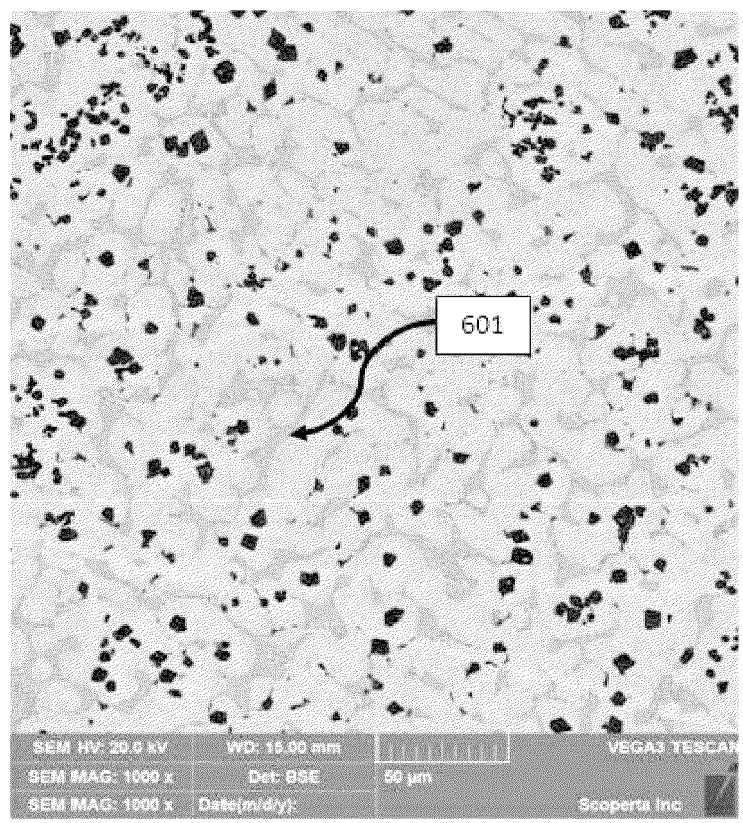
FIG. 9 shows an SEM micrograph of an embodiment of the disclosure (Alloy X25) illustrating the grain boundary eutectic hard phase.

In the case of alloy X21, the chromium content measured in an arc melted ingot was 10.8 weight % (or about 10.8 weight %). The chromium content measured in a single layer on mild steel weld was 7.6 weight % (or about 7.6 weight %). The chromium content will necessarily decrease by an amount proportional to the amount of process dependent dilution. Thus, for the purposes of defining the microstructural criteria, it is preferably if an undiluted alloy specimen is used. An SEM micrograph of Alloy X21 in an undiluted state is shown in FIG. 7. The micrograph shows a ferritic matrix [901] with embedded (Nb,Ti) carbide particles [902] and $Cr_2B$ grain boundary particles [903]. The chromium content is measured from the ferritic matrix [901] using energy dispersive spectroscopy.

The second microstructural criteria pertains to the alloy's wear resistance and is defined by the experimentally measured volume fraction of isolated primary hard phase. In some embodiments, increasing total hard phase content can increase an alloy's wear resistance. The isolated primary hard phase is defined as a carbide or boride containing Cr, Nb, Ta, Ti, V, W, or Zr or any combination of these elements. As shown in FIG. 5 with example alloy X24, in the microstructure the isolated primary hard phase appear as small, discrete particles spherical in shape with an average diameter between 1 and 20 µm [501]. The isolated primary carbides are usually contained in side of the ferritic, austenitic, or martensitic matrix [502]. The volume fraction measurements are taken from alloy micrographs with the aid of image analysis software. In a non-limiting example the isolated primary hard phase content can be experimentally measured in an alloy in the form of an ingot, casting, weld, or thermal spray coating.

In some embodiments, the alloy can be said to meet a certain microstructural criteria that describes the alloy's wear resistance. The alloy can be said to meet the microstructural criteria for wear resistance if it contains a minimum experimentally measured volume fraction of isolated primary hard phase. In some embodiments, the minimum experimentally measured volume fraction of isolated hard phase is at or above 5% (or at or above about 5%). In some embodiments, the minimum experimentally measured volume fraction of isolated hard phase is at or above 10% (or at or above about 10%). In some embodiments, the minimum experimentally measured volume fraction of isolated hard phase is at or above 15% (or at or above about 15%). In some embodiments, the hard phase fraction is at or above 20 volume % (or at or above about 20 volume %). Table 1 shows the measured isolated hard phase fraction (Isolated Hard) for each alloy.

In the example of Alloy 21, the hard phase fraction in an undiluted ingot was measured at 24.4 volume % (or about 24.4 volume %). The hard phase fraction of Alloy 21 in the weld was 13.8 volume % (or about 13.8%). Similar to evaluating the chromium content, it is preferable to evaluate the hard phase fraction in undiluted specimens to remove process related variables in the evaluation of the alloy.

The third microstructural criteria pertains to the alloy's crack resistance and is defined by the experimentally measured volume fraction of grain boundary eutectic hard phase. The grain boundary hard phase is defined as a carbide or boride containing Cr, Nb, Ta, Ti, V, W, or Zr or any combination of these elements. The grain boundary hard phase is a eutectic phase and is always the last phase to begin to solidify. As a result the grain boundary hard phase often forms, but is not limited to, a lamellar structure. As shown in FIG. 6 of example alloy X25, in the microstructure the grain boundary hard phase will form around regions of matrix [601]. Depending on volume, the grain boundary hard phase can form as a continuous phase that completely surrounds regions of matrix or as small discrete areas along the edges of matrix regions. A large volume fraction of grain boundary hard phase will result in a continuous phase. In this case one could draw a line in the grain boundary hard phase from one end of a micrograph to the other without having to cross into a different phase. A low volume fraction of grain boundary hard phase will result in a discontinuous phase. Depending on the volume fraction, the typical size of the grain boundary regions can be approximately 1 to 30 µm in width. A continuous hard, and therefore brittle, phase is highly susceptible to cracking. When considering crack resistance, large volume fractions of grain boundary hard phase will form as a continuous phase and severely reduce the alloy's crack resistance. Whereas an alloy containing no grain boundary hard phase will have a higher relative crack resistance. The grain boundary hard phase will also contribute to wear resistance similarly as the isolate primary hard phase. Therefore, an alloy containing a high volume fraction of grain boundary hard phase will have improved wear resistance but poor crack resistance relative to an alloy with no grain boundary hard phase. Table 6 shows the measured grain boundary hard phase fraction (GB Hard) for each alloy.

In some embodiments, an alloy can be said to meet a certain microstructural criteria that describes the alloy's crack resistance. The experimentally measured volume fraction of grain boundary eutectic hard phase can be used to describe the alloy's crack resistance. For example an alloy can be said to meet the microstructural criteria if the alloy contains a maximum measured volume fraction of grain boundary hard phase. In some embodiments, the experimentally measured volume fraction of grain boundary eutectic hard phase is at or below 5% (or about at or below 5%). In some embodiments, the experimentally measured volume fraction of grain boundary eutectic hard phase is at or below 3% (or at or below 3%). In some embodiments, the alloy the experimentally measured volume fraction of grain boundary eutectic hard phase is 0% (or about 0%).

The fourth microstructural criteria pertains to the alloy's bulk hardness and is defined as the experimentally measured hardness of the alloy's matrix. The matrix of the alloy constitutes the majority phase volume fraction in the alloy, making up between 80 and 90%. The matrix is defined as iron in the form of ferrite, austenite, or martensite, or any combination of the three. Through extensive experimentation it has been determined the matrix hardness has a strong influence on the bulk hardness of the alloy. Increasing the alloy's matrix hardness increases the bulk hardness of the alloy. Increasing bulk hardness can increase the wear resistance of the alloy. Matrix hardness of an alloy is measured using a micro hardness tester. Table 6 shows the measured matrix micro hardness using a Vickers indenter (Matrix Hardness) for each alloy.

In some embodiments, the alloy can be said to meet a certain microstructural criteria that describes the alloy's bulk hardness. The experimentally measured hardness of the alloy's matrix can be used to describe the alloy's bulk hardness. For example an alloy can be said to meet the microstructural criteria if the alloy's matrix is of a minimum experimentally measured hardness. In some embodiments, the experimentally measured matrix hardness is at or above 300 Vickers (or at or above about 300 Vickers). In some embodiments, the experimentally measured matrix hardness is at or above 350 Vickers (or at or above about 350 Vickers). In some embodiments, the experimentally measured matrix hardness is at or above 400 Vickers (or at or above about 400 Vickers). The matrix hardness is more critical to the ultimate wear performance of the alloy in the case of a low grain boundary hard phase fraction, at or below 10 volume %. In the case of alloys with elevated grain boundary hard phase fractions, above 10 volume %, this matrix hardness specification is desired but not critical to the wear performance of the alloy.

TABLE 6

Microstructural Measurements of Experimental Alloys

| Alloy | Cr in Matrix | Isolated Hard | GB Hard | Matrix Hardness |
|---|---|---|---|---|
| X22 | 12.5 | 12.6 | 0.0 | 223 |
| X23 | 16.7 | 9.2 | 0.0 | 235 |
| X24 | 13.6 | 10.4 | 3.2 | 421 |
| X25 | 13.9 | 7.6 | 10.4 | 387 |
| X26 | 10.3 | 9.3 | 14.3 | 248 |
| X27 | 13.6 | 7.9 | 22.7 | 239 |
| X28 | 13.3 | 23.6 | 0.0 | 305 |
| X29 | 12.9 | 21.1 | 14.5 | 352 |
| X30 | 14.9 | 3.7 | 42.7 | 205 |
| X31 | 13.4 | 3.5 | 28.7 | 250 |
| X32 | 15.3 | 3.4 | 35.0 | 425 |
| X86 | 9.5 | 4.3 | 7.8 | 422 |

Performance Criteria: Corrosion Resistance

In some embodiments, the alloy can be described by a set of performance criteria. For example, an alloy can be said to meet the performance criteria when it possess a minimum bulk hardness, a minimum abrasion resistance, a minimum level of crack resistance, and a minimum corrosion resistance. Hardness/wear resistance can be inversely proportional to crack resistance. Furthermore, conventional hardfacing material typically can have low corrosion resistance. In the field of hardfacing, there are no known materials that meet the specifications of all three material categories as defined in this disclosure.

The first criteria of this disclosure is related to the wear resistance of the material. It is generally desirable for a hardfacing material to be highly resistant to abrasive wear. The bulk hardness, as measured via Rockwell hardness testing, and mass loss occurring in ASTM G65 dry sand wear testing, hereby incorporated by reference in its entirety, are well known accurate indicators of the wear resistance of the alloy. In some embodiments, the alloy possess a minimum Rockwell C hardness of 40 HRC (or about 40 HRC). In some embodiments, the alloy possess a minimum Rockwell C hardness of 45 HRC (or about 45 HRC). In some embodiments, the alloy possess a minimum Rockwell C hardness of 50 HRC (or about 50 HRC). In some embodiments, the alloy possess a minimum Rockwell C hardness of 55 HRC (or about 55 HRC).

In some embodiments, the alloy possesses a maximum mass loss of 1.0 grams (or about 1.0 grams) under ASTM G65 testing. In some embodiments, the alloy possesses a maximum mass loss of 0.6 grams (or about 0.6 grams) under ASTM G65 testing. In some embodiments, the alloy possesses a maximum mass loss of 0.45 grams (or about 0.45 grams) under ASTM G65 testing. In some embodiments, the alloy possesses a maximum mass loss of 0.3 grams (or about 0.3 grams) under ASTM G65 testing.

The second criteria is related to the toughness and crack resistance of the material. In certain applications it is desirable for the hardfacing alloy to be free of cracks. In many applications, it is desirable for corrosion resistant material to be free of cracks to prevent the ingress of corrosive species through the cracks and into the base material. Crack resistance can be quantified on hardfacing materials through a series of increasingly aggressive testing in terms of conditions which promote cracking in the weld. In all the proceeding embodiments, cracking can be measured via one of several well-known methods including dye penetrant testing or magnetic particle inspection. In one embodiment, the alloy exhibits no cracks when welded onto one complete surface a 6"×6" plate 1" thick using an interpass temperature of 400 F. In some embodiments, the alloy exhibits a crack frequency of 2 cracks/inch or less when welded onto the inner diameter of a 6" O.D. water cooled pipe. In some embodiments, the alloy exhibits a crack frequency of 1 cracks/inch or less when welded onto the inner diameter of a 6" O.D. water cooled pipe. In some embodiments, the alloy exhibits no cracks when welded onto the inner diameter of a 6" O.D. water cooled pipe.

The third criteria is related to the corrosion performance of the material. In some embodiments, abrasive conditions can have accelerated mass loss when corrosion is present as well. Therefore, it can be advantageous for an alloy to exhibit high corrosion resistance in many hardfacing applications. A standard test for measuring corrosion resistance is the ASTM G31 test, hereby incorporated by reference in its entirety, whereby a sample alloy is immersed in a solution and mass loss is measured whereby a corrosion rate can be calculated. Saltwater corrosion is particularly relevant to the hardfacing industry and thus a 30,000 ppm pH8 solution can be used to measure corrosion resistance for this application. In some embodiments, the corrosion rate of the alloy in 30,000 ppm ph* saltwater is 10 mils per year (mpy) or less (or about 10 mils per year or less). In some embodiments, the corrosion rate of the alloy in 30,000 ppm ph* saltwater is 8 mils per year (mpy) or less (or about 8 mils per year or less). In some embodiments, the corrosion rate of the alloy in 30,000 ppm ph* saltwater is 6 mils per year (mpy) or less (or about 6 mils per year or less).

In all tests, the solutions were aerated. Test specimens were subject to this environment for a period of two weeks. This specific testing criterion shall be referred to as test #1. In one embodiment, the alloy exhibits a corrosion rate of 10 mpy (or about 10 mpy) or less under test #1. In some embodiments, the alloy exhibits a corrosion rate of 5 mpy (or about 5 mpy) or less under test #1. In some embodiments, the alloy exhibits a corrosion rate of 3 mpy (or about 3 mpy) or less under test #1. Table 7 shows a list of alloys produced as experimental ingots and tested for properties relevant to this set of performance criteria. Alloy 10, 17, 20, and 21 were selected as good candidates for corrosion testing and demonstrated corrosion rates in test #1 solution of less than 2.5 mils per year (or less than about 2.5 mils per year). In comparison, chromium carbide, a standard material used in hardfacing, exhibited a corrosion rate over 15 mils per year (or over about 15 mils per year) in the test #1 solution.

TABLE 7

Experimental Alloy Compositions (given in weight %) Produced to Measure Hardness, Wear Resistance, and Corrosion Resistance, HRC = Rockwell C hardness, (HRB is Rockwell B hardness where denoted), G65 = ASTM G65 Procedure A Dry Sand Testing mass loss in grams, T#1 = corrosion rate in mils per year performed according to test #1 specifications, NT = not tested

| Alloy | B | C | Co | Cr | N | Nb | Mn | Mo | Si | Ti | V | Fe |
|---|---|---|---|---|---|---|---|---|---|---|---|---|
| P22-X7 | 0 | 0.01 | 0.15 | 10.50 | 0.02 | 0.35 | 0.25 | 0.00 | 1.30 | 0.25 | 0.25 | 86.93 |
| P22-X8 | 0 | 0.01 | 0.30 | 12.00 | 0.03 | 0.35 | 0.25 | 0.50 | 2.00 | 0.50 | 0.50 | 83.56 |
| P22-X9 | 0 | 0.01 | 0.50 | 12.00 | 0.10 | 0.35 | 0.50 | 0.50 | 5.00 | 0.50 | 0.50 | 80.04 |
| P22-X10 | 0 | 1.00 | 0.50 | 12.00 | 0.00 | 0.35 | 0.50 | 0.50 | 1.50 | 0.25 | 0.50 | 82.90 |
| P22-X11 | 0 | 0.01 | 0.50 | 12.00 | 1.00 | 0.35 | 0.50 | 0.50 | 5.00 | 3.42 | 0.50 | 76.22 |
| P22-X12 | 0 | 1.00 | 0.50 | 18.00 | 0.00 | 0.35 | 0.50 | 0.50 | 1.50 | 0.25 | 0.50 | 76.90 |
| P22-X13 | 0 | 0.70 | 0.00 | 17.00 | 0.00 | 0.00 | 1.00 | 0.75 | 1.00 | 0.00 | 0.00 | 79.55 |
| P22-X15 | 0 | 1.50 | 1.50 | 18.00 | 0.00 | 0.50 | 2.00 | 1.50 | 2.00 | 0.50 | 1.00 | 71.50 |
| P22-X16 | 0 | 3.00 | 1.50 | 18.00 | 0.00 | 0.50 | 2.00 | 1.50 | 2.00 | 0.50 | 1.00 | 70.00 |
| P22-X17 | 1.00 | 1.00 | 0.50 | 12.00 | 0.00 | 0.35 | 0.50 | 0.50 | 1.50 | 0.25 | 0.50 | 81.90 |
| P22-X18 | 1.00 | 1.00 | 0.50 | 12.00 | 0.00 | 1.00 | 0.50 | 0.50 | 1.50 | 0.25 | 0.50 | 81.25 |
| P22-X19 | 1.00 | 1.00 | 0.50 | 12.00 | 0.00 | 0.35 | 0.50 | 0.50 | 1.50 | 1.00 | 0.50 | 81.15 |
| P22-X20 | 1.00 | 1.00 | 0.50 | 12.00 | 0.00 | 1.00 | 0.50 | 0.50 | 1.50 | 1.00 | 0.50 | 80.50 |
| P22-X21 | 1.00 | 1.00 | 0.50 | 12.00 | 0.00 | 0.35 | 0.50 | 0.50 | 1.50 | 1.80 | 0.50 | 80.35 |

| Alloy | HRC | G65 | T#1 |
|---|---|---|---|
| P22-X7 | 77 (HRB) | NT | NT |
| P22-X8 | 87 (HRB) | NT | NT |
| P22-X9 | 26 | NT | NT |
| P22-X10 | 53 | NT | 2.21 |
| P22-X11 | 43 | NT | NT |
| P22-X12 | 42 | NT | NT |
| P22-X13 | 35 | NT | NT |
| P22-X15 | 33 | NT | NT |
| P22-X16 | 46 | NT | NT |
| P22-X17 | 61 | 0.58 | 2.35 |
| P22-X18 | 61 | NT | NT |
| P22-X19 | 60 | NT | NT |
| P22-X20 | 60 | 0.34 | 1.73 |
| P22-X21 | 61 | 0.40 | 2.35 |

EXAMPLES

The following examples are intended to be illustrative and non-limiting.

Example 1

In an experiment to determine the performance of several alloys an initial corrosion test was run on three alloys disclosed herein, X10, X17, and X20. In this example, the alloys were produced in the form of 40 gram test melts and subject to an ASTMG31 immersion test using 30,000 ppm saltwater for 7 days at room temperature. In addition to these 3 alloys, a standard chromium carbide overlay and a known corrosion resistant steel S30V were run in comparison. As shown X10, X17, and X20 met the corrosion performance of this disclosure.

TABLE 8

Corrosion performance of experimental alloy test melts

| Alloy | Corrosion Rate (mpy) |
|---|---|
| X10 | 2.21 |
| X17 | 2.55 |
| X20 | 5.15 |
| Chromium Carbide | 15.23 |
| S30V | 2.96 |

Based on these results several alloys, X17, X20, X21, and X86, were manufactured into metal cored welding wire and welded onto a 6"×6"×1" steel plate to replicate the manufacture of a wear plate used by the hardfacing industry. The following weld procedures were used to produce the specimens:

Shielding Gas: 98/2 Ar/O2
Gas Flow (CFH): 40
Wire Feed (inches/min): 300
Amperage (Amps): 260
Voltage (Volts): 29
Traverse Rate: 4-5 inches/min
Oscillation Width (inches): 1
Pre-Heat: None All four alloys were able to be deposited onto the steel plate without cracking. A similar corrosion experiment was performed in addition to ASTM G65 testing. These results are detailed in Table 9, which show that all alloys meet the disclosed performance criteria.

TABLE 9

Performance Results of experimental welding alloys

| Alloy | Corrosion Rate (mpy) | ASTM G65 Mass Loss |
|---|---|---|
| X17 | 2.35 | 0.58 |
| X20 | 1.73 | 0.34 |
| X21 | 2.35 | 0.24 |
| X86 | 9 | 0.22 |

Example 2

In a second non-limiting example, the P20-X86 alloy was welded onto the inner diameter of a 6" O.D. steel pipe while simultaneously cooling with flowing water. The P20-X86 exhibited minimum cracking, ~2 cracks/inch, as compared to conventional materials in this welding trial in both single and double pass overlays. The hardness of the both overlays, single and double, has a hardness of 55-56 HRc. The corrosion rate of the weld was 0 mpy although some highly adherent rust developed on the surface.

From the foregoing description, it will be appreciated that an inventive thermal spray coatings are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A work piece having at least a portion of its surface covered by a layer comprising a microstructure comprising:
    an Fe-based matrix comprising ferrite, austenite, martensite or a combination thereof, whereby the matrix contains a minimum of 8 wt. % chromium;
    primary hard phases defined as carbides or borides which form 1-20 micron spherical particles at a volume fraction of at least 5%; and
    a matrix microhardness of at least 300 Vickers;
    wherein the matrix contains less than 10% mole fraction of iron or chromium containing carbide or borocarbide particles in excess of 5 microns in size.

2. The work piece of claim 1, wherein the matrix does not contain any iron or chromium containing carbide or borocarbide particles in excess of 5 microns in size.

3. The work piece of claim 1, whereas the layer comprises a grain boundary eutectic boride and/or carbide volume fraction of 10% or more.

4. The work piece of claim 1, whereas the layer comprises a grain boundary eutectic boride and/or carbide volume fraction of 10% or less.

5. The work piece of claim 1, wherein the work piece is a steel pipe and the layer coats at least a portion of an interior diameter of the pipe.

6. The work piece of claim 1, wherein the work piece is a steel plate and the layer coats at least a portion of at least one surface of the steel plate.

7. The work piece of claim 1, wherein the layer is deposited using one or more of the following techniques: MIG welding, TIG welding, sub-arc welding, open-arc welding, PTA welding, laser cladding, or thermal spraying.

8. The work piece of claim 1, whereas the layer comprises, in wt. %:
    Fe;
    B: 0-1;
    C: 0.75-1.9;

Co: 0-0.5;
Cr: 12-21;
Mn: 0.5-1.4;
Mo: 0.5-1.6;
Nb: 0-3.5;
Si: 0.5-1.5;
Ti: 0.2-5; and
V: 0-0.6.

9. The work piece of claim 1, wherein the layer or the feedstock material used to produce the layer comprises in wt. % one or more of the following compositions having Fe and:
C: 1, Co: 0.5, Mn: 0.5, Nb: 0.35, Si: 1.5, Ti: 0.25, V: 0.5;
B: 1, C: 1, Co: 0.5, Cr: 12, Mn: 0.5, Nb: 0.35, Si: 1.5, Ti: 0.25, V: 0.5;
B: 1, C: 1, Co: 0.5, Cr: 12, Mn: 0.5, Mo: 0.5, Nb: 1, Si: 1.5, Ti: 1, V: 0.5;
B: 1, C: 1, Co: 0.5, Cr: 12, Mn: 0.5, Mo: 0.5, Nb: 0.35, Si: 1.5, Ti: 1.8, V: 0.5;
C: 1.9, Cr: 14, Mn: 1.25, Mo: 1, Si: 1, Ti: 5;
B: 0.6, C: 1.2, Cr: 20, Mn: 1, Mo: 1, Nb: 3.5, Si: .0.5, Ti: 0.5, V: 0.5;
B: 0.6, C: 0.8, Cr: 16, Mn: 1, Mo: 1, Nb: 3.5, Si: .0.5, Ti: 0.5, V: 0.5;
B: 0.6, C: 1.6, Cr: 20, Mn: 1, Mo: 1, Nb: 3.5, Si: .0.5, Ti: 0.5, V: 0.5; or
B: 0.6, C: 0.8, Cr: 14.5, Mn: 1, Mo: 1, Nb: 3, Si: 0.5, Ti: 0.5, V: 0.4.

10. A work piece having at least a portion of its surface covered by a layer, the layer comprising:
a high wear resistance as defined by an ASTM G65 mass loss of 0.6 grams or less;
a high corrosion resistance as defined by an ASTM G31 corrosion rate in 30,000 ppm saltwater of 10 mils per year or less; and
a high resistance to cracking as defined by the ability to be MIG welded crack free over the entire surface of a 12"×12" steel plate which is 1" thick using an interpass temperature of 400° F.

11. The work piece of claim 10, wherein the work piece is a steel pipe and the layer coats at least a portion of an interior diameter of the pipe.

12. The work piece of claim 10, wherein the work piece is a steel plate and the layer coats at least a portion of at least one surface of the steel plate.

13. The work piece of claim 10, wherein the layer is deposited using one or more of the following techniques: MIG welding, TIG welding, sub-arc welding, open-arc welding, PTA welding, laser cladding, or thermal spraying.

14. The work piece of claim 10, whereas the layer comprises in wt. %:
Fe;
B: 0-1;
C: 0.75-1.9;
Co: 0-0.5;
Cr: 12-21;
Mn: 0.5-1.4;
Mo: 0.5-1.6;
Nb: 0-3.5;
Si: 0.5-1.5;
Ti: 0.2-5; and
V: 0-0.6.

15. The work piece of claim 10, wherein the layer or the feedstock material used to produce the layer comprises, in wt. %, one or more of the following compositions having Fe and:

C: 1, Co: 0.5, Mn: 0.5, Nb: 0.35, Si: 1.5, Ti: 0.25, V: 0.5;
B: 1, C: 1, Co: 0.5, Cr: 12, Mn: 0.5, Nb: 0.35, Si: 1.5, Ti: 0.25, V: 0.5;
B: 1, C: 1, Co: 0.5, Cr: 12, Mn: 0.5, Mo: 0.5, Nb: 1, Si: 1.5, Ti: 1, V: 0.5;
B: 1, C: 1, Co: 0.5, Cr: 12, Mn: 0.5, Mo: 0.5, Nb: 0.35, Si: 1.5, Ti: 1.8, V: 0.5;
C: 1.9, Cr: 14, Mn: 1.25, Mo: 1, Si: 1, Ti: 5;
B: 0.6, C: 1.2, Cr: 20, Mn: 1, Mo: 1, Nb: 3.5, Si: .0.5, Ti: 0.5, V: 0.5;
B: 0.6, C: 0.8, Cr: 16, Mn: 1, Mo: 1, Nb: 3.5, Si: .0.5, Ti: 0.5, V: 0.5;
B: 0.6, C: 1.6, Cr: 20, Mn: 1, Mo: 1, Nb: 3.5, Si: .0.5, Ti: 0.5, V: 0.5; or
B: 0.6, C: 0.8, Cr: 14.5, Mn: 1, Mo: 1, Nb: 3, Si: 0.5, Ti: 0.5, V: 0.4.

16. A work piece having at least a portion of its surfaced covered by a layer, wherein the layer comprises a wear resistant and corrosion resistant alloy, wherein the alloy possesses the following thermodynamic traits:
a minimum weight fraction of chromium in an iron-based austenitic matrix phase calculated at 1300K of at least 8 wt. %;
a minimum mole fraction of isolated hard particles of 5%, wherein isolated hard particles are carbides or borides that form at a temperature above the formation temperature of the austenite or ferrite iron-based matrix phase;
a maximum delta ferrite concentration of 40 mole %, wherein delta ferrite is any the body centered cubic iron-based matrix phase that exists between 1500K and 1900K; and
a maximum of 10 mole % of iron or chromium based (Fe+Cr>50 wt. %) carbides forming at a temperature above the solidus temperature of the alloy.

17. The work piece of claim 16, wherein the layer comprises a summed total of grain boundary eutectic carbides and borides, defined as those which form in between the liquidus and solidus of the alloy, of 10 mole % or more.

18. The work piece of claim 16, whereas the layer comprises a summed total of grain boundary eutectic carbides and borides, defined as those which form in between the liquidus and solidus of the alloy, of 10 mole % or less.

19. The work piece of claim 16, wherein the work piece is a steel pipe and the layer coats at least a portion of an interior diameter of the pipe.

20. The work piece of claim 16, wherein the work piece is a steel plate and the layer coats at least a portion of at least one surface of the steel plate.

21. The work piece of claim 16, wherein the layer is deposited using one or more of the following techniques: MIG welding, TIG welding, sub-arc welding, open-arc welding, PTA welding, laser cladding, or thermal spraying.

22. The work piece of claim 16, wherein the layer comprises in wt. %:
Fe;
B: 0-1;
C: 0.75-1.9;
Co: 0-0.5;
Cr: 12-21;
Mn: 0.5-1.4;
Mo: 0.5-1.6;
Nb: 0-3.5;
Si: 0.5-1.5;
Ti: 0.2-5; and
V: 0-0.6.

23. The work piece of claim 16, wherein the layer or the feedstock material used to produce the layer comprises, in wt. %, one or more of the following compositions having Fe and:

C: 1, Co: 0.5, Mn: 0.5, Nb: 0.35, Si: 1.5, Ti: 0.25, V: 0.5;
B: 1, C: 1, Co: 0.5, Cr: 12, Mn: 0.5, Nb: 0.35, Si: 1.5, Ti: 0.25, V: 0.5;
B: 1, C: 1, Co: 0.5, Cr: 12, Mn: 0.5, Mo: 0.5, Nb: 1, Si: 1.5, Ti: 1, V: 0.5;
B: 1, C: 1, Co: 0.5, Cr: 12, Mn: 0.5, Mo: 0.5, Nb: 0.35, Si: 1.5, Ti: 1.8, V: 0.5;
C: 1.9, Cr: 14, Mn: 1.25, Mo: 1, Si: 1, Ti: 5;
B: 0.6, C: 1.2, Cr: 20, Mn: 1, Mo: 1, Nb: 3.5, Si: .0.5, Ti: 0.5, V: 0.5;
B: 0.6, C: 0.8, Cr: 16, Mn: 1, Mo: 1, Nb: 3.5, Si: .0.5, Ti: 0.5, V: 0.5;
B: 0.6, C: 1.6, Cr: 20, Mn: 1, Mo: 1, Nb: 3.5, Si: .0.5, Ti: 0.5, V: 0.5; or
B: 0.6, C: 0.8, Cr: 14.5, Mn: 1, Mo: 1, Nb: 3, Si: 0.5, Ti: 0.5, V: 0.4.

* * * * *